US008296561B2

(12) United States Patent
Kanemura et al.

(10) Patent No.: US 8,296,561 B2
(45) Date of Patent: Oct. 23, 2012

(54) CERTIFYING DEVICE, VERIFYING DEVICE, VERIFYING SYSTEM, COMPUTER PROGRAM AND INTEGRATED CIRCUIT

(75) Inventors: Kouichi Kanemura, Osaka (JP); Yoshikatsu Ito, Osaka (JP); Tomoyuki Haga, Nara (JP); Hideki Matsushima, Osaka (JP); Takayuki Ito, Osaka (JP)

(73) Assignee: Panasonic Corporation, Osaka (JP)

( * ) Notice: Subject to any disclaimer, the term of this patent is extended or adjusted under 35 U.S.C. 154(b) by 968 days.

(21) Appl. No.: 12/306,816

(22) PCT Filed: Jul. 2, 2007

(86) PCT No.: PCT/JP2007/063248
§ 371 (c)(1),
(2), (4) Date: Dec. 29, 2008

(87) PCT Pub. No.: WO2008/004524
PCT Pub. Date: Jan. 10, 2008

(65) Prior Publication Data
US 2009/0204806 A1 Aug. 13, 2009

(30) Foreign Application Priority Data
Jul. 3, 2006 (JP) .................................. 2006-182972

(51) Int. Cl.
*H04L 29/06* (2006.01)
(52) U.S. Cl. ...................................... 713/155
(58) Field of Classification Search .................... 713/155
See application file for complete search history.

(56) References Cited

U.S. PATENT DOCUMENTS

| 5,830,918 | A | 11/1998 | Sportsman et al. |
| 5,851,988 | A | 12/1998 | Sportsman et al. |
| 5,896,444 | A | 4/1999 | Perlman et al. |
| 5,918,013 | A | 6/1999 | Mighdoll et al. |
| 5,935,207 | A | 8/1999 | Logue et al. |
| 5,940,074 | A | 8/1999 | Britt et al. |
| 5,945,991 | A | 8/1999 | Britt et al. |
| 5,974,461 | A | 10/1999 | Goldman et al. |

(Continued)

FOREIGN PATENT DOCUMENTS
JP       10-198571     7/1998
(Continued)

OTHER PUBLICATIONS

International Search Report issued Sep. 12, 2007 in the International (PCT) Application of which the present application is the U.S. National Stage.

(Continued)

*Primary Examiner* — Michael S McNally
(74) *Attorney, Agent, or Firm* — Wenderoth Lind & Ponack, L.L.P.

(57) ABSTRACT

An authentication system verifies an authentic computer program, certifies the authenticity itself, and verifies a certification. The authentication system includes a terminal (e.g., requesting device) and a card (e.g., verifying device). The card stores secret information to be used by the terminal, and an update program for the terminal. The card verifies authenticity of the terminal using information obtained from the terminal. When it judges that the terminal is authentic, the card outputs the secret information to the terminal. When it judges that the terminal is not authentic, the card outputs the update program. The terminal is forced to update the program when it attempts to use the secret information.

6 Claims, 49 Drawing Sheets

U.S. PATENT DOCUMENTS

| | | | |
|---|---|---|---|
| 5,996,022 | A | 11/1999 | Krueger et al. |
| 6,005,563 | A | 12/1999 | White et al. |
| 6,008,836 | A | 12/1999 | Bruck et al. |
| 6,023,268 | A | 2/2000 | Britt et al. |
| 6,034,689 | A | 3/2000 | White et al. |
| 6,073,168 | A | 6/2000 | Mighdoll et al. |
| 6,133,913 | A | 10/2000 | White et al. |
| 6,141,693 | A | 10/2000 | Perlman et al. |
| 6,230,319 | B1 | 5/2001 | Britt et al. |
| 6,259,442 | B1 | 7/2001 | Britt et al. |
| 6,278,773 | B1 | 8/2001 | Perlman et al. |
| 6,308,221 | B1 | 10/2001 | Perlman et al. |
| 6,308,222 | B1 | 10/2001 | Krueger et al. |
| 6,311,197 | B2 | 10/2001 | Mighdoll et al. |
| 6,311,207 | B1 | 10/2001 | Mighdoll et al. |
| 6,329,431 | B1 | 12/2001 | Sportsman et al. |
| 6,330,606 | B1 | 12/2001 | Logue et al. |
| 6,332,157 | B1 | 12/2001 | Mighdoll et al. |
| 6,473,099 | B1 | 10/2002 | Goldman et al. |
| 6,496,205 | B1 | 12/2002 | White et al. |
| 6,496,868 | B2 | 12/2002 | Krueger et al. |
| 6,505,232 | B1 | 1/2003 | Mighdoll et al. |
| 6,584,506 | B1 | 6/2003 | Perlman et al. |
| 6,587,886 | B1 | 7/2003 | Perlman et al. |
| 6,614,890 | B2 | 9/2003 | Perlman et al. |
| 6,647,421 | B1 | 11/2003 | Logue et al. |
| 6,662,218 | B2 | 12/2003 | Mighdoll et al. |
| 6,671,724 | B1 | 12/2003 | Pandya et al. |
| 6,848,047 | B1 | 1/2005 | Morikawa et al. |
| 6,891,553 | B2 | 5/2005 | White et al. |
| 6,957,260 | B1 | 10/2005 | Mighdoll et al. |
| 7,302,698 | B1 * | 11/2007 | Proudler et al. ............... 726/2 |
| 7,305,472 | B2 | 12/2007 | Mighdoll et al. |
| 7,350,155 | B2 | 3/2008 | White et al. |
| 7,478,433 | B2 | 1/2009 | Hashiguchi |
| 7,516,213 | B2 | 4/2009 | Cunningham et al. |
| 7,620,811 | B2 | 11/2009 | Maeda et al. |
| 2002/0016367 | A1 | 2/2002 | Sportsman et al. |
| 2002/0054069 | A1 | 5/2002 | Britt et al. |
| 2003/0078188 | A1 | 4/2003 | Kauvar et al. |
| 2003/0226031 | A1 * | 12/2003 | Proudler et al. ............... 713/200 |
| 2005/0021968 | A1 * | 1/2005 | Zimmer et al. ............... 713/176 |
| 2005/0229011 | A1 * | 10/2005 | Ebringer et al. ............... 713/189 |
| 2006/0020781 | A1 * | 1/2006 | Scarlata et al. ............... 713/100 |
| 2006/0031871 | A1 | 2/2006 | Quere et al. |
| 2006/0085848 | A1 * | 4/2006 | Aissi et al. ............... 726/9 |
| 2006/0095961 | A1 * | 5/2006 | Govindarajan et al. ......... 726/15 |
| 2008/0141120 | A1 | 6/2008 | White et al. |
| 2008/0184163 | A1 | 7/2008 | White et al. |

FOREIGN PATENT DOCUMENTS

| | | |
|---|---|---|
| JP | 2003-303028 | 10/2003 |
| JP | 2003-330745 | 11/2003 |
| JP | 2004-320793 | 11/2004 |
| JP | 2005-301550 | 10/2005 |
| JP | 2005-339472 | 12/2005 |
| JP | 2006-50625 | 2/2006 |

OTHER PUBLICATIONS

Trusted Computing Platform Alliance (TCPA), Main Specification Version 1.1b, Published by the Trusted Computing Group, Feb. 2002.
International Search Report issued Sep. 11, 2007 in International (PCT) Application No. PCT/JP2007/063249.

* cited by examiner

| Terminal ID | Update program | Authentic PCR value |
|---|---|---|
| ID_A | UpDate ProgA | A |
| ID_B | UpDate ProgB | B |
| ID_C | UpDate ProgC | C |
| ⋮ | ⋮ | ⋮ |

CRL database 1202

| | CRL database | | |
|---|---|---|---|
| | Terminal ID | Update program | Authentic PCR value |
| T1401 | ID_A | UpDate ProgA | A |
| T1402 | ID_B | UpDate ProgB | B |
| T1403 | ID_N | NULL | Current PCR |
| | ⋮ | ⋮ | ⋮ |

| Terminal ID before conversion | Terminal ID after conversion |
|---|---|
| IDA | IDA-1 |
| IDB | IDB-2 |
| IDC | IDC-3 |
| ⋮ | ⋮ |

| Distribution-purpose encrypted device key | Encrypted individual transmission key |
|---|---|
| E(Deli_Key1, DK1) | E(MK, Deli_Key1) |
| E(Deli_Key2, DK2) | E(MK, Deli_Key2) |
| E(Deli_Key3, DK3) | E(MK, Deli_Key3) |
| ⋮ | ⋮ |

CERTIFYING DEVICE, VERIFYING DEVICE, VERIFYING SYSTEM, COMPUTER PROGRAM AND INTEGRATED CIRCUIT

BACKGROUND OF THE INVENTION

TECHNICAL FIELD

The present invention relates to a technology, in an information processing machine that operates in accordance with a computer program, of requesting verification of the authenticity of the machine itself and verifying the authenticity of another machine.

BACKGROUND ART

As digital contents have become popular, unauthorized copying of contents has become a social issue. When a content processing function is achieved by a software program, the program needs to be protected from unauthorized copying which is attempted by malicious users. When a program achieving a content processing function is tampered or bugged by a malicious user, it is possible that the content in a plain text state may be extracted, or a key used to encrypt the content may be obtained from the program in an unauthorized manner and the content may be decrypted. Digital contents can be redistributed easily via the Internet. Accordingly, if a content in a plain text state is distributed in an unauthorized manner, the advantage of the right owner is greatly lost. To prevent such a matter from occurring, it is important to protect a content processing program from attacks.

However, at a release of a processing program, it is difficult to provide a safe program not having a security hole. Accordingly, it is expected that, for example, a malicious user attacks such a security hole to tamper a content processing program and copy a digital content in an unauthorized manner. After such a fact becomes apparent, the program in question needs to be updated to a new program that has taken measures against the security hole. The following technologies, as one example, are known to perform such countermeasures.

Patent Document 1 discloses a technology in which a server for supplying an update program performs a mutual authentication with an update module of a terminal, and when they recognize each other as authentic, the update program is supplied to the terminal, and a program held by the terminal is updated by the update program. Also, Patent Document 2 discloses a technology in which a card storing an update program performs a mutual authentication with an update module of a terminal, and when they recognize each other as authentic, the terminal obtains the update program from the card, and the terminal itself updates a program held by the terminal.

Patent Document 1: Japanese Patent Application Publication No. H10-198571
Patent Document 2: Japanese Patent Application Publication No. 2003-330745

SUMMARY OF THE INVENTION

According to the above-described conventional technologies, a card or server, which is to supply the update program, performs a mutual authentication with an update module of a terminal, and when they recognize each other as authentic, the update program is supplied. The method of this mechanism depends on the reliability of the update module provided on the terminal side.

However, it is difficult with these technologies to ensure an update of the program when the terminal has already been hacked because in that case, there is a possibility that the reliability of the update module has been lost. For example, when the update module is also a software program, there is a possibility that the update module itself has been hacked. In such a case, when the update module itself has been hacked, the original update process itself may be avoided, or that a judgment on whether or not an update is necessary may be made erroneously. When this occurs, a forced software update becomes impossible.

To prevent the update module itself from being hacked, it is required that the program update system is protected by a tamper-resistant shield that is stronger than the update target program. A conventional technology discloses, for example, a tamper-resistant structure where each constituent element of the program update system is made of hardware. However, the program update system is often created to be large in scale since in many cases it is equipped with a function to perform communication with the Internet or the like. Therefore, it is practically difficult to generate a program update system that is made of hardware as a whole.

It is therefore an object of the present invention to provide an authentication system, a requesting device, a verifying device, a requesting method, a verifying method, a computer program, and an integrated circuit that can show having an authentic computer program, can request verification of the authenticity of itself, and can perform the verification in response to the request.

The above-stated object is fulfilled by an authentication system composed of a requesting device and a verifying device, the requesting device requesting verification from the verifying device, the requesting device including: a storage unit storing a plurality of computer programs that are to run on the requesting device, the computer programs being hierarchically related to each other; a measuring unit operable to, each time one of the plurality of computer programs is loaded, measure an amount of characteristics of said one of the plurality of computer programs; a generation unit which is tamper-resistant and is operable to, while a computer program that is one of the plurality of computer programs is loaded, generate certification information reflecting amounts of characteristics of the computer program and other computer programs that have already been loaded and are required to run the computer program; and an output unit operable to output the generated certification information, the verifying device including: an obtaining unit operable to obtain the certification information; a storing unit preliminarily storing verification information reflecting amounts of characteristics which are to be obtained from the computer program and the other computer programs when the computer program and the other computer programs are not tampered with; and a judging unit operable to judge, using the verification information and the obtained certification information, whether or not the requesting device is authentic.

With the above-described structure, the requesting device, with use of the tamper-resistant generation unit, generates certification information reflecting amounts of characteristics of the computer program. The generated certification information is therefore reliable. Also, the verifying device judges the authenticity of the requesting device using the obtained certification information. This structure therefore produces an excellent advantageous effect that the authenticity can be verified reliably.

The above-stated authentication system may use a configuration certification technology specified in Trusted Computing Group (TCG), wherein the generation unit constitutes a Trusted Platform Module specified in the TCG, and the judging unit makes the judgment on authenticity of the requesting device by performing a verification process specified in the TCG.

With the above-described structure, the generation unit constitutes a Trusted Platform Module specified in the TCG. The generated certification information is therefore reliable. Also, it makes the judgment on authenticity of the requesting device by performing a verification process specified in the TCG. Accordingly, it is possible to verify the authenticity of the requesting device reliably.

The above-stated generation unit may include a plurality of platform configuration registers for storing amounts of characteristics, and the generation unit receives specification of one of the platform configuration registers from the verifying device, and generates the certification information in accordance with an amount of characteristics stored in the register indicated by the received specification. Also, the obtain unit may obtain certification information that was generated in accordance with an amount of characteristics stored in a platform configuration register specified by the verifying device, and the judging unit makes the judgment on authenticity of the requesting device, using the obtained certification information and an amount of characteristics to be stored in the platform configuration register.

With the above-described structures, the requesting device includes a plurality of platform configuration registers for storing amounts of characteristics, and generates the certification information in accordance with an amount of characteristics stored in the register specified by the verifying device, and the verifying device makes the judgment on authenticity of the requesting device, using the obtained certification information and an amount of characteristics to be stored in the specified platform configuration register, and thus can restrict the PCRs, reduce size of the data to be transferred on a communication path between the requesting device and the verifying device, and reduce the load on the network between the requesting device and the verifying device. Also, since the PCRs are restricted, the load on the generation of the certification information by the requesting device is reduced.

The above-stated requesting device may further comprise: an obtaining unit operable to obtain another certification information for certifying authenticity of the verifying device, said another certification information having been generated based on at least an amount of characteristics of a computer program for operating the verifying device; and a judging unit operable to judge, using the obtained another certification information, whether or not the verifying device is authentic. Also, the verifying device may further comprise: a storage unit storing a plurality of computer programs that are to run on the verifying device, the computer programs being hierarchically related to each other; a measuring unit operable to, each time one of the plurality of computer programs is loaded, measure an amount of characteristics of said one of the plurality of computer programs; a generation unit which is tamper-resistant and is operable to generate certification information while one computer program among the plurality of computer programs is loaded, the certification information reflecting (a) an amount of characteristics of the one computer program and (b) amounts of characteristics of other computer programs that have already been loaded and are required to run the one computer program; and an output unit operable to output the generated certification information.

With the above-described structures, a mutual authentication is performed between the verifying device and the requesting device, which makes it possible to provide a higher security environment.

The above-stated requesting device may further comprise a second generation unit which is tamper-resistant, wherein the storage unit further stores a second computer program for operating the requesting device, the second computer program including a plurality of computer instructions, the second generation unit requests verification of authenticity of the second generation unit itself from the generation unit, the generation unit verifies authenticity of the second generation unit, the measuring unit further measures a second amount of characteristics when the second computer program is loaded, the second amount of characteristics being an amount of characteristics of the second computer program, the second generation unit, when the generation unit has confirmed authenticity of the second generation unit, generates second certification information for requesting verification of authenticity of the requesting device, based on at least the second amount of characteristics, and the output unit further outputs the second certification information. Also, the obtaining unit may further obtain second certification information for certifying authenticity of the requesting device, the second certification information having been generated based on at least an amount of characteristics of a second computer program for operating the requesting device, and the judging unit further makes the judgment on authenticity of the requesting device by using the obtained second certification information.

With the above-described structures, the requesting device is provided with two TPMs corresponding to two computer programs, and in the verifying device, in addition to verification of each TPM, the first TPM verifies the authenticity of the second TPM. Accordingly, it is possible to provide a higher security environment to a requesting device on which a plurality of computer programs run in conjunction with each other.

The above-stated verifying device may be a card storing second certification information for certifying authenticity of the verifying device itself, and the generation unit, when the verifying device has confirmed authenticity of the requesting device successfully, obtains the second certification information from the verifying device, and judges, using the obtained second certification information, whether or not the verifying device is authentic. Also, the verifying device may be a card and further comprise: a certification information storage unit storing second certification information indicating authenticity of the verifying device; and an output unit operable to output the second certification information when the judging unit has confirmed authenticity of the requesting device successfully.

With the above-described structure, the verifying device is a card, and outputs the second certification information when the judging unit has confirmed authenticity of the requesting device successfully, and the requesting device judges, using the obtained second certification information, whether or not the verifying device is authentic. This enables a mutual authentication to be performed between the requesting device and the verifying device being a card.

In the above-stated requesting device, when the verifying device has confirmed authenticity of the requesting device itself, the requesting device may further request verification of authenticity of itself from a second verifying device, the storage unit further stores a plurality of second computer programs that are to run on the requesting device, the second computer programs being hierarchically related to each other, the measuring unit, each time one of the plurality of second computer programs is loaded, measures an amount of characteristics of said one of the plurality of second computer programs, the requesting device further comprises a second generation unit which is tamper-resistant and is operable to, while a second computer program that is one of the plurality of second computer programs is loaded, generate second certification information reflecting amounts of characteristics of the second computer program and other second computer programs that have already been loaded and are required to run the second computer program, and the output unit further outputs the generated second certification information to the second verifying device.

With the above-described structure, the requesting device is provided with two TPMs corresponding to two computer programs, the first verifying device verifies the first TPM, and when the verification results in a success, the first verifying device further verifies the second TPM. Accordingly, it is possible to provide a higher security environment to a requesting device on which a plurality of computer programs run in conjunction with each other.

The above-stated requesting device may further comprise: a requesting unit operable to send a request for secret information to the verifying device; a receiving unit operable to receive either the secret information or an update program, depending on a result of a judgment which is made by the verifying device to confirm whether or not the requesting device is authentic; and an update unit operable to, when the receiving unit has received the update program, update the computer program stored in the storage unit in accordance with the received update program. Also, The verifying device may further comprise: an information holding unit holding secret information safely; a program storage unit storing an update program for updating a computer program including a plurality of computer instructions for operating the requesting device; and an output unit operable to output the secret information held by the information holding unit to the requesting device when authenticity of the requesting device has been confirmed, and output the update program stored in the program storage unit to the requesting device when unauthenticity of the requesting device has been confirmed.

With the above-described structure, the requesting device cannot obtain a desired piece of secret information unless it updates the computer program in accordance with the received update program. Accordingly, this makes it possible to force the requesting device to update the computer program.

The above-stated secret information may be an encrypted device key that was generated by encrypting a device key assigned to the requesting device, based on a device identifier for identifying the requesting device, the receiving unit receives the encrypted device key when the verifying device has confirmed authenticity of the requesting device, the requesting device further comprises a decrypting unit operable to generate a device key by decrypting the received encrypted device key, based on the device identifier for identifying the requesting device. Also, the information holding unit may hold, as the secret information, an encrypted device key that was generated by encrypting a device key assigned to the requesting device, based on a device identifier for identifying the requesting device, and the output unit outputs the encrypted device key when authenticity of the requesting device has been confirmed.

With the above-described structure, information to be transferred from the verifying device to the requesting device is encrypted based on a device identifier that is unique to the requesting device. This makes it possible to prevent the aforesaid information from being obtained in an unauthorized manner by an unauthorized device spoofing the requesting device. The above-stated generation unit may generate the certification information based on amounts of characteristics measured by the measuring unit and a device identifier for identifying the requesting device. Also, the obtaining unit may obtain the certification information that was generated based on the amount of characteristics and a device identifier for identifying the requesting device, the verifying device further comprises a verification information obtaining unit operable to obtain verification information that was generated based on an authentic amount of characteristics and the device identifier of the requesting device, the authentic amount of characteristics being an amount of characteristics of an authentic computer program, and based on the device identifier of the requesting device, and the judging unit makes the judgment on authenticity of the requesting device, using the certification information and the verification information.

With the above-described structures, the certification information is generated based on amounts of characteristics measured by the measuring unit and a device identifier for identifying the requesting device, and the verification information is generated based on an authentic amount of characteristics being an amount of characteristics of an authentic computer program, and based on the device identifier of the requesting device, and the authenticity of the requesting device is judged based the certification information and the verification information. This makes it possible to prevent an unauthorized device from spoofing the requesting device.

The above-stated generation unit may generate the certification information based on amounts of characteristics measured by the measuring unit and a device identifier for identifying the requesting device. Also, the obtaining unit may obtain the certification information that was generated based on the amount of characteristics and a device identifier for identifying the requesting device, the verifying device further comprises an authentic amount of characteristics obtaining unit operable to obtain an authentic amount of characteristics, the authentic amount of characteristics being an amount of characteristics of an authentic computer program; and a verification information generating unit operable to generate verification information for verifying authenticity of the requesting device, based on the obtained authentic amount of characteristics, and based on the device identifier of the requesting device, and the judging unit makes the judgment on authenticity of the requesting device, using the certification information and the verification information.

With the above-described structures, the certification information is generated based on amounts of characteristics measured by the measuring unit and a device identifier for identifying the requesting device, and the verification information is generated based on an authentic amount of characteristics being an amount of characteristics of an authentic computer program, and based on the device identifier of the requesting device, and the authenticity of the requesting device is judged based the certification information and the verification information. This makes it possible to prevent an unauthorized device from spoofing the requesting device.

The above-stated verifying device may further comprise: an identifier obtaining unit operable to obtain a device identifier for identifying the requesting device; an encrypting unit operable to generate an encrypted device key by encrypting a device key assigned to the requesting device, based on the obtained device identifier; and a device key storing unit operable to store the generated encrypted device key into the information holding unit.

With the above-described structure, the verifying device generates an encrypted device key by encrypting a device key assigned to the requesting device, based on the obtained device identifier, and outputs the generated encrypted device key to the requesting device. With this structure, even if an unauthorized device spoofed the requesting device and obtained the encrypted device key in an authorized manner, the unauthorized device would not be able to decrypt the encrypted device key correctly since it does not recognize the correct device identifier. Accordingly, an unauthorized use of a device key can be prevented.

The above-stated secret information may be an encrypted device key that was generated by encrypting a device key, the requesting device further comprises an encrypting unit, the receiving unit receives the encrypted device key when the verifying device has confirmed authenticity of the encrypting unit, the encrypting unit generates a double-encrypted device key by encrypting the received encrypted device key, based on the device identifier for identifying the requesting device, and the requesting device further comprises a device key holding unit operable to hold the generated double-encrypted device key. Also, the requesting device may include an encrypting unit operable to encrypt an encrypted device key, the information holding unit holds the encrypted device key as the secret information, the judging unit makes the judgment on authenticity of the requesting device, by judging whether or not the encrypting unit of the requesting device is authentic, and the output unit outputs the encrypted device key to the requesting device when authenticity of the encrypting unit has been confirmed.

With the above-described structures, the encrypted device key is sent from the verifying device to the requesting device when authenticity of the encrypting unit provided in the requesting device has been confirmed, and the encrypting unit provided in the requesting device generates a double-encrypted device key by encrypting the received encrypted device key, based on the device identifier for identifying the requesting device, and stores the generated double-encrypted device key. This makes it possible to authenticate the requesting device more reliably. Also, the double-encryption prevents the device key from being leaked in a more enhanced manner.

The above-stated encrypting unit may include: a storage subunit storing an encryption program including a plurality of computer instructions constituting an encryption algorithm; and a microprocessor that operates in accordance with the encryption program, the receiving unit, when the verifying device has failed to confirm authenticity of the encrypting unit, receives, as the update program, an authentic encryption program including a plurality of computer instructions constituting an encryption algorithm, and overwrites the encryption program stored in the storage subunit with the received authentic encryption program, and the encrypting unit achieves a function of the encryption algorithm as the microprocessor operates in accordance with the authentic encryption program. Also, the encrypting unit of the requesting device may include (i) a storage subunit storing an encryption program including a plurality of computer instructions constituting an encryption algorithm, and (ii) a microprocessor that operates in accordance with the encryption program, the program storage unit stores, as the update program, an authentic encryption program including a plurality of computer instructions constituting the encryption algorithm, and the output unit outputs the authentic encryption program to the requesting device when unauthenticity of the encrypting unit has been confirmed.

With the above-described structures, the requesting device cannot obtain a desired piece of secret information unless it updates the original encryption program in accordance with the received authentic encryption program. Accordingly, this makes it possible to force the requesting device to update an encryption program to be an authentic encryption program.

When it has been confirmed that the encryption program for performing an individual encryption was deleted, the receiving unit may further receive, from the verifying device, a key that is indispensably required for decrypting the received encrypted device key. Also, the output unit may output a key required for decrypting the encrypted device key when the judging unit has confirmed that the encrypt ion program for performing an individual encryption was deleted.

With the above-described structures, the requesting device cannot obtain a key that is dispensable for decrypting the device key unless it deletes the received encryption program. Accordingly, this makes it possible to force the requesting device to delete the encryption program.

BRIEF DESCRIPTION OF THE DRAWING

FIG. 14 is a block diagram showing the structure of the CRL database provided in the card in Embodiment 1 of the present invention.

FIG. 19 shows an example of the data structure of the management table T2000.

FIG. 25 shows an example of the data structure of the secret information management table T2100.

DESCRIPTION OF CHARACTERS 2000, 2000a, 2000b, 2100 device key distribution system
2001, 2001a, 2001b, 2101 terminal
2002, 2002a, 2002b, 2102 card
2003, 2003a, 2003b, 2103 network connected terminal
2004, 2004a, 2004b, 2104 server
2010, 2010a, 2010b, 2110 ID storage unit
2011, 2011a, 2011b program storage unit
2012, 2012a, 2012b, 2113 terminal measuring unit
2013, 2013a, 2013b program updating unit
2014, 2014a, 2014b secret information decrypting unit
2020, 2020a, 2020b, 2120 secret information providing unit
2021, 2021a, 2021b, 2121 terminal ID storage unit
2022, 2022a, 2022b, 2122 authenticity confirmation information storage unit
2023, 2023a, 2023b, 2123 update program storage unit
2024, 2024a, 2024b, 2124 secret information obtaining unit
2025, 2025a, 2025b, 2125 authenticity confirmation information obtaining unit
2026 2026a, 2026b, 2126 update program obtaining unit
2027, 2027a, 2027b, 2127 authenticity confirmation unit
2028, 2028a, 2028b, 2128 program output unit
2029, 2029a, 2029b, 2132 secret information storage unit
2030, 2030a, 2030b, 2133 switch
2040b confirmation information individualizing unit
2041b device key individualizing unit
2042b card ID storage unit
2043b terminal common key storage unit
2111 first program storage unit
2112 second program storage unit
2114 first program updating unit
2115 second program updating unit
2116 device key individualizing unit
2117 individual device key storage unit
2118 device key decrypting unit
2123 first update program storage unit
2124 second update program storage unit
2125 secret information obtaining unit
2127 first update program obtaining unit
2128 second update program obtaining unit
2130 first program output unit
2131 second program output unit
2140 confirmation information individualizing unit
3000 authentication system
3001 terminal device
3002 CA server device
3003 TPM server device
3004 terminal server device
3005 Internet 3102 control unit
3103 transmission/reception unit
3104 measured value notifying unit
3106 program storage unit
3107 RTM
3108 memory
3111 PCR value storage unit
3112 log obtaining unit
3113 PCR value calculating unit
3114 certificate storage unit
3116 log storage unit
3117 TPM
3118 TPM control unit
3119 verifying unit
3120 key storage unit

DETAILED DESCRIPTION OF THE INVENTION

In the following, an embodiment of the present invention will be described with reference to the attached drawings.

Figure 1:
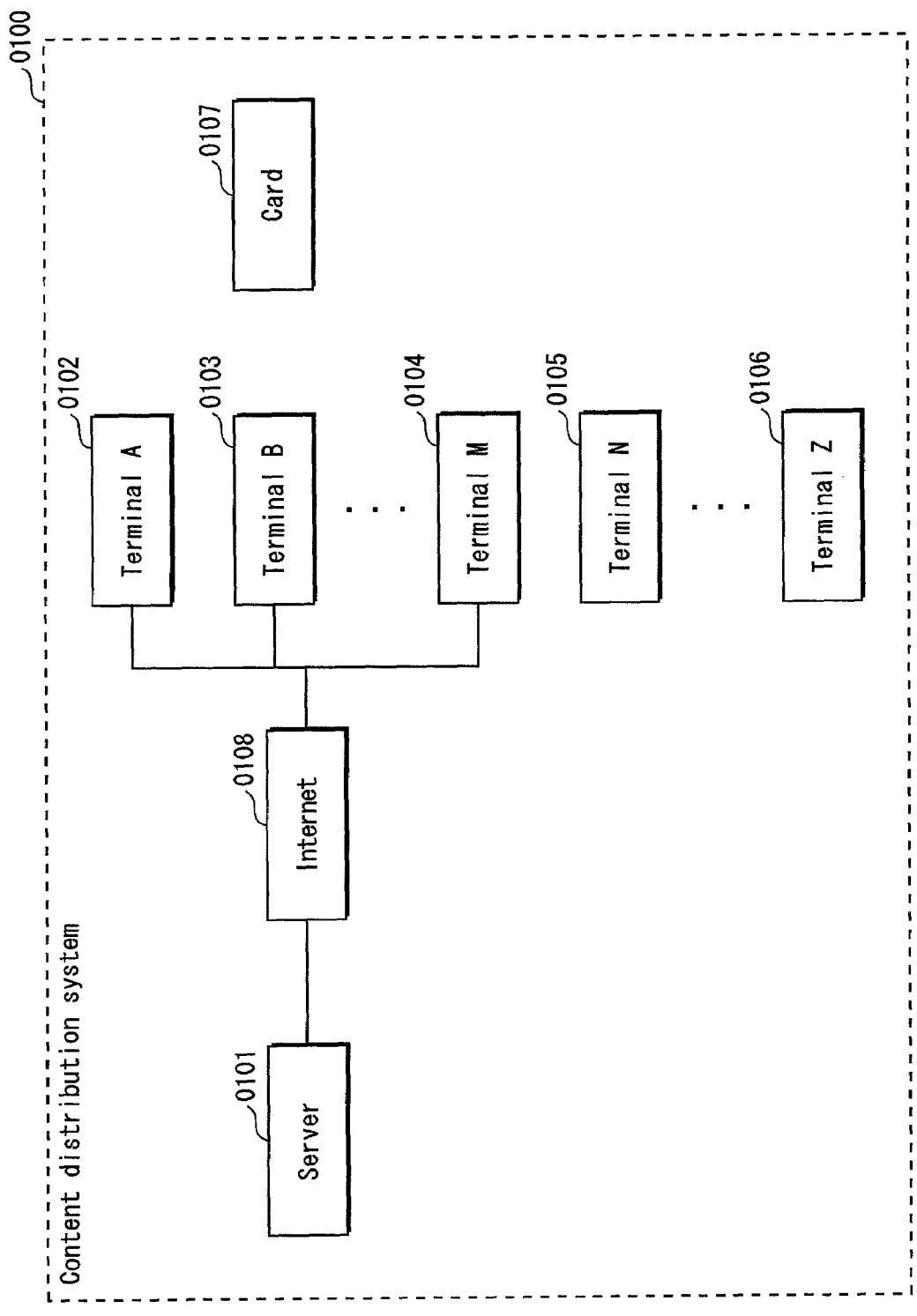
FIG. 1 is a block diagram showing the structure of the content distribution system in Embodiment 1 of the present invention.

FIG. 1 shows the structure of a content distribution system 0100. The content distribution system 0100 is composed of a server 0101, a terminal A 0102, a terminal B 0103, . . . a terminal M 0104, a terminal N 0105, . . . a terminal Z 0106, and a card 0107. The server 0101 is connected with the terminal A 0102, the terminal B 0103, and the terminal M 0104 via the Internet 0108. The terminal N 0105 and the terminal Z 0106 do not have means for directly performing communication with the server 0101. The terminal A 0102, the terminal B 0103, . . . the terminal M 0104, and the terminal N 0105, . . . the terminal Z each have a card interface, and can transfer data among them via the card 0107.

Note that, although FIG. 1 shows only the terminal A 0102, the terminal B 0103, and the terminal M 0104 as terminals that are connected with the server 0101, one or more terminals having the same structure as, for example, the terminal A 0102 may further exist in the content distribution system 0100. Alternatively, the number of such terminals existing in the content distribution system 0100 may be smaller than the number of terminals shown in FIG. 1. Hereinafter, description of the structure of the terminal B 0103 and the terminal M 0104 is omitted, except for the cases where it is necessary, since they have the same structure as the terminal A 0102. Also, although FIG. 1 shows only the terminal N 0105 and the terminal Z 0106 as terminals that are not connected with the server 0101, one or more terminals having the same structure as the terminal N 0105 or the terminal Z 0106 may further exist in the content distribution system 0100. Alternatively, the number of such terminals existing in the content distribution system 0100 may be smaller than the number of terminals shown in FIG. 1. Hereinafter, description of the structure of the terminal Z 0106 is omitted, except for the cases where it is necessary, since it has the same structure as the terminal N 0105.

The terminal A 0102 has a function to perform communication with the server 0101 via the Internet 0108 and download a content such as music or a movie therefrom, and a function to play back the downloaded content. Note that the contents are protected by copyright and are downloaded to the terminal A 0102 in an encrypted state.

The card 0107 performs communication with the server 0101 via the terminal A 0102 and the Internet 0108, obtains a key used to encrypt a content, and upon request from the terminal A 0102, gives the key to the terminal A 0102. Here, the card 0107 is structured to output the key only after it confirms that the terminal A 0102 is an authentic terminal. More specifically, the card 0107 gives the key to the terminal A 0102 only after it confirms through a mutual authentication that the terminal A 0102 is an authentic terminal.

Figure 2:
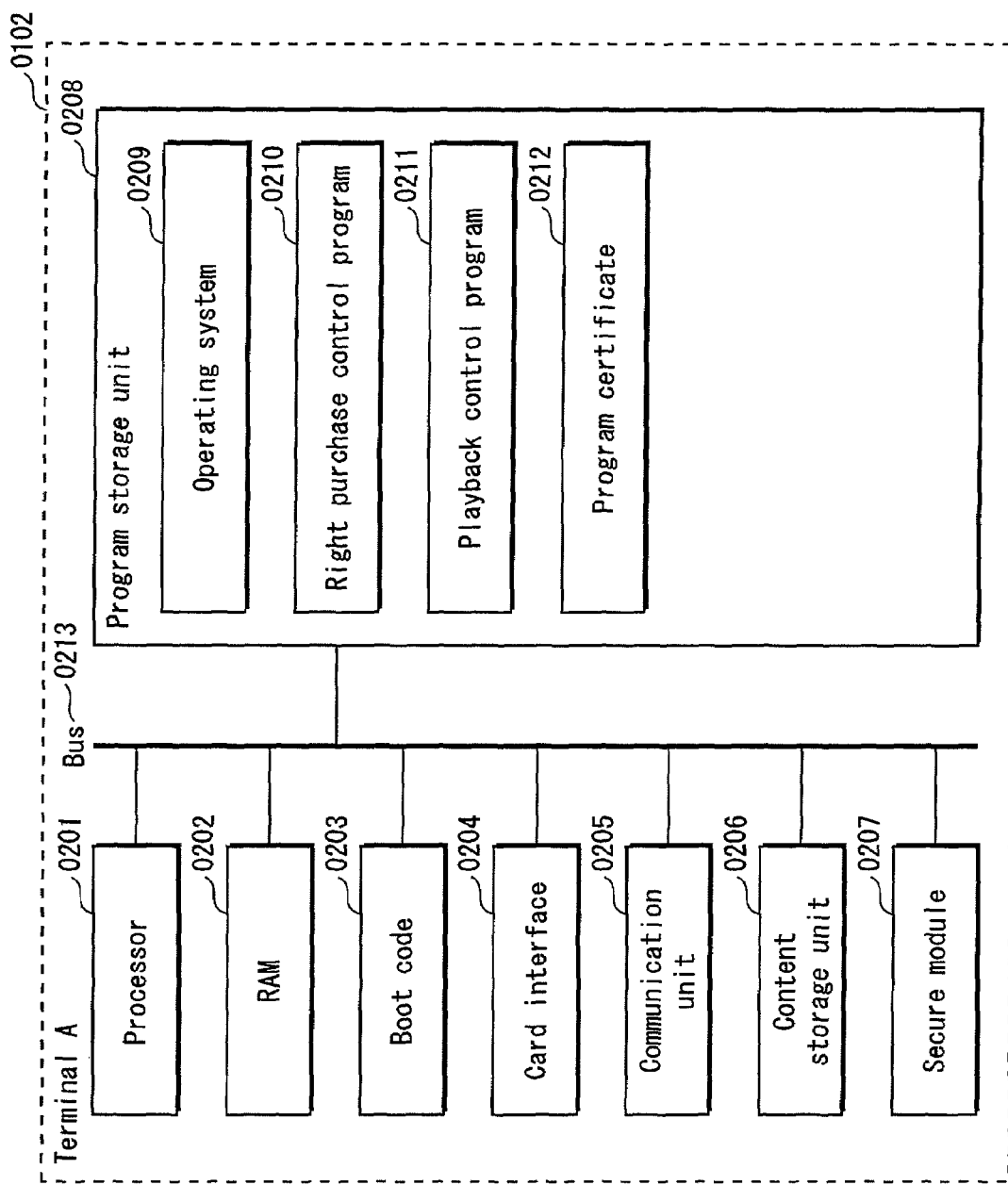
FIG. 2 is a block diagram showing the hardware structure of the terminal A in Embodiment 1 of the present invention.

FIG. 2 shows the structure of the terminal A 0102. Note that the terminal B 0103 and the terminal M 0104 have the same structure as the terminal A 0102. The terminal A 0102 is composed of a processor 0201, a RAM 0202, a boot code 0203, a card interface 0204, a communication unit 0205, a content storage unit 0206, a secure module 0207, and a program storage unit 0208. These units are connected with each other via a bus 0213. The program storage unit 0208 stores an operating system 0209, a right purchase control program 0210, a playback control program 0211, a program certificate 0212.

The processor 0201 executes the boot code 0203 and the programs having been loaded in the RAM 0202, and performs various processes for the terminal A 0102.

The RAM 0202 holds a program that is loaded thereto for execution by the processor 0201. The program to be loaded thereto is stored in the program storage unit 0208.

The boot code 0203 includes one or more codes (boot codes) that are to be executed first by the processor 0201 after the terminal A 0102 is reset. The boot code 0203 expands the operating system 0209 stored in the program storage unit 0208, into the RAM 0202.

The card interface 0204 is an interface which connects the card 0107 with the terminal A 0102. A program that runs in the processor 0201 can perform communication with the card 0107 by performing communication with the card interface 0204. A program that runs in the terminal A 0102 always uses the card interface 0204 to perform communication with the card 0107. In the following description, description of the card interface 0204 will be omitted when a communication between the card 0107 and the program running in the terminal A 0102 is described.

The communication unit 0205 is an interface which connects the Internet 0108 with the terminal A 0102. A program that runs in the processor 0201 can perform communication with the server 0101 via the Internet 0108 by performing communication with the communication unit 0205.

The content storage unit 0206 stores contents that are downloaded from the server 0101 by the terminal A 0102.

The secure module 0207 is a device that has the same function as the TPM (Trusted Platform Module) standardized by the TCG (Trusted Computing Group). For detailed specifications of the TPM, see the homepage of the TCG <URL: http://www.trustedcomputinggroup.org>.

The secure module 0207 includes a register called PCR (Platform Configuration Register). The register stores a value that is dependent on the software structure of the terminal A 0102. The secure module 0207 provides a command for updating the PCR. When the command is executed, a current PCR value and the argument of the command are concatenated, a one-way function is applied to a value obtained by the concatenation, and the PCR is updated in accordance with the result of the function application. Hereinafter, the command is referred to as a PCR extend command.

The secure module 0207 can provide a service of attaching a signature to a PCR value using a private key that is held within the secure module 0207 in a state protected from being taken out outside. This service is called "attestation". For example, a program running in the terminal A 0102 may obtain a current PCR value to which a signature has been attached with use of the attestation service provided by the secure module 0207, and transmit the obtained value to the server 0101. In this case, the server 0101 can confirm whether or not the value received therefrom is a PCR value generated by the secure module 0207, by performing signature verification using the public key of the secure module 0207 obtained from an authentication authority. Note that the secure module 0207 has been made tamper-resistant so that the PCR extend process and the attestation process, which are performed in the secure module 0207, cannot be altered in an unauthorized manner.

The program storage unit 0208 stores programs that run in the terminal A 0102, and stores the operating system 0209, the right purchase control program 0210, the playback control program 0211, and the program certificate 0212.

The operating system 0209 is infra structure software of the terminal A 0102, and provides services to applications that operate on the operating system 0209. The operating system 0209 loads applications stored in the program storage unit 0208 onto the RAM 0202.

Next, processes performed by the programs will be described.

Figure 3:
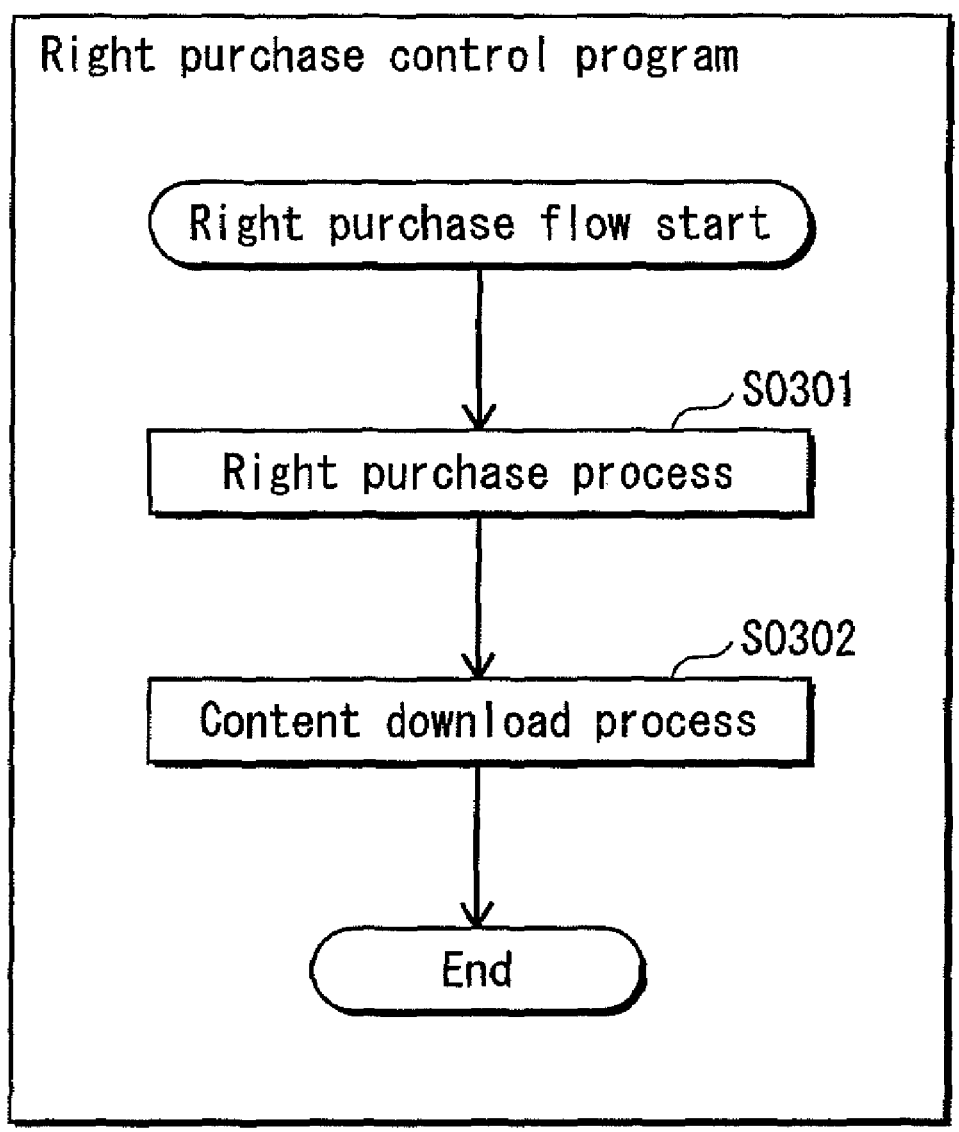
FIG. 3 is a flowchart showing the operation of the right purchase control program in Embodiment 1 of the present invention.

FIG. 3 shows an operational flow of the right purchase control program 0210. The right purchase control program 0210 is an application that operates on the operating system 0209. The right purchase control program 0210 performs a process of requesting the card 0107 to obtain a right of a content that is provided from the server 0101. The right purchase control program 0210 also downloads the content. The following will describe the process in detail.

The right purchase control program 0210, after being loaded by the operating system 0209 and obtaining the right for control, first obtains a list of purchasable contents from the server 0101. The list includes information for identifying the contents, such as content IDs, content titles, or content summaries. Next, the right purchase control program 0210 presents the list to the user of the terminal A 0102, causes the user to select a content to purchase, and transmits a content purchase request to the card 0107 via the card interface 0204, where the content purchase request including a content ID of the selected content, and a terminal ID identifying a terminal (in this example, the terminal A 0102) by which the content is purchased (step S0301).

Next, the right purchase control program 0210 transmits the content ID of the content requested to the card 0107 to purchase, to the server 0101, downloads the requested content from the server 0101, and stores the downloaded content into the content storage unit 0206. Here, since the downloaded content has been encrypted, the copyright is protected even if the content is copied in an unauthorized manner from the content storage unit (step S0302).

Note that the terminal A 0102 may purchase a content for a terminal, such as the terminal N 0105, that is not connected with the Internet 0108. In this case, the terminal ID to be included in the content purchase request is the terminal ID of the terminal, such as the terminal N 0105, that is not connected with the Internet 0108. In addition to this, an additional step is performed, after step S0302, to transfer the content to the card 0107 so that the content is transferred to the terminal N 0105.

Figure 4:
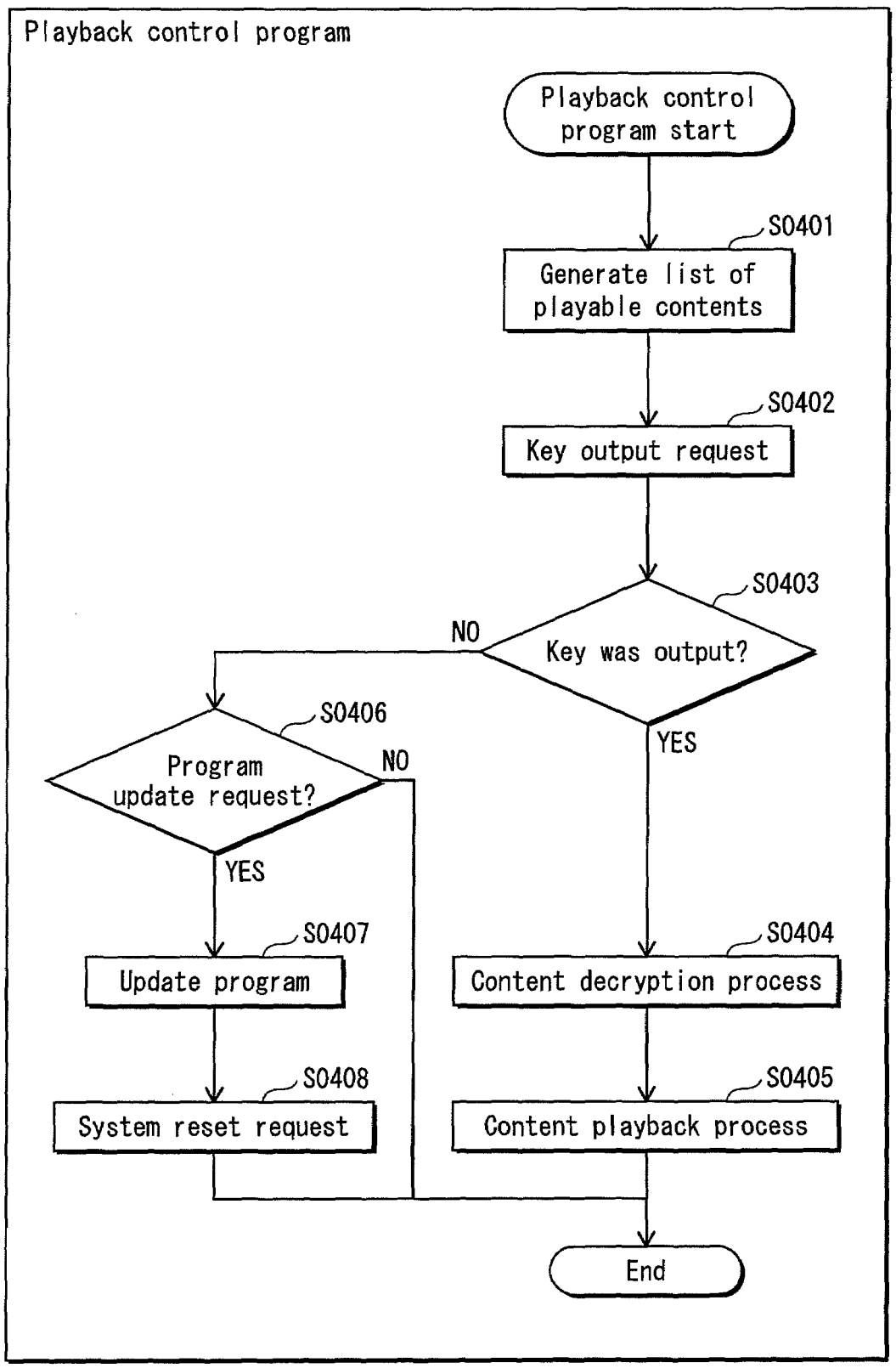
FIG. 4 is a flowchart showing the operation of the playback control program in Embodiment 1 of the present invention.

FIG. 4 shows an operational flow of the playback control program 0211. The playback control program 0211 is an application that operates on the operating system 0209. The playback control program 0211 obtains a key used to encrypt a content, from the card 0107, decrypts the content using the key, and plays back the decrypted content. Also, upon receiving a request to updated a program in the terminal A 0102, from the card, the playback control program 0211 updates the program stored in the program storage unit 0208. The following will describe in detail the process performed by the playback control program 0211.

The playback control program 0211, after being loaded by the operating system 0209 and obtaining the right for control, first obtains a list of contents stored in the content storage unit 0206, and generates a list of playable contents by asking and referring to information provided by the card 0107. The card 0107 stores keys respectively used to encrypt contents stored therein, and stores content IDs that correspond to the keys. The playback control program 0211 obtains a list of the content IDs stored in the card 0107, and then generates the list of playable contents by comparing the list with a list of the content IDs of contents stored in the content storage unit 0206. The generated list is, for example, a list of contents whose corresponding keys are stored in the card (step S0401).

Note that the playback control program 0211 may also obtain the list of content IDs stored in the card 0107, from the card 0107, and add it to the list of playable contents. The additional list is generated in the same procedure as that in which the list of playable contents for the contents stored in the terminal A 0102 is generated. The list including this additional list becomes a list of contents corresponding to keys that exist in the terminal including the card, and becomes a list of contents (regardless of whether they are stored in the content storage unit 0206) that can be played back by the terminal.

The playback control program 0211 presents the list of playable contents generated in step S0401, to the user of the terminal A 0102, causes the user to select a content to playback, and obtains a content ID of the selected content. The playback control program 0211 transmits key output request information including the content ID to the card 0107, thereby requesting to output a key used to encrypt the selected content (step S0402). The key out put request information includes a content ID, a terminal ID, a program certificate, and a current PCR value to which a signature has been attached. Here, the current PCR value with signature attached has been obtained by the playback control program 0211 using the attestation service by the secure module, and the PCR value is a value that is dependent on the software that is currently operating in the terminal.

Next, the playback control program 0211 asks the card 0107 whether the card 0107 has output the requested key (step S0403). When the requested key has been output (YES in step S0403), the playback control program 0211 performs the content decryption process using the key (step S0404). When the requested key has not been output (NO in step S0403), the playback control program 0211 confirms whether or not a program update request has been made by the card 0107 (step S0406). Note that the program update request is a request to update a program, the request being issued by the card 0107 before outputting the key when the card 0107 judges that a security hole or the like has been detected in a program that is to process the content in concern.

When the requested key has been output (YES in step S0403), the playback control program 0211 obtains the key from the card 0107, obtains the content to be played back from the content storage unit 0206 or the card 0107, and decrypts the content (step S0404).

After the decryption, the playback control program 0211 plays back the decrypted content (step S0405). The playback control program 0211 performs a playback in accordance with the type of the decrypted content. The succeeding playback procedure is based on a general playback method, and description thereof is omitted.

When the requested key has not been output (NO in step S0403), the playback control program 0211 confirms whether or not a program update request has been made. When it is confirmed that a program update request has been made (YES in step S0406), the playback control program 0211 obtains an update program and an authentic PCR value that will be described later, and updates the program stored in the program storage unit 0208 and the program certificate 0212 that will be described later (step S0407). Note that the update target program and the program certificate 0212 of the update target program are obtained from the server 0101 and updated. After this, the playback control program 0211 transmits a system reset request to the operating system 0209 to reboot the terminal A 0102 (step S0408).

When it is confirmed that a program update request has not been made (NO in step S0406), the playback control program 0211 ends the process.

Up to now, the process performed by the playback control program 0211 has been explained. In the following, the description of the information stored in the program storage unit 0208 will be resumed.

The program certificate 0212 is data that is generated by attaching a signature to a PCR value held by the secure module 0207, using a private key that is known only to the maker of the terminal A 0102. The PCR value to which the signature is to be attached is a PCR value that is obtained after the terminal A 0102 is booted and the operating system 0209 and various types of applications are loaded. Before attaching the signature, the maker confirms whether or not the operating system 0209 and the various types of applications satisfy the implementation conditions defined in various copyright protection standards. Here, the terminal A 0102 cannot generate the program certificate 0212 since the private key to be used for the signature has not been loaded in the terminal A 0102. The program certificate 0212 is generated in a factory of the maker, for example.

To cause the PCR value to depend on the software structure of the terminal A 0102, the PCR value is updated by executing a PCR extend command, using, as an argument, a hash value of a program loaded in the terminal A 0102. It is possible to cause the PCR value always to depend on the software structure of the terminal A 0102, in the following way: whenever a program is loaded, a hash value of the load target program is calculated, and the PCR is updated by the PCR extend command using the calculated hash value.

Figure 5:
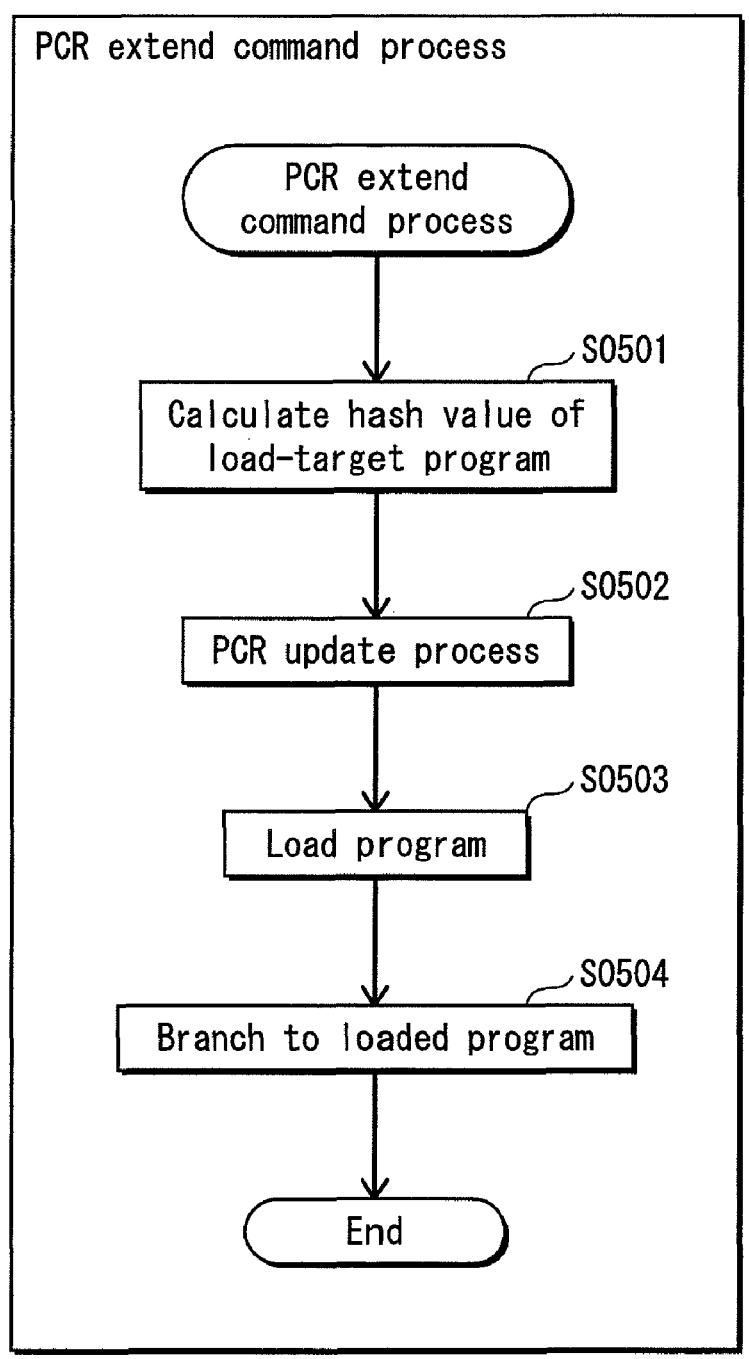
FIG. 5 is a flowchart showing the operation of the PCR extend command process in Embodiment 1 of the present invention.

FIG. 5 shows a flow of a process for updating the PCR in the secure module 0207 such that the PCR stores a value that depends on the software structure of the terminal A 0102. This process is included in common in the operations of the boot code 0203 and the operating system 0209, where the boot code 0203 loads the operating system 0209, and the operating system 0209 loads the various types of application programs. This is because the boot code 0203 changes the software structure of the terminal A 0102 by reading the operating system 0209, and the operating system 0209 changes the software structure of the terminal A 0102 by reading the application programs.

In the following explanation, a program calling another program is referred to as a loader program (for example, the boot code 0203 when loading the operating system 0209, and the operating system 0209 when loading the various types of application programs), and a program called by an other program is referred to as a load-target program (for example, the operating system 0209 when being loaded by the boot code 0203, and the various types of application programs when being loaded by the operating system 0209).

The loader program first calculates a hash value of a load-target program by a hash function algorithm (step S0501). Next, the loader program executes a PCR extend command using the hash value as an argument, and updates the value of PCR in the secure module 0207 (step S0502). After the PCR update process is completed (step S0502), the loader program expands the load-target program into the RAM 0202 (step S0503). Lastly, the loader program branches to a program that was loaded into the RAM 0202 (step S0504).

The terminal A 0102, after it is powered or reset, namely, after it is booted, loads the operating system 0209 and the various types of applications into the RAM 0202. The terminal A 0102, when loading a program, updates the PCR as explained with reference to FIG. 5.

Figure 6:
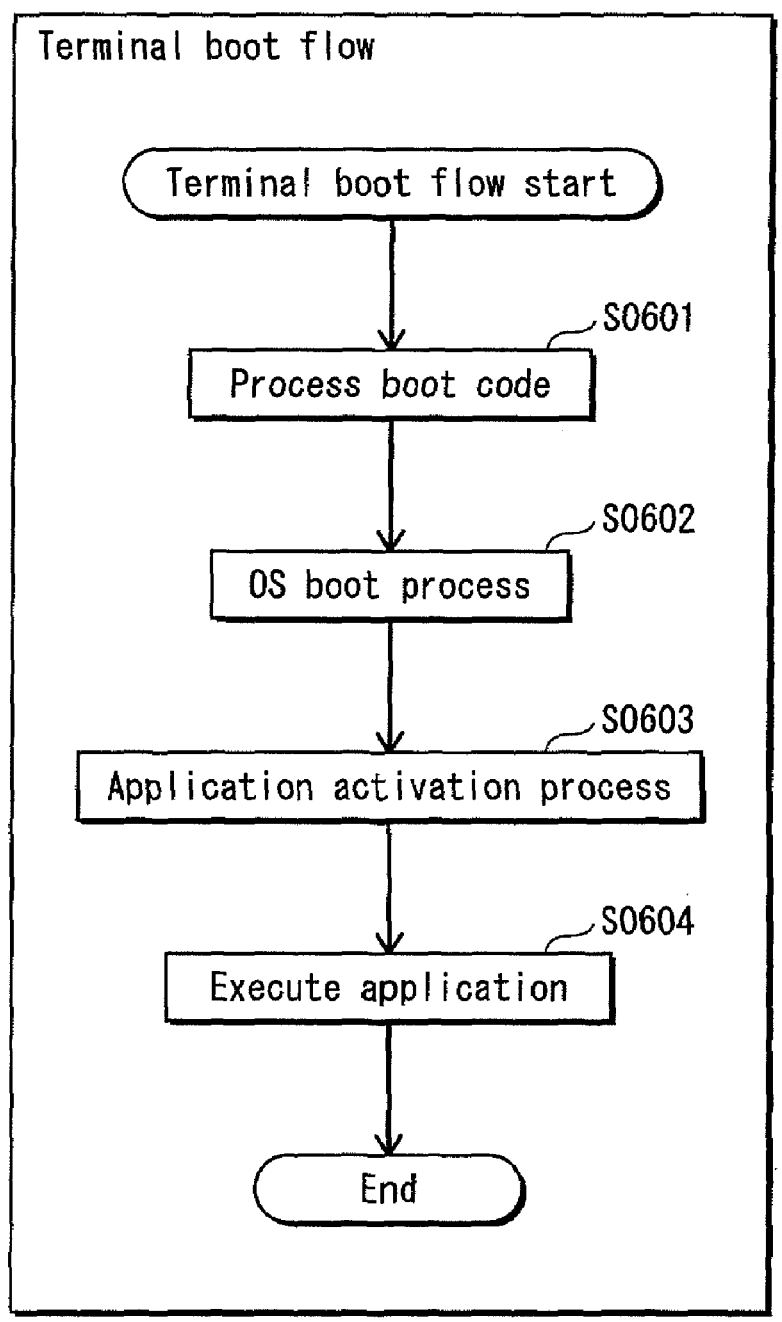
FIG. 6 is a flowchart showing the operation when the terminal is booted in Embodiment 1 of the present invention.

FIG. 6 is a flowchart showing the operation when the terminal A 0102 is booted.

After the terminal A 0102 is powered or reset, the processor 0201 executes the boot code 0203 (step S0601). The boot code 0203 performs the initial settings of the hardware constituting the terminal A 0102, then calculates a hash value of the boot code 0203 itself, and updates the PCR of the secure module 0207 using the hash value as an argument of the PCR extend command. It is presumed here that the PCR of the secure module 0207 has been initialized after the terminal is powered or reset.

Next, the boot code 0203 loads the operating system 0209 into the RAM 0202. The boot code 0203, when it loads the operating system 0209 into the RAM 0202, calculates a hash value of the operating system 0209, and updates the PCR of the secure module 0207, in the procedure shown in FIG. 5. After this, the processor 0201 executes the operating system 0209 and initializes the operating system 0209.

The operating system 0209 then loads the various types of applications (step S0603). The operating system 0209, when it loads the various types of applications, calculates a hash value of each application, and updates the PCR of the secure module 0207, in the procedure shown in FIG. 5.

After this, the terminal A 0102 waits for an input from the user, and executes an application program in accordance with the input (S0604).

As described above, the terminal A 0102, after it is powered or reset, continues to update the PCR in the secure module 0207 by the PCR extend command, using hash values of the programs such as the boot code 0203 that run on the terminal A 0102. After this, the PCR in the secure module 0207 has a value that depends on the programs that run on the terminal A 0102.

Up to now, the structure of the terminal A 0102 has been explained. Next, the structure of the terminal N 0105 will be explained.

Figure 7:
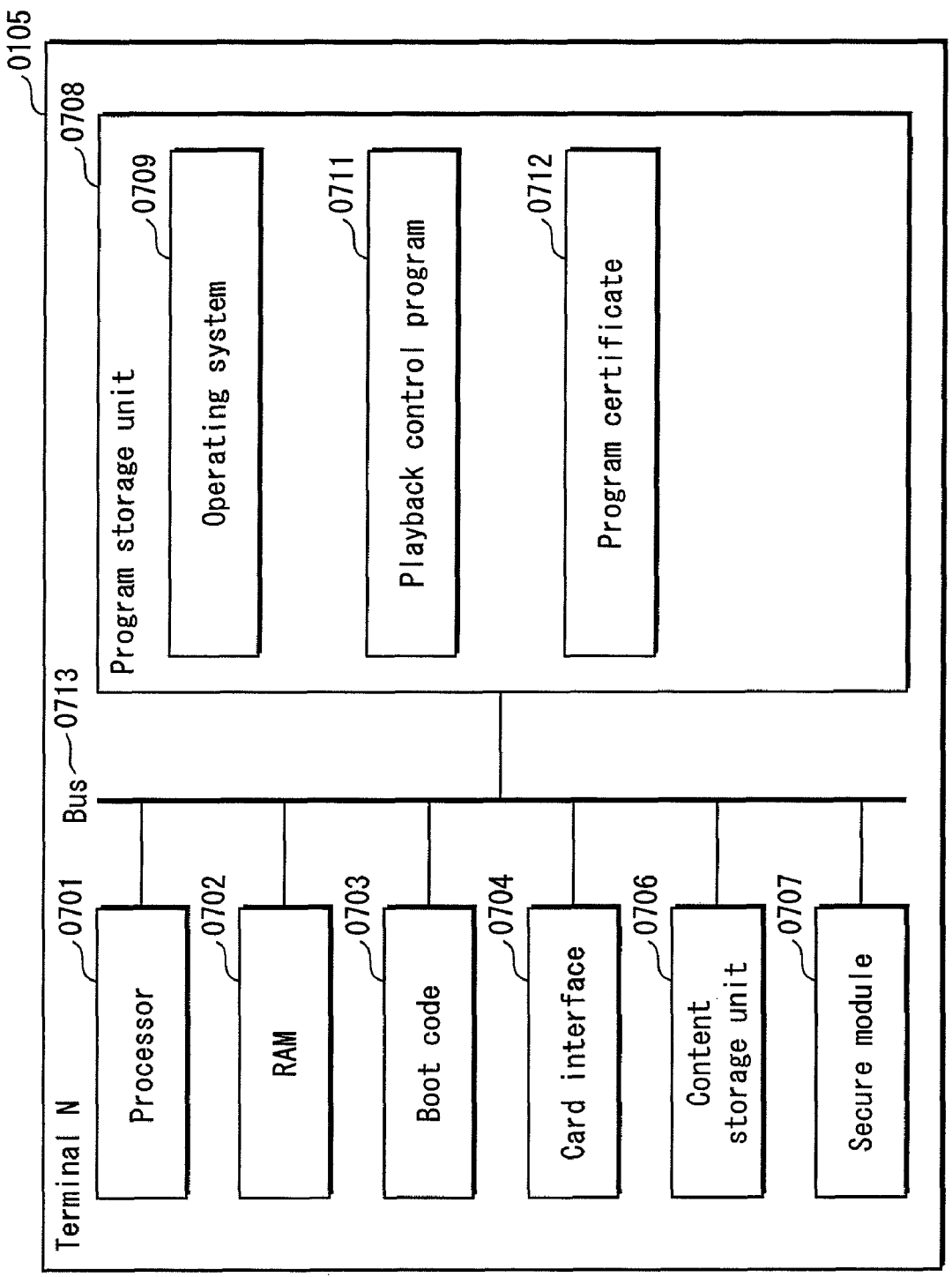
FIG. 7 is a block diagram showing the hardware structure of the terminal N in Embodiment 1 of the present invention.

FIG. 7 shows the structure of the terminal N 0105. Note that the terminal Z 0106 has the same structure as the terminal N 0105. The terminal N 0105 is composed of a processor 0701, a RAM 0702, a boot code 0703, a card interface 0704, a content storage unit 0706, a secure module 0707, and a program storage unit 0708. These units are connected with each other via a bus 0713. The program storage unit 0708 stores an operating system 0709, a playback control program 0711, and a program certificate 0712.

These constituent elements have the same functions as those of the terminal A 0102 shown in FIG. 2, and description thereof is omitted. Note that the terminal N 0105 does not have constituent elements that correspond to the communication unit 0205 and the right purchase control program 0210 of the terminal A 0102.

This completes description of the structure of the terminal N 0105. The following will describe the structure of the server 0101.

Figures 12, 13:
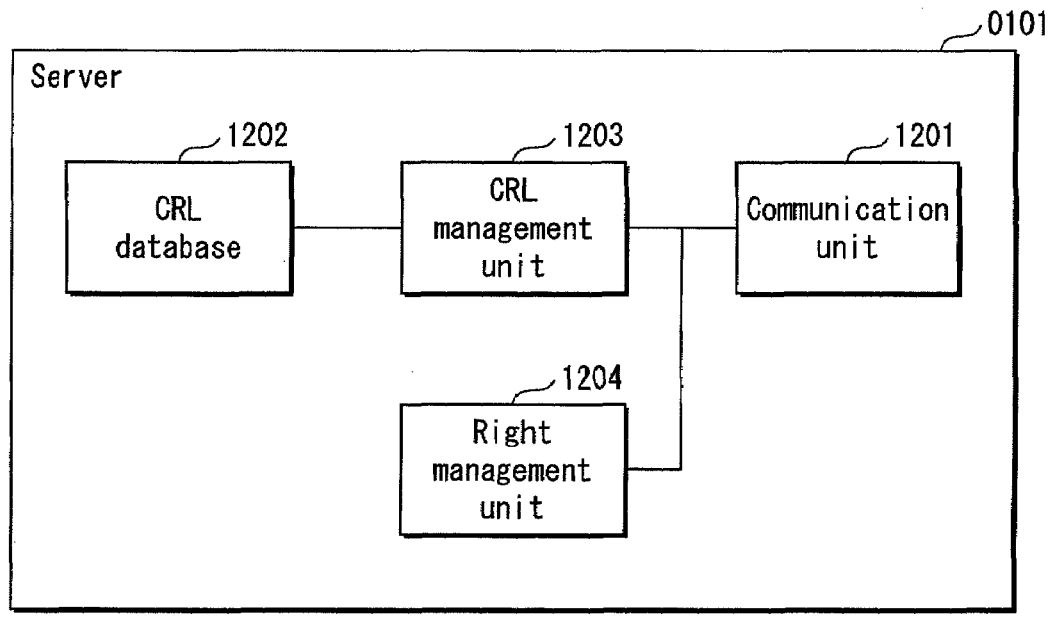
FIG. 12 is a block diagram showing the structure of the server in Embodiment 1 of the present invention.
FIG. 13 is a block diagram showing the structure of the CRL database provided in the server in Embodiment 1 of the present invention.

FIG. 12 shows the structure of the server 0101. The server 0101 is composed of a communication unit 1201, a CRL database 1202, a CRL management unit 1203, and a right management unit 1204. The CRL database 1202 is connected with the CRL management unit 1203. Also, the CRL management unit 1203 and the right management unit 1204 are connected with the communication unit 1201.

The communication unit 1201 is connected with the Internet 0108, and performs communication with the terminal A 0102, the terminal B 0103 and the terminal M 0104. The CRL management unit 1203 and the right management unit 1204 perform communication, via the communication unit 1201, with the terminal A 0102, the terminal B 0103 and the terminal M 0104, and with the card 0107 when it is connected with the terminal A 0102 or the like.

The CRL database 1202 stores (i) a terminal ID of a revoked terminal, (ii) an update program generated after a cause of the revoking is removed, and (iii) a PCR value when the update program is run on the terminal. Note that in general, a revoked terminal may also indicate a terminal that has a defect from which the terminal cannot recover even if an update program is applied. For example, the revoked terminal may be a terminal of a malicious user that has been identified and revoked. However, in the present embodiment, a revoking target is presumed to be a terminal having a defect from which the terminal can recover by updating the program. More specifically, in the present embodiment, a terminal that has continued to use an old software program having a security hole is recorded in the CRL database as a revoking target, for example.

FIG. 13 shows the structure of the CRL database 1202. The CRL database 1202 includes a CRL entry T1301, a CRL entry T1302, a CRL entry T1303, . . . . Each CRL entry has are as for storing a terminal ID, an update program, and an authentic PCR value. The CRL database 1202 is composed of information of a revoked terminal.

The terminal ID area stores the ID of a revoked terminal. The update program area stores an update program for the revoked terminal. When the cause of the revoking exists in the software, an update program may be applied to the terminal so that the terminal can continue to operate. Specific examples of such cases are when it is detected that the software was hacked, and when a security hole is detected in the software. The authentic PCR value area stores a PCR value of when the terminal normally operates after being updated using the update program stored in the update program area. It is possible to check, using the authentic PCR value, whether or not the terminal side has updated the program correctly.

The CRL management unit 1203 performs a mutual authentication with the card 0107 via the communication unit 1201 and the terminal A 0102 to confirm that the card is authentic, then provides the CRL information via the communication unit 1201. More specifically, the CRL management unit 1203 checks whether or not the terminal ID sent from the card 0107 exists in the CRL database 1202, and when it exists, the CRL management unit 1203 provides the card 0107 with an update program of a corresponding entry and the authentic PCR value.

The right management unit 1204 manages the right information of the content, performs charging process upon request from the terminal, and provides the right information of the content. The right management unit 1204 performs charging process and provides the right information after it confirms that the card 0107 is an authentic card by performing a mutual authentication with the card 0107. The right management unit 1204 is connected with the Internet 0108 via the communication unit 1201.

This completes the explanation of the structure of the server 0101. The following will describe the structure of the card 0107.

Figure 8:
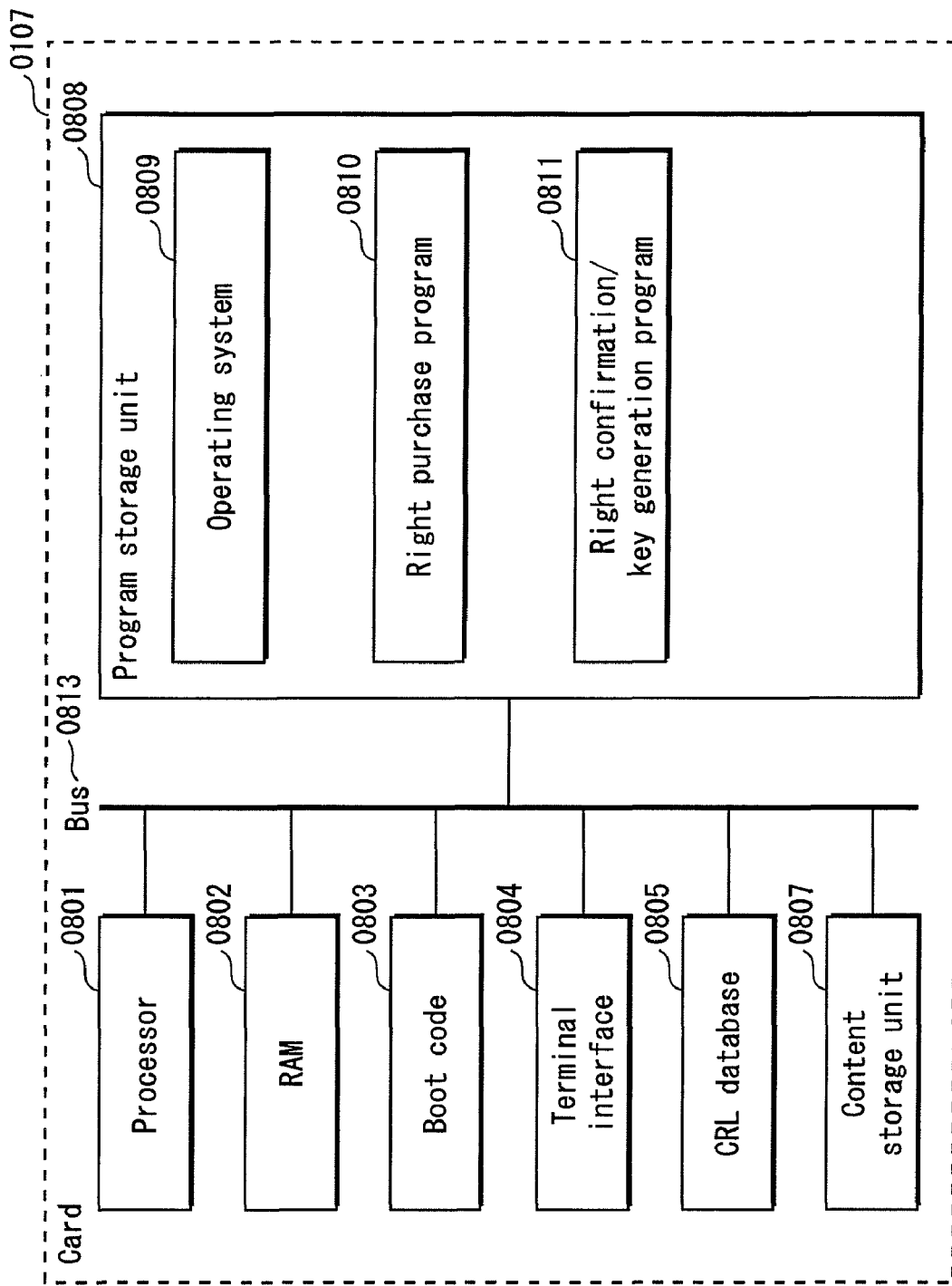
FIG. 8 is a block diagram showing the hardware structure of the card in Embodiment 1 of the present invention.

FIG. 8 shows the structure of the card 0107. The card 0107 is composed of a processor 0801, a RAM 0802, a boot code 0803, a terminal interface 0804, CRL database 0805, a content storage unit 0807, and a program storage unit 0808. These constituent elements are connected with each other via a bus 0813. The card 0107 is tamper-resistant so that programs and data in the card cannot be exposed easily.

The processor 0801 executes the boot code 0803 and a program having been loaded into the RAM 0802, and performs various processes for the card 0107.

The RAM 0802 holds a program that is loaded thereto for execution by the processor 0801. The program to be loaded thereto is stored in the program storage unit 0808.

The boot code 0803 includes one or more codes (boot codes) that are to be executed first by the processor 0801 after the card 0107 is reset. The boot code 0803 expands the operating system 0809 stored in the program storage unit 0808, into the RAM 0802. Note that the card 0107 is reset when the terminal is powered.

The terminal interface 0804 is an interface which connects the card 0107 with the terminal. A program that runs in the processor 0801 can perform communication with the terminal by performing communication with the terminal interface 0804. A program that runs in the card 0107 always uses the terminal interface 0804 to perform communication with the terminal. In the following description, the terminal interface 0804 will be omitted in the description of a communication between the terminal and the program running in the card 0107.

FIG. 14 shows the structure of the CRL database 0805. The CRL database 0805 includes a CRL entry T1401, a CRL entry T1402, a CRL entry T1403, . . . . Each CRL entry has areas for storing a terminal ID, an update program, and an authentic PCR value.

The terminal ID area stores the ID of a terminal obtained by the card 0107. Note that "ID_A", "ID_B", and "ID_N" written in the terminal ID area are respectively the terminal IDs of a terminal A 102, a terminal B 103, and a terminal N 105. When there is a revoked terminal, the update program area stores an update program for the revoked terminal in the entry including the terminal ID thereof. The authentic PCR value area stores a PCR value of when the terminal normally operates after being updated using the update program stored in the update program area. Note that the T1403 includes "NULL" in the update program area, and "current PCR" in the authentic PCR value area. This indicates that the terminal is in the state after the card 0107 has received the key output request information, but has not obtained the update program. A terminal may be in such a state, for example, immediately after the card 0107 is inserted into the terminal N 0105 for the first time and receives the key output request information.

The content storage unit 0807 stores an encrypted content and the right on the content. The content is downloaded by a terminal, such as the terminal A 0102, that can be connected with the server 0101, and is stored into the content storage unit 0807. The content storage unit 0807 is used to provide a content to a terminal, such as the terminal N 0105, that cannot access the server 0101 via the Internet 0108. Also, the right on the content is obtained by the right purchase program 0810 from the server 0101, and is stored into the content storage unit 0807.

The right on the content stored in the content storage unit 0807 cannot be directly accessed from outside the card 0107, but is implemented so that it can be accessed only by a right confirmation/key generation program 0811 which will be described later. More specifically, such an implementation can be achieved by encrypting it such that it can be decrypted only by the right confirmation/key generation program 0811.

The program storage unit 0808 stores an operating system 0809, a right purchase program 0810, and the right confirmation/key generation program 0811.

The operating system 0809 is infrastructure software of the card 0107, and provides services to applications that operate on the operating system 0809. The operating system 0809 loads applications stored in the program storage unit 0808 onto the RAM 0202.

The right purchase program 0810 performs communication with the server 0101 using the communication function of the terminal, based on the content purchase request received from the right purchase control program 0210 of the terminal, and performs purchase of the right and update of the CRL database 0805 of the card 0107. Note that, as described earlier with regards to the terminal A 0102, the content purchase request includes a content ID of the purchase target content, and a terminal ID identifying a terminal by which the content is purchased.

Figure 9:
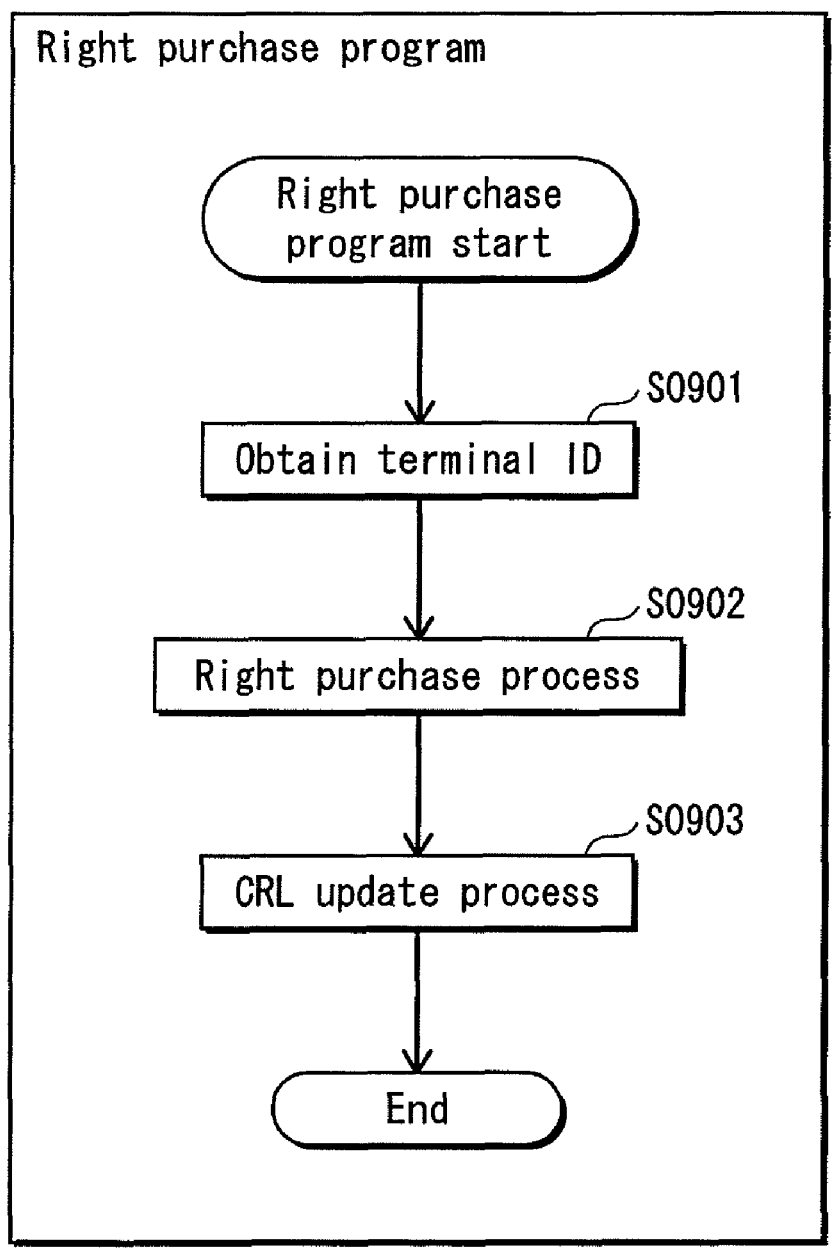
FIG. 9 is a flowchart showing the operation of the right purchase program in Embodiment 1 of the present invention.

FIG. 9 is a flowchart showing the operation of the right purchase program 0810. The right purchase program 0810 obtains the terminal ID contained in the content purchase request, and stores it into the CRL database 0805 (step S0901). The right purchase program 0810 operates the CRL database 0805 to create a CRL entry, and stores the obtained terminal ID into the terminal ID area thereof. The right purchase program 0810 does not create the CRL entry when there is a CRL entry in which a terminal ID having already been obtained is stored in the terminal ID area.

The right purchase program 0810 performs a mutual authentication with the server 0101, and performs the content purchase process and obtains the right on the content (step S0902). The obtained right on the content is safely stored in the content storage unit 0807. The right on the content stores a content use condition and a key used to encrypt the content, where the content use condition is, for example, a use deadline of the content, or the number of times the content is permitted to be used. The right on the content is stored in the content storage unit 0807 in an encrypted state.

Next, the right purchase program 0810 asks the server 0101 and updates the CRL database 0805 (step S0903). Here, the right purchase program 0810 transmits, to the server 0101, all terminal IDs that are stored in the CRL entries in the CRL database 0805. The CRL management unit 1203 of the server 0101 checks whether or not the received terminal IDs are stored in the CRL database 1202. When a corresponding terminal ID exists, the CRL management unit 1203 transmits, to the right purchase program 0810, the update program and authentic PCR value that are stored in the CRL entry in which the corresponding terminal ID is stored. The right purchase program 0810 stores the received update program and authentic PCR value into a CRL entry that contains the corresponding terminal ID, in the CRL database 0805.

Figure 10:
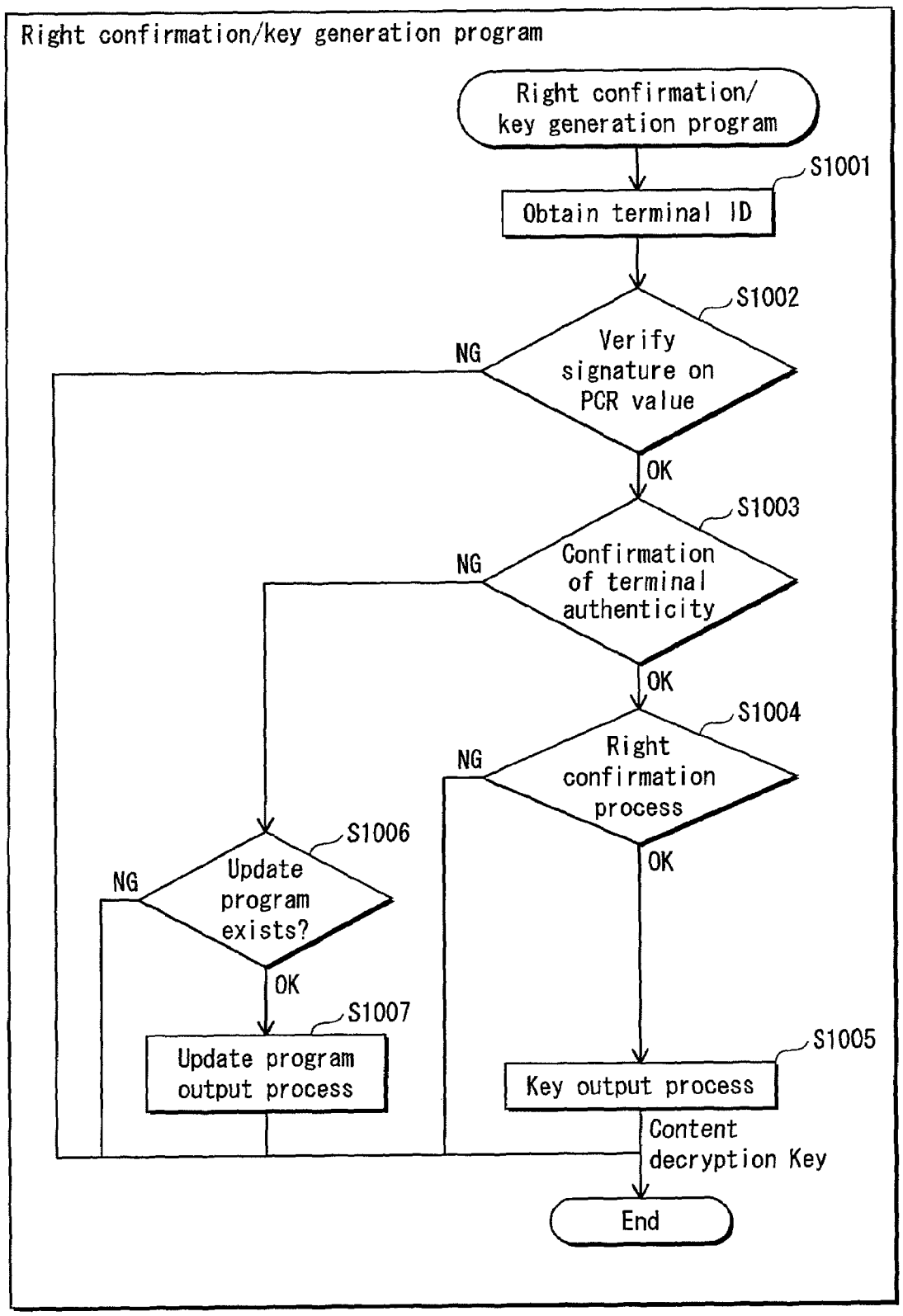
FIG. 10 is a flowchart showing the operation of the right confirmation/key generation program in Embodiment 1 of the present invention.

FIG. 10 is a flowchart showing the operation of the right confirmation/key generation program 0811.

The right confirmation/key generation program 0811 checks whether or not the terminal has been revoked. When the terminal has not been revoked, the right confirmation/key generation program 0811 checks the content use condition to see whether or not it is in a playable state, and when it judges affirmatively, it outputs the encryption key of the content to the terminal. When the terminal has been revoked, the right confirmation/key generation program 0811 outputs the update program to the terminal.

The right confirmation/key generation program 0811 obtains the terminal ID included in the key output request information, and stores it into the CRL database 0805 (step S1001). The right confirmation/key generation program 0811 creates a CRL entry in the CRL database 0805 by operating the CRL database 0805, and stores the obtained terminal ID into the terminal ID area of the created CRL entry. The right confirmation/key generation program 0811 does not create a CRL entry when the CRL database 0805 already has a CRL entry including the obtained terminal ID in the terminal ID area thereof. The right purchase program 0810 has a function to perform a similar process. However, this step is used to obtain a terminal ID with a terminal such as the terminal N 0105 that is not connected with the Internet 0108. This is because terminals such as the terminal N 0105 have no chance to execute the right purchase program 0810. Note that it is expected that a terminal such as the terminal N 0105 plays back a content that has been purchased preliminarily by a terminal such as the terminal A 0102 that is connected with the Internet 0108, using the card 0107.

The right confirmation/key generation program 0811 performs a verification of a signature attached to a PCR value by the attestation service included in the key output request information (step S1002). When it is judged that the PCR value is not authentic as a result of the signature verification (NG in step S1002), the right confirmation/key generation program 0811 ends the process.

When it is judged that the PCR value is authentic as a result of the signature verification (OK in step S1002), the right confirmation/key generation program 0811 performs authentication of a terminal using the PCR value (step S1003). In this step, the right confirmation/key generation program 0811 refers to the CRL database 0805 and compares the PCR value obtained from the terminal with an authentic PCR value in a CRL entry that has a terminal ID identical with the terminal ID included in the key output request information. When the comparison result is OK (OK in step S1003), the control moves to the right confirmation process. When the comparison result is NG (NG in step S1003), the control moves to the program update process. Note that here, when the comparison result is OK, it indicates that the PCR value matches the authentic PCR value; and when the comparison result is NG, it indicates that the PCR value does not match the authentic PCR value.

Note that when there is no authentic PCR value in a CRL entry having a terminal ID identical with the terminal ID included in the key output request information, the right confirmation/key generation program 0811 confirms the authenticity of the terminal by using the PCR value included in the program certificate in the key output request information instead of using the authentic PCR value. When the comparison result is OK (OK in step S1003), the control moves to the right confirmation process. When the comparison result is NG (NG in step S1003), the control moves to the program update process.

Here, the right confirmation/key generation program 0811 stores the PCR value included in the program certificate in the key output request information into the CRL entry only when the authentic PCR value has not been obtained from the server. The right confirmation/key generation program 0811 uses the stored PCR value when it authenticate the terminal later. The maker, at the time of shipping, attaches a signature to the program certificate that includes a PCR value indicating the software configuration of the device. Therefore, substantially, the card 0107 can verify merely whether or not the terminal has the software configuration at the time of shipping. However, as will be described, in the present embodiment, the right purchase process checks with respect to each of the terminal IDs stored in the CRL entries, whether or not an update program exists. When it is judged that an update program exists, the update program and an authentic PCR corresponding to the update program are stored in a CRL entry in the card 0107. Accordingly, once a terminal ID is stored in a CRL entry and the right purchase process is performed, the verification on the authenticity of the terminal, using the authentic PCR value, functions completely. The terminal user must execute the right purchase process when he/she desires to continue to receive the content distribution service. Thus it is difficult for the user to avoid the operation for obtaining the authentic PCR value.

When it is judged that the terminal is authentic (OK in step S1003), the right confirmation/key generation program 0811 obtains, from the content storage unit 0807, the right information for the content that has the content ID contained in the key output request information, and checks the use condition (step S1004). When the check result is negative, (NG in step S1004), the right confirmation/key generation program 0811 ends the process.

When the check result is affirmative (OK in step S1004), the right confirmation/key generation program 0811 outputs, to the terminal, the content encryption key included in the right information of the content, and ends the process of the right confirmation/key generation program (step S1005).

When it is judged that the terminal is not authentic (NG in step S1003), the right confirmation/key generation program 0811 refers to the CRL database 0805 and checks whether or not an update program exists in the update program area in a CRL entry having the terminal ID included in the key output request (step S1006). When it is judged that an update program does not exist (NG in step S1006), the right confirmation/key generation program 0811 ends the process.

When it is judged that an update program exists (OK in step S1006), the right confirmation/key generation program 0811 outputs the update program and the authentic PCR value (step S1007). Here, the update program and the authentic PCR value are those included in a CRL entry having the terminal ID included in the key output request information stored in the CRL database 0805.

Next, the operation of the content distribution system 0100 will be described.

First, the operation of terminals (the terminal A 0102, the terminal B 0103, and the terminal M 0104) connected with the server 0101 via the Internet 0108 will be described. In the following description, the terminal A 0102 is used as an example. Note that the terminal B 0103 and the terminal M 0104 operate in the same manner as the terminal A 0102 described in the following since they have the same structure as the terminal A 0102.

Figure 11:
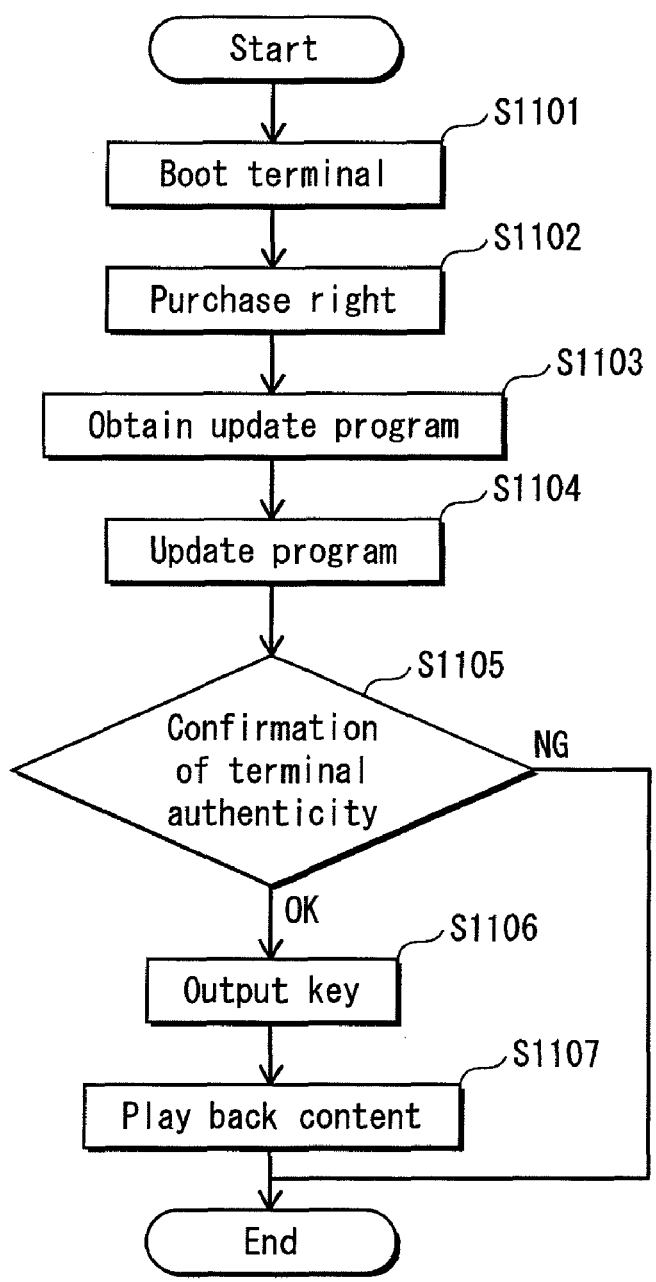
FIG. 11 is a flowchart showing the overall operation of the content distribution system in Embodiment 1 of the present invention.

FIG. 11 is a flowchart showing the operation of the content distribution system 0100 when the user of the terminal A 0102 purchases the right from the server 0101 using the card 0107 and plays back a content obtained from the server 0101 on the terminal A 0102. It is presumed here that the terminal A 0102 has been revoked and that a CRL entry including the terminal ID of the terminal A 0102 exists in the CRL database 1202 of the server 0101. It is also presumed that the update programand the authentic PCR value corresponding thereto are stored in the corresponding CRL entry in the CRL database 1202. The following will describe the operation of the content distribution system 0100 with reference to the flowchart shown in FIG. 11.

The terminal A 0102 performs the terminal boot process in accordance with the terminal boot flow shown in FIG. 6 (step S1101). As a result of this, the PCR in the secure module 0207 of the terminal A 0102 has a value that depends on the programs running on the terminal A 0102. The card 0107 loads the operating system 0809 onto the RAM 0802 using the boot code 0803. After this, the operating system 0809 activates the various applications, so that the card 0107 enters the state in which it is usable.

Next, the terminal A 0102 runs the right purchase control program 0210 to perform the right purchase process by using the card 0107, as shown in FIG. 3 (step S1102). The card 0107 performs the right purchase process by running the right purchase program, as shown in FIG. 9.

Since the terminal A0102 has been revoked, the right purchase program 0810 stores an update program for the terminal A 0102 and a corresponding authentic PCR value from the server 0101 into the CRL database 0805 (step S1103).

Next, the terminal A 0102 runs the playback control program 0211 to play back the content, as shown in FIG. 4 (step S1102). When the playback control program 0211 requests the card 0107 to output the key, the right confirmation/key generation program 0811 runs as shown in FIG. 10. Here, the right confirmation/key generation program 0811 outputs the update program and the authentic PCR value to the terminal A 0102 since a CRL entry including the terminal ID of the terminal A 0102 exists in the CRL database 0805 and the update program and the authentic PCR value exist. The playback control program 0211 stores the received update program and authentic PCR value into the program storage unit 0208, and reboots the terminal A 0102 (step S1104). After this, the terminal A 0102 is booted in the same manner as in step S1101.

Next, the terminal A 0102 runs the playback control program 0211 so that it requests the card 0107 again to output the key. Upon receiving this request, the right confirmation/key generation program 0811 of the card 0107 performs authentication of the terminal in step S1003 of the process thereof (step S1105). When the program has been updated correctly (OK in step S1105), the PCR value obtained from the secure module 0207 of the terminal A 0102 matches the PCR value stored in the CRL database 0805 of the card 0107, and the authenticity of the terminal A 0102 is confirmed, and the key is output.

On the other hand, when the program has not been updated because the playback control program 0211 of the terminal A 0102 for performing the program update process had been tampered by a malicious party (NG in step S1105), the PCR value obtained from the secure module 0207 of the terminal A 0102 does not match the PCR value stored in the CRL database 0805 of the card 0107, and the terminal A 0102 is judged as not authentic, and the process for the terminal A 0102 ends.

When the program has been updated correctly (OK in step S1105), the encryption key for the content is output from the card 0107 (step S1106).

After the key is output, the playback control program 0211 extracts an encrypted content from the content storage unit 0206, decrypts the content using a key, and plays back the decrypted content (step S1107).

In the above-described structure, a content encryption key is not output unless it is confirmed, using the PCR value, that the program has been updated correctly. Accordingly, when the program has not been updated correctly, the check on the authenticity of the terminal results in an NG, and the content encryption key is not output to the terminal. Therefore, to play back the content correctly, it is necessary to update the program. Also, even when the updated program is tempered with, the check on the authenticity of the terminal results in an NG, and the content cannot be played back. Accordingly, with the above-described structure, it is possible to protect the copyright of the content appropriately.

Furthermore, the present invention enables the program to be updated forcibly, not like a conventional technology in which the program update means as a whole is implemented to be tamper-resistant. That is to say, for the above-described process to be achieved, only the card 0107 and the secure module 0207 need to be implemented as tamper-resistant. Thus the portion required to be tamper-resistant is greatly reduced.

Also, when the right to play back a content is requested, the card 0107 confirms the authenticity of the terminal surely, and when the check on the authenticity of the terminal results in an NG, the program for the terminal is updated. Thus, according to this structure, the program is updated surely when the content is to be played back. This makes it possible to update the software of the revoked terminal surely. In the present embodiment, the above-described process is performed when the content is played back. However, not limited to this, the process may be performed, for example, when the content is recorded. In this way, the software can be updated forcibly at desired timings other than when the content is played back.

Next, the operation of the terminals (the terminal N 0105 and the terminal Z 0106) that cannot be connected with the Internet 0108 will be described. In the following description, the terminal N 0105 is used as an example. Note that the terminal Z 0106 operates in the same manner as the terminal N 0105 described in the following since it has the same structure as the terminal N 0105.

Figure 15:
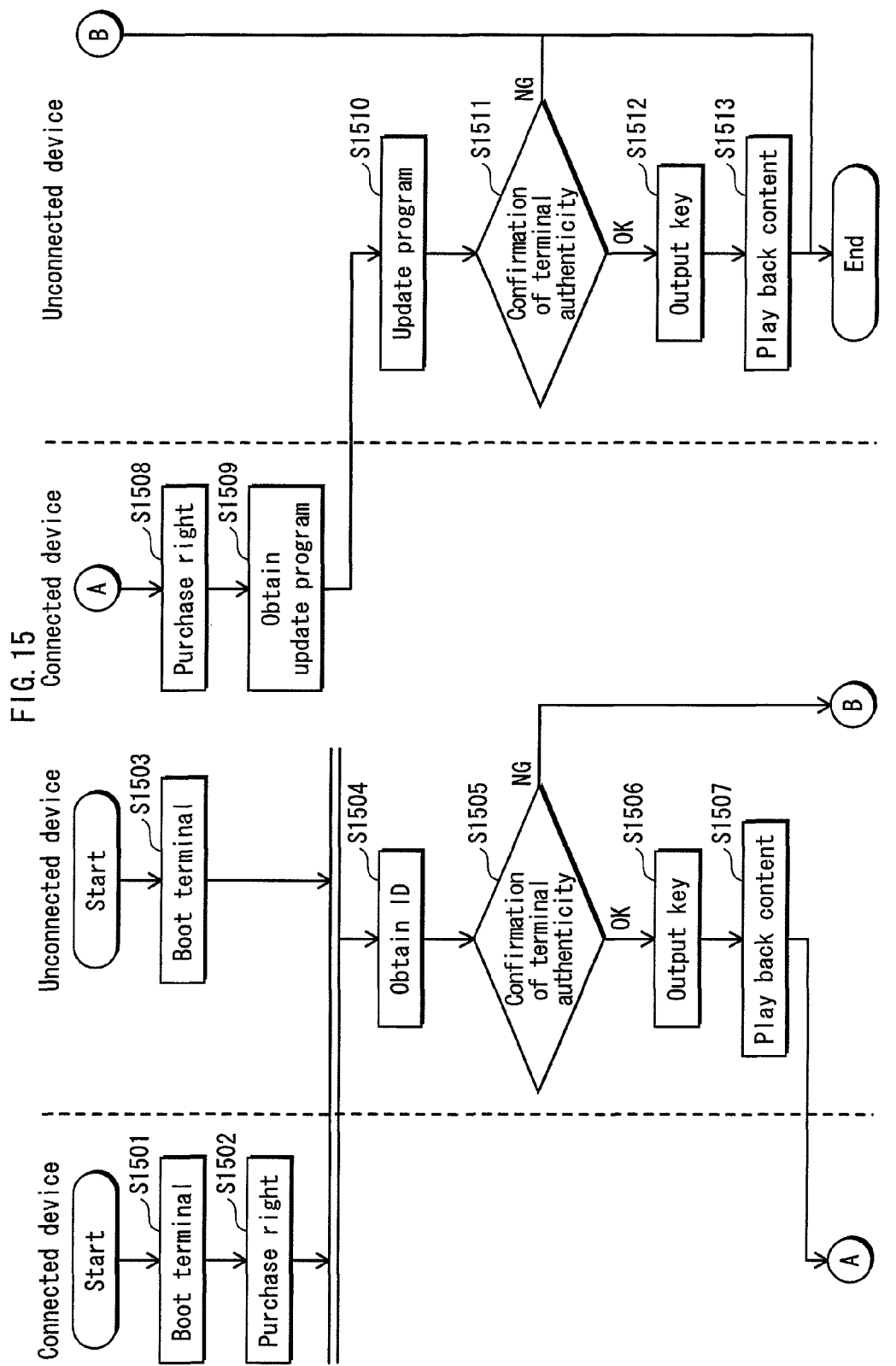
FIG. 15 is a flowchart showing the overall operation of the content distribution system in Embodiment 1 of the present invention.

FIG. 15 is a flowchart showing the operation of the content distribution system 0100 in updating the program for the terminal N 0105 that cannot be connected with the server 0101 via the Internet 0108. It is presumed here that the terminal N 0105 has been revoked and that a CRL entry including the terminal ID of the terminal N 0105 exists in the CRL database 1202 of the server 0101. It is also presumed that the update program and the authentic PCR value corresponding thereto are stored in the corresponding CRL entry in the CRL database 1202. Here, since the terminal N 0105 cannot be connected with the server 0101 via the Internet 0108, it purchases the right using the terminal A 0102, and the use of the content and the right on the terminal N 0105 becomes possible by using the card 0107. In the following, the operation of the content distribution system 0100 will be described with reference to the flowchart shown in FIG. 15.

The terminal A 0102 performs the terminal boot process and the right purchase process as described in steps S1101 and S1102 of FIG. 11. Here, the terminal A 0102 stores a downloaded content into the content storage unit 0807 of the card 0107 so that the terminal N 0105 can play back the downloaded content.

The terminal N 0105 performs the terminal boot process in accordance with the terminal boot flow shown in FIG. 6 (step S1503). As a result of this, the PCR in the secure module 0707 of the terminal N 0105 has a value that depends on the programs running on the terminal N 0105.

Next, the card 0107 is moved from the terminal A 0102 to the terminal N 0105 so that the content having been purchased on the terminal A 0102 is played back on the terminal N 0105. The terminal N 0105 runs the playback control program 0711 to play back the content, and the playback control program 0711 requests the card 0107 to output the key. The card 0107 runs the right confirmation/key generation program 0811 that operates as shown in FIG. 10. Here, the right confirmation/key generation program 0811 adds the terminal ID of the terminal N 0105 into the CRL database, and creates a CRL entry including the terminal ID of the terminal N 0105 (step S1504).

After this, the right confirmation/key generation program 0811, in step S1003, performs the authentication of the terminal N 0105 (step S1505). Here, the right confirmation/key generation program 0811 refers to the CRL database 0805 and detects a CRL entry that includes the terminal ID of the terminal N 0105. However, since there is no authentic PCR value, the right confirmation/key generation program 0811 performs the authentication of the terminal N 0105 using the PCR value stored in the program certificate 0712 of the terminal N 0105. When the PCR value obtained from the secure module 0707 of the terminal N 0105 does not match the PCR value stored in the program certificate 0712 (NG in step S1505), it is judged that the terminal is not authentic, and the right confirmation/key generation program ends the process.

When it is judged that the terminal is authentic (OK in step S1505), the right confirmation/key generation program 0811 performs the right confirmation process S1004, then decrypts the content encryption key for the content stored in the content storage unit 0807, and outputs the decrypted key to the terminal N 0105 (step S1506).

The playback control program 0711 of the terminal N 0105 decrypts the content stored in the content storage unit 0807 of the card 0107 using the content encryption key received from the card 0107, and plays back the decrypted content (step S1507). Note that the content may be played back after it is transferred from the content storage unit 0807 of the card 0107 to the content storage unit 0706 of the terminal N 0105.

Next, the card 0107 is inserted into the terminal A 0102 so that the right on the content is purchased newly using the card 0107. The following describes a flow for purchasing the right on the content on the terminal A 0102.

The terminal A 0102 performs the right purchase process by the right purchase control program 0210 using the card 0107, as shown in FIG. 3 (step S1508). The card 0107 performs the right purchase process by running the right purchase program, as shown in FIG. 9. The content downloaded when the right is purchased is stored into the content storage unit 0807 of the card 0107.

Since the terminal N0105 has been revoked, the right purchase program 0810 stores an update program for the terminal N 0105 and a corresponding authentic PCR value from the server 0101 into the CRL database 0805 (step S1509). The CRL database 0805 of the card 0107 has a CRL entry including the terminal ID of the terminal N 0105. As a result, in the CRL update process (step S0903) of the right purchase program 0810, the terminal ID of the terminal N 0105 is used when a search in the CRL database 1202 of the server 0101 is performed. In this search, it is found that a CRL entry including the terminal ID of the terminal N 0105 exists in the CRL database 1202. The right purchase program 0810 thus retrieves the update program for the terminal N 0105 and the authentic PCR value from the CRL entry in the CRL database 1202, and stores them into a CRL entry including the terminal ID of the terminal N 0105, in the CRL database 0805 of the card 0107.

Next, the card 0107 is inserted into the terminal N 0105 so that the content is played back on the terminal N 0105. The following describes the content playback operation on the terminal N 0105.

The terminal N 0105 updates the program for the terminal N 0105 in the same manner as the terminal A 0102 performs the process in step S1104 of FIG. 11 (step S1510).

The terminal N 0105 requests the card 0107 to output the key in the same manner as the terminal A 0102 does in step S1105 of FIG. 11. This causes the card 0107 to perform authentication of the terminal (step S1511). When the authenticity is confirmed (OK in step S1511), the content encryption key is output from the card 0107 to the terminal N 0105.

On the other hand, when the program has not been updated because the playback control program 0711 of the terminal N 0105 for performing the program update process had been tampered by a malicious party (NG in step S1511), the PCR value obtained from the secure module 0707 of the terminal N 0105 does not match the PCR value stored in the CRL database 0805 of the card 0107, and the terminal N 0105 is judged as not authentic, and the process for the terminal N 0105 ends.

When the program has been updated correctly (OK in step S1511), the content encryption key is output from the card 0107 (step S1512).

The playback control program 0711 of the terminal N 0105 decrypts a content stored in the content storage unit 0807 of the card 0107, using the content encryption key received from the card 0107, and plays back the decrypted content (step S1513). Note that the content may be played back after it is transferred from the content storage unit 0807 of the card 0107 to the content storage unit 0706 of the terminal N 0105.

With the above-described structure, it is possible even for a terminal such as the terminal N 0105 that cannot be connected with the server 0101 via the Internet 0108, to revoke the terminal and update the program.

Also, in the above-described structure, the card 0107 stores only revocation lists that correspond to terminals that have used the card 0107 once. The structure thus makes it possible even for the card 0107 having small resources to deal with the revocation lists.

Also, off course, this structure produces advantageous effects in the same manner as the structure for the terminal connected with a network.

<Modifications>

Up to now, the present invention has been described through an embodiment thereof. However, the present invention is not limited to the embodiment, but includes, for example, the following modifications.

(1) In the embodiment described above, the update target is software. However, it may be applied to a system for updating the hardware structure information. A specific example of such hardware is a reconfigurable processor.

(2) In the embodiment described above, each program for controlling the card, terminal, or server runs on the operating system. However, not limited to this, the operating system may not necessarily be required when the application programs or the like are written in a language that can be directly processed by the processor.

(3) In the embodiment described above, the PCR is a hash value. However, not limited to this, the PCR may be any value in so far as it can be used to detect a tampering. For example, it may be a value generated by encrypting part of a program, or may be a check sum of a program.

(4) In the embodiment described above, when the key is requested, it is judged whether or not the terminal has been revoked. However, not limited to the key information, the judgment may be performed when there is a request for any other information which should not be given to an unauthorized terminal because it would be disadvantageous. Further, the process performed by the terminal is not limited to a playback of a content. For example, the terminal may perform a process on a database that deals with personal information. In this case, the timing at which it is judged whether or not the terminal has been revoked may be when a request for personal information is received from the terminal.

(5) In the embodiment described above, the card 0107 judges whether or not the terminal has been revoked. However, not limited to this, the server may judge whether or not the terminal has been revoked, when, for example, the server provides the right information. In this case, the terminal may transmit the PCR, together with the request for the right information. Also, the server stores the authentic PCR, and when the PCR received from the terminal does not match the authentic PCR (namely, when the judgment result is NG), it updates the program for the terminal. Description of the detailed process is omitted since it is the same as the update process that is performed between the terminal and the card.

(6) In the embodiment described above, the terminal is rebooted after the program is updated. However, not limited to this, the process may be continued without rebooting when the update is small enough to exclude the necessity for the reboot. That is to say, after the update of the program is completed, rebooting of the terminal may be omitted, and the key information may be output to the terminal, and the content may be decrypted and played back.

(7) Each of the above-described devices is specifically a computer system that includes a microprocessor, ROM, RAM, a hard disk unit, a display unit, a keyboard, a mouse and the like. A computer program is stored in the RAM or the hard disk unit. The microprocessor operates in accordance with the computer program and causes each device to achieve the functions. The computer program is composed of a plurality of instruction codes that instruct the computer to achieve predetermined functions.

(8) Part or all of the structural elements constituting the devices described above may be achieved in one system LSI (Large Scale Integration). The system LSI is an ultra multifunctional LSI that is manufactured by integrating a plurality of components on one chip. More specifically, the system LSI is a computer system that includes a microprocessor, ROM, RAM and the like. A computer program is stored in the RAM. The microprocessor operates in accordance with the computer program, thereby enabling the system LSI to achieve its functions.

Each part of structural elements constituting each of the above-described devices may be achieved on one chip, or part or all thereof may be achieved on one chip.

Although the term system LSI is used here, it may be called IC, LSI, super LSI, ultra LSI or the like, depending on the level of integration. It is also possible to use the FPGA (Field Programmable Gate Array), with which a programming is available after the LSI is manufactured, or the reconfigurable processor that can re-configure the connection or setting of the circuit cells within the LSI.

Furthermore, a technology for an integrated circuit that replaces the LSI may appear in the near future as the semiconductor technology improves or branches into other technologies. In that case, the new technology may be incorporated into the integration of the functional blocks constituting the present invention as described above. Such possible technologies include biotechnology.

(9) Part or all of the structural elements constituting each of the above-described devices may be achieved as an IC card or a single module that is attachable/detachable to or from each device. The IC card or module is a computer system that includes a microprocessor, ROM, RAM, and the like. The IC card or module may include the aforesaid ultra multi-functional LSI. The microprocessor operates in accordance with the computer program and causes the IC card or module to achieve the functions. The IC card or module may be tamper resistant.

(10) The present invention may be methods shown by the above. The present invention may be a computer program that allows a computer to realize the methods, or may be a digital signal representing the computer program.

Furthermore, the present invention may be a computer-readable recording medium such as a flexible disk, a hard disk, CD-ROM, MO, DVD, DVD-ROM, DVD RAM, BD (Blu-ray Disc), or a semiconductor memory, that stores the computer program or the digital signal. Furthermore, the present invention may be the digital signal recorded on any of the aforementioned recording mediums.

Furthermore, the present invention may be the computer program or the digital signal transmitted via an electric communication line, a wireless or wired communication line, a network of which the Internet is representative, or a data broadcast.

Furthermore, the present invention may be a computer system that includes a microprocessor and a memory, the memory storing the computer program, and the microprocessor operating according to the computer program.

Furthermore, by transferring the program or the digital signal via the recording medium, or by transferring the program or the digital signal via the network or the like, the program or the digital signal may be executed by another independent computer system.

(11) The present invention may be any combination of the above-described embodiments and modifications.

(Summary)

(1) As described above, one aspect of the present invention is an information processing device comprising a terminal and a card detachable from the terminal, the terminal including: a terminal measuring unit operable to measure a characteristic of a program running on the terminal and stores the measured characteristic; a program storage unit storing the program running on the terminal; and a program update unit operable to update the program stored in the program storage unit, the card including: an update program storage unit storing an update program of the terminal; an authenticity confirming unit operable to confirm whether or not the terminal is authentic using information obtained from the terminal measuring unit; a secret information providing unit operable to provide secret information held in the card to the terminal only when the authenticity confirming unit judges that the terminal is not authentic; and a program output unit operable to output the update program stored in the update program storage unit to the program update unit.

In the above-stated information processing device, the card further includes: a terminal ID storage unit storing a terminal ID of a terminal with which the card was connected at least once; an update program obtaining unit operable to, when the terminal with which the card is connected is connectable to a network, obtain, from a server, an update program associated with the terminal ID stored in the terminal ID storage unit, and store the obtained update program into the update program storage unit; an authenticity confirmation information storage unit storing authenticity confirmation information of a terminal associated with the update program obtained by the update program obtaining unit; authenticity confirmation information obtaining unit operable to, when the terminal with which the card is connected is connectable to a network, obtain, from the server, authenticity confirmation information associated with the update program obtained by the update program obtaining unit, and store the obtained authenticity confirmation information into the authenticity confirmation information storage unit, wherein authenticity of the terminal is confirmed using the authenticity confirmation information obtained by the authenticity confirming unit from the authenticity confirmation information storage unit.

With the above-described structure, it is possible to provide a program update method that does not depend on the reliability of the update module itself.

Also, it is possible to modify an unauthorized terminal to an authorized terminal by updating a program, without making a revoked terminal inoperable. This enables a playback of a content to be continued. Accordingly, the structure makes it possible to maintain the soundness of the content distribution system, preventing the user from suffering a damage from making a revoked terminal inoperable.

Furthermore, with this structure, even a terminal that cannot be connected with the Internet can update the program since it updates the program using a mechanism provided in the card.

(2) An other aspect of the present invention is an information recording device that is used together with an information processing device operated by a program, and stores information to be used by the information processing device, the information recording device comprising: a receiving unit operable to receive an information access request from an information processing device; an update program storage unit storing an update program for operating the information processing device; an obtaining unit operable to, when the access request has been received, obtain characteristic information of a program that operates the information processing device that issued the access request; an authenticity confirming unit operable to confirm authenticity of the program that operates the information processing device, based on the characteristic information; and an output unit operable to output the update program to the information processing device when it is confirmed that the program is not authentic.

With the above-described structure, when it has been confirmed that a program that operates the information processing device that has requested information to the information recording device is not authentic, the program is updated by the update program. Accordingly, it is possible to force a device, which intends to use information, to update the program.

(3) In the above-stated information recording device of the present invention, the output unit may further output the information to the information processing device only after it is confirmed that the program is authentic.

With the above-described structure, the information processing device cannot obtain the requested information unless it is judged that the program is authentic. Accordingly, to obtain the information for which it has issued an access request, the information processing device needs to update the program. Thus, it is possible to force the device to update the program.

(4) The above-stated information recording device of the present invention may further comprise an authentic characteristic information storage unit storing authentic characteristic information that is characteristic information of an authentic program for operating the information processing device, wherein the authenticity confirming unit confirms whether or not the program is authentic, by comparing the authentic characteristic information with the characteristic information received from the information processing device.

With the above-described structure, the information recording device can confirm whether or not the program of the information processing device is authentic, based on the characteristic information.

(5) In the above-stated information recording device of the present invention, the receiving unit may further obtain a piece of identification information for identifying the information processing device, together with the access request, the update program storage unit stores one or more pieces of identification information for identifying one or more information processing devices that issued an access request in past, and stores one or more update programs for the one or more information processing devices in one-to-one correspondence with the one or more pieces of identification information, and the output unit outputs an update program for the information processing device identified by the piece of identification information that was received together with the access request.

With the above-described structure, even when the information recording device is shared by a plurality of information processing devices, it is possible to output an appropriate update program to each information processing device.

(6) In the above-stated information recording device of the present invention, when the access request is received from another information processing device, the update program storage unit may additionally store a piece of identification information for identifying said another information processing device.

With the above-described structure, the information recording device can manage update programs with respect to all information processing devices from which the access request was received at least once in past.

(7) In the above-stated information recording device of the present invention may further comprise: a transmitting unit operable to transmit the piece of identification information for identifying the information processing device stored in the update program storage unit, to a server that provides the update program; and an obtaining unit operable to obtain, from the server, an update program for an information processing device identified by the transmitted piece of identification information, wherein the update program storage device stores the obtained update program in association with the piece of identification information.

With the above-described structure, when the update program has been upgraded with respect to an information processing device managed by the information recording device itself, the information recording device can obtain and record the upgraded update program onto the device itself.

(8) The above-stated information recording device may be a portable recording medium.

With the above-described structure, it is possible to force even an information processing device that cannot be connected with the Internet to update the program since a mechanism provided in the portable information recording device is used to update the program.

(9) A further aspect of the present invention is an information processing device that is operated by a program and is used together with an information recording device which confirms authenticity of the program based on characteristic information of the program, the information processing device comprising: a characteristic information calculating unit operable to calculate characteristic information of the program; a transmitting unit operable to transmit the calculated characteristic information to the information recording device when the information processing device issues an access request for information recorded on the information recording device; a receiving unit operable to receive either information or an update program for the information processing device, depending on a result of a judgment for confirmation made by the information recording device; and an update unit operable to, when the update program has been received, update the program by the received update program.

With the above-described structure, when the information processing device is to send a request for information to the information recording medium, and when it is detected that a program that operates the information processing device itself is an unauthorized one, the information processing device can update the program.

(10) In the above-stated information processing device of the present invention, the characteristic information calculating unit may be protected by means of a tamper resistant structure thereof.

With the above-described structure, it is possible to prevent the characteristic information from being tampered by an unauthorized analyzer. Accordingly, when a program that operates the information processing device is an unauthorized one, it is possible to update the program in a more ensured manner. Also, protecting merely the characteristic information calculating unit is enough to prevent the above-mentioned unauthorized action. Accordingly, this makes it possible to forcibly update the program at a lower cost than the case where the whole device is made tamper-resistant.

Further, the present invention can be achieved as a system, program update method, program, or integrated circuit that includes the above-described features of the information recording device and the information processing device, producing the same advantageous effects.

<Other Modifications>

(A-1) Modification 1

In the above-described embodiment, when the authentication of a terminal by the card (step S1003 shown in FIG. 10) results in OK, the card outputs a key used for decrypting the content. However, the present invention is not limited to this structure.

When the authentication of a terminal by the card results in OK, the card may output a new device key to update a device key unique to the terminal.

Note that, in the present modification, the secret encryption method is used as a method for encrypting information. Also, the device key is a key unique to each terminal, and in the present modification, is used to encrypt and decrypt a key (herein after, referred to as a content key) that is used to encrypt and decrypt a content.

In the following, the system structure and the structure of each device in the present modification will be described.

Figure 16:
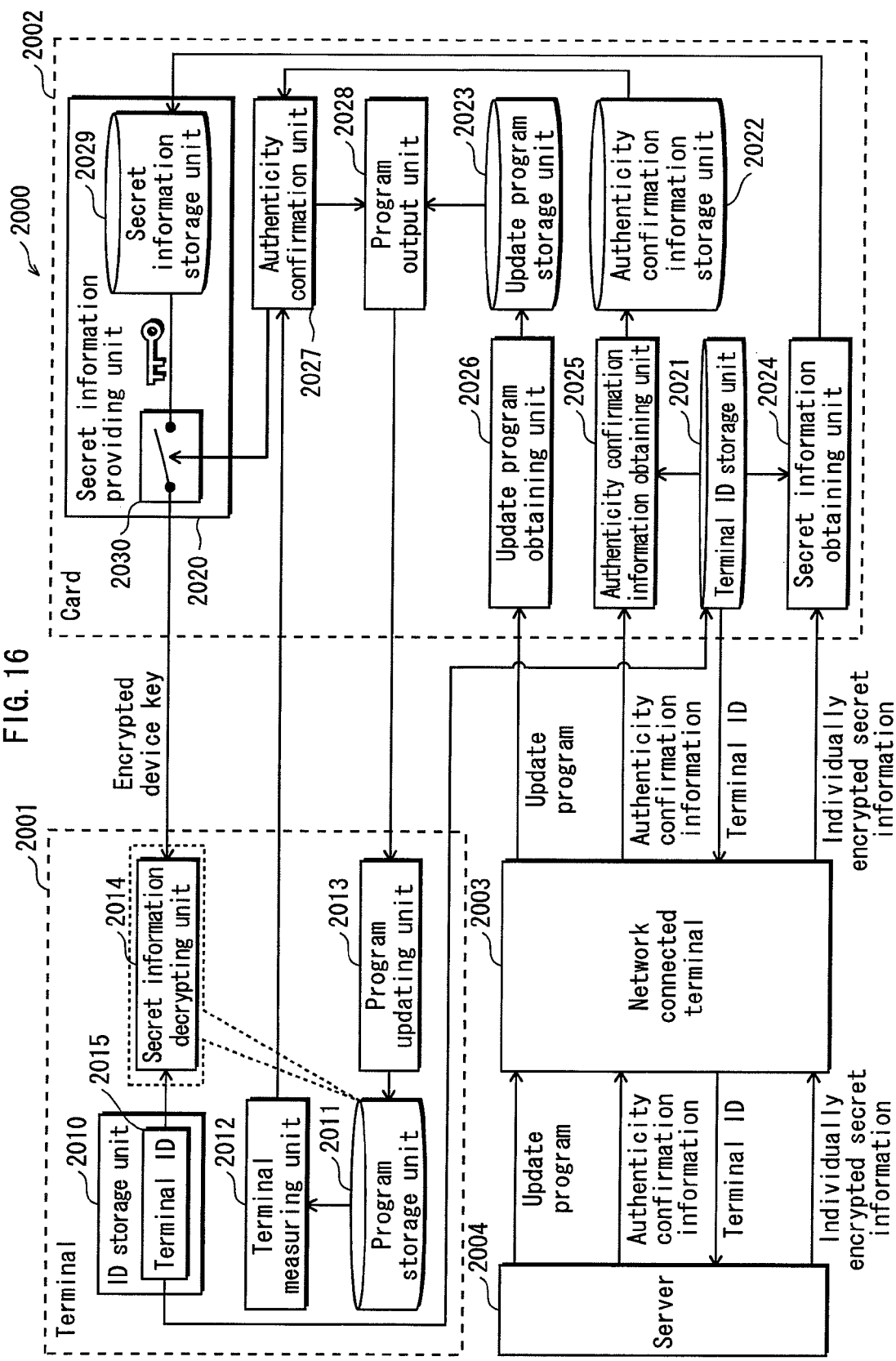
FIG. 16 is a block diagram showing the structure of the device key distribution system 2000 in Modification 1.

A device key distribution system 2000 is composed of, as shown in FIG. 16, a terminal (requesting device) 2001, a card (verifying device) 2002, a network connected terminal 2003 and a server 2004.

The terminal 2001 is a terminal not connected with the network, and corresponds to the terminal N 0105, . . . the terminal Z 0106. The terminal 2001 has a device key and a program (herein after referred to as a content key decryption program) that is used to decrypt an encrypted content key.

The card 2002, after it is attached to a terminal, obtains a terminal ID for identifying the terminal, and stores the obtained terminal ID. It is presumed here that the card 2002 preliminarily stores a terminal ID for identifying the terminal 2001. That is to say, it is presumed that the card 2002 was once attached to the terminal 2001. The card 2002 outputs the preliminarily stored terminal ID to the network connected terminal 2003 in the CRL update process described in the embodiment above.

The network connected terminal 2003 transmits the terminal ID to the server 2004 via the network. The network connected terminal 2003 receives, from the server 2004, an update program for updating the content key decryption program, authenticity confirmation information (the authentic PCR value in the above-described embodiment), and an authentic device key (herein after referred to as secret information or individually encrypted secret information) that has been individually encrypted with use of the transmitted terminal ID, and outputs these received information to the card 2002.

The server 2004, upon receiving the terminal ID from the network connected terminal 2003, transmits the update program, the authenticity confirmation information, and the secret information that is based on the received terminal ID.

Here will described how the authentic device key is individually encrypted.

Figure 17:
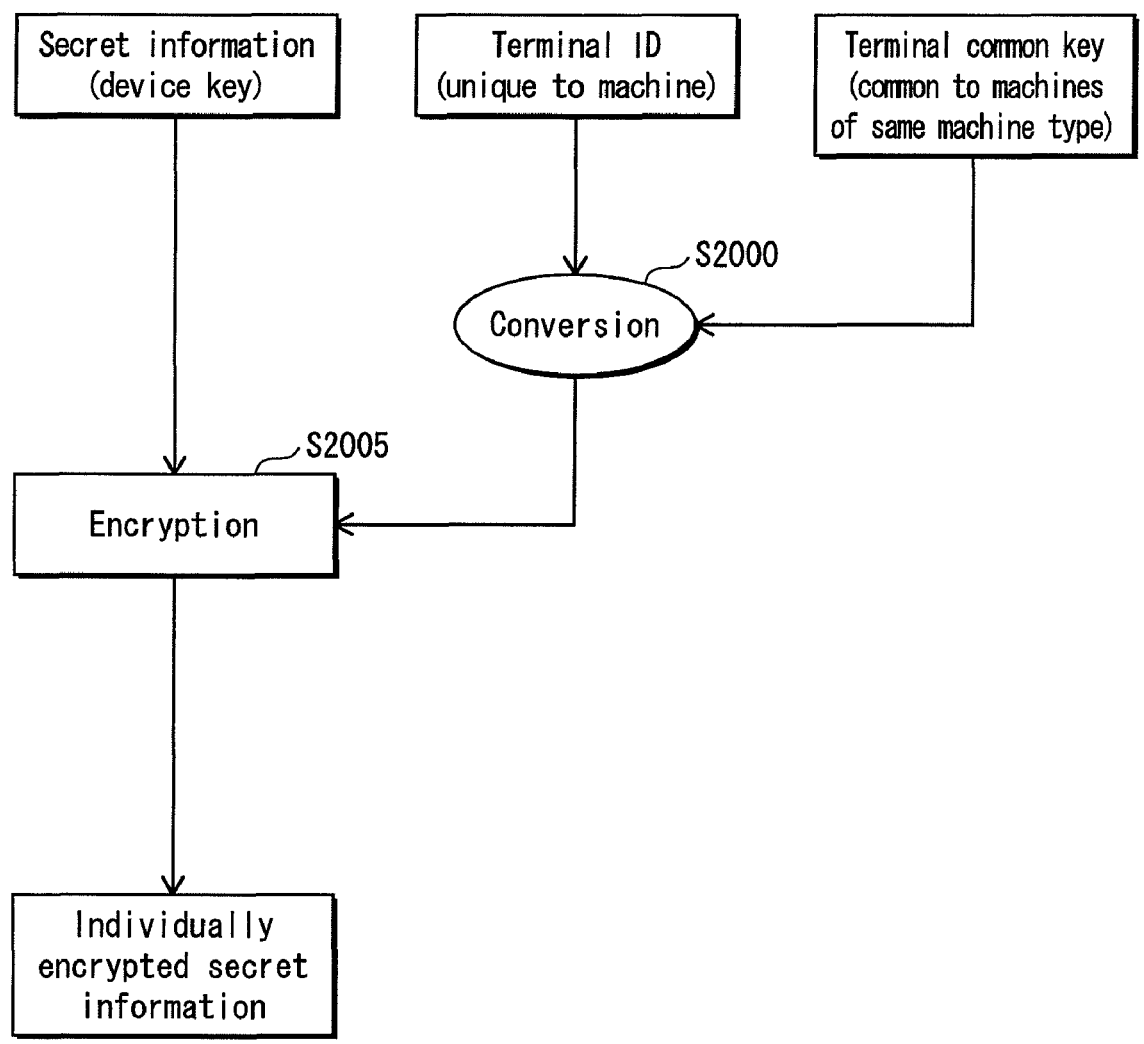
FIG. 17 shows a flow of generating the individually encrypted secret information.

As shown in FIG. 17, the server 2004 calculates a value (herein after referred to as encryption-purpose converted value) converted from a terminal ID and a terminal common key (step S2000). The terminal ID is identification information unique to each terminal, and the terminal common key is a key common to a plurality of terminals. Here, the encryption-purpose converted value is obtained, for example, by concatenating the terminal ID with the terminal common key, and applying a one-way function to a value obtained by the concatenation. An other calculation method is to encrypt the terminal ID by the secret key encryption method, using the terminal common key as the encryption key. In either case, the encryption-purpose converted value becomes a value depending on the terminal ID.

The server 2004 generates the individually encrypted secret information by encrypting the secret information (device key) by the secret key encryption method, using the calculated encryption-purpose converted value as the encryption key (step S2005).

(A-1-1) Terminal 2001

The terminal 2001 is composed of, as shown in FIG. 16, an ID storage unit 2010, a program storage unit 2011, a terminal measuring unit 2012, a program updating unit 2013, and a secret information decrypting unit 2014.

Part or all of the structural elements constituting the terminal 2001 is achieved in one system LSI (Large Scale Integration). The system LSI stores a key (the aforesaid terminal common key) that is common to a plurality of terminals that are of the same type as the terminal 2001. The terminal common key has confidentiality and is protected by the tamper-resistant structure.

(A-1-1-1) ID Storage Unit 2010, Program Storage Unit 2011

The ID storage unit 2010 preliminarily stores a terminal ID 2015 that is a terminal ID of the terminal 2001 itself.

The ID storage unit 2010 is tamper-resistant, and thus the terminal ID 2015 cannot be tampered.

The program storage unit 2011 corresponds to the program storage unit 0708 in the above-described embodiment. The program storage unit 2011 stores the programs that are stored in the program storage unit 0708 in the above-described embodiment, and further stores preliminarily a program (herein after referred to as a secret information decryption program) that is used to decrypt the authentic device key that has been individually encrypted, and further stores preliminarily the content key decryption program.

(A-1-1-2) Terminal Measuring Unit 2012

The terminal measuring unit 2012 corresponds to the secure module 0707 and part of the boot code 0703, the operating system 0709 and the playback control program 0711 for controlling the secure module 0707 in the above-described embodiment.

The terminal measuring unit 2012 measures (calculates) the PCR value of the content key decryption program, and outputs the measured PCR value to the card 2002 in the above-described embodiment.

The measuring timing is the same as that in the above-described embodiment, namely, when the content key decryption program is loaded. Also, the timing at which the measured PCR value is output is when the content is played back.

The measuring method is the same as that described in the above-described embodiment, and thus description thereof is omitted here.

(A-1-1-3) Program Updating Unit 2013

The program updating unit 2013 performs a process that corresponds to steps S0407 and S0408 shown in FIG. 4 in the above-described embodiment.

Upon receiving the update program for updating the content key decryption program from the card 2002, the program updating unit 2013 updates the content key decryption program using the received update program.

The program updating unit 2013, after the update of the content key decryption program, requests the operating system of the terminal 2001 to reset the system, in the same manner as in step S0408.

(A-1-1-4) Secret Information Decrypting Unit 2014

The secret information decrypting unit 2014 is achieved as the secret information decryption program stored in the program storage unit 2011 is booted and run.

The secret information decrypting unit 2014 obtains the individually encrypted secret information that corresponds to the terminal 2001 itself, from the card 2002.

The secret information decrypting unit 2014 obtains the terminal ID and the terminal common key from the ID storage unit 2010 and the system LSI, respectively.

The secret information decrypting unit 2014 calculates a decryption-purpose converted value using the obtained terminal ID and terminal common key, in the same manner as the server 2004 calculates the encryption-purpose converted value.

The secret information decrypting unit 2014 generates a device key by decrypting the individually encrypted secret information using the calculated decryption-purpose converted value. The secret information decrypting unit 2014 updates the device key currently stored by replacing it with the generated device key.

Note that the terminal 2001, after it receives individually encrypted secret information including a device key for an update target, may store the receiving information, and may decrypt it when a new device key is required.

(A-1-2) Card 2002

The card 2002 is composed of, as shown in FIG. 16, a secret information providing unit 2020, a terminal ID storage unit 2021, an authenticity confirmation information storage unit 2022, an update program storage unit 2023, a secret information obtaining unit 2024, an authenticity confirmation information obtaining unit 2025, an update program obtaining unit 2026, an authenticity confirmation unit 2027, and a program output unit 2028.

(A-1-2-1) Secret Information Providing Unit 2020

The secret information providing unit 2020 includes a secret information storage unit 2029 and a switch 2030, as shown in FIG. 16.

The secret information storage unit 2029 corresponds to the content storage unit 0807 in the above-described embodiment. The secret information storage unit 2029 stores the individually encrypted secret information that was received from the server 2004 via the network connected terminal 2003. It is presumed here that the secret information storage unit 2029 stores secret information that was encrypted using the terminal ID of the terminal 2001.

The switch 2030 corresponds to the operation of outputting a content key performed in step S1005 shown in FIG. 10 in the above-described embodiment. The switch 2030 operates under control of the authenticity confirmation unit 2027. When it is judged that the terminal is authentic, the switch 2030 connects the terminal with the secret information storage unit 2029 so that the terminal can obtain the individually encrypted secret information. When it is judged that the terminal is not authentic, the switch 2030 does not connect the terminal with the secret information storage unit 2029.

After the terminal 2001 and the secret information storage unit 2029 are connected with each other, the secret information providing unit 2020 outputs the individually encrypted secret information corresponding to the terminal 2001, and requests the operating system of the terminal 2001 to boot the secret information decryption program.

The operation of connection/disconnection by the switch 2030 is controlled by the authenticity confirmation unit 2027. The switch 2030 may be controlled by the secret information providing unit 2020 based on the confirmation result of the authenticity confirmation unit 2027.

(A-1-2-2) Terminal ID Storage Unit 2021

The terminal ID storage unit 2021 corresponds to the terminal ID storage area in the CRL database 0805 in the above-described embodiment.

The terminal ID storage unit 2021 stores terminal IDs of terminals to which the card was attached at least once. It is presumed here that the terminal ID storage unit 2021 stores the terminal ID of the terminal 2001.

When the card 2002 is being connected with the network connected terminal 2003, the network connected terminal 2003 obtains the terminal ID stored in the terminal ID storage unit 2021.

(A-1-2-3) Authenticity Confirmation Information Storage Unit 2022

The authenticity confirmation information storage unit 2022 corresponds to the authentic PCR value storage area in the CRL database 0805 in the above-described embodiment.

The authenticity confirmation information storage unit 2022 stores the authenticity confirmation information that was received from the server 2004 via the network connected terminal 2003, in association with the terminal ID stored in the terminal ID storage unit 2021. It is presumed here that the authenticity confirmation information storage unit 2022 stores the authenticity confirmation information (PCR value) for updating the content key decryption program, in association with the terminal ID 2015 of the terminal 2001.

(A-1-2-4) Update Program Storage Unit 2023

The update program storage unit 2023 corresponds to the update program storage area in the CRL database 0805 in the above-described embodiment.

The update program storage unit 2023 stores the update program that was received from the server 2004 via the network connected terminal 2003, in association with the terminal ID stored in the terminal ID storage unit 2021. It is presumed here that the update program storage unit 2023 stores the update program for updating the content key decryption program, in association with the terminal ID 2015 of the terminal 2001.

It should be apparent from the above description that the aforesaid CRL database 0805 is composed of the terminal ID storage unit 2021, the authenticity confirmation information storage unit 2022, and the update program storage unit 2023 described in the present modification.

(A-1-2-5) Secret Information Obtaining Unit 2024

The secret information obtaining unit 2024 performs a process that corresponds to the right purchase process shown in FIG. 9 in the above-described embodiment.

The secret information obtaining unit 2024, upon receiving the individually encrypted secret information from the server 2004 via the network connected terminal 2003, stores the received individually encrypted secret information into the secret information storage unit 2029.

The timing at which the secret information obtaining unit 2024 receives and stores the individually encrypted secret information is, for example, when a content is purchased.

(A-1-2-6) Authenticity Confirmation Information Obtaining Unit 2025

The authenticity confirmation information obtaining unit 2025 performs a process that corresponds to the CRL update process shown in FIG. 9 in the above-described embodiment, especially the process of updating the authentic PCR value in the CRL database.

The authenticity confirmation information obtaining unit 2025, upon receiving the authenticity confirmation information from the server 2004 via the network connected terminal 2003, stores the received authenticity confirmation information into the authenticity confirmation information storage unit 2022.

(A-1-2-7) Update Program Obtaining Unit 2026

The update program obtaining unit 2026 performs a process that corresponds to the CRL update process shown in FIG. 9 in the above-described embodiment, especially the process of updating the update program in the CRL database.

The update program obtaining unit 2026, upon receiving the update program from the server 2004 via the network connected terminal 2003, stores the update program into the update program storage unit 2023.

(A-1-2-8) Authenticity Confirmation Unit 2027

The authenticity confirmation unit 2027 performs a process that corresponds to step S1003 shown in FIG. 10 in the above-described embodiment.

The authenticity confirmation unit 2027, upon receiving the PCR value for the content key decryption program from the terminal 2001, obtains, from the authenticity confirmation information storage unit 2022, authenticity confirmation information for the content key decryption program associated with the terminal 2001.

The authenticity confirmation unit 2027 judges whether or not the received PCR value matches the authenticity confirmation information.

When it judges that they match, the authenticity confirmation unit 2027 closes the switch 2030 so that the terminal is connected with the secret information storage unit 2029.

When it judges that they do not match, the authenticity confirmation unit 2027 outputs the NG information indicating that they do not match, to the program output unit 2028.

In the present modification, the authenticity confirmation unit 2027 corresponds to only step S1003. However, the present invention is not limited to this structure.

The authenticity confirmation unit 2027 may correspond to steps S1002 and S1003. In this case, the authenticity confirmation unit 2027 performs a verification of a signature attached to a PCR value, as in the above-described embodiment, and when the signature verification results in OK, the authenticity confirmation unit 2027 compares the PCR value received from the terminal 2001 with the authenticity confirmation information.

(A-1-2-9) Program Output Unit 2028

The program output unit 2028, upon receiving the NG information from the authenticity confirmation unit 2027, obtains, from the update program storage unit 2023, the update program for updating the content key decryption program for the terminal 2001.

The program output unit 2028 outputs the obtained update program to the program updating unit 2013 of the terminal 2001.

(A-1-3) Network Connected Terminal 2003

The network connected terminal 2003 obtains the terminal ID of the terminal 2001 from the terminal ID storage unit 2021 of the card 2002 being attached to the network connected terminal 2003 itself, then outputs the obtained terminal ID to the server 2004 via the network.

After this, the network connected terminal 2003 receives the update program associated with the output terminal ID, the authenticity confirmation information, and the individually encrypted secret information, from the server 2004 via the network, and stores these received information into the card 2002.

(A-1-4) Server 2004

The server 2004, as in the above-described embodiment, includes a CRL database, and manages, for each terminal, update programs and authentic PCR values (authenticity confirmation information) to be distributed thereto. It is presumed here that each type of terminal is associated with a different update program and a different piece of authenticity confirmation information. That is to say, a plurality of terminals of the same type have a common update program and a common piece of authenticity confirmation information, and a plurality of terminals of different types have different update programs and different pieces of authenticity confirmation information, respectively.

Also, the server 2004 preliminarily stores and manages the terminal common key.

The server 2004 preliminarily generates a plurality of pieces of secret information (device keys), and stores and manages the generated secret information. The server 2004 manages the plurality of pieces of secret information such that, when a piece of secret information is distributed to a terminal, the same piece of secret information is no more distributed to the terminal. Note that the plurality of pieces of secret information managed by the server 2004 differ from each other. Furthermore, after having distributed all the pieces of secret information having been managed, the server 2004 newly generates a plurality of pieces of secret information that are different from the pieces of secret information having been managed so far. As described above, the newly generated pieces of secret information are different from each other.

The server 2004, upon receiving the terminal ID from the network connected terminal 2003 via the network, identifies the machine type from the received terminal ID, and obtains a piece of type common information (update program, authenticity confirmation information, and terminal common key) that is associated with the identified machine type.

The server 2004 generates an encryption-purpose converted value using the obtained terminal common key and the received terminal ID.

The server 2004 obtains one of the plurality of pieces of secret information (device keys) having been preliminarily stored, and generates individually encrypted secret information by encrypting the obtained piece of secret information using the encryption-purpose converted value as the encryption key.

The server 2004 outputs a set of terminal individual data (the generated individually encrypted secret information and the obtained update program and authenticity confirmation information) to the network connected terminal 2003 via the network.

(A-1-5) Operation of Device Key Distribution System 2000

The operation of the device key distribution system 2000 will be described with reference to the flow diagram shown in FIG. 18.

The card 2002, after it is attached to the terminal 2001, obtains the terminal ID of the terminal 2001 and stores the obtained terminal ID into the terminal ID storage unit 2021 (step S2010).

The card 2002, when it attempts to obtain a device key from the server 2004 after being attached to the network connected terminal 2003, transmits the terminal ID stored in the terminal ID storage unit 2021 to the server 2004 via the network connected terminal 2003 (step S2015).

The server 2004, upon receiving the terminal ID of the terminal 2001 from the card 2002 via the network connected terminal 2003, identifies a machine type from the received terminal ID, and obtains a piece of type common information (update program, authenticity confirmation information, and terminal common key) that is associated with the identified machine type (step S2020).

The server 2004 generates individually encrypted secret information by subjecting the secret information (device key) into the individual encryption process (step S2025). More specifically, the server 2004 generates an encryption-purpose converted value by using the obtained terminal common key and the received terminal ID. The server 2004 generates secret information (device key), and generates individually encrypted secret information by encrypting the secret information using the encryption-purpose converted value as the encryption key.

The server 2004 outputs a set of terminal individual data (the generated individually encrypted secret information and the obtained update program and authenticity confirmation information) to the network connected terminal 2003 via the network (step S2030).

The card 2002, upon receiving the set of terminal individual data from the server 2004 via the network connected terminal 2003, stores each piece of information (data) (step S2035). More specifically, the secret information obtaining unit 2024 of the card 2002 receives the individually encrypted secret information and stores the received individually encrypted secret information into the secret information storage unit 2029. Upon receiving the authenticity confirmation information, the authenticity confirmation information obtaining unit 2025 stores the received authenticity confirmation information into the authenticity confirmation information storage unit 2022. Upon receiving the update program, the update program obtaining unit 2026 stores the received update program into the update program storage unit 2023.

The card 2002 outputs the update program to the terminal 2001 (step S2040).

The terminal 2001 installs the update program (step S2045)

The authenticity confirmation unit 2027 of the card 2002, upon receiving a secret information (device key) output request from the terminal 2001, judges the authenticity of the terminal 2001 (step S2050). The secret information output request corresponds to step S0402 shown in FIG. 4 in the above-described embodiment, and includes a PCR value of a content key decryption program. In the present example, the authenticity confirmation unit 2027 of the card 2002 compares the authenticity confirmation information for the latest update program received from the server 2004, with the PCR value included in the secret information output request received from the terminal 2001.

When it judges that the terminal is not authentic (NG in step S2050), the card 2002 outputs the update program to the terminal 2001 (step S2055). More specifically, the authenticity confirmation unit 2027 outputs the NG information to the program output unit 2028. The program output unit 2028, upon receiving the NG information from the authenticity confirmation unit 2027, obtains an update program for updating a content key decryption program for the terminal 2001, from the update program storage unit 2023, and outputs the obtained update program to the program updating unit 2013 of the terminal 2001. Note that, although in the present example, the target of update by the update program is merely the content key decryption program, the whole program loaded in the terminal 2001 may be the target of update by the update program. Also, in the following description, although the content key decryption program is explained as the target of update, the whole program may be the target of update.

When it judges that the terminal is authentic (OK in step S2050), the card 2002 outputs the individually encrypted secret information to the terminal 2001 (step S2060). More specifically, after it is confirmed that the update program has been installed correctly by the secret information storage unit 2029 under the control of the authenticity confirmation unit 2027, and it is notified that the secret information can be output, the secret information providing unit 2020 outputs the individually encrypted secret information, which is associated with the terminal 2001, to the terminal 2001.

The program updating unit 2013 of the terminal 2001, upon receiving the update program from the card 2002, installs the received update program (step S2065). More specifically, upon receiving the update program for updating the content key decryption program from the card 2002, the program updating unit 2013 updates the content key decryption program using the received update program. The program updating unit 2013, after the update of the content key decryption program, requests the operating system of the terminal 2001 to reset the system, in the same manner as in step S0408.

Upon receiving the individually encrypted secret information from the card 2002, the secret information decrypting unit 2014 of the terminal 2001 installs the individually encrypted secret information (step S2070). More specifically, the secret information decrypting unit 2014 obtains, from the card 2002, individually encrypted secret information associated with the terminal. The secret information decrypting unit 2014 obtains the terminal ID from the ID storage unit 2010, and the terminal common key from the system LSI. The secret information decrypting unit 2014 calculates a decryption-purpose converted value using the obtained terminal ID and terminal common key, in the same manner as the server 2004 calculates the encryption-purpose converted value. The secret information decrypting unit 2014 generates a device key by decrypting the individually encrypted secret information using the calculated decryption-purpose converted value, and updates the device key currently stored by replacing it with the generated device key.

After this, for example, the terminal 2001 performs step S0403 and subsequent steps shown in FIG. 4, and the card 2002 runs the right confirmation/key generation program shown in FIG. 10.

The following shows an example of the timings at which each step is performed.

Step S2010 is performed after the card 2002 is attached to the terminal 2001.

Steps S2015 through S2035 are performed after the card 2002 is attached to the network connected terminal 2003.

Steps S2040 through S2045 are performed when a service person updates a program for the terminal 2001.

Step S2050 and subsequent steps are performed after the user of the terminal 2001 requests playback of a content.

(A-1-6) Other Modifications

Up to now, the present invention has been described through Modification 1. However, the present invention is not limited to Modification 1, but includes, for example, the following modifications.

(1) In the above-described Modification 1, a plurality of pieces of secret information managed by the server 2004 are managed in a plain text state (state before it is encrypted). However, the present invention is not limited to this.

The server 2004 may manage each of the plurality of pieces of secret information, in an individually encrypted state.

In this case, the server 2004 generates a plurality of pieces of individually encrypted secret information by encrypting each of the plurality of pieces of secret information using a different terminal ID, by the same encryption method as in Modification 1. When managing the generated pieces of individually encrypted secret information, the server 2004 manages them in association with the terminal ID that was used in the encryption. Upon receiving a terminal ID from the network connected terminal, the server 2004 obtains a piece of individually encrypted secret information associated with the received terminal ID.

(2) In the above-described Modification 1, the server 2004 preliminarily stores and manages a plurality of pieces of secret information. However, the present invention is not limited to this structure.

The server 2004 may generate secret information each time it receives a terminal ID from the network connected terminal.

Figure 18:
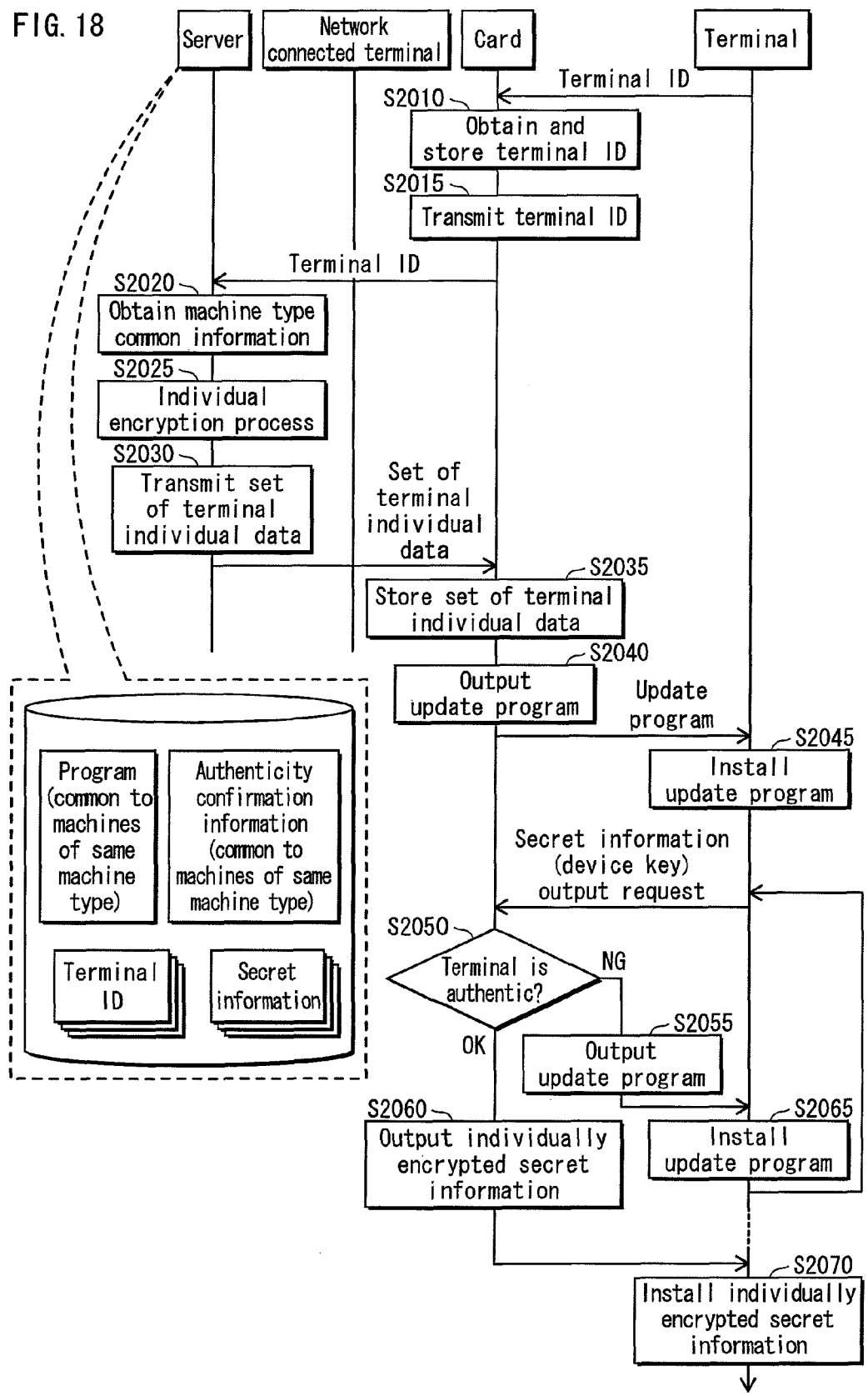
FIG. 18 is a flowchart showing the operation of the device key distribution system 2000.

(3) In the above-described Modification 1, the device key distribution system 2000 performs steps S2040 through S2045 shown in FIG. 18 when a service person updates a content key decryption program for the terminal 2001. However, the present invention is not limited to this structure.

The device key distribution system 2000 may not perform steps S2040 through S2045 in the operation thereof.

(4) In the above-described Modification 1, a converted value (an encryption-purpose converted value or a decryption-purpose converted value) generated from the terminal ID and terminal common key is used when the secret information is encrypted or decrypted. However, the present invention is not limited to this structure.

Only the terminal ID may be used as the key when the secret information is encrypted or decrypted.

(5) In the above-described Modification 1, the converted value is generated from the terminal ID and terminal common key. However, the present invention is not limited to this structure.

The converted value may be a value that is uniquely associated with a terminal ID.

(6) In the above-described Modification 1, the card 2002 stores the terminal ID 2015 itself of the terminal 2001. However, the present invention is not limited to this structure.

(6-1) The card 2002 may store a value (herein after referred to as "second terminal ID") that is obtained by applying a one-way function (for example, SHA-1) to a terminal ID (herein after referred to as "first terminal ID").

In this case, the conversion from the first terminal ID to the second terminal ID may be performed by the card 2002 or the terminal 2001.

Also in this case, the server 2004 includes a management table T2000 shown in FIG. 19.

The management table T2000 has an area for storing one or more pairs of a pre-conversion terminal ID and a post-conversion terminal ID. The pre-conversion terminal ID is a terminal ID of a terminal, namely, the first terminal ID; and the post-conversion terminal ID is the second terminal ID that is obtained by applying a one-way function (for example, SHA-1) to the terminal ID.

The card 2002 transmits the second terminal ID to the server 2004 via the network connected terminal 2003.

Upon receiving the second terminal ID from the card 2002 via the network connected terminal 2003, the server 2004 obtains a first terminal ID which is associated with the received second terminal ID, from the management table T2000. The server 2004 generates individually encrypted secret information using the obtained first terminal ID.

For example, upon receiving a second terminal ID "IDA-1" from the card 2002, the server 2004 obtains a first terminal ID "IDA" (an ID that is the same as the terminal ID 2015) associated with the received second terminal ID "IDA-1", and generates individually encrypted secret information using the obtained first terminal ID "IDA" (the terminal ID 2015).

(6-2) The individually encrypted secret information may be generated using the second terminal ID.

In this case, the card 2002 transmits the second terminal ID to the server 2004 via the network connected terminal 2003, in the same manner as described above.

Upon receiving the second terminal ID from the card 2002 via the network connected terminal 2003, the server 2004 generates individually encrypted secret information using the received second terminal ID.

The terminal 2001 generates the second terminal ID, and decrypts the individually encrypted secret information using the generated second terminal ID.

(7) In the above-described Modification 1, the terminal 2001 is a terminal not connected with a network. However, the present invention is not limited to this structure.

The terminal 2001 may be a terminal that is connectable to a network. That is to say, the terminal 2001 may also have the function of the network connected terminal 2003 recited in the above-described Modification 1.

(8) The above-described embodiment and modifications may be combined.

(A-1-7) Summary

Usually, a program targeted for an update is provided in common in machines of a same type. Therefore, when the mechanism of the above-described embodiment is applied, without modification, to a device key distribution, a device key is distributed to clone terminals as well. This enables the clone terminals to use the distributed device key. The confirmation by the authenticity confirming unit alone is not sufficient to prevent the distribution to the clone terminals. Here, the clone terminals refer to unauthorized terminals that have the same constituent elements and the like as authorized terminals, except for the terminal ID.

According to Modification 1 described above, the data (in the provided example, a device key) is transmitted in an encrypted state after being encrypted individually using the terminal ID. Therefore, even if a card judges that a clone terminal is authentic and distributes a device key to the clone terminal, the clone terminal cannot decrypt the device key that has been encrypted.

Also, the device key is transmitted only after it is confirmed that the program has been updated. Therefore, the transmitted cannot be used by an unauthorized program or a program having a security hole. This enables device keys to be updated safely.

(B-1) Modification 2

Here, a modification to the authenticity confirmation process will be described centering on the differences from Modification 1 described above.

The following describes the system structure and the structure of each device.

Figure 20:
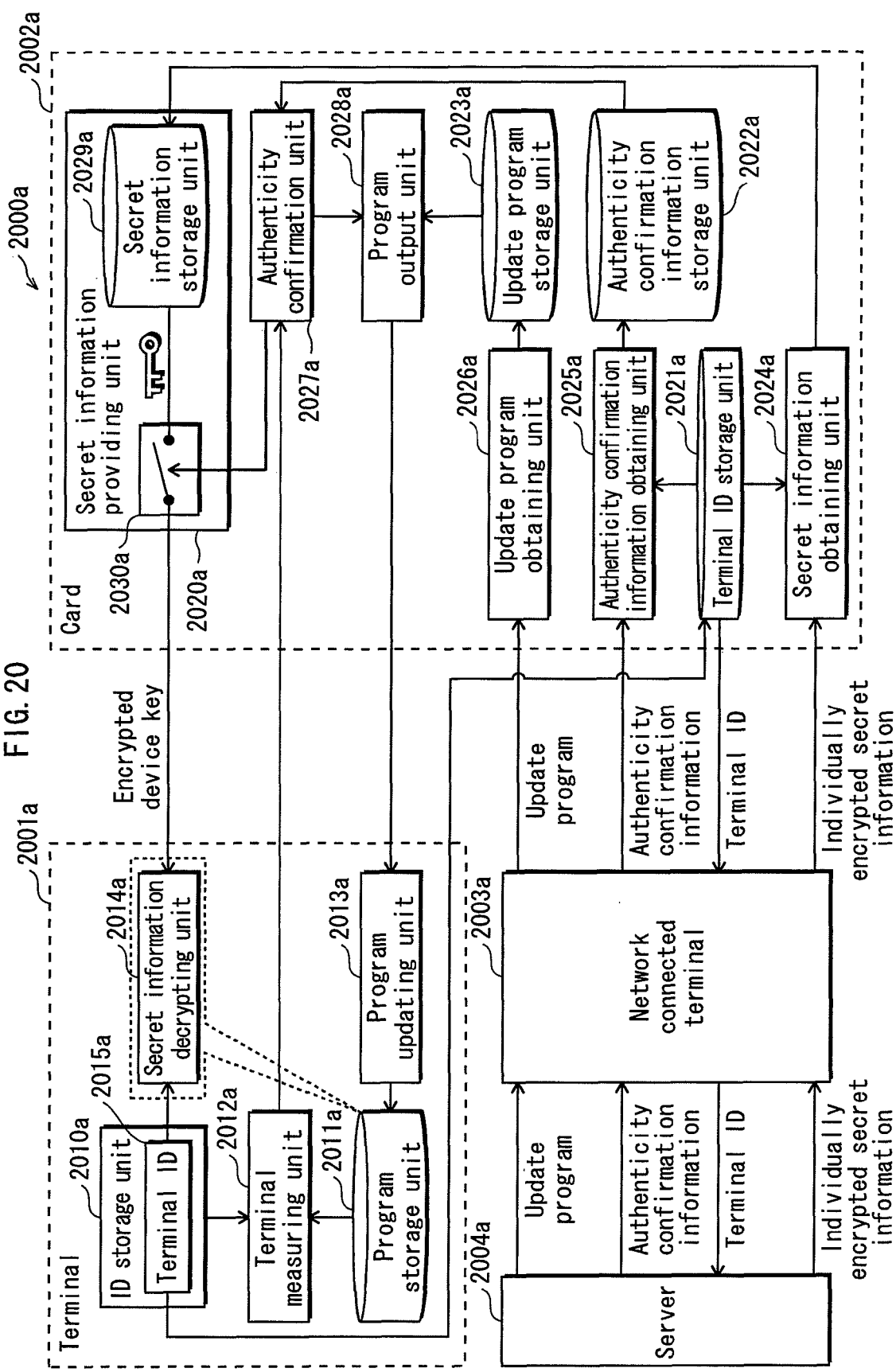
FIG. 20 is a block diagram showing the structure of the device key distribution system 2000a in Modification 2.

A device key distribution system 2000a is composed of a terminal (requesting device) 2001a, a card (verifying device) 2002a, a network connected terminal 2003a and a server 2004a, as shown in FIG. 20.

The terminal 2001a is a terminal not connected with the network, and, as is the case with the terminal 2001 described in Modification 1, has a device key and a program (herein after referred to as a content key decryption program) that is used to decrypt an encrypted content key.

The card 2002a, after it is attached to a terminal, obtains a terminal ID for identifying the terminal, and stores the obtained terminal ID. It is presumed here that the card 2002a preliminarily stores a terminal ID for identifying the terminal 2001a, as is the case with the card 2002 described in Modification 1. The card 2002a outputs the preliminarily stored terminal ID to the network connected terminal 2003a in the CRL update process.

The network connected terminal 2003a transmits the terminal ID to the server 2004a via the network. The network connected terminal 2003a receives, from the server 2004a, an update program for updating a decryption program, authenticity confirmation information, and individually encrypted secret information that has been individually encrypted with use of the transmitted terminal ID, and outputs these received information to the card 2002a.

The server 2004a, upon receiving the terminal ID from the network connected terminal 2003a, transmits the update program, the authenticity confirmation information, and the secret information that is based on the received terminal ID.

The individual encryption of the authentic device key is the same as that described in Modification 1, thus description thereof is omitted here.

(B-1-1) Terminal 2001a

The terminal 2001a is composed of, as shown in FIG. 20, an ID storage unit 2010a, a program storage unit 2011a, a terminal measuring unit 2012a, a program updating unit 2013a, and a secret information decrypting unit 2014a.

Note that the terminal 2001a stores a terminal common key, as is the case with the terminal 2001 described in Modification 1, and that the terminal common key has confidentiality and is protected by the tamper-resistant structure.

(B-1-1-1) ID Storage Unit 2010a, Program Storage Unit 2011a

The ID storage unit 2010a preliminarily stores a terminal ID 2015a that is a terminal ID of the terminal 2001a itself.

The ID storage unit 2010a is tamper-resistant, and thus the terminal ID 2015a cannot be tampered.

The program storage unit 2011a is the same as the program storage unit 2011 described in Modification 1, thus description thereof is omitted here.

(B-1-1-2) Terminal Measuring Unit 2012a

The terminal measuring unit 2012a corresponds to the secure module 0707 and part of the boot code 0703, the operating system 0709 and the playback control program 0711 for controlling the secure module 0707 in the above-described embodiment.

The terminal measuring unit 2012a first, as in the above-described embodiment, measures (calculates) the PCR value of the content key decryption program. Next, the terminal measuring unit 2012a generates a PCR value (herein after referred to as an "ID-attached PCR value") by applying the PCR extend command to the terminal ID 2015a stored in the ID storage unit 2010a and to the calculated PCR value, wherein the generated PCR value, the terminal ID 2015a is reflected on the PCR value of the content key decryption program. Note that, although in the present example, the terminal ID is reflected after the PCR value of the content key decryption program is measured, the content key decryption program may be reflected after the terminal ID is reflected.

The terminal measuring unit 2012*a* outputs the generated ID-attached PCR value to the card 2002*a*.

The PCR extend command has been described in the embodiment above, thus description thereof is omitted here.

The timings of the measuring and outputting are the same as those in Modification 1 described above.

(B-1-1-3) Program Updating Unit 2013*a*

The program updating unit 2013*a* is the same as the program updating unit 2013 described in Modification 1 above, thus description thereof is omitted here.

(B-1-1-4) Secret Information Decrypting Unit 2014*a*

The secret information decrypting unit 2014*a* is the same as the secret information decrypting unit 2014 described in Modification 1 above, thus description thereof is omitted here.

(B-1-2) Card 2002*a*

The card 2002*a* is composed of, as shown in FIG. 20, a secret information providing unit 2020*a*, a terminal ID storage unit 2021*a*, an authenticity confirmation information storage unit 2022*a*, an update program storage unit 2023*a*, a secret information obtaining unit 2024*a*, an authenticity confirmation information obtaining unit 2025*a*, an update program obtaining unit 2026*a*, and an authenticity confirmation unit 2027*a*.

(B-1-2-1) Secret Information Providing Unit 2020*a*

The secret information providing unit 2020*a* includes a secret information storage unit 2029*a* and a switch 2030*a*, as shown in FIG. 20.

The secret information storage unit 2029*a* and the switch 2030*a* are the same as the secret information storage unit 2029 and the switch 2030 described in Modification 1 above, thus description thereof is omitted here.

(B-1-2-2) Terminal ID Storage Unit 2021*a*

The terminal ID storage unit 2021*a* is the same as the terminal ID storage unit 2021 described in Modification 1, thus description thereof is omitted here.

(B-1-2-3) Authenticity Confirmation Information Storage Unit 2022*a*

The authenticity confirmation information storage unit 2022*a* corresponds to the authentic PCR value storage area in the CRL database 0805 in the above-described embodiment.

The authenticity confirmation information storage unit 2022*a* stores the authenticity confirmation information (an authentic-ID-attached PCR value) that was received from the server 2004*a* via the network connected terminal 2003*a*, in association with the terminal ID stored in the terminal ID storage unit 2021*a*. It is presumed here that the authenticity confirmation information storage unit 2022*a* stores the authenticity confirmation information (authentic-ID-attached PCR value) for updating the content key decryption program, in association with the terminal ID 2015*a* of the terminal 2001*a*.

(B-1-2-4) Update Program Storage Unit 2023*a*

The update program storage unit 2023*a* corresponds to the update program storage area in the CRL database 0805 in the above-described embodiment.

The update program storage unit 2023*a* is the same as the program updating unit 2023 described in Modification 1 above, thus description thereof is omitted here.

It should be apparent from the above description that the aforesaid CRL database 0805 is composed of the terminal ID storage unit 2021*a*, the authenticity confirmation information storage unit 2022*a*, and the update program storage unit 2023*a* described in the present modification.

(B-1-2-5) Secret Information Obtaining Unit 2024*a*

The secret information obtaining unit 2024*a* is the same as the secret information obtaining unit 2024 described in Modification 1 above, thus description thereof is omitted here.

(B-1-2-6) Authenticity Confirmation Information Obtaining Unit 2025*a*

The authenticity confirmation information obtaining unit 2025*a* performs a process that corresponds to the CRL update process shown in FIG. 9 in the above-described embodiment, especially the process of updating the authentic PCR value in the CRL database. The authenticity confirmation information obtaining unit 2025*a*, upon receiving the authenticity confirmation information (the authentic-ID-attached PCR value) from the server 2004*a* via the network connected terminal 2003*a*, stores the received authenticity confirmation information into the authenticity confirmation information storage unit 2022*a*.

(B-1-2-7) Update Program Obtaining Unit 2026*a*

The update program obtaining unit 2026*a* is the same as the update program obtaining unit 2026 described in Modification 1 above, thus description thereof is omitted here.

(B-1-2-8) Authenticity Confirmation Unit 2027*a*

The authenticity confirmation unit 2027*a* performs a process that corresponds to step S1003 shown in FIG. 10 in the above-described embodiment.

The authenticity confirmation unit 2027*a*, upon receiving the ID-attached PCR value for the content key decryption program and the terminal ID 2015*a* from the terminal 2001*a*, obtains, from the authenticity confirmation information storage unit 2022*a*, authenticity confirmation information (authentic-ID-attached PCR value) for the content key decryption program and the terminal ID 2015*a* associated with the terminal 2001*a*.

The authenticity confirmation unit 2027*a* judges whether or not the received PCR value matches the authenticity confirmation information.

The operation performed in accordance with the judgment result is the same as the operation performed in accordance with the judgment result by the authenticity confirmation unit 2027 described in Modification 1 above, thus description thereof is omitted here.

As is the case with Modification 1, the authenticity confirmation unit 2027*a* may correspond to steps S1002 and S1003.

(B-1-2-9) Program Output Unit 2028*a*

The program output unit 2028*a* is the same as the program output unit 2028 described in Modification 1 above, thus description thereof is omitted here.

(B-1-3) Network Connected Terminal 2003*a*

The network connected terminal 2003*a* obtains the terminal ID of the terminal 2001*a* from the terminal ID storage unit 2021*a* of the card 2002*a* being attached to the network connected terminal 2003*a* itself, then outputs the obtained terminal ID to the server 2004*a* via the network.

After this, the network connected terminal 2003*a* receives the update program associated with the output terminal ID, the authenticity confirmation information (the authentic-ID-attached PCR value), and the individually encrypted secret information, from the server 2004*a* via the network, and stores these received information into the card 2002*a*.

(B-1-4) Server 2004*a*

The server 2004*a*, as in the above-described embodiment, includes a CRL database, and manages, for each terminal, update programs and authentic PCR values (authenticity confirmation information) to be distributed thereto. It is presumed here that, as is the case with Modification 1, each type of terminal is associated with a different update program and a different piece of authenticity confirmation information.

Also, the server 2004a preliminarily stores and manages the terminal common key.

The server 2004a preliminarily generates a plurality of pieces of secret information (device keys), and stores and manages the generated secret information. The server 2004a manages the plurality of pieces of secret information such that, when a piece of secret information is distributed to a terminal, the same piece of secret information is no more distributed to the terminal. Note that the plurality of pieces of secret information managed by the server 2004a differ from each other. Furthermore, after having distributed all the pieces of secret information having been managed, the server 2004a newly generates a plurality of pieces of secret information that are different from the pieces of secret information having been managed so far. As described above, the newly generated pieces of secret information are different from each other.

The server 2004a, upon receiving the terminal ID from the network connected terminal 2003a via the network, identifies the machine type from the received terminal ID, and obtains an update program for updating a content key decryption program associated with the identified machine type, its PCR value, and a terminal common key.

The server 2004a generates authenticity confirmation information (an authentic-ID-attached PCR value) by applying the PCR extend command to the terminal ID received from the network connected terminal 2003a and to the obtained PCR value, where in the generated authenticity confirmation information, the terminal ID is reflected on the PCR value of the content key decryption program.

The server 2004a generates individually encrypted secret information by the same method of the server 2004 described in Modification 1 above.

The server 2004a outputs a set of terminal individual data (the generated individually encrypted secret information and the obtained update program and authenticity confirmation information (authentic-ID-attached PCR value)) to the network connected terminal 2003a via the network.

(B-1-5) Operation of Device Key Distribution System 2000a

Description of operation of the device key distribution system 2000a is omitted here since the operation is the same as that of the device key distribution system 2000 shown in FIG. 18, except for the contents of the authenticity confirmation information.

(B-1-6) Other Modifications

Up to now, the present invention has been described through Modification 2. However, the present invention is not limited to Modification 2, but includes, for example, the following modifications.

(1) In the above-described Modification 2, the ID-attached PCR value is generated by applying the PCR extend command to the terminal ID 2015a and to the PCR value of the content key decryption program. However, the present invention is not limited to this.

The ID-attached PCR value may be generated by applying a hash value, which is obtained by applying a one-way function to the terminal ID 2015a, to the PCR value of the content key decryption program.

(2) In the above-described Modification 2, the terminal 2001a is a terminal not connected to a network. However, the present invention is not limited to this structure.

The terminal 2001a may be a terminal that is connectable to a network. That is to say, the terminal 2001a may also have the function of the network connected terminal 2003a recited in the above-described Modification 2.

(3) The above-described embodiment and modifications may be combined.

(B-1-7) Summary

According to the above-described Modification 2, the ID-attached PCR value is calculated using the terminal ID and the PCR value of the program, and the authenticity of the terminal is confirmed using the calculated ID-attached PCR value. This prevents an unauthorized terminal, which obtained a terminal ID of another terminal in an unauthorized manner, from obtaining the device key.

With the above-described structure, it is possible to prevent generation of a clone terminal.

Also, as is the case with Modification 1, the device key can be updated safely since the device key is transmitted only after it is confirmed that the program has been updated.

(C-1) Modification 3

In Modification 2 described above, the server generates a PCR value on which a terminal ID has been reflected. However, the present invention is not limited to this.

The card may generate a PCR value on which a terminal ID has been reflected.

The following describes the system structure and the structure of each device in this case, centering on the differences from Modifications 1 and 2 described above.

Figure 21:
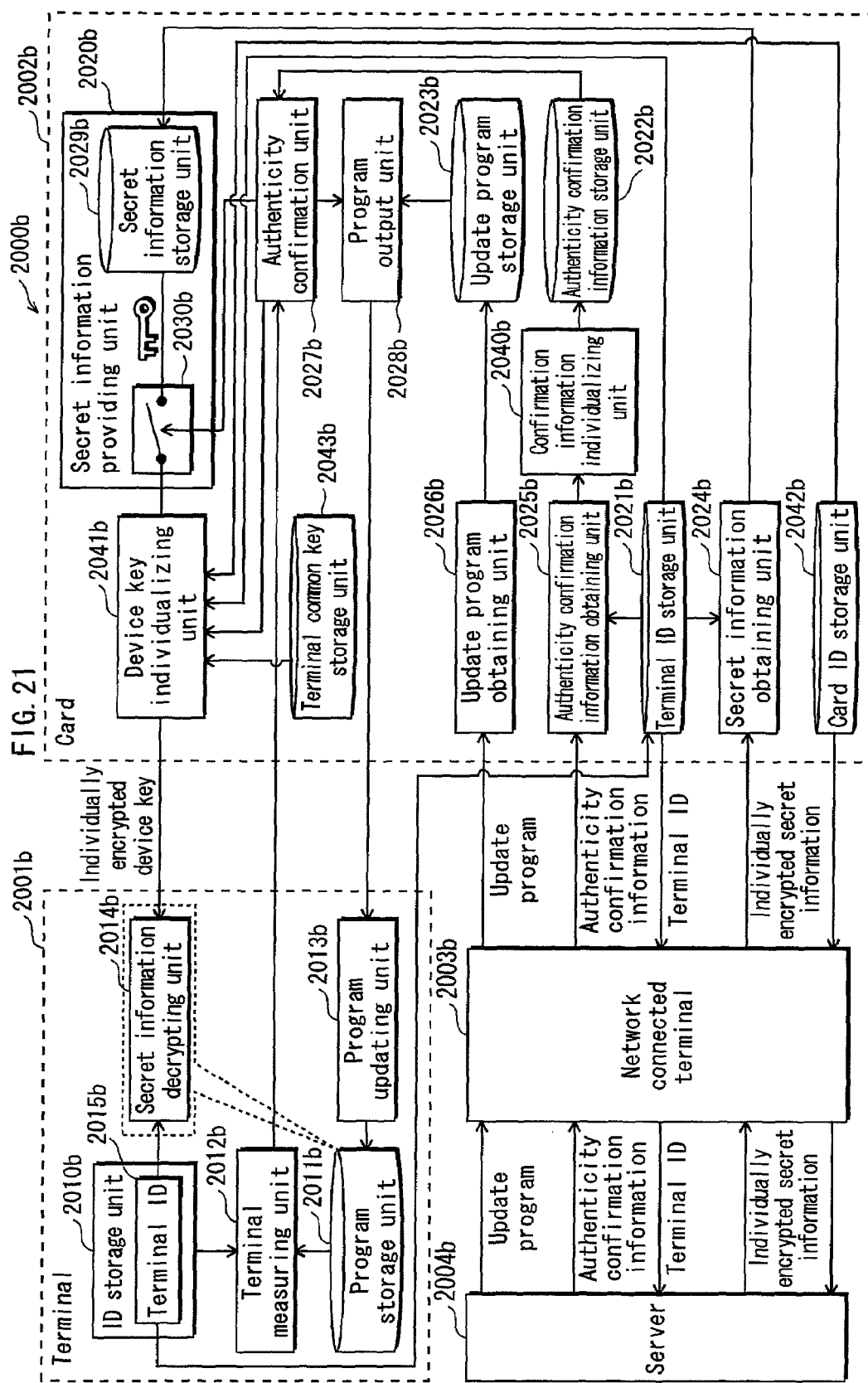
FIG. 21 is a block diagram showing the structure of the device key distribution system 2000b in Modification 3.

A device key distribution system 2000b is composed of a terminal (requesting device) 2001b, a card (verifying device) 2002b, a network connected terminal 2003b and a server 2004b, as shown in FIG. 21.

The terminal 2001b is a terminal not connected with the network, and, as is the case with the terminal 2001 described in Modification 1, has a device key and a program (herein after referred to as a content key decryption program) that is used to decrypt an encrypted content key.

The terminal 2001b receives, from the card 2002b, an encrypted device key (herein after referred to as an individually encrypted device key) that has been generated by encrypting a device key by using a value associated with the terminal ID of the terminal 2001b, and obtains a device key associated with the terminal 2001b by decrypting the received individually encrypted device key.

The card 2002b, after it is attached to a terminal, obtains a terminal ID for identifying the terminal, and stores the obtained terminal ID. It is presumed here that the card 2002b preliminarily stores a terminal ID for identifying the terminal 2001b, as is the case with the card 2002a described in Modification 2. The card 2002b outputs the preliminarily stored terminal ID to the network connected terminal 2003b in the CRL update process.

The network connected terminal 2003b transmits the terminal ID to the server 2004b via the network. The network connected terminal 2003b receives, from the server 2004b, an update program for updating a decryption program, authenticity confirmation information, and individually encrypted secret information that has been individually encrypted with use of the transmitted terminal ID, and outputs these received information to the card 2002b.

The server 2004b, upon receiving the terminal ID from the network connected terminal 2003b, transmits the update program, the authenticity confirmation information, and the secret information that is based on the received terminal ID.

The individual encryption of the authentic device key is the same as that described in Modification 1, thus description thereof is omitted here. That is to say, the authentic device key is encrypted using, as the secret key, a converted value having been converted from a terminal ID and a terminal common key.

(C-1-1) Terminal 2001*b*

The terminal 2001*b* is composed of, as shown in FIG. 21, an ID storage unit 2010*b*, a program storage unit 2011*b*, a terminal measuring unit 2012*b*, a program updating unit 2013*b*, and a secret information decrypting unit 2014*b*.

Note that the terminal 2001*b* stores a terminal common key, as is the case with the terminal 2001 described in Modification 1, and that the terminal common key has confidentiality and is protected by the tamper-resistant structure.

(C-1-1-1) ID Storage Unit 2010*b*, Program Storage Unit 2011*b*

The ID storage unit 2010*b* preliminarily stores a terminal ID 2015*b* that is a terminal ID of the terminal 2001*b* itself.

The ID storage unit 2010*b* is tamper-resistant, and thus the terminal ID 2015*b* cannot be tampered.

The program storage unit 2011*b* is the same as the program storage unit 2011 described in Modification 1, thus description thereof is omitted here.

(C-1-1-2) Terminal Measuring Unit 2012*b*

The terminal measuring unit 2012*b* corresponds to the secure module 0707 and part of the boot code 0703, the operating system 0709 and the playback control program 0711 for controlling the secure module 0707 in the above-described embodiment.

The terminal measuring unit 2012*b* generates an ID-attached PCR value by operating in the same manner as in Modification 2. A detailed operation thereof has been described in Modification 2 above, thus description thereof is omitted here.

(C-1-1-3) Program Updating Unit 2013*b*

The program updating unit 2013*b* is the same as the program updating unit 2013 described in Modification 1 above, thus description thereof is omitted here.

(C-1-1-4) Secret Information Decrypting Unit 2014*b*

The secret information decrypting unit 2014*b* is achieved as the secret information decryption programs to red in the program storage unit 2011*b* is booted and run.

The secret information decrypting unit 2014*b* obtains the individually encrypted device key from the card 2002*b*.

The secret information decrypting unit 2014*b* obtains the terminal ID and the terminal common key from the ID storage unit 2010*b* and the system LSI, respectively.

The secret information decrypting unit 2014*b* generates a device key by decrypting the individually encrypted device key using the obtained terminal ID and the terminal common key. The secret information decrypting unit 2014*b* updates the device key currently stored by replacing it with the generated device key.

(C-1-2) Card 2002*b*

The card 2002*b* is composed of, as shown in FIG. 21, a secret information providing unit 2020*b*, a terminal ID storage unit 2021*b*, an authenticity confirmation information storage unit 2022*b*, an update program storage unit 2023*b*, a secret information obtaining unit 2024*b*, an authenticity confirmation information obtaining unit 2025*b*, an update program obtaining unit 2026*b*, an authenticity confirmation unit 2027*b*, a confirmation information individualizing unit 2040*b*, a device key individualizing unit 2041*b*, a card ID storage unit 2042*b*, and a terminal common key storage unit 2043*b*.

(C-1-2-1) Card ID Storage Unit 2042*b*

The card ID storage unit 2042*b* stores a card ID that is unique to the card 2002*b*.

The card ID storage unit 2042*b* is tamper-resistant, and thus the card ID storage unit 2042*b* cannot be tampered.

(C-1-2-2) Secret Information Providing Unit 2020*b*

The secret information providing unit 2020*b* includes a secret information storage unit 2029*b* and a switch 2030*b*, as shown in FIG. 21.

The secret information storage unit 2029*b* stores a plurality of encrypted device keys (herein after referred to as "secret information" or "distribution-purpose encrypted device keys") that have been generated by encrypting device keys using the card ID stored in the card ID storage unit 2042*b*.

The switch 2030*b* is the same as the switch 2030 described in Modification 1 above, thus description thereof is omitted here.

The secret information providing unit 2020*b* manages the plurality of pieces of secret information such that, when a piece of secret information is distributed to a terminal, the same piece of secret information is no more distributed to the terminal.

For such management, for example, each of the plurality of pieces of secret information is associated with a flag. More specifically, the secret information providing unit 2020*b* associates a value "0" with each piece of secret information that has not been output; and associates a value "1" with each piece of secret information that has been output.

The distribution-purpose encrypted device keys are generated by the secret key encryption method, using the card ID as the encryption key.

(C-1-2-3) Terminal ID Storage Unit 2021*b*, Terminal Common Key Storage Unit 2043*b*

The terminal ID storage unit 2021*b* is the same as the terminal ID storage unit 2021 described in Modification 1 above, thus description thereof is omitted here.

The terminal common key storage unit 2043*b* stores each of one or more terminal common keys in association with a type of a terminal in which the terminal common key is stored. It is presumed here that the terminal common key storage unit 2043*b* stores terminal common keys associated with the terminal 2001*b*.

The terminal common key storage unit 2043*b* is tamper-resistant, and thus the terminal common key storage unit 2043*b* cannot be tampered.

(C-1-2-4) Authenticity Confirmation Information Storage Unit 2022*b*

The authenticity confirmation information storage unit 2022*b* corresponds to the authentic PCR value storage area in the CRL database 0805 in the above-described embodiment.

The authenticity confirmation information storage unit 2022*b* stores the authentic-ID-attached PCR value (herein after referred to as individualized confirmation information) that was generated from the terminal ID 2015*b* and from the authenticity confirmation information (authentic PCR value) for the content key decryption program managed by the server 2004*b*. The authenticity confirmation information storage unit 2022*b* stores the individualized confirmation information in association with the terminal ID stored in the terminal ID storage unit 2021*b*. It is presumed here that the authenticity confirmation information storage unit 2022*b* stores the individualized confirmation information (the authentic-ID-attached PCR value) for the content key decryption program and the terminal ID 2015*b*, in association with the terminal ID 2015*b* of the terminal 2001*b*.

(C-1-2-5) Update Program Storage Unit 2023*b*

The update program storage unit 2023*b* corresponds to the update program storage area in the CRL database 0805 in the above-described embodiment.

The update program storage unit 2023*b* is the same as the program updating unit 2023 described in Modification 1 above, thus description thereof is omitted here.

It should be apparent from the above description that the aforesaid CRL database 0805 is composed of the terminal ID storage unit 2021*b*, the authenticity confirmation information storage unit 2022*b*, and the update program storage unit 2023*b* described in the present modification.

(C-1-2-6) Secret Information Obtaining Unit 2024*b*

The secret information obtaining unit 2024*b*, upon receiving a plurality of distribution-purpose encrypted device keys (secret information) from the server 2004*b* via the network connected terminal 2003*b*, stores the received distribution-purpose encrypted device keys (secret information) into the secret information storage unit 2029*b*.

(C-1-2-7) Authenticity Confirmation Information Obtaining Unit 2025*b*

The authenticity confirmation information obtaining unit 2025*b* performs a process that corresponds to the CRL update process shown in FIG. 9 in the above-described embodiment, especially the process of updating the authentic PCR value in the CRL database.

The authenticity confirmation information obtaining unit 2025*b*, upon receiving the authenticity confirmation information (the authentic PCR value) from the server 2004*b* via the network connected terminal 2003*b*, outputs the received authenticity confirmation information to the confirmation information individualizing unit 2040*b*.

(C-1-2-8) Update Program Obtaining Unit 2026*b*

The update program obtaining unit 2026*b* is the same as the update program obtaining unit 2026 described in Modification 1 above, thus description thereof is omitted here.

(C-1-2-9) Authenticity Confirmation Unit 2027*b*

The authenticity confirmation unit 2027*b* performs a process that corresponds to step S1003 shown in FIG. 10 in the above-described embodiment.

The authenticity confirmation unit 2027*b*, upon receiving the ID-attached PCR value for the content key decryption program and the terminal ID 2015*b* from the terminal 2001*b*, obtains, from the authenticity confirmation information storage unit 2022*b*, authenticity confirmation information (authentic-ID-attached PCR value) for the content key decryption program and the terminal ID 2015*b* associated with the terminal 2001*b*.

The authenticity confirmation unit 2027*b* judges whether or not the received PCR value matches the authenticity confirmation information.

When it judges that the received PCR value matches the authenticity confirmation information, the authenticity confirmation unit 2027*b* closes the switch 2030*b* so that the terminal is connected with the secret information storage unit 2029*b*, and outputs the OK information indicating that they match, to the device key individualizing unit 2041*b*.

When it judges that they do not match, the authenticity confirmation unit 2027*b* outputs the NG information indicating that they do not match, to the program output unit 2028*b*.

In the present modification, the authenticity confirmation unit 2027*b* corresponds to only step S1003. However, the present invention is not limited to this structure.

The authenticity confirmation unit 2027*b* may correspond to steps S1002 and S1003, as is the case with Modification 1.

(C-1-2-10) Program Output Unit 2028*b*

The program output unit 2028*b* is the same as the program output unit 2028 described in Modification 1 above, thus description thereof is omitted here.

(C-1-2-11) Confirmation Information Individualizing Unit 2040*b*

The confirmation information individualizing unit 2040*b*, upon receiving the authenticity confirmation information (authentic PCR value) from the authenticity confirmation information obtaining unit 2025*b*, obtains the terminal ID 2015*b* from the terminal ID storage unit 2021*b*. Note that the authentic PCR value received here from the server 2004*b* has not been associated with the terminal ID.

The confirmation information individualizing unit 2040*b* generates the individualized confirmation information (the authentic-ID-attached PCR value) from the authenticity confirmation information and the terminal ID 2015*b*, by performing the same process as the PCR extend process, wherein the generated individualized confirmation information, the terminal ID is reflected on the PCR value of the content key decryption program.

The confirmation information individualizing unit 2040*b* stores the generated individualized confirmation information into the authenticity confirmation information storage unit 2022*b*.

(C-1-2-12) Device Key Individualizing Unit 2041*b*

The device key individualizing unit 2041*b*, upon receiving the OK information (indicating that the authenticity has been confirmed) from the authenticity confirmation unit 2027*b*, obtains the terminal ID 2015*b* from the terminal ID storage unit 2021*b*, obtains a distribution-purpose encrypted device key (secret information) associated with value "0" from the secret information storage unit 2029*b*, and obtains the card ID from the card ID storage unit 2042*b*.

The device key individualizing unit 2041*b* generates a device key by decrypting the obtained one piece of distribution-purpose encrypted device key using the card ID.

The device key individualizing unit 2041*b* generates the individually encrypted device key by encrypting a device key by the secret encryption method, using, as the secret key, the value generated by the conversion method shown in FIG. 17 in the above-described embodiment, and also using the terminal common key (stored in the terminal common key storage unit 2043*b*) preliminarily stored in the card 2002*b* and using the terminal ID 2015*b* (stored in the terminal common key storage unit 2043*b*).

The device key individualizing unit 2041*b* outputs the generated individually encrypted device key to the terminal 2001*b*, and requests the operating system of the terminal 2001*b* to boot the secret information decryption program.

(C-1-3) Network Connected Terminal 2003*b*

The network connected terminal 2003*b* obtains the terminal ID of the terminal 2001*b* from the terminal ID storage unit 2021*b* of the card 2002*b* being attached to the network connected terminal 2003*b* itself, obtains the card ID from the card ID storage unit 2042*b* of the card 2002*b*, then outputs the obtained terminal ID and card ID to the server 2004*b* via the network. In this operation, the card ID is output in the encrypted state such that the confidentiality of the card is maintained on a communication path between the card 2002*b* and the server 2004*b*. More specifically, the card ID to be output is encrypted using a key that is common with the server 2004*b*, by, for example, a known method for constructing a same communication path.

After this, the network connected terminal 2003*b* receives the update program associated with the output terminal ID, the authenticity confirmation information (PCR value), and a plurality of pieces of secret information (distribution-purpose encrypted device keys), from the server 2004*v* via the network, and stores these received information into the card 2002*b*.

(C-1-4) Server 2004*b*

The server 2004*b*, as in the above-described embodiment, includes a CRL database, and manages, for each terminal, update programs and authentic PCR values (authenticity confirmation information) to be distributed thereto. It is presumed here that each type of terminal is associated with a different update program and a different piece of authenticity confirmation information.

Also, the server 2004*b* preliminarily generates a plurality of device keys (secret information), and stores and manages the generated secret information. The server 2004*b* manages the plurality of pieces of secret information such that, when a piece of secret information is distributed to a terminal, the same piece of secret information is no more distributed to the terminal. Note that the plurality of pieces of secret information managed by the server 2004*b* differ from each other. Furthermore, after having distributed all the pieces of secret information having been managed, the server 2004*b* newly generates a plurality of pieces of secret information that are different from the pieces of secret information having been managed so far. As described above, the newly generated pieces of secret information are different from each other.

The server 2004*b*, upon receiving the terminal ID and card ID from the network connected terminal 2003*b* via the network, identifies the machine type from the received terminal ID, and obtains an update program for updating a content key decryption program associated with the identified machine type, and obtains its PCR value.

The server 2004*b* obtains a predetermined number of (two or more) device keys among the plurality of device keys it manages.

The server 2004*b* generates a predetermined number of distribution-purpose encrypted device keys (secret information) by encrypting the obtained predetermined number of device keys by the secret key encryption method by using, as the secret key, the card ID that has been transmitted on a safe communication path from the card 2002*b*.

The server 2004*b* outputs a set of terminal individual data (the generated plurality of pieces of secret information, the obtained update program and the authenticity confirmation information (authentic PCR value)) to the network connected terminal 2003*b* via the network.

(C-1-5) Operation of Device Key Distribution System 2000*b*

The operation of the device key distribution system 2000*b* will be described with reference to the flow diagram shown in FIG. 22.

The card 2002*b*, after it is attached to the terminal 2001*b*, obtains the terminal ID of the terminal 2001*b* and stores the obtained terminal ID into the terminal ID storage unit 2021*b* (step S2100).

The card 2002*b*, in the CRL data update process after it is attached to the network connected terminal 2003*b*, obtains a card ID from the card ID storage unit 2042*b*, and outputs, to the server 2004*b* via the network connected terminal 2003*b*, the obtained card ID and the terminal ID 2015*b* of the terminal 2001*b* that is stored in the terminal ID storage unit 2021*b* (step S2105).

The server 2004*b*, upon receiving the card ID of the card 2002*b* and the terminal ID of the terminal 2001*b* from the card 2002*b* via the network connected terminal 2003*b*, identifies a machine type from the received terminal ID, and obtains a piece of type common informati (update program, and the authenticity confirmation information (PCR value)) that is associated with the identified machine type (step S2110).

The server 2004*b* obtains a predetermined number of (two or more) device keys among the plurality of device keys it manages, and generates a predetermined number of pieces of secret information (distribution-purpose encrypted device keys) by encrypting the obtained predetermined number of device keys by the secret key encryption method by using the received card ID as the secret key (step S2115).

The server 2004*b* outputs a set of terminal individual data (the generated plurality of pieces of secret information (distribution-purpose encrypted device keys) and the obtained update program and the authenticity confirmation information) to the network connected terminal 2003*b* via the network (step S2120).

The card 2002*b*, upon receiving the set of terminal individual data from the server 2004*b* via the network connected terminal 2003*b*, stores each piece of information (data) (step S2125). More specifically, the secret information obtaining unit 2024*b* of the card 2002*b* receives the plurality of pieces of secret information (distribution-purpose encrypted device keys), and stores the received plurality of pieces of secret information into the secret information storage unit 2029*b*. Upon receiving the authenticity confirmation information, the authenticity confirmation information obtaining unit 2025*b* stores the received authenticity confirmation information into the authenticity confirmation information storage unit 2022*b*. Upon receiving the update program, the update program obtaining unit 2026*b* stores the received update program into the update program storage unit 2023*b*.

The card 2002*b* outputs the update program to the terminal 2001*b* (step S2130).

The terminal 2001*b* installs the update program (step S2135)

The authenticity confirmation unit 2027*b* of the card 2002*b*, upon receiving a secret information (device key) output request from the terminal 2001*b*, judges the authenticity of the terminal 2001*b* (step S2140). The secret information output request corresponds to step S0402 shown in FIG. 4 in the above-described embodiment, and includes an ID-attached PCR value of a content key decryption program. In the present example, the authenticity confirmation unit 2027*b* of the card 2002*b* compares the authenticity confirmation information for the content key decryption program, with the ID-attached PCR value included in the received secret information output request.

When it judges that the terminal is not authentic (NG in step S2140), the card 2002*b* outputs the update program to the terminal 2001*b* (step S2145). More specifically, the authenticity confirmation unit 2027*b* outputs the NG information to the program output unit 2028*b*. The program output unit 2028*b*, upon receiving the NG information from the authenticity confirmation unit 2027*b*, obtains an update program for updating a content key decryption program for the terminal 2001*b*, from the update program storage unit 2023*b*, and outputs the obtained update program to the program updating unit 2013*b* of the terminal 2001*b*.

When it judges that the terminal is authentic (OK in step S2140), the card 2002*b* generates an individually encrypted device key, and outputs the generated individually encrypted device key to the terminal 2001*b* (step S2150). More specifically, the authenticity confirmation unit 2027*b* outputs the OK information to the device key individualizing unit 2041*b*. Upon receiving the OK information from the authenticity confirmation unit 2027*b*, the device key individualizing unit 2041*b* obtains the terminal ID 2015*b* from the terminal ID storage unit 2021*b*, obtains a distribution-purpose encrypted device key (secret information) associated with value "0" from the secret information storage unit 2029*b*, and obtains the card ID from the card ID storage unit 2042*b*. The device key individualizing unit 2041*b* generates a device key by decrypting the obtained one piece of distribution-purpose encrypted device key using the card ID. The device key individualizing unit 2041b generates the individually encrypted device key by encrypting a device key by the secret encryption method, using, as the secret key, the value generated by the conversion method shown in FIG. 17 in the above-described embodiment, and also using the terminal common key preliminarily stored in the card 2002b and using the terminal ID 2015b. The device key individualizing unit 2041b outputs the generated individually encrypted device key to the terminal 2001b.

The program updating unit 2013b of the terminal 2001b, upon receiving the update program from the card 2002b, installs the received update program (step S2155). More specifically, upon receiving the update program for updating the content key decryption program from the card 2002b, the program updating unit 2013b updates the content key decryption program using the received update program. The program updating unit 2013b, after the update of the content key decryption program, requests the operating system of the terminal 2001b to reset the system, in the same manner as in step S0408.

Upon receiving the individually encrypted device key from the card 2002b, the secret information decrypting unit 2014b of the terminal 2001b installs the individually encrypted device key (step S2160). More specifically, the secret information decrypting unit 2014b obtains, from the card 2002b, the individually encrypted device key associated with the terminal. The secret information decrypting unit 2014b also obtains the terminal ID from the ID storage unit 2010b. The secret information decrypting unit 2014b generates a device key by decrypting the individually encrypted device key using the obtained terminal ID and the terminal common key. The secret information decrypting unit 2014b updates the device key currently stored by replacing it with the generated device key.

After this, for example, the terminal 2001b performs step S0403 and subsequent steps shown in FIG. 4, and the card 2002b runs the right confirmation/key generation program shown in FIG. 10.

The following shows an example of the timings at which each step is performed.

Step S2010 is performed after the card 2002b is attached to the terminal 2001b.

Steps S2015 through S2035 are performed after the card 2002b is attached to the network connected terminal 2003b.

Steps S2040 through S2045 are performed when a service person updates a program for the terminal 2001b.

Step S2050 and subsequent steps are performed after the user of the terminal 2001b requests playback of a content.

(C-1-6) Other Modifications

Up to now, the present invention has been described through Modification 3. However, the present invention is not limited to Modification 3, but includes, for example, the following modifications.

(1) In the above-described Modification 3, the (predetermined) number of device keys obtained by the server 2004b is two or more. However, the present invention is not limited to this.

The server 2004b may obtain one or more device keys.

(2) In the above-described Modification 3, the number of device keys obtained by the server 2004b is a predetermined number. However, the present invention is not limited to this.

The number of device keys to be obtained by the server 2004b may be specified by the user when information is transmitted with the network connected terminal.

In this case, the network connected terminal 2003b transmits information indicating the number of device keys to be obtained specified by the user, to the server 2004b. Upon receiving the information from the network connected terminal 2003b, the server 2004b obtains as many device keys as the number indicated by the received information.

(3) In the above-described Modification 3, the secret information storage unit 2029b stores a plurality of distribution-purpose encrypted device keys. However, the present invention is not limited to this structure.

The secret information storage unit 2029b may stores a plurality of decrypted device keys.

The operation of the card 2002b in this case will be described in the following.

Upon receiving a plurality of distribution-purpose encrypted device keys from the server 2004b, the secret information obtaining unit 2024b obtains the card ID from the card ID storage unit 2042b.

The server 2004b generates a device key by decrypting a received distribution-purpose encrypted device key using the obtained card ID. The server 2004b repeats this operation as many times as the number of received distribution-purpose encrypted device keys, so that it generates as many device keys as the number of received distribution-purpose encrypted device keys.

The secret information obtaining unit 2024b stores the generated plurality of device keys into the secret information storage unit 2029b.

(4) In the above-described Modification 3, the terminal 2001b is a terminal not connected to a network. However, the present invention is not limited to this structure.

The terminal 2001b may be a terminal that is connectable to a network. That is to say, the terminal 2001b may also have the function of the network connected terminal 2003b recited in the above-described Modification 3.

Figure 22:
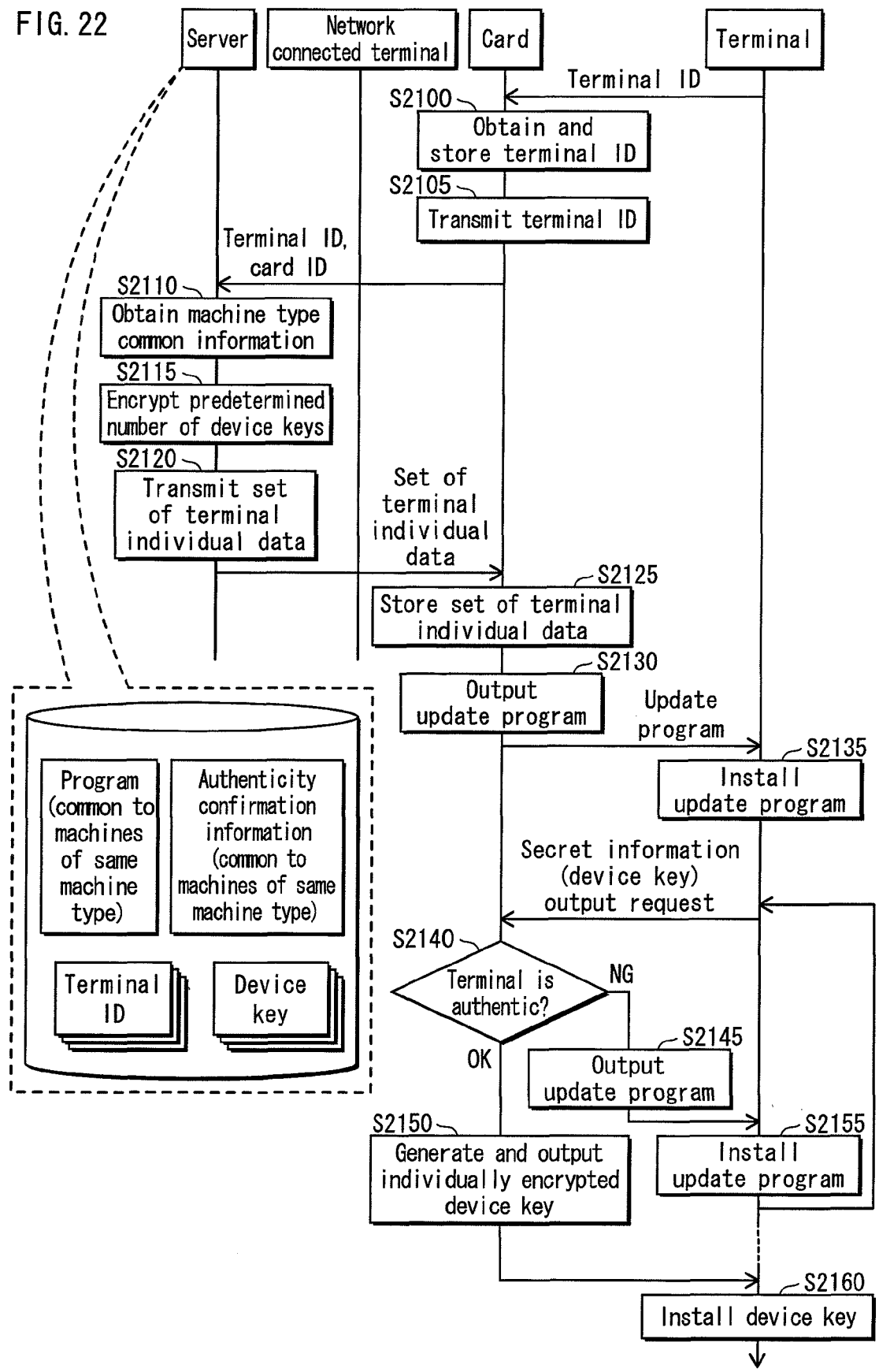
FIG. 22 is a flowchart showing the operation of the device key distribution system 2000b.

(5) In the above-described Modification 3, the device key distribution system 2000b updates the content key decryption program for the terminal 2001b with a service person in steps S2130 through S2135 shown in FIG. 22. However, the present invention is not limited to this structure.

The device key distribution system 2000b may not perform steps S2130 through S2135 in the operation thereof.

(6) In the above-described Modification 3, the secret information providing unit 2020b associates each of the plurality of pieces of secret information stored in the secret information storage unit 2029b, with a flag so that, when a piece of secret information is distributed to a terminal, the same piece of secret information is no more distributed to the terminal. However, the present invention is not limited to this structure.

The secret information providing unit 2020b may generate a list composed of one or more pieces of secret information having been output so that it can manage the plurality of pieces of secret information such that, when a piece of secret information is distributed to a terminal, the same piece of secret information is no more distributed to the terminal.

Alternatively, the secret information providing unit 2020b may delete each piece of secret information that has been output.

That is to say, the secret information providing unit 2020b may upload information indicating the state of secret information having been installed to terminals so that it can manage either secret information having been output or secret information not having been output, or both thereof.

(7) In the above-described Modification 3, the device key individualizing unit 2041b uses a terminal ID when it generates an individually encrypted device key. However, the present invention is not limited to this structure.

The device key individualizing unit 2041b may generate an individually encrypted device key by encrypting a device key using, as the secret key, individualized confirmation information (namely, an ID-attached PCR value) used by the authenticity confirmation unit 2027b.

(8) In the above-described Modification 3, the server 2004b generates distribution-purpose encrypted device keys using a card ID. However, the present invention is not limited to this structure.

As is the case with Modifications 1 and 2, the server 2004b may generate distribution-purpose encrypted device keys using a converted value (an encryption-purpose converted value) generated from the terminal ID and terminal common key, or may generate distribution-purpose encrypted device keys using only a terminal ID.

In this case, the device key individualizing unit 2041b of the card 2002b may decrypt a distribution-purpose encrypted device key that has been encrypted using the encryption-purpose converted value or the terminal ID, and then generate an individually encrypted device key by encrypting the decryption result using the terminal ID. Alternatively, the device key individualizing unit 2041b may generate an individually encrypted device key by encrypting the distribution-purpose encrypted device key itself using the terminal ID, namely, by performing a double encryption.

When a double encryption has been made, the terminal 2001b first generates a distribution-purpose encrypted device key by decrypting the individually encrypted device key using the terminal ID. The terminal 2001b then generates a decryption-purpose converted value from the terminal ID and terminal common key, and generates a device key by decrypting the generated distribution-purpose encrypted device key using the generated decryption-purpose converted value.

Also, a distribution-purpose encrypted device key may be generated using a secret key that is shared preliminarily by the card 2002b and the server 2004b.

(9) In the above-described Modification 3, the card 2002b preliminarily stores a terminal common key. However, the present invention is not limited to this structure.

The card 2002b may receive a terminal common key from the server 2004b.

In this case, after the server 2004b receives a terminal ID and a card ID from the card 2002b, the server 2004b obtains a terminal common key associated with a machine type identified by the received terminal ID, encrypts the obtained terminal common key using the received card ID, and transmits the encrypted terminal common key to the card 2002b.

Upon receiving the encrypted terminal common key, the card 2002b stores the received encrypted terminal common key into the terminal common key storage unit 2043b.

The card 2002b decrypts the encrypted terminal common key when an individually encrypted device key is generated.

(10) The above-described embodiment and modifications may be combined.

(C-1-7) Summary

According to the above-described Modification 3, in addition to the effects produced by the above-described Modification 2, a plurality of device keys are encrypted using a card ID. With this structure, it is possible to individualize a plurality of device keys to be stored for each card. This enables a different device key to be distributed to each of a plurality of terminals, by using one card.

Also, since one card stores a plurality of device keys (in this example, distribution-purpose encrypted device keys), the number of accesses to the server can be reduced.

(D-1) Modification 4

In Modification 3 described above, the card is used to individualize the device keys. However, the present invention is not limited to this. The device keys may be individualized by terminals that receive the transmitted device keys.

Note that, in the present modification, the secret encryption method is used as a method for encrypting information. Also, the device key is a key that is used to encrypt and decrypt a key (herein after, referred to as a content key) that is used to encrypt and decrypt a content.

In the following, the system structure and the structure of each device in the present modification will be described.

Figure 23:
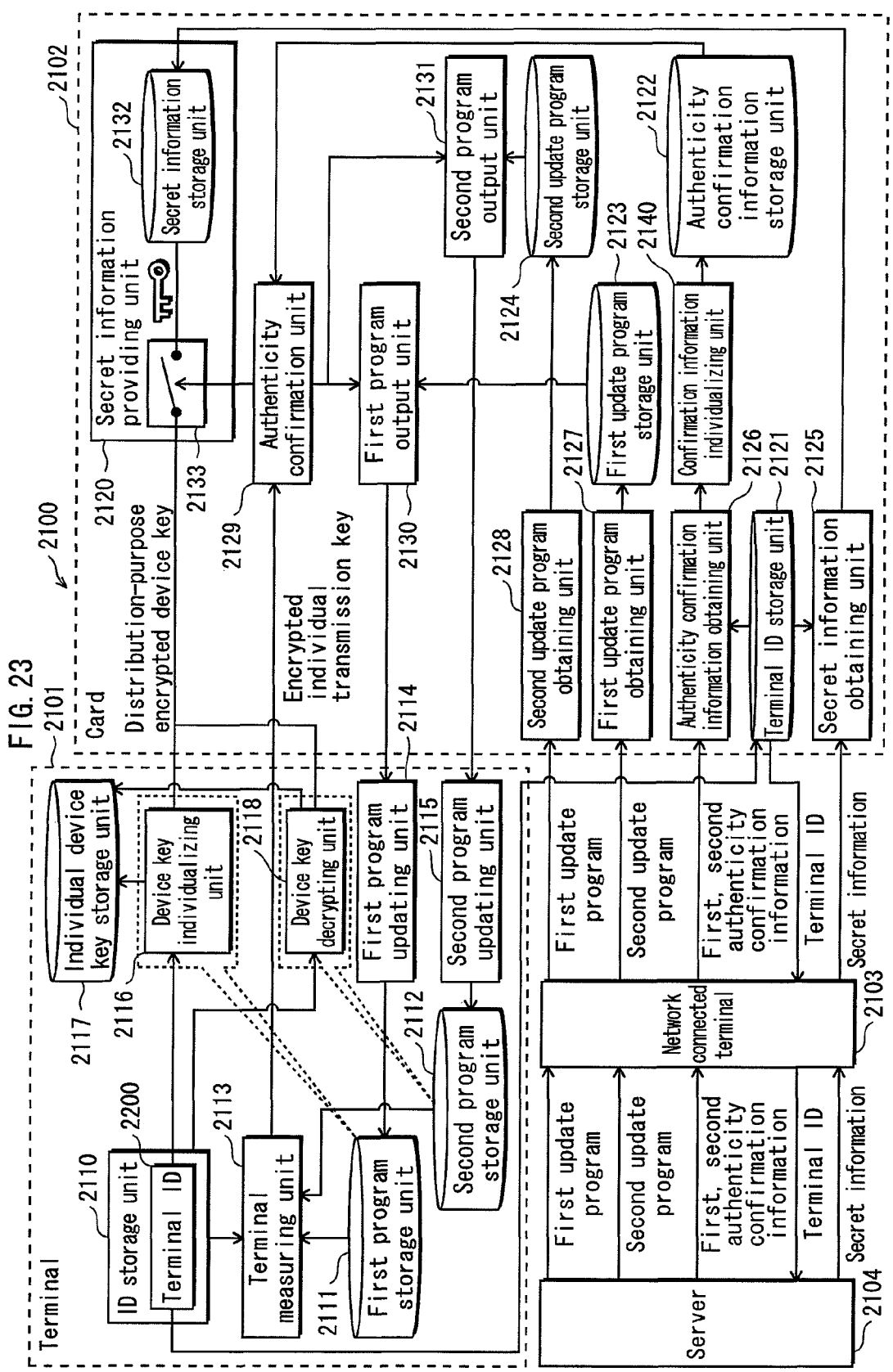
FIG. 23 is a block diagram showing the structure of the device key distribution system 2100 in Modification 4.

A device key distribution system 2100 is composed of, as shown in FIG. 23, a terminal (requesting device) 2101, a card (verifying device) 2102, a network connected terminal 2103 and a server 2104.

The terminal 2101 is a terminal not connected with the network, and corresponds to the terminal N 0105, . . . the terminal Z 0106. The terminal 2101 has a device key and a program (herein after referred to as a content key decryption program) that is used to decrypt an encrypted content key. Also, when a device key is obtained (updated), the terminal 2101 receives, from the card 2102, an individually encrypted program used for encrypting a device key. The individually encrypted program will be described later.

The card 2102, after it is attached to a terminal, obtains a terminal ID for identifying the terminal, and stores the obtained terminal ID. It is presumed here that the card 2102 preliminarily stores a terminal ID for identifying the terminal 2101. That is to say, it is presumed that the card 2102 was once attached to the terminal 2101. The card 2102 outputs the preliminarily stored terminal ID to the network connected terminal 2103 in the CRL update process described in the embodiment above.

The network connected terminal 2103 transmits the terminal ID to the server 2104 via the network. The network connected terminal 2103 receives, from the server 2104, an update program (herein after referred to as first update program) for updating the individually encrypted program, an update program (herein after referred to as second update program) for updating the content key decryption program, first authenticity confirmation information for the individually encrypted program, second authenticity confirmation information for the content key decryption program, and a plurality of pieces of secret information, and outputs these received information to the card 2102.

Note that each piece of secret information is composed of a pair of a distribution-purpose encrypted device key and an encrypted individual transmission key. The distribution-purpose encrypted device key is generated by encrypting a device key using an individual transmission key that is individually assigned to the device key, where each device key is assigned with an individual transmission key individually. The encrypted individual transmission key is generated by encrypting the individual transmission key using a terminal common key. The encryption method used in the present example is the secret key encryption method, as mentioned earlier.

The server 2104, upon receiving the terminal ID from the network connected terminal 2103, transmits an update program associated with the terminal ID, authenticity confirmation information, and a plurality of pieces of secret information.

Here, how the authentic device key and the individual transmission key are encrypted will be described.

Figure 24:
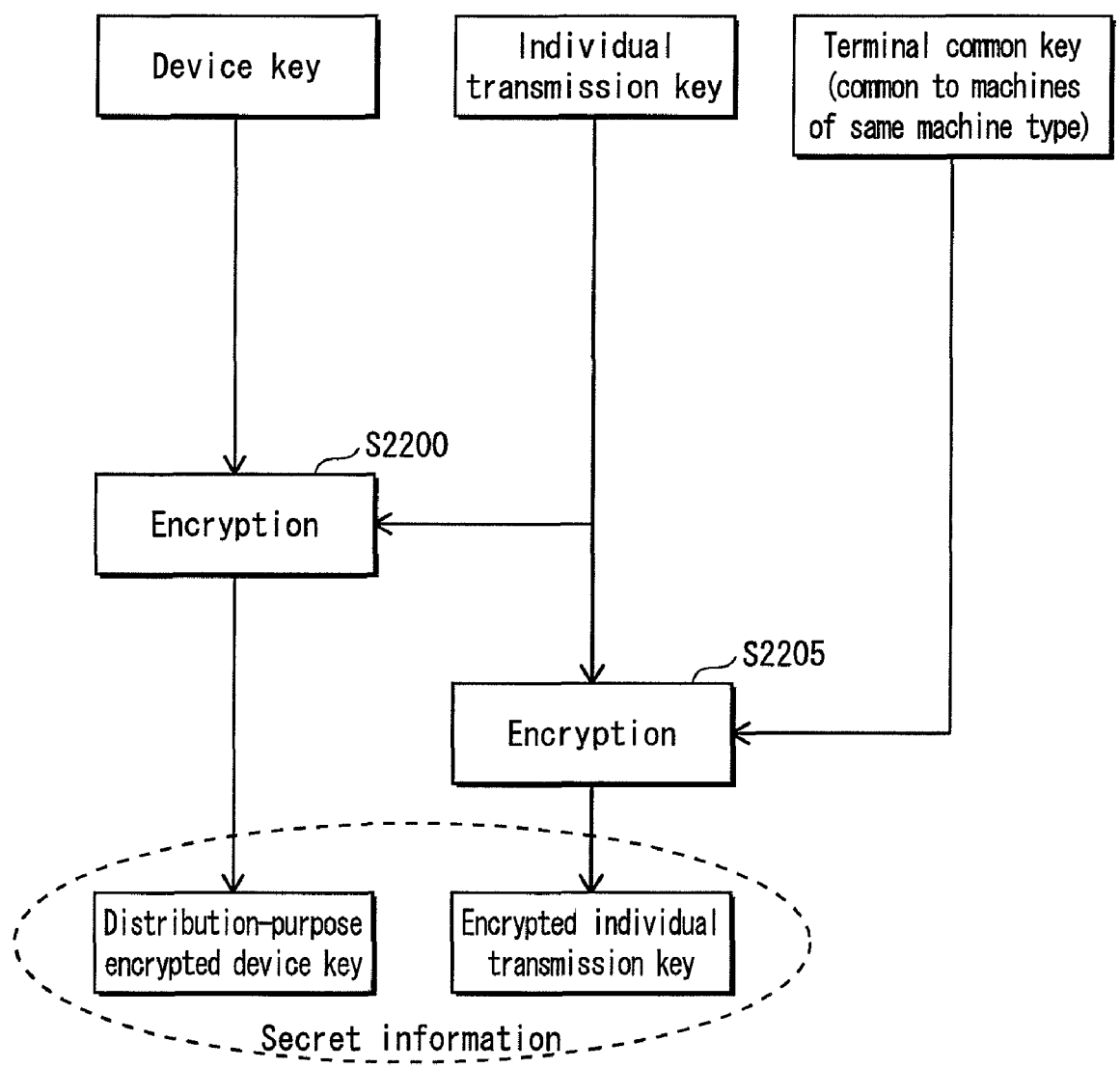
FIG. 24 shows a flow of generating the secret information.

The server 2104, as shown in FIG. 24, generates a distribution-purpose encrypted device key by encrypting a device key using an individual transmission key associated with the device key (step S2200).

The server 2104 generates the encrypted individual transmission key by encrypting the individual transmission key using a terminal common key (step S2205).

The server 2104 transmits, to the card 2102, a piece of secret information that is composed of a pair of the generated distribution-purpose encrypted device key and encrypted individual transmission key.

(D-1-1) Terminal 2101

The terminal 2101 is composed of, as shown in FIG. 23, an ID storage unit 2110, a first program storage unit 2111, a second program storage unit 2112, a terminal measuring unit 2113, a first program updating unit 2114, a second program updating unit 2115, a device key individualizing unit 2116, an individual device key storage unit 2117, and a device key decrypting unit 2118.

Part or all of the structural elements constituting the terminal 2101 is achieved in one system LSI (Large Scale Integration). The system LSI stores a key (herein after referred to as terminal common key) that is common to a plurality of terminals that are of the same type as the terminal 2101. The terminal common key has confidentiality and is protected by the tamper-resistant structure.

(D-1-1-1) ID Storage Unit 2110, First Program Storage Unit 2111, Second Program Storage Unit 2112

The ID storage unit 2110 preliminarily stores a terminal ID 2200 that is a terminal ID of the terminal 2101 itself.

The ID storage unit 2110 is tamper-resistant, and thus the terminal ID 2200 cannot be tampered.

The first program storage unit 2111 and the second program storage unit 2112 correspond to the program storage unit 0708 in the above-described embodiment.

The first program storage unit 2111 has an area for storing the individually encrypted program.

The first program storage unit 2111 stores the individually encrypted program when a device key is received. After this, the individually encrypted program is deleted from the first program storage unit 2111 when the second program updating unit 2115 starts to be operated.

The second program storage unit 2112 preliminarily stores the programs that are stored in the program storage unit 0708 in the above-described embodiment, and further stores preliminarily a program (herein after referred to as a device key decryption program) that is used to decrypt the authentic device key that has been individually encrypted, and further stores preliminarily the content key decryption program.

(D-1-1-2) Terminal Measuring Unit 2113

The terminal measuring unit 2113 corresponds to the secure module 0707 and part of the boot code 0703, the operating system 0709 and the playback control program 0711 for controlling the secure module 0707 in the above-described embodiment.

The terminal measuring unit 2113 measures (calculates) a PCR value (herein after referred to as first PCR value) of the individually encrypted program. The terminal measuring unit 2113 obtains the terminal ID 2200 stored in the ID storage unit 2110. The terminal measuring unit 2113 generates a PCR value (herein after referred to as first ID-attached PCR value) by applying the PCR extend command to the obtained terminal ID 2200 and to the calculated first PCR value, where the generated first ID-attached PCR value is an individually encrypted program's PCR value on which the terminal ID 2200 has been reflected. The terminal measuring unit 2113 outputs the generated first ID-attached PCR value to the card 2102.

The terminal measuring unit 2113 measures (calculates) a PCR value (herein after referred to as second PCR value) of the content key decryption program. The terminal measuring unit 2113 obtains the terminal ID 2200 stored in the ID storage unit 2110. The terminal measuring unit 2113 generates a PCR value (herein after referred to as second ID-attached PCR value) by applying the PCR extend command to the obtained terminal ID 2200 and to the calculated second PCR value, where the generated second ID-attached PCR value is a content key decryption program's PCR value on which the terminal ID 2200 has been reflected. The terminal measuring unit 2113 outputs the generated second ID-attached PCR value to the card 2102.

The timings of measuring are when the individually encrypted program is loaded, and when the content key decryption program is loaded, as is the case with the above-described embodiment, and the timing of each output is when a content is played back.

Description of the measuring method is omitted here since it is the same as that described in the embodiment above.

(D-1-1-3) First Program Updating Unit 2114, Second Program Updating Unit 2115

The first program updating unit 2114, upon receiving an individually encrypted program (herein after, also referred to as first update program) from the card 2102, stores the received first update program into the first program storage unit 2111.

After storing the individually encrypted program, the first program updating unit 2114 requests the operating system of the terminal 2101 to reset the system, as in step S0408.

The second program updating unit 2115, upon receiving an update program (herein after referred to as second update program) for updating a content key decryption program from the card 2102, deletes the individually encrypted program from the first program storage unit 2111.

The second program updating unit 2115 updates the content key decryption program using the received second update program, and then requests the operating system of the terminal 2101 to reset the system, as in step S0408.

(D-1-1-4) Device Key Individualizing Unit 2116

The device key individualizing unit 2116 is achieved as the individually encrypted program stored in the first program storage unit 2111 is booted and run.

The device key individualizing unit 2116, upon receiving a distribution-purpose encrypted device key from the card 2102, obtains the terminal ID 2200 from the ID storage unit 2110.

The device key individualizing unit 2116 generates an individually encrypted device key by encrypting the received distribution-purpose encrypted device key using the obtained terminal ID.

The device key individualizing unit 2116 stores the generated individually encrypted device key into the individual device key storage unit 2117.

(D-1-1-5) Individual Device Key Storage Unit 2117

The individual device key storage unit 2117 has an area for storing the individually encrypted device key generated by the device key individualizing unit 2116.

(D-1-1-6) Device Key Decrypting Unit 2118

The device key decrypting unit 2118 is achieved as the device key decryption program stored in the second program storage unit 2112 is booted and run.

The device key decrypting unit 2118 receives, from the card 2102, an encrypted individual transmission key that is associated with the individually encrypted device key stored in the individual device key storage unit 2117.

The device key individualizing unit 2116 stores the received encrypted individual transmission key into a predetermined storage area (for example, the individual device key storage unit 2117).

The device key decrypting unit 2118 obtains an individually encrypted device key that is associated with the received encrypted individual transmission key, from the individual device key storage unit 2117.

The device key decrypting unit 2118 obtains the terminal ID 2200 from the ID storage unit 2110, and generates a distribution-purpose encrypted device key by decrypting the individually encrypted device key obtained from the individual device key storage unit 2117, using the obtained terminal ID 2200.

The device key decrypting unit 2118 obtains the terminal common key of the terminal in concern, and generates an individual transmission key by decrypting the received encrypted individual transmission key using the obtained terminal common key.

The device key individualizing unit 2116 generates a device key by decrypting the distribution-purpose encrypted device key using the generated individual transmission key.

(D-1-2) Card 2102

The card 2102 is composed of, as shown in FIG. 23, a secret information providing unit 2120, a terminal ID storage unit 2121, an authenticity confirmation information storage unit 2122, a first update program storage unit 2123, a second update program storage unit 2124, a secret information obtaining unit 2125, an authenticity confirmation information obtaining unit 2126, a first update program obtaining unit 2127, a second update program obtaining unit 2128, an authenticity confirmation unit 2129, a first program output unit 2130, a second program output unit 2131, and a confirmation information individualizing unit 2140.

(D-1-2-1) Secret Information Providing Unit 2120

The secret information providing unit 2120, as shown in FIG. 23, includes a secret information storage unit 2132 and a switch 2133, as shown in FIG. 23.

The secret information storage unit 2132 corresponds to the content storage unit 0807 described in the embodiment above. The secret information storage unit 2132 stores a plurality of pieces of secret information received from the server 2104 via the network connected terminal 2103. More specifically, the secret information storage unit 2132 includes a secret information management table T2100 shown in FIG. 25.

The secret information management table T2100 has an area for storing one or more pairs of a distribution-purpose encrypted device key and an encrypted individual transmission key.

Description of the distribution-purpose encrypted device key and the encrypted individual transmission key is omitted here since they have already been described earlier.

Here, a sign E(x,y) indicates a result of encrypting data y using an encryption key x. DK1, DK2, DK3, . . . indicate device keys. Deli-Key1, Deli-Key2, Deli-Key3, . . . indicate individual transmission keys that are associated with the device keys DK1, DK2, DK3, . . . , respectively. The sign MK indicates a terminal common key.

The switch 2133 corresponds to the process of outputting a key for a content performed in step S1005 shown in FIG. 10 in the embodiment described above, and operates under control of the authenticity confirmation unit 2129. When it is judged that the terminal is authentic, the switch 2133 connects the terminal and the secret information storage unit 2132 so that the terminal can obtain a distribution-purpose encrypted device key and an encrypted individual transmission key associated with it. When it is judged that the terminal is not authentic, the switch 2133 does not connect the terminal and the secret information storage unit 2132. Here, to connect specifically means to make it possible that the terminal 2101 can obtain information from the secret information storage unit 2132.

Upon receiving, from the authenticity confirmation unit 2129, first OK information indicating that the terminal 2101 is authentic as a result of authenticity confirmation using the first PCR value, the secret information providing unit 2120 controls the switch to connect the terminal 2101 and the secret information storage unit 2132, and requests the operating system of the terminal 2101 to boot the individually encrypted program.

Upon receiving, from the authenticity confirmation unit 2129, second OK information indicating that the terminal 2101 is authentic as a result of authenticity confirmation using the second PCR value, the secret information providing unit 2120 controls the switch to connect the terminal 2101 and the secret information storage unit 2132, and requests the operating system of the terminal 2101 to boot the device key decryption program.

Upon receiving, from the authenticity confirmation unit 2129, NG information indicating that the terminal 2101 is not authentic, the secret information providing unit 2120 controls the switch not to connect the terminal 2101 and the secret information storage unit 2132.

The secret information providing unit 2120 performs management such that, when a distribution-purpose encrypted device key is distributed to a terminal, the same distribution-purpose encrypted device key is no more distributed to the terminal. For such management, for example, each of the plurality of pieces of secret information is associated with a flag. More specifically, the secret information providing unit 2120 associates a value "0" with each distribution-purpose encrypted device key that has not been output; and associates a value "1" with each distribution-purpose encrypted device key that has been output.

The secret information providing unit 2120 achieves the management by associating the distribution-purpose encrypted device keys with terminal IDs of terminals to which the distribution-purpose encrypted device keys are to be output.

With this structure, the device key decrypting unit 2118 described above can generate a device key by obtaining an encrypted individual transmission key that is associated with a distribution-purpose encrypted device key that has been output and associated with the terminal 2101.

(D-1-2-2) Terminal ID Storage Unit 2121

The terminal ID storage unit 2121 is the same as the terminal ID storage unit 2021 described in the above-described Modification 1, and thus description thereof is omitted here.

(D-1-2-3) Authenticity Confirmation Information Storage Unit 2122

The authenticity confirmation information storage unit 2122 corresponds to the authentic PCR value storage area in the CRL database 0805 in the above-described embodiment.

The authenticity confirmation information storage unit 2122 stores the first ID-attached PCR value (herein after also referred to as first individualized confirmation information) that was generated from the terminal ID 2200 and from the first authenticity confirmation information received from the server 2104 via the network connected terminal 2103, in association with the terminal ID stored in the terminal ID storage unit 2121.

The authenticity confirmation information storage unit 2122 stores the second ID-attached PCR value (herein after also referred to as second individualized confirmation information) that was generated from the terminal ID 2200 and from the second authenticity confirmation information received from the server 2104 via the network connected terminal 2103, in association with the terminal ID stored in the terminal ID storage unit 2121.

It is presumed here that the authenticity confirmation information storage unit 2122 stores the first and second individualized confirmation information respectively in association with the terminal ID 2200 of the terminal 2101.

(D-1-2-4) First Update Program Storage Unit 2123, Second Update Program Storage Unit 2124

The first update program storage unit 2123 and the second update program storage unit 2124 correspond to the update program storage area in the CRL database 0805 in the above-described embodiment.

The first update program storage unit 2123 stores the first update program (individually encrypted program) that was received from the server 2104 via the network connected terminal 2103, in association with the terminal ID stored in the terminal ID storage unit 2121. It is presumed here that the first update program storage unit 2123 stores the first update program in association with the terminal ID 2200 of the terminal 2101.

The second update program storage unit 2124 stores the second update program that was received from the server 2104 via the network connected terminal 2103, in association with the terminal ID stored in the terminal ID storage unit 2121. It is presumed here that the second update program storage unit 2124 stores the second update program in association with the terminal ID 2200 of the terminal 2101.

It should be apparent from the above description that the aforesaid CRL database 0805 is composed of the terminal ID storage unit 2121, the authenticity confirmation information storage unit 2122, the first update program storage unit 2123, and the second update program storage unit 2124 described in the present modification.

(D-1-2-5) Secret Information Obtaining Unit 2125

The secret information obtaining unit 2125 performs a process that corresponds to the right purchase process shown in FIG. 9 in the above-described embodiment.

The secret information obtaining unit 2125, upon receiving a plurality of pieces of secret information from the server 2004 via the network connected terminal 2003, stores the received pieces of secret information into the secret information management table T2100 of the secret information storage unit 2132.

The timing at which the secret information obtaining unit 2125 receives and stores the individually encrypted secret information is, for example, when a content is purchased.

(D-1-2-6) Authenticity Confirmation Information Obtaining Unit 2126

The authenticity confirmation information obtaining unit 2126 performs a process that corresponds to the CRL update process shown in FIG. 9 in the above-described embodiment, especially the process of updating the authentic PCR value in the CRL database.

The authenticity confirmation information obtaining unit 2126, upon receiving (i) the first authenticity confirmation information for the individually encrypted program and (ii) the second authenticity confirmation information for the content key decryption program, from the server 2104 via the network connected terminal 2103, outputs the received first and second authenticity confirmation information to the confirmation information individualizing unit 2140.

(D-1-2-7) First Update Program Obtaining Unit 2127, Second Update Program Obtaining Unit 2128

The first update program obtaining unit 2127 and the second update program obtaining unit 2128 perform processes that correspond to the CRL update process shown in FIG. 9 in the above-described embodiment, especially the process of updating the update program in the CRL database.

The first update program obtaining unit 2127, upon receiving the first update program (individually encrypted program) from the server 2104 via the network connected terminal 2103, stores the received first update program into the first update program storage unit 2123.

The second update program obtaining unit 2128, upon receiving the second update program from the server 2104 via the network connected terminal 2103, stores the received second update program into the second update program storage unit 2124.

(D-1-2-8) Authenticity Confirmation Unit 2129

The authenticity confirmation unit 2129 performs a process that corresponds to step S1003 shown in FIG. 10 in the above-described embodiment.

The authenticity confirmation unit 2129, upon receiving the first ID-attached PCR value from the terminal 2101, obtains, from the authenticity confirmation information storage unit 2122, first authenticity confirmation information associated with the terminal 2101.

The authenticity confirmation unit 2129 judges whether or not the received first ID-attached PCR value matches the first individualized confirmation information. When it judges that they match, the authenticity confirmation unit 2129 outputs the first OK information to the secret information providing unit 2120. When it judges that they do not match, the authenticity confirmation unit 2129 outputs the NG information to the secret information providing unit 2120 and the first program output unit 2130.

The authenticity confirmation unit 2129, upon receiving the second ID-attached PCR value from the terminal 2101, judges whether or not the first update program (individually encrypted program) has been deleted from the first program storage unit 2111 of the terminal 2101. Note that the second individualized confirmation information may be used for this judgment. Alternatively, the second ID-attached PCR value received from the terminal 2101 may be compared with the second individualized confirmation information, and it may be judged that the individually encrypted program has been deleted when they match. Here, the reason why the judgment on whether the individually encrypted program has been deleted can be made is that the target program, which is used to generate the second individualized confirmation information, does not include an individually encrypted program.

When it judges that the individually encrypted program has not been deleted, the authenticity confirmation unit 2129 requests the operating system of the terminal 2101 to delete the first update program (individually encrypted program), and then later judges again whether or not the first update program (individually encrypted program) has been deleted from the first program storage unit 2111 of the terminal 2101.

When it judges that the individually encrypted program has been deleted, the authenticity confirmation unit 2129 obtains, from the authenticity confirmation information storage unit 2122, second individualized confirmation information that is associated with the terminal 2101. The authenticity confirmation unit 2129 then judges whether or not the received second ID-attached PCR valued matches the second individualized confirmation information. When it judges that they match, the authenticity confirmation unit 2129 outputs the second OK information to the secret information providing unit 2120. When it judges that they do not match, the authenticity confirmation unit 2129 outputs the NG information to the secret information providing unit 2120 and the second program output unit 2131.

Note that, as is the case with Modification 1, the authenticity confirmation unit 2129 may perform a process that corresponds to steps S1002 and S1003.

(D-1-2-9) First Program Output Unit 2130, Second Program Output Unit 2131

The first program output unit 2130, upon receiving the NG information from the authenticity confirmation unit 2129, obtains the first update program (individually encrypted program) from the first update program storage unit 2123. The first program output unit 2130 outputs the obtained first update program to the first program updating unit 2114 of the terminal 2101.

The second program output unit 2131, upon receiving the NG information from the authenticity confirmation unit 2129, obtains the second update program for the terminal 2101 from the second update program storage unit 2124. The second program output unit 2131 outputs the obtained second update program to the second program updating unit 2115 of the terminal 2101.

(D-1-2-10) Confirmation Information Individualizing Unit 2140

The confirmation information individualizing unit 2140, upon receiving the first and second authenticity confirmation information from the authenticity confirmation information obtaining unit 2126, obtains the terminal ID 2200 from the terminal ID storage unit 2121.

The confirmation information individualizing unit 2140 generates first individualized confirmation information, which is a PCR value of an individually encrypted program attached with a terminal ID, by performing a process that is equivalent with the PCR value extend command, using the first authenticity confirmation information and the terminal ID 2200. The confirmation information individualizing unit 2140 stores the generated first individualized confirmation information into the authenticity confirmation information storage unit 2122.

The confirmation information individualizing unit 2140 generates second individualized confirmation information, which is a content key decryption program PCR value attached with a terminal ID, by performing a process that is equivalent with the PCR value extend command, using the second authenticity confirmation information and the terminal ID 2200. The confirmation information individualizing unit 2140 stores the generated second individualized confirmation information into the authenticity confirmation information storage unit 2122.

(D-1-3) Network Connected Terminal 2103

The network connected terminal 2103 obtains the terminal ID of the terminal 2101 from the terminal ID storage unit 2121 of the card 2102 being attached to the network connected terminal 2103 itself, then outputs the obtained terminal ID to the server 2104 via the network.

After this, the network connected terminal 2003 receives the first and second update programs associated with the output terminal ID, the first and second authenticity confirmation information, and a plurality of pieces of secret information, from the server 2004 via the network, and stores these received information into the card 2102.

(D-1-4) Server 2104

The server 2104, as in the above-described embodiment, includes a CRL database, and manages, for each terminal, the first and second update programs and the first and second authenticity confirmation information to be distributed thereto. It is presumed here that each type of terminal is associated with different first and second update programs and first and second authenticity confirmation information.

Also, the server 2104 preliminarily stores and manages the terminal common key.

The server 2104 preliminarily generates a plurality of pieces of secret information (device keys), and stores and manages the generated secret information. The server 2104 manages the plurality of pieces of secret information such that, when a piece of secret information is distributed to a terminal, the same piece of secret information is no more distributed to the terminal. Note that the plurality of pieces of secret information managed by the server 2104 differ from each other. Furthermore, after having distributed all the pieces of secret information having been managed, the server 2104 newly generates a plurality of pieces of secret information that are different from the pieces of secret information having been managed so far. As described above, the newly generated pieces of secret information are different from each other.

The server 2104, upon receiving the terminal ID from the network connected terminal 2103 via the network, identifies the machine type from the received terminal ID, and obtains a piece of type common information (first and second update programs, first and second authenticity confirmation information, and terminal common key) that is associated with the identified machine type.

The server 2104 obtains a predetermined number of (two or more) device keys among the plurality of device keys it manages, and also obtains individual transmission keys that are respectively associated with the predetermined number of device keys. The server 2104 generates a predetermined number of distribution-purpose encrypted device keys by encrypting each of the obtained predetermined number of device keys, using an associated individual transmission key as a secret key, by the secret key encryption method.

The server 2104 generates a predetermined number of encrypted individual transmission keys by encrypting each of the individual transmission keys that were used for generating the distribution-purpose encrypted device keys, using the terminal common key as a secret key, by the secret key encryption method.

The server 2104 outputs a set of terminal individual data (the generated plurality of pieces of secret information, the obtained first and second update program and the first and second authenticity confirmation information) to the network connected terminal 2103 via the network.

Note that the secret key, as described above, is a pair of a distribution-purpose encrypted device key and an encrypted individual transmission key.

(D-1-5) Operation of Device Key Distribution System 2100

The operation of the device key distribution system 2100 will be described with reference to the flow diagrams shown in FIGS. 26 and 27.

The operation described in the following is an operation after the card 2102 executes steps S2010 and S2015 shown in FIG. 18, and transmits the terminal ID 2200 of the terminal 2101 to the server 2104.

The server 2104, upon receiving the terminal ID from the network connected terminal 2103 via the network, identifies the machine type from the received terminal ID, and obtains a piece of type common information (first and second update programs, first and second authenticity confirmation information, and terminal common key) that is associated with the identified machine type. The server 2104 obtains a predetermined number of (two or more) device keys among the plurality of device keys it manages, and also obtains individual transmission keys that are respectively associated with the predetermined number of device keys. The server 2104 generates a predetermined number of distribution-purpose encrypted device keys by encrypting each of the obtained predetermined number of device keys, using an associated individual transmission key. The server 2104 generates a predetermined number of encrypted individual transmission keys by encrypting each of the predetermined number of individual transmission keys that were used for generating the distribution-purpose encrypted device keys, using the terminal common key as a secret key, by the secret key encryption method (step S2500).

The server 2104 outputs a set of terminal individual data (the generated plurality of pieces of secret information, the obtained first and second update programs and the first and second authenticity confirmation information) to the network connected terminal 2103 via the network (steps S2505, S2510, S2515, S2520). Upon receiving the set of terminal individual data from the server 2104 via the network connected terminal 2103, the card stores the received data into a predetermined storage area. More specifically, upon receiving the plurality of pieces of secret information from the server 2104, the secret information obtaining unit 2125 stores the received plurality of pieces of secret information into the secret information management table T2100. Upon receiving the first and second authenticity confirmation information from the server 2104, the authenticity confirmation information obtaining unit 2126 outputs the received first and second authenticity confirmation information to the confirmation information individualizing unit 2140. Upon receiving the first update program (individually encrypted program) from the server 2104, the first update program obtaining unit 2127 stores the received first update program into the first update program storage unit 2123. Upon receiving the second update program from the server 2104, the second update program obtaining unit 2128 stores the received second update program into the second update program storage unit 2124.

Upon receiving the first and second authenticity confirmation information, the server 2104 obtains the terminal ID 2200 of the terminal 2101 (step S2530). More specifically, the confirmation information individualizing unit 2140 obtains the terminal ID 2200 from the terminal ID storage unit 2121.

The confirmation information individualizing unit 2140 generates first and second individualized confirmation information respectively associated with the first and second authenticity confirmation information, using the obtained terminal ID 2200 (step S2525). More specifically, the confirmation information individualizing unit 2140 generates the first individualized confirmation information by executing the PCR value extend command using the first authenticity confirmation information and the terminal ID 2200. Also, the confirmation information individualizing unit 2140 generates the second individualized confirmation information by executing the PCR value extend command using the second authenticity confirmation information and the terminal ID 2200. The confirmation information individualizing unit 2140 stores the generated first and second individualized confirmation information into the authenticity confirmation information storage unit 2122.

The card 2102 outputs the individually encrypted program to the terminal 2101 (step S2540).

The terminal 2101 installs the individually encrypted program (step S2545).

The terminal 2101 outputs a device key obtainment request and the first ID-attached PCR value to the authenticity confirmation unit 2129 of the card 2102 (step S2550). Upon receiving the device key obtainment request and the first ID-attached PCR value from the terminal 2101, the authenticity confirmation unit 2129 judges whether or not the terminal 2101 is authentic (step S2555). In this example, the authenticity confirmation unit 2129 of the card 2102 compares the first individualized confirmation information with the received first ID-attached PCR value.

When it judges that the terminal 2101 is not authentic (NG in step S2555), the card 2102 outputs the individually encrypted program to the terminal 2101 (step S2560). After the terminal 2101 receives the individually encrypted program (step S2565), the control returns to step S2545. More specifically, the authenticity confirmation unit 2129 outputs the NG information to the first program output unit 2130. Upon receiving the NG information from the authenticity confirmation unit 2129, the first program output unit 2130 obtains an individually encrypted program associated with the terminal 2101 from the first update program storage unit 2123, and outputs the obtained individually encrypted program to the first program updating unit 2114 of the terminal 2101. Upon receiving the individually encrypted program from the card 2102, the first program updating unit 2114 updates the first programs to rage unit 2111 by overwriting the individually encrypted program stored therein with the newly received individually encrypted program, and requests the operating system of the terminal 2101 to reset the system.

When it judges that the terminal 2101 is authentic (OK in step S2555), the secret information providing unit 2120 of the card 2102 outputs a distribution-purpose encrypted device key to the terminal 2101 (step S2570). More specifically, the authenticity confirmation unit 2129 outputs the first OK information to the secret information providing unit 2120. Upon receiving the first OK information from the authenticity confirmation unit 2129, the secret information providing unit 2120 obtains a distribution-purpose encrypted device key with flag value "0" from the secret information storage unit 2132. The secret information providing unit 2120 outputs the obtained distribution-purpose encrypted device key to the terminal 2101.

Upon receiving the distribution-purpose encrypted device key from the card 2102 (step S2575), the device key individualizing unit 2116 of the terminal 2101 generates an individually encrypted device key using the received distribution-purpose encrypted device key, and stores the generated individually encrypted device key into the individual device key storage unit 2117 (step S2580). More specifically, upon receiving the distribution-purpose encrypted device key, the device key individualizing unit 2116 obtains the terminal ID 2200 from the ID storage unit 2110. The device key individualizing unit 2116 generates an individually encrypted device key by encrypting the received distribution-purpose encrypted device key using the obtained terminal ID, and stores the generated individually encrypted device key into the individual device key storage unit 2117.

The card 2102 outputs the second update program to the terminal 2101 (step S2585).

The terminal 2101 installs the second update program (step S2590), and then deletes the individually encrypted program from the first program storage unit 2111 (step S2595).

The terminal 2101 outputs an encrypted individual transmission key obtainment request and the second ID-attached PCR value to the authenticity confirmation unit 2129 of the card 2102 (step S2600).

Upon receiving the encrypted individual transmission key obtainment request and the second ID-attached PCR value from the terminal 2101, the authenticity confirmation unit 2129 judges whether or not the first update program (individually encrypted program) has been deleted from the first program storage unit 2111 of the terminal 2101 (step S2605).

When it judges that the individually encrypted program has not been deleted (NO in step S2605), the authenticity confirmation unit 2129 requests the operating system of the terminal 2101 to delete the first update program (individually encrypted program) (step S2610), and then returns to step S2605.

When it judges that the individually encrypted program has been deleted (YES in step S2605), the authenticity confirmation unit 2129 judges whether or not the terminal 2101 is authentic (step S2615). In this example, the authenticity confirmation unit 2129 of the card 2102 compares the second individualized confirmation information with the received second ID-attached PCR value.

When it judges that the terminal 2101 is not authentic (NG in step S2615), the card 2102 outputs the second update program to the terminal 2101 (step S2620). After the terminal 2101 receives the second update program (step S2625), the control returns to step S2590. More specifically, the authenticity confirmation unit 2129 outputs the NG information to the second program output unit 2131. Upon receiving the NG information from the authenticity confirmation unit 2129, the second program output unit 2131 obtains a second update program associated with the terminal 2101 from the second update program storage unit 2124, and outputs the obtained second update program to the second program updating unit 2115 of the terminal 2101. Upon receiving the second update program from the card 2102, the second program updating unit 2115 updates the content key decryption program using the received second update program, and requests the operating system of the terminal 2101 to reset the system.

When it judges that the terminal 2101 is authentic (OK in step S2615), the secret information providing unit 2120 of the card 2102 outputs, to the terminal 2101, an encrypted individual transmission key associated with the distribution-purpose encrypted device key that is output in step S2570 (step S2630). More specifically, the authenticity confirmation unit 2129 outputs the second OK information to the secret information providing unit 2120. Upon receiving the second OK information from the authenticity confirmation unit 2129, the secret information providing unit 2120 obtains, from the secret information storage unit 2132, an encrypted individual transmission key associated with a distribution-purpose encrypted device key with flag value "1" and associated with the terminal ID 2200 of the terminal 2101, and outputs the obtained encrypted individual transmission key to the device key decrypting unit 2118 of the terminal 2101.

Upon receiving the encrypted individual transmission key from the card 2102 (step S2635), the device key decrypting unit 2118 stores the received encrypted individual transmission key into a predetermined storage area (for example, the individual device key storage unit 2117) (step S2640).

The device key decrypting unit 2118 generates a device key from the individually encrypted device key stored in the individual device key storage unit 2117 (step S2645). More specifically, the device key decrypting unit 2118 obtains an individually encrypted device key that is associated with the received encrypted individual transmission key, from the individual device key storage unit 2117. The device key decrypting unit 2118 obtains the terminal ID 2200 from the ID storage unit 2110, and generates a distribution-purpose encrypted device key by decrypting the individually encrypted device key obtained from the individual device key storage unit 2117, using the obtained terminal ID 2200. The device key decrypting unit 2118 obtains the terminal common key of the terminal in concern, and generates an individual transmission key by decrypting the received encrypted individual transmission key using the obtained terminal common key. The device key individualizing unit 2116 generates a device key by decrypting the distribution-purpose encrypted device key using the generated individual transmission key.

The following shows an example of the timings at which each step is performed.

Steps S2015 through S2035 are performed after the card 2002 is attached to the network connected terminal 2003.

Steps S2040 through S2045 and steps S2585 through S2595 are performed when a service person updates a program for the terminal 2101.

Steps S2550 through S2580, step S2545 after NG judgment in step 2555, steps S2600 through S2645, and steps S2590 through S2595 after NG judgment in step 2615 are performed after the user of the terminal 2101 requests playback of a content.

(D-1-6) Other Modifications

Up to now, the present invention has been described through Modification 4. However, the present invention is not limited to Modification 4, but includes, for example, the following modifications.

(1) In the above-described Modification 4, the (predetermined) number of device keys obtained by the server 2104 is two or more. However, the present invention is not limited to this.

The server 2104 may obtain one or more device keys.

(2) In the above-described Modification 4, the number of device keys obtained by the server 2104 is a predetermined number. However, the present invention is not limited to this.

The number of device keys to be obtained by the server 2104 may be specified by the user when information is transmitted with the network connected terminal.

In this case, the network connected terminal 2103 transmits information indicating the number of device keys to be obtained specified by the user, to the server 2104. Upon receiving the information from the network connected terminal 2103, the server 2104 obtains as many device keys as the number indicated by the received information.

(3) In the above-described Modification 4, the terminal 2101 is a terminal not connected to a network. However, the present invention is not limited to this structure.

The terminal 2101 may be a terminal that is connectable to a network. That is to say, the terminal 2101 may also have the function of the network connected terminal 2103 recited in the above-described Modification 4.

Figure 26:
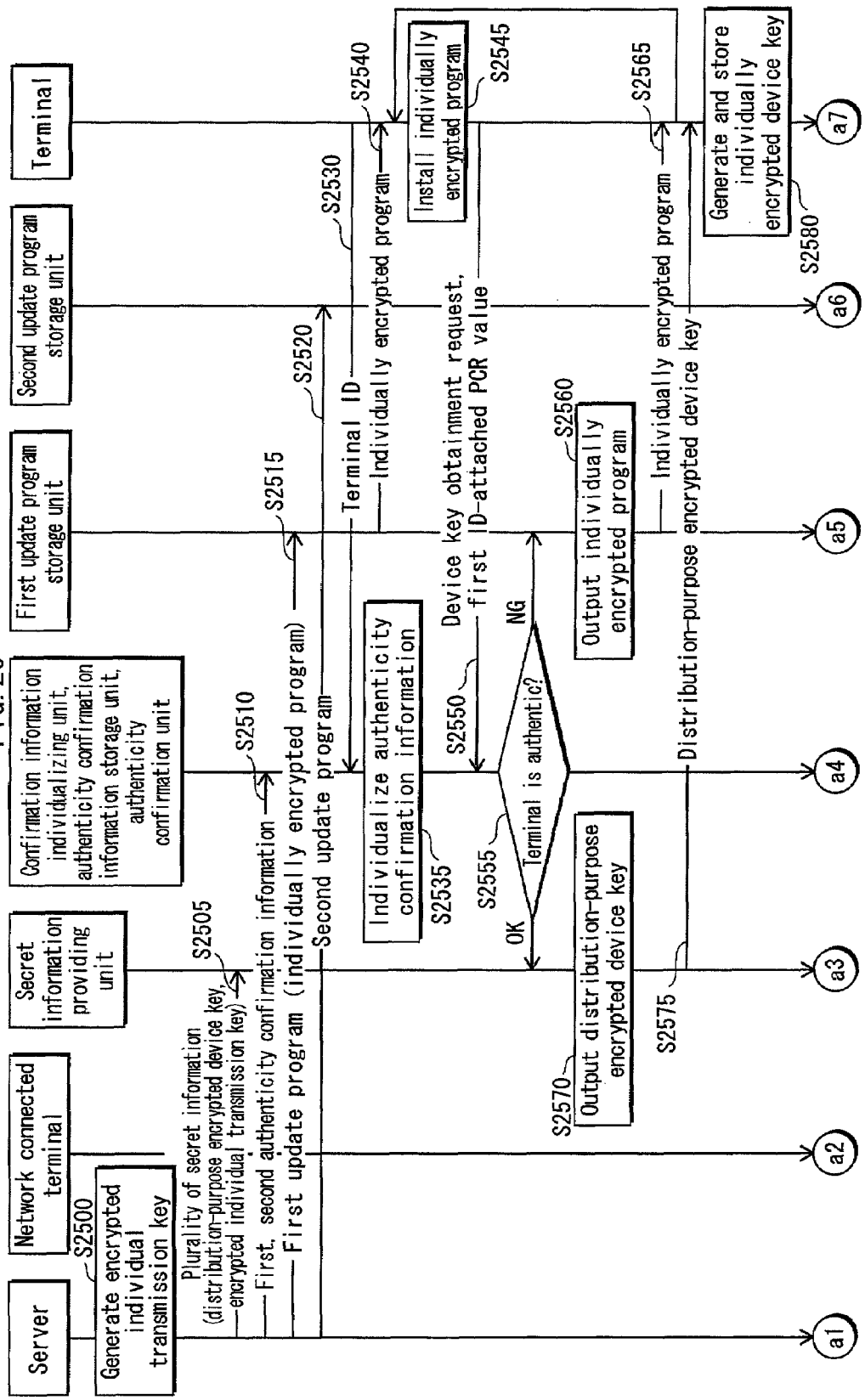
FIG. 26 is a flowchart showing the operation of the device key distribution system 2100, continuing to FIG. 27.
Figure 27:
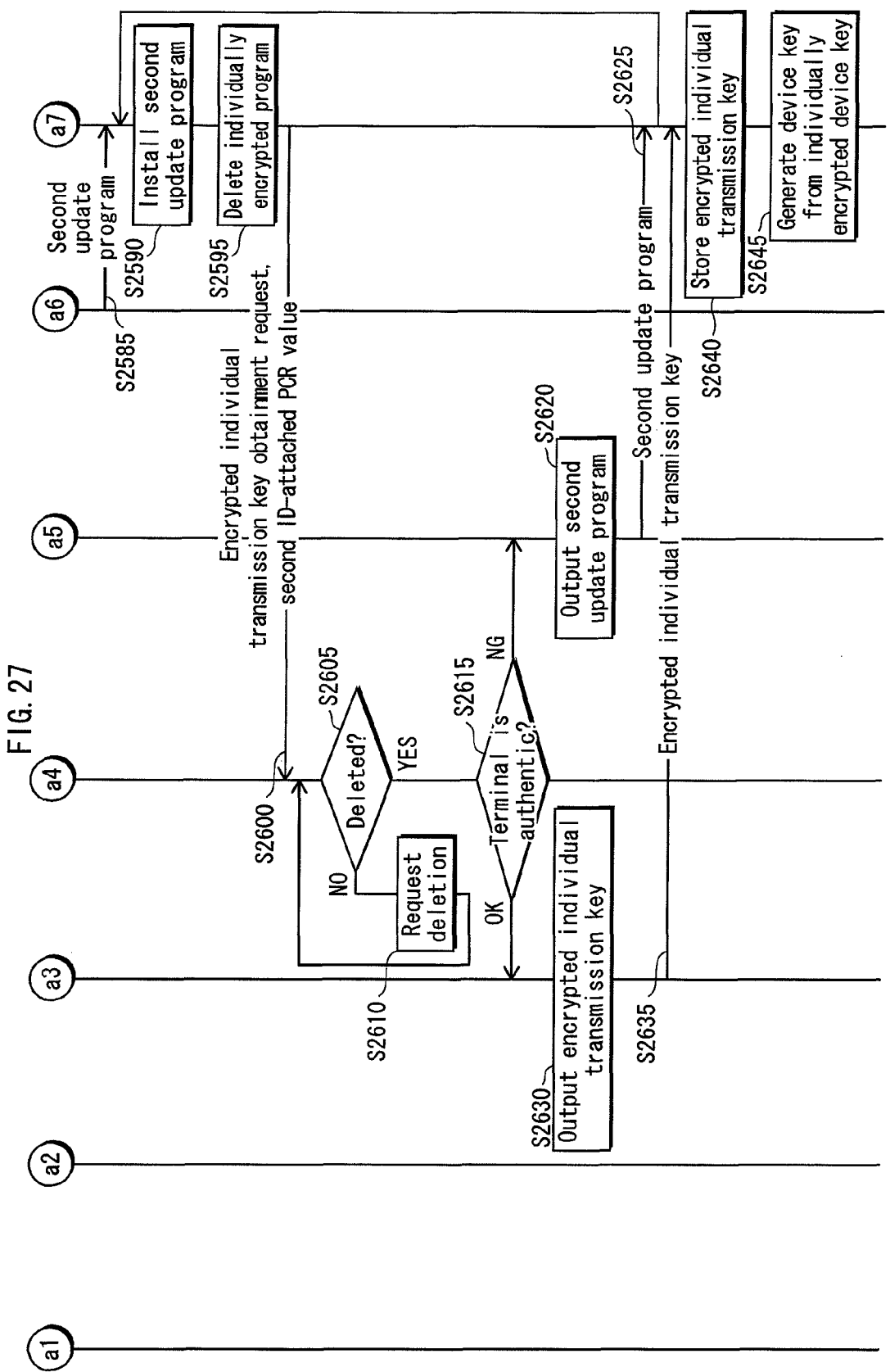
FIG. 27 is a flowchart showing the operation of the device key distribution system 2100, continuing from FIG. 26.

(4) In the above-described Modification 4, the device key distribution system 2100 updates the individually encrypted program and the content key decryption program for the terminal 2101 with a service person in steps S2540 through S2545 and steps S2585 through S2590 shown in FIG. 26. However, the present invention is not limited to this structure.

The device key distribution system 2100 may not perform steps S2540 through S2545 and steps S2585 through S2590 in the operation thereof.

(5) In the above-described Modification 4, the secret information providing unit 2120 associates each of the plurality of pieces of secret information stored in the secret information storage unit 2132, with a flag so that, when a piece of secret information is distributed to a terminal, the same piece of secret information is no more distributed to the terminal. However, the present invention is not limited to this structure.

The secret information providing unit 2120 may generate a list composed of one or more pieces of secret information having been output so that it can manage the plurality of pieces of secret information such that, when a piece of secret information is distributed to a terminal, the same piece of secret information is no more distributed to the terminal.

Alternatively, the secret information providing unit 2120 may delete each piece of secret information that has been output.

That is to say, the secret information providing unit 2120 may upload information indicating the state of secret information having been installed to terminals so that it can manage either secret information having been output or secret information not having been output, or both thereof.

(6) In the above-described Modification 4, the terminal 2101 deletes the individually encrypted program after the use thereof. However, the present invention is not limited to this structure.

The terminal 2101 may not delete the individually encrypted program.

In this case, when the card 2102 judges that the terminal 2101 is not authentic, namely, when the terminal 2101 stores an unauthorized individually encrypted program, the terminal 2101 receives a new individually encrypted program (authorized individually encrypted program). In this case, the card does not output a distribution-purpose encrypted device key to the terminal until it confirms that the individually encrypted program has been updated. This prevents an unauthorized individually encrypted program from leaking a distribution-purpose encrypted device key.

(7) The above-described embodiment and modifications may be combined.

(D-1-7) Summary

According to the above-described Modification 4, a terminal can correctly perform the individual encryption of the device keys when it is an authentic terminal. With this structure, it is possible to prevent the individual encryption from being performed in an unauthorized manner, by outputting the device keys (in this example, distribution-purpose encrypted device keys) after the authenticity of the terminal has been confirmed.

Also, for the individual encryption, the terminal 2101 uses a program (individually encrypted program) dedicated thereto, and deletes the individually encrypted program used for the individual encryption after the individual encryption is performed. This prevents the individual encryption method from being leaked.

Also, the card 2102 does not output an encrypted individual transmission key when the individually encrypted program has not been deleted from the terminal 2101. This enables the individually encrypted program to be deleted forcibly.

(E-1) Other Modifications

Up to now, the present invention has been described through the Embodiment and Modifications 1-4. However, the present invention is not limited to the Embodiment and Modifications 1-4, but includes, for example, the following modifications.

(1) In each Modification described above, the device keys are preliminarily generated by the server. However, the present invention is not limited to this.

The device keys may be generated by the card.

In this case, the card output the generated device keys to the terminal to which it is attached, and stores the output device keys and the terminal ID of the terminal to which the device keys are output, in association with each other into a predetermined storage area. The card transmits, to the server, the device keys and the terminal ID stored in association with each other when the card performs a data transmission/reception with the server via the network connected terminal.

Upon receiving the device keys and the terminal ID that are associated with each other, the server manages the received device keys and terminal ID.

(2) In each Modification described above, to confirm the authenticity of a terminal, the card performs an authentication (authentication by attestation) by comparing a PCR value of a program actually loaded into the terminal, with an authentic PCR value. However, the present invention is not limited to this structure.

The card may check the version of the program to confirm the authenticity of the terminal.

Alternatively, the card may obtain a key unique to the program (a key unique to firmware) to confirm the authenticity of the terminal.

Still alternatively, the card may perform a challenge-response authentication to confirm the authenticity of the terminal.

(3) In each Modification described above, the card receives an update program from the server via the network. However, the present invention is not limited to this structure.

The card may receive an update program transmitted in the form of broadcast waves from the server, via a terminal (broadcast reception terminal) that can be attached with the card and can receive the broadcast waves.

Alternatively, the server may transmit, in the form of broadcast waves, only information (update information) indicating the necessity of a program update. In this case, the card receives the update information via a broadcast reception terminal, and outputs (displays) a message indicating the reception of the update information, to the user via the broadcast reception terminal. After this, the card, operated by the user, receives the update program from the serve via the network and the broadcast reception terminal.

Still alternatively, the card may be directly inserted into the server to receive the update program, without via the network. In this case, for example, a kiosk terminal may be used as the server.

(4) In each Modification described above, a device key is output after the card confirms the authenticity of the terminal by performing an authentication process. However, the present invention is not limited to this structure.

After the authenticity of the terminal is confirmed, other data may be output from the card to the terminal.

For example, music data, image data, other key (work key, content key, or key ticket), or a program having a new function (a new program) may be output. That is to say, data protected by copyright (the music data or image data), or highly confidential data (the other key or new program) may be output from the card to the terminal after the authenticity of the terminal is confirmed.

In this case, the server receives the copyright-protected data or highly confidential data, instead of the device key, from the server via the network connected terminal.

(5) In each Modifications 2, 3 and 4 described above, each device key distribution system may use the second terminal ID, as is the case with (6-1) or (6-2) in "(A-1-6) Other Modifications" described above.

(6) In each Modification described above, the system distributes device keys respectively unique to terminals to the terminals, and updates (renews) the device keys for each terminal. However, the present invention is not limited to this structure.

The system may update (renew) other information for the terminals.

Here, the terminal measuring unit, as described above, corresponds to the secure module in the above-described embodiment. Thus the terminal measuring unit has a function equivalent with the TPM (Trusted Platform Module) standardized by the TCG (Trusted Computing Group).

As one example of the update (renewal) of other information, an update (renewal) of the platform certificate included in the TPM is described.

The terminal common key in Modification 1 described above may be changed to an endorsement key (EK private key) included in the TPM, the device key may be changed to a platform certificate, and the endorsement key and platform certificate may be sent to the TPM (the terminal measuring unit) of the terminal.

Of course, not limited to the update of the platform certificate, updates of other information using the EK private key are also possible.

(7) In each Modification described above, the system includes a card. However, the present invention is not limited to this structure.

The system may include a device (herein after referred to as an authentication device) that has the same constitutional elements as the card.

Here, the authentication device may be incorporated into the server described above, or may be a device different from the server.

In this case, for example, the terminal is connected with the network connected terminal by a dedicated cable, and receives an update program and a device key (secret information), from an update terminal via the network connected terminal.

(8) Each of the above-described devices is specifically a computer system that includes a microprocessor, ROM, RAM, a hard disk unit, a display unit, a keyboard, a mouse and the like. A computer program is stored in the RAM or the hard disk unit. The microprocessor operates in accordance with the computer program and causes each device to achieve the functions. The computer program is composed of a plurality of instruction codes that instruct the computer to achieve predetermined functions.

(9) Part or all of the structural elements constituting the devices described above may be achieved in one system LSI (Large Scale Integration). The system LSI is an ultra multi-functional LSI that is manufactured by integrating a plurality of components on one chip. More specifically, the system LSI is a computer system that includes a microprocessor, ROM, RAM and the like. A computer program is stored in the RAM. The microprocessor operates in accordance with the computer program, thereby enabling the system LSI to achieve its functions.

Each part of structural elements constituting each of the above-described devices may be achieved on one chip, or part or all thereof may be achieved on one chip.

Although the term system LSI is used here, it may be called IC, LSI, super LSI, ultra LSI or the like, depending on the level of integration. It is also possible to use the FPGA (Field Programmable Gate Array), with which a programming is available after the LSI is manufactured, or the reconfigurable processor that can re-configure the connection or setting of the circuit cells within the LSI.

Furthermore, a technology for an integrated circuit that replaces the LSI may appear in the near future as the semi-conductor technology improves or branches into other technologies. In that case, the new technology may be incorporated into the integration of the functional blocks constituting the present invention as described above. Such possible technologies include biotechnology.

(10) Part or all of the structural elements constituting each of the above-described devices may be achieved as an IC card or a single module that is attachable/detachable to or from each device. The IC card or module is a computer system that includes a microprocessor, ROM, RAM, and the like. The IC card or module may include the aforesaid ultra multi-functional LSI. The microprocessor operates in accordance with the computer program and causes the IC card or module to achieve the functions. The IC card or module may be tamper resistant.

(11) The present invention may be methods shown by the above. The present invention may be a computer program that allows a computer to realize the methods, or may be a digital signal representing the computer program.

(12) Furthermore, the present invention may be a computer-readable recording medium such as a flexible disk, a hard disk, CD-ROM, MO, DVD, DVD-ROM, DVD RAM, BD (Blu-ray Disc), or a semiconductor memory, that stores the computer program or the digital signal. Furthermore, the present invention may be the digital signal recorded on any of the aforementioned recording mediums.

(13) Furthermore, the present invention may be the computer program or the digital signal transmitted via an electric communication line, a wireless or wired communication line, a network of which the Internet is representative, or a data broadcast.

(14) Furthermore, the present invention may be a computer system that includes a microprocessor and a memory, the memory storing the computer program, and the microprocessor operating according to the computer program.

(15) Furthermore, by transferring the program or the digital signal via the recording medium, or by transferring the program or the digital signal via the network or the like, the program or the digital signal may be executed by another independent computer system.

(16) The present invention may be any combination of the above-described embodiments and modifications.

<Other Embodiments>

The following describes other embodiments of the present invention with reference to the attached drawings. The following embodiments relate to a machine authentication conforming to the TCG standard.

1. Embodiment 1

1.1 Outline

Figure 28:
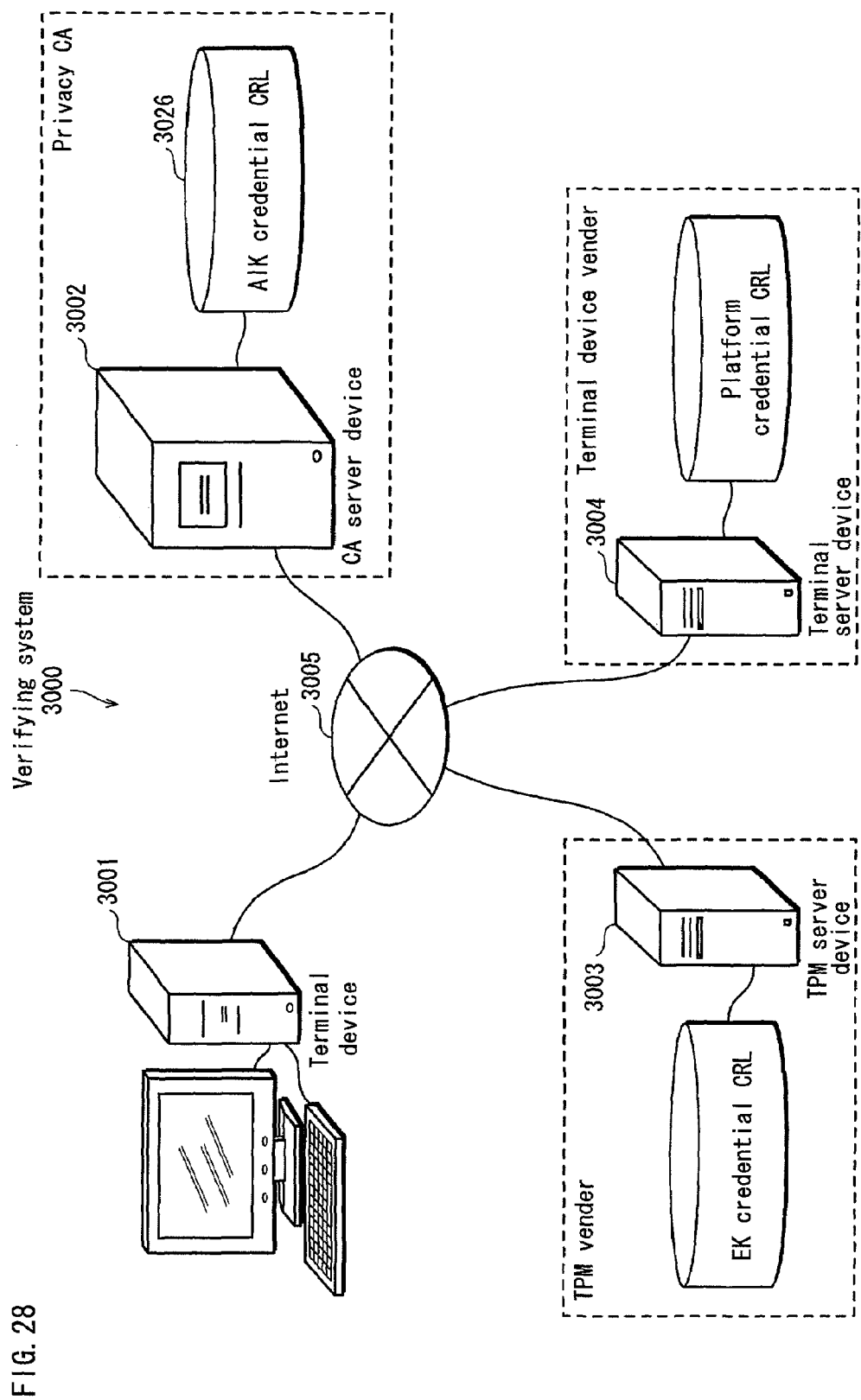
FIG. 28 shows the structure in Embodiment 1 in the other embodiments.

An authentication system 3000 in Embodiment 1 is composed of, as shown in FIG. 28, a terminal device (requesting device) 3001, a CA server device (verifying device) 3002, and a TPM server device 3003, where these devices are all connected with the Internet 3005.

The terminal device 3001 includes a TPM (Trusted Platform Module) loaded therein, and obtains, from the CA server device immediately after it is booted or initialized, an AIK (Attestation Identity Key) credential (AIK certificate) that certifies that the device has an authentic structure (both hardware and software).

The TPM is a hardware module having a function to subject an integrity value (which will be described later) into an extend process and record the result, where the integrity value indicates integrity of programs provided in the terminal device 3001.

When the terminal device 3001 actually operates, the CA server device 3002 becomes a verifying device at a predetermined timing and verifies the authenticity of the terminal device 3001 (such verification conforming to the TCG standard is called "attestation"). More specifically, it verifies whether or not a program has been tampered in an unauthorized manner and whether or not a program is operating normally. In the present embodiment, the CA server device 3002, which issues an AIK credential to the terminal device 3001, is the verifying device in the attestation. However, not limited to this structure, an individual device other than the CA server device 3002 may play the role of the verifying device in the attestation while the terminal device 3001 operates.

1.2 Structure of Terminal Device 3001

(1) Hardware Structure

The hardware structure of the terminal device 3001 will be described with reference to FIG. 29.

The terminal device 3001 includes a transmission/reception unit 3103, a CPU 3141, a RAM 3145, a hard disk unit 3142, a secure ROM 3143, and a TPM 3117, where all these units are connected with an internal bus 3160.

(1-1) Transmission/Reception Unit 3103

The transmission/reception unit 3103 is equipped with an interface that is connectable with the Internet 3005. The transmission/reception unit 3103 performs transmission/reception of information with external machines that are connected with the Internet 3005.

(1-2) Secure ROM 3143

The secure ROM 3143 stores information (machine ID, device type number and the like) that is unique to the device, and also stores a series of programs, such as a BIOS 3109 and a boot loader 3162, that run when the terminal device 3001 is booted.

The BIOS 3109 is composed of a plurality of programs that are executed first when the terminal device 3001 is booted, and controls peripheral devices such as a disk drive, keyboard, and video card that are connected with the computer. The BIOS 3109 is composed of, as shown in FIG. 29, a plurality of blocks including a boot block 3165 that is executed immediately after the device is powered, where a CRTM 3163 (which will be described later) is written in the boot block 3165.

The boot loader 3162 includes a procedure for calling a kernel of the OS.

Each of these programs and programs stored in the hard disk unit 3142 includes an RTM (Root of Trust Measurements) 3161. The RTM 3161 is a code for achieving a function to measure the integrity value of the programs that are called by each program. The integrity value is a value that indicates the integrity level of the program in concern. In the present embodiment, as one example, a hash value of a called program code is used as the integrity value. The SHA-1 is used as the hash function. Note that this is merely one example. Other one-way functions may be used, or other methods, such as a method of measuring the number of bits constituting a called program, may be used for measuring the integrity value.

Especially, since the BIOS 3109 is a program that is executed first, the RTM code (the CRTM 3163 shown in FIG. 29) included in the BIOS 3109 is different from RTM codes included in other programs, and includes a procedure for measuring the integrity value of the BIOS 3109 itself, and a procedure for measuring the integrity values of programs called by the BIOS 3109.

The BIOS 3109 is recorded on the secure ROM 3143, which cannot be rewritten, and the reliability of a PCR value (which will be described later) is assured based on the reliability of the integrity value of the BIOS 3109 measured by the RTM code included in the boot block 3165 in the BIOS 3109. For this reason, the RTM code included in the BIOS 3109 is called CRTM (Core Root of Trust for Measurement) so that it can be distinguished from RTM codes of other programs.

(1-3) CPU 3141

The CPU 3141 executes various types of programs stored in the secure ROM 3143, the hard disk unit 3142, and the RAM 3145 to achieve various functional units described below.

(1-4) RAM (Random Access Memory) 3145

The RAM 3145 is a volatile storage medium that loads programs to be executed by the CPU 3141, from the hard disk unit 3142 or the secure ROM 3143, and stores the loaded programs.

(1-5) Hard Disk Unit 3142

The hard disk unit 3142 is a nonvolatile recording medium on which data can be written and erased. The hard disk unit 3142 stores, as one example, the OS, verification program, and application as shown in FIG. 29.

Figure 29:
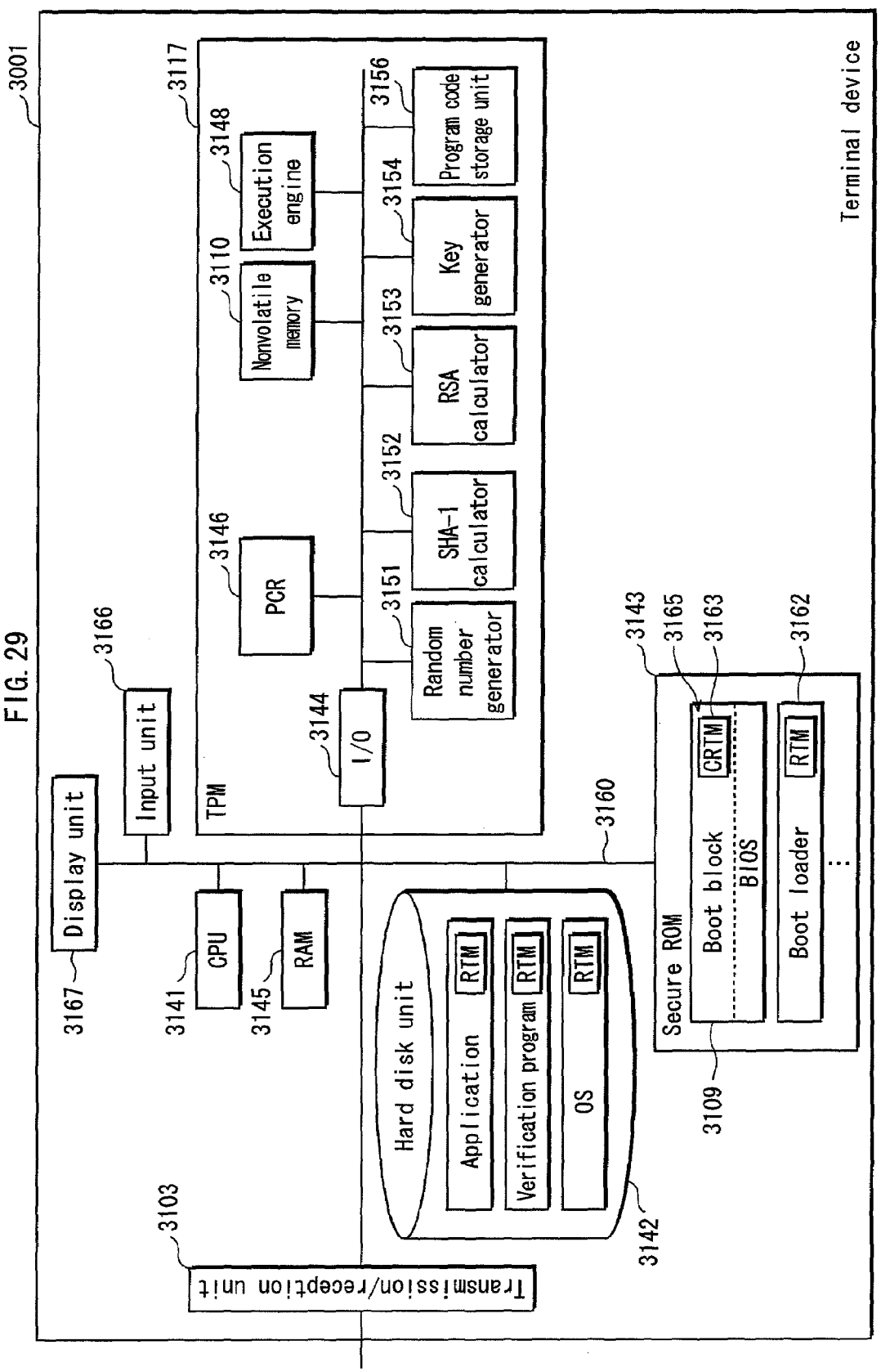
FIG. 29 shows the hardware structure of the terminal device 3001.

Note that, although FIG. 29 does not show, the hard disk unit 3142 stores not only programs but also various types of data that are used by the CPU 3141.

(1-6) TPM 3117

The TPM 3117 is generated by forming, on one chip, an interface 3144, a PCR (Platform Configuration Register) 3146, a nonvolatile memory 3110, an execution engine 3148, a random number generator 3151, an SHA-1 calculator 3152, an RSA calculator 3153, a key generator 3154, and a program code storage unit 3156.

Figure 30:
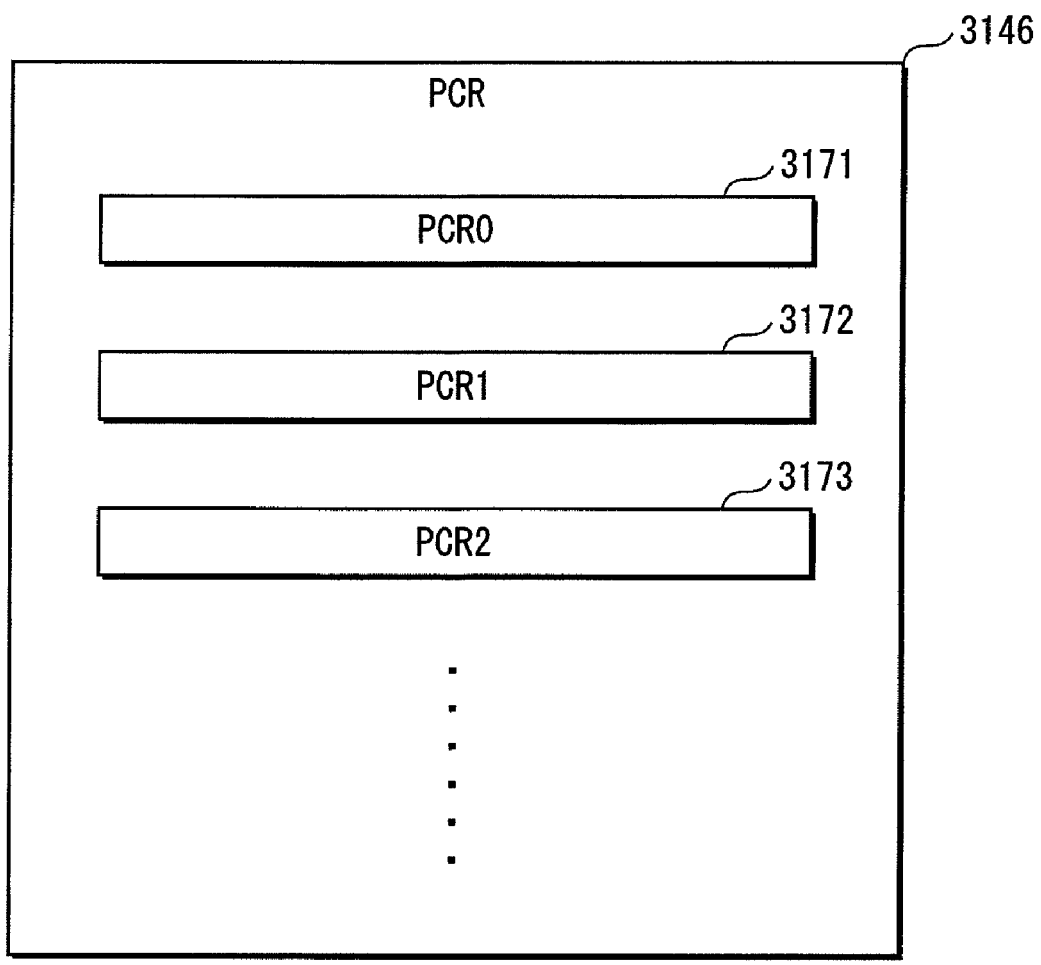
FIG. 30 shows the internal structure of the PCR (Platform Configuration Register) 3146.

The PCR 3146 is achieved by a volatile memory. FIG. 30 shows the internal structure of the PCR 3146. As shown in the figure, the PCR 3146 includes storage areas 3171, 3172, 3173 . . . . For the sake of convenience, PCR values stored in the storage areas 3171, 3172, 3173 . . . are represented as PCR0, PCR1, PCR2, . . . , respectively. The storage areas correspond one-to-one to the programs stored in the hard disk unit 3142 or the secure ROM 3143. For example, the storage area 3171 corresponds to the BIOS.

The nonvolatile memory 3110 stores various types of keys. These keys will be described later in the description of the functional units. The nonvolatile memory 3110 stores various types of keys in a hierarchical structure, where lower-order keys are encrypted using higher-order keys and the generated encrypted keys are stored in the nonvolatile memory 3110. The nonvolatile memory 3110 also stores an SRK (Storage Root Key) that is the root key of the hierarchical structure.

The execution engine 3148 operates in accordance with the program stored in the program code storage unit 3156 and controls the calculators, thereby achieving various functions.

The random number generator 3151 generates a random number (nonce), and outputs the generated random number.

The SHA-1 calculator 3152 calculates a hash value by substituting the input data into a hash function. In the present example, the SHA-1 is used as the hash function. However, not limited to this, other one-way functions may be used.

The RSA calculator 3153 performs an encryption calculation or a decryption calculation by the RSA encryption method, using the input data and key.

The key generator 3154 is a circuit for generating a pair of keys to be used in the RSA encryption.

Figure 31:
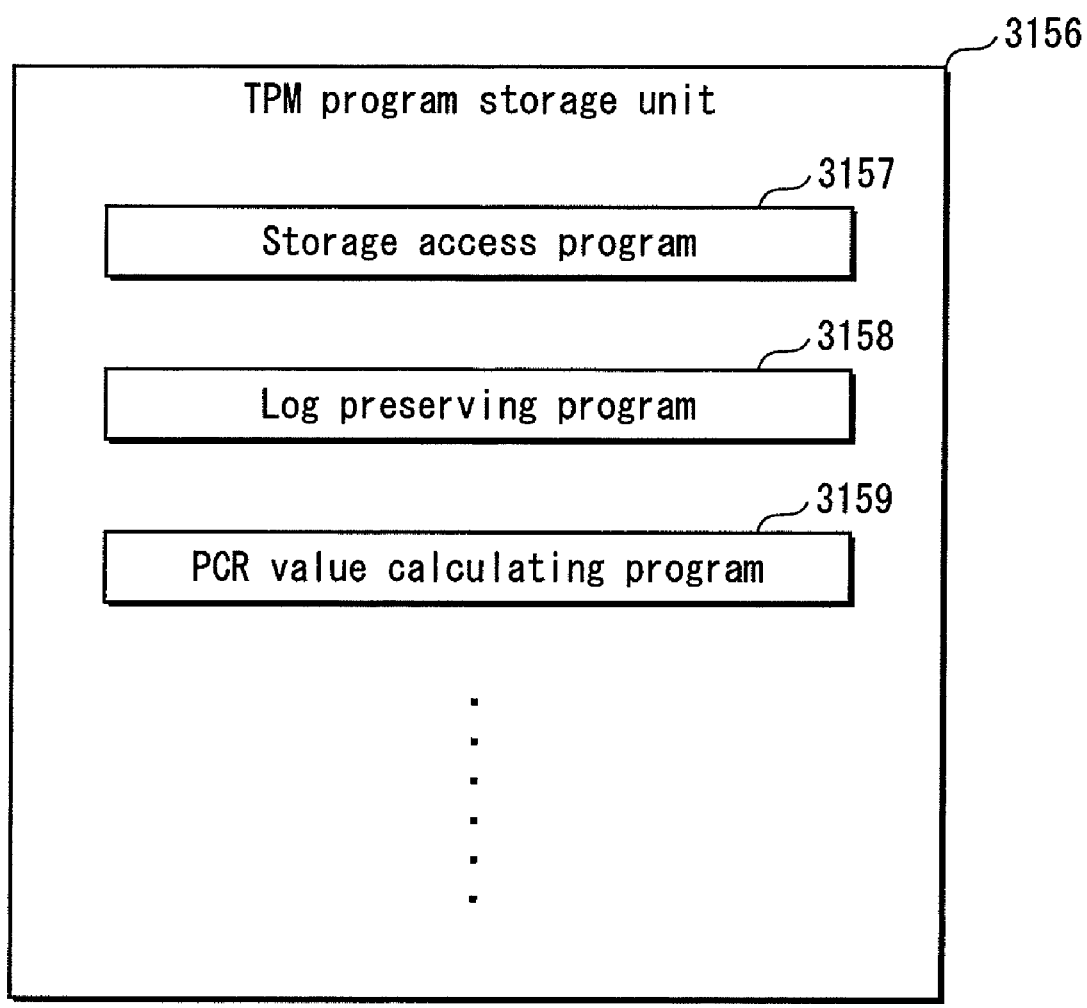
FIG. 31 shows an example of programs stored in the program code storage unit 3156.

The program code storage unit 3156 stores various types of programs such as a storage access program 3157, a log preserving program 3158, a PCR value calculating program 3159 . . . , as shown in FIG. 31. These programs are written in a machine language executable by the execution engine 3148. The program code storage unit 3156 also temporarily stores various types of data, such as data that is necessary when the execution engine 3148 executes each program, and data output in the middle of calculation.

The storage access program 3157 is a program including a procedure for accessing storage mediums (in this example, the RAM 3145, the hard disk unit 3142, and the secure ROM) that exist outside the TPM 3117.

The log preserving program 3158 is a program including a procedure for obtaining the PCR values stored in the PCR 3146 each time any of the PCR values stored in the PCR 3146 has been changed, running the storage access program 3157 to store the obtained PCR values into the hard disk unit 3142, and generating the log information.

The PCR value calculating program 3159 is a program including a procedure for calculating a PCR value corresponding to a program that is to be newly loaded into the memory 3108 (which will be described later), using the SHA-1 calculator 3152, and writing the calculated PCR value into an appropriate area in the PCR 3146.

(1-7) Input Unit 3166 and Display Unit 3167

The input unit 3166 is connected with input devices such as a keyboard and a mouse, receives an operation of the user that were made with these devices, and notifies operation information indicating the received operation to the CPU 3141.

The display unit 3167, connected with a monitor, outputs, to the monitor, various types of images that are output by the CPU 3141.

(2) Functional Structure

Figure 32:
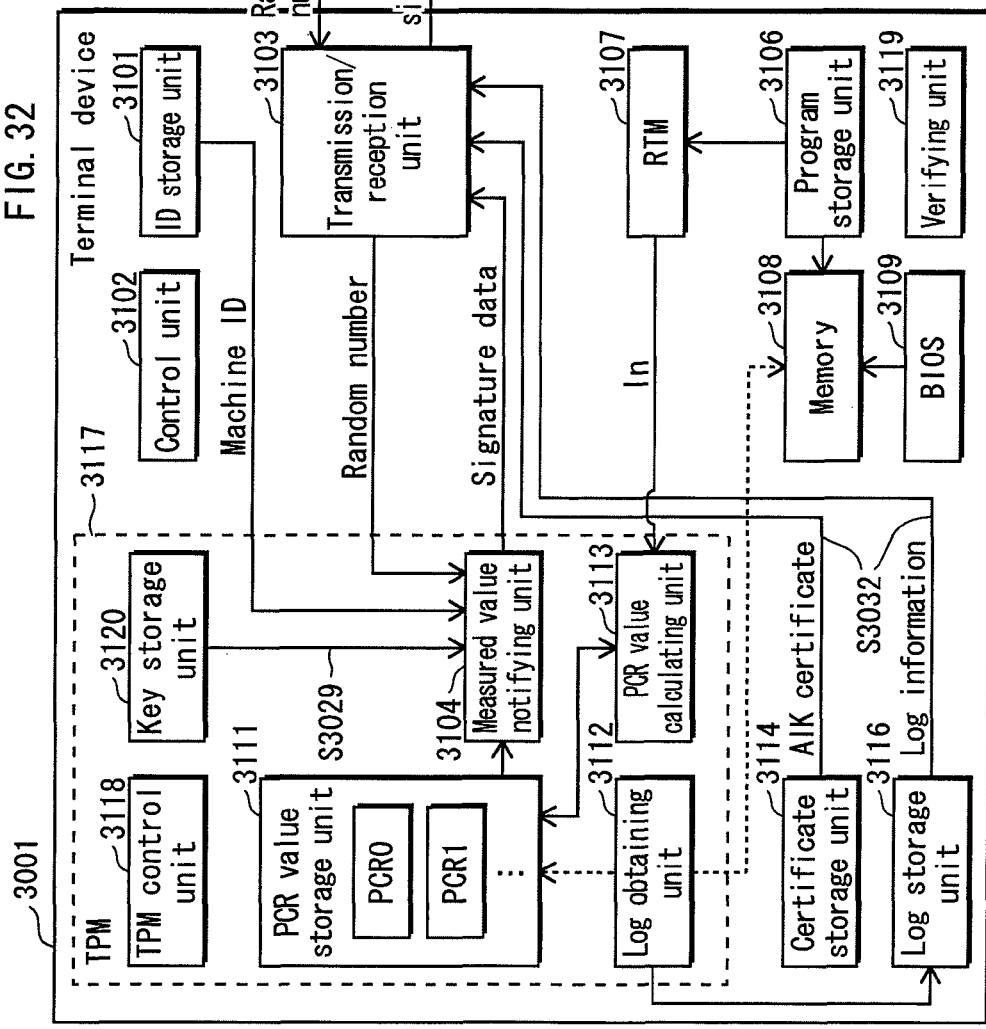
FIG. 32 is a functional block diagram that shows the functional structure of the terminal device 3001 and the CA server device 3002.

FIG. 32 is a functional block diagram that shows the functional structure of the terminal device 3001 and the CA server device 3002. The arrows in the drawing indicate data flows in the attestation performed by the terminal device 3001.

As shown in FIG. 32, the terminal device 3001 includes an ID storage unit 3101, a control unit 3102, the transmission/reception unit 3103, a measured value notifying unit 3104, a program storage unit 3106, a RTM 3107, a memory 3108, the BIOS 3109, a key storage unit 3120, a PCR value storage unit 3111, a log obtaining unit 3112, a PCR value calculating unit 3113, a certificate storage unit 3114, and a log storage unit 3116. Among these, the measured value notifying unit 3104, the TPM control unit 3118, the key storage unit 3120, the PCR value storage unit 3111, the log obtaining unit 3112, and the PCR value calculating unit 3113 are achieved in a circuit formed on the TPM.

The ID storage unit 3101, the control unit 3102, the transmission/reception unit 3103, the measured value notifying unit 3104, the program storage unit 3106, the RTM 3107, the memory 3108, the BIOS 3109, the key storage unit 3120, the TPM control unit 3118, the PCR value storage unit 3111, the log obtaining unit 3112, the PCR value calculating unit 3113, the certificate storage unit 3114, the log storage unit 3116, and the verifying unit 3119 are achieved when the above-described hardware operate properly.

The following describes each functional unit.

(2-1) ID Storage Unit 3101

The ID storage unit 3101 is composed of the secure ROM 3143, and stores a machine ID that uniquely identifies the terminal device 3001 itself.

(2-2) Control Unit 3102

The control unit 3102 controls the operation of each constitutional element in accordance with the various types of programs having been loaded in the memory 3108. In this control, the control unit 3102 outputs control signals to each functional units, although it is not illustrated specifically. Also, the control unit 3102 receives data and instruction input by the user, and controls each unit in accordance with the received instruction.

The control unit 3102 stores information indicating whether or not the AIK credential (which will be described later) has been obtained, and when the terminal device 3001 is booted in the state where the AIK credential has not been obtained, the control unit 3102 notifies to the TPM control unit 3118 that the AIK credential has not been obtained. Here, "boot" means that the OS is loaded into the memory 3108 and the loaded OS is in the executable state.

The control unit 3102 then receives a newly generated AIK public key from the TPM control unit 3118. Upon receiving the AIK public key, the control unit 3102 generates IDs that are respectively to be assigned to an AIK private key and the AIK public key (herein after a pair of these keys are referred to as an AIK key pair, as necessary), where the AIK private key has been generated newly in the TPM 3117.

Next, the control unit 3102 reads out, from the certificate storage unit 3114, an EK (Endorsement Key) credential 3121 and a PF (PlatForm) credential 3122 (which will be described later). The control unit 3102 then requests an issuance of the AIK credential by transmitting the generated IDs, AIK public key, read-out EK credential, and PF credential to the CA server device 3002 via the transmission/reception unit 3103.

Figure 33:
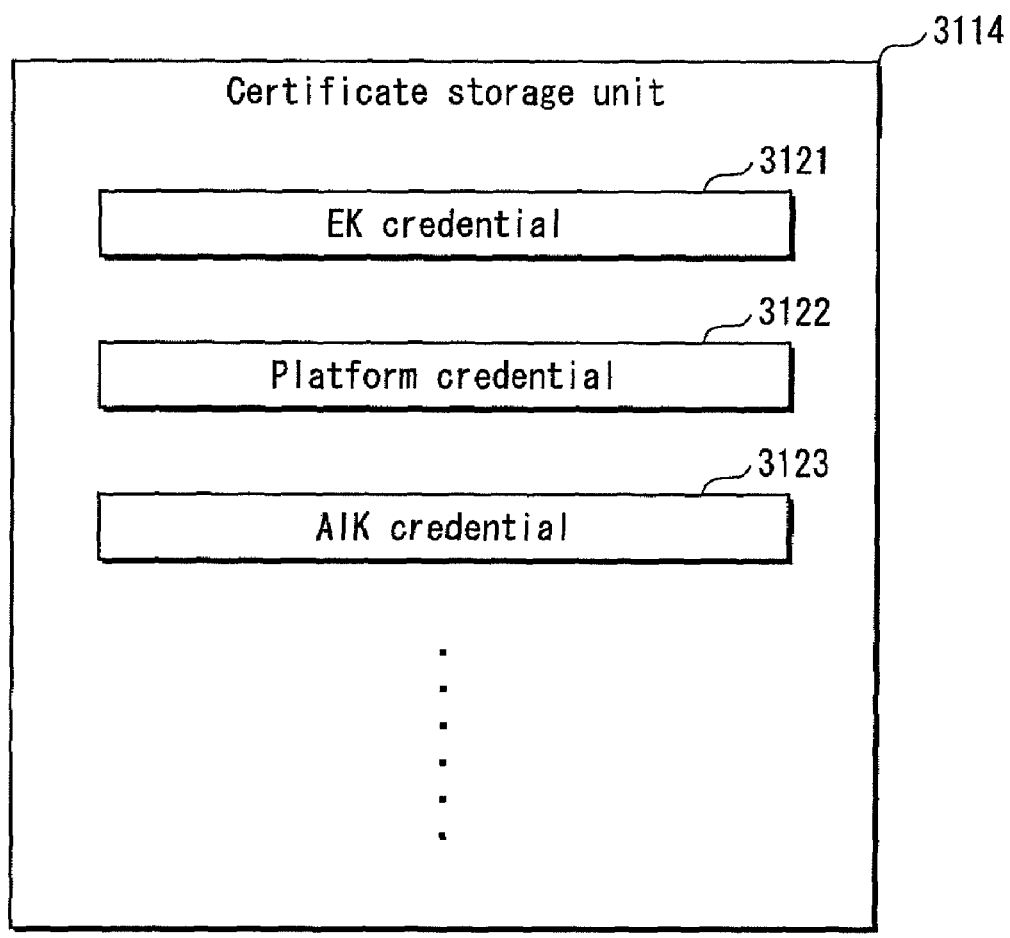
FIG. 33 shows an example of information stored in the certificate storage unit 3114.

After the request is accepted, the control unit 3102 receives an encrypted AIK credential via the transmission/reception unit 3103. The encrypted AIK credential is generated by encrypting the AIK credential using the EK public key. The control unit 3102 generates an AIK credential by decrypting the received encrypted AIK credential using the EK private key. The control unit 3102 writes the generated AIK credential into the certificate storage unit 3114. FIG. 33 shows the certificate storage unit 3114 after an AIK credential 3123 is obtained and written therein.

Instead of the above-described structure where the control unit 3102 itself reads out the EK private key and decrypts the encrypted AIK credential, the control unit 3102 may output the encrypted AIK credential to the TPM control unit in the TPM 3117 and may request it to decrypt the encrypted AIK credential. With this structure, the EK private key is not output outside the TPM chip, and thus the safety increases.

When the terminal device 3001 is booted in the state where the AIK credential has been obtained, the control unit 3102 sends a boot notification indicating that the own device has been booted, to the CA server device 3002 via the transmission/reception unit 3103. The control unit 3102 then receives the operation permission notification or the operation inhibition notification from the CA server device 3002. After it receives the operation permission notification, the control unit 3102 continues to control the operation of each constituent element. After it receives the operation inhibition notification, the control unit 3102 displays, on the monitor, a warning screen notifying that the terminal device 3001 either has an unauthorized structure or operates in an unauthorized manner, and stops the operation of the terminal device 3001.

The control unit 3102 achieves its functions as the CPU 3141 operates in accordance with the computer program stored in the memory 3108, the secure ROM 3143, or the hard disk unit 3142.

(2-3) Transmission/Reception Unit 3103

The transmission/reception unit 3103 performs transmission/reception of various types of information between an external machine connected with the Internet 3005, and each functional unit in the terminal device 3001. In the present example, the external machine is the CA server device 3002. When actually a communication is to be performed between devices, a disposable key (session key) is generated, data is encrypted using the generated session key, and the transmission/reception is performed safely. This can be achieved by a known technology, and is not directly related to the present invention. Thus, description of the encryption/decryption process using a session key during a communication will be omitted in the following description.

(2-4) Program Storage Unit 3106

The program storage unit 3106 is specifically achieved by the hard disk unit 3142 and stores various types of programs such as the OS (Operating System). Some functional units are achieves as such programs are loaded into the memory 3108 and executed.

(2-5) Memory 3108

The memory 3108 is mainly composed of the RAM 3145, and includes the secure ROM 3143 and a part of the hard disk unit 3142. The memory 3108 loads the various types of programs to be executed by the CPU 3141, from the program storage unit 3106 and the like, and stores the programs in the executable state.

(2-6) BIOS 3109

The BIOS 3109 is a kind of IPL. More specifically, the BIOS 3109 is a program stored in the secure ROM 3143. The BIOS 3109 is program that is loaded into the memory 3108 and executed first when the terminal device 3001 is booted.

(2-7) RTM 3107

The RTM 3107, before a program is newly loaded into the memory 3108 and executed, measures the integrity value of the new program and outputs the measured integrity value and an identifier of the new program to the PCR value calculating unit 3113. In the present example, the hash value of the measurement target program code is used as the integrity value. Also, the SHA-1 is used as the hash value function.

The RTM 3107 is a functional unit that is achieved as the CPU 3141 executes the CRTM 3163 contained in the BIOS 3109, and the RTM code in each program that has been loaded in the memory 3108. With respect to the BIOS 3109 that is to be loaded and executed first, the CRTM 3163 contained in the program code storage unit 3156 measures the integrity value of the BIOS 3109 itself and outputs the measured value.

In the present embodiment, each program includes an RTM code. However, this is not indispensable according to the TCG standard. The CPU 3141 may execute the CRTM 3163 embedded in the BIOS 3109 so that the integrity value of a program that is to be newly loaded into the memory 3108 is measured.

(2-8) Certificate Storage Unit 3114

The certificate storage unit 3114 is specifically achieved by the hard disk unit 3142, and stores, for example, the EK (Endorsement Key) credential (certificate) 3121, PF credential 3122, and AIK (Attestation Identity Key) credential 3123, as shown in FIG. 33.

The EK credential 3121 is a certificate that is issued by the TPM manufacturer or the terminal device manufacturer, and certifies the authenticity of the EK public key. The EK public key and an EK private key 3126 which will be described later constitute a key pair corresponding to the RSA encryption. The EK private key 3126 and the EK public key constitute a key pair corresponding to the TPM chip, where the EK credential 3121 is generated during the manufacturing process of the terminal device 3001 by the TPM manufacturer or the terminal device manufacturer, and is written into the certificate storage unit 3114.

The PF credential 3122 is an attribute certificate which clearly indicates the structure of the platform (for example, the terminal device 3001 itself and a part of the terminal device 3001 in which the TPM chip is loaded) and the manufacturer, and indicates the characteristics of the platform. The PF credential 3122 also certifies that an authentic TPM is loaded in the platform. More specifically, in the case where the platform is the terminal device 3001 itself, the PF credential 3122 includes identification information indicating the manufacturer of the terminal device 3001, identification numbers of the loaded TPM and CPU, information indicating the type of the OS and the software configuration and the like. Also, in the case where the platform is the mother board, the PF credential 3122 includes identification information indicating the manufacturer of the mother board, machine type numbers of the TPM and CPU loaded on the mother board, the type of the OS and the like. The PF credential 3122 is issued by the platform manufacturer, and is written into the certificate storage unit 3114 in the process of manufacturing the terminal device 3001.

Each credential is written in, for example, the X.509 format, and includes identification number for uniquely identifying the credential, name of the issuer, expiring time, signature data generated by using private key (herein referred to as server private key) of the issuer (issuing device), information indicating the algorithm used in the generation of the signature data and the like.

In the present example, the certificate storage unit 3114 is composed of the hard disk unit 3142. However, the certificate storage unit 3114 may be implemented in the TPM 3117.

(2-9) Log Storage Unit 3116

The log storage unit 3116 is specifically composed of the hard disk unit 3142. The log storage unit 3116 stores a history of PCR values over a time period from the boot of the terminal device 3001 to the current time. Hereinafter, the history is referred to as log information. The log information at least includes the history of PCR values and identification information of programs that respectively correspond to the PCR values. The log information may include version information of programs and information indicating behavior of programs, as well. Note that the log information is called SML (Stored Measurement Log) in the TCG standard. In the following explanation and in the drawings, the log information is called SML as necessary.

In the present example, the log storage unit 3116 is achieved by the hard disk unit 3142. However, the log storage unit 3116 may be implemented in the TPM 3117.

(2-10) Key Storage Unit 3120

Figure 34:
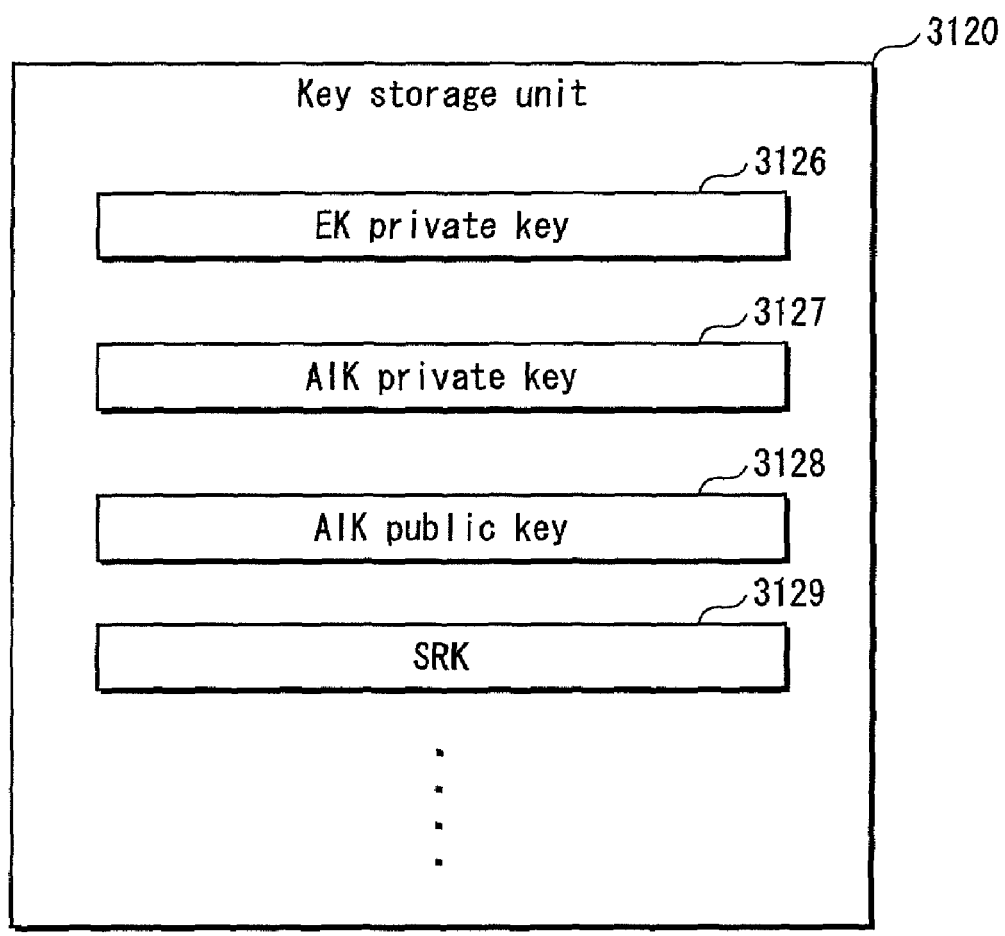
FIG. 34 shows an example of information stored in the key storage unit 3120.

The key storage unit 3120, as one example, stores the EK private key 3126, an AIK private key 3127, an AIK public key 3128, SRK 3129, . . . , as shown in FIG. 34. Note that, as indicated earlier in the description of the hardware structure, these keys are stored in a hierarchical structure, where the SRK 3129 is the root key. Here, description of the hierarchical structure is omitted for the sake of convenience.

The EK private key 3126 is a private key that makes a pair with the EK public key contained in the EK credential 3121, and is a key in the key pair that is used in the RSA encryption. Each of the EK private key 3126 and the EK public key uniquely corresponds to a different TPM chip. The EK private key 3126 and the EK credential 3121 are written by the manufacturer of the TPM or the terminal device 3001 before the shipment.

The AIK private key 3127 and the AIK public key 3128 make a key pair that is generated by the key generator 3154 in the TPM 3117 when or immediately after the terminal device 3001 is booted, where the key pair corresponds to the RSA encryption. The AIK public key 3128 is identical with the public key included in the AIK credential 3123, and thus is not necessarily written in the key storage unit 3120. Also, the timing when the AIK key pair is obtained is not limited to when or immediately after the terminal device 3001 is booted, but may be written in a manufacturing process.

Description of the SRK 3129 is omitted here since it has already been described.

Up to now, described is the key storage unit 3120 in the state after the AIK key pair is generated at the first booting and the AIK credential 3123 is obtained.

(2-11) PCR Value Storage Unit 3111

The PCR value storage unit 3111, which is achieved by the PCR 3146 in function, stores PCR0, PCR1, PCR2, . . . .

Each PCR value corresponds to the BIOS 3109 and each program stored in the program storage unit 3106. That is to say, each storage area shown in FIG. 30 corresponds to a different program. More specifically, the storage areas 3171, 3172, 3173, . . . respectively correspond to the BIOS 3109, the boot loader, the OS, . . . in the order of booting. Accordingly, PCR0 corresponds to the BIOS 3109, PCR1 corresponds to the boot loader, and PCR2 corresponds to the OS.

Note that the above-described correspondence between each PCR value and the programs is an example, and the present invention is not limited to this.

(2-12) TPM Control Unit 3118

The TPM control unit 3118 controls the operation of each functional unit in the TPM 3117. Although not illustrated, the TPM control unit 3118 outputs control signals to the units inside and outside the TPM.

More specifically, the TPM control unit 3118 receives a random number and the attestation (structure certificate) request from the CA server device 3002 via the transmission/reception unit 3103. Upon receiving the attestation request, the TPM control unit 3118 outputs the received random number to the measured value notifying unit 3104 (which will be described later). Next, the TPM control unit 3118 reads out the log information from the log storage unit 3116, and reads out the AIK credential 3123 from the certificate storage unit 3114. Next, the TPM control unit 3118 transmits the signature data generated by the measured value notifying unit 3104, and the read-out AIK credential 3123 and log information to the CA server device 3002 via the transmission/reception unit 3103.

Also, the TPM control unit 3118 receives from the control unit 3102 a notification that the AIK credential has not been obtained, when the terminal device 3001 is booted for the first time or immediately after the initialization thereof. Upon receiving the notification, the TPM control unit 3118 generates an AIK key pair, and writes the generated AIK key pair into the key storage unit 3120. The TPM control unit 3118 then outputs the generated AIK public key to the control unit 3102.

The function of the TPM control unit 3118 is achieved as the execution engine 3148 operates in accordance with the program stored in the program code storage unit 3156 and controls each calculator to operate.

(2-13) PCR Value Calculating Unit 3113

The PCR value calculating unit 3113 receives, from the RTM 3107, an identifier and an integrity value (hash value) of a program that is to be newly loaded into the memory 3108.

Upon receiving these, the PCR value calculating unit 3113 reads out a PCR value from an area in the PCR value storage unit 3111 immediately before an area in which a PCR value corresponding to the received identifier is stored. Next, the PCR value calculating unit 3113 concatenates the read-out PCR value with the received integrity value, and substitutes the result into a hash function. The PCR value calculating unit 3113 writes, as a PCR value, a hash value calculated out from this into an area in the PCR value storage unit 3111 that corresponds to the received identifier.

When PCR0 corresponding to the BIOS 3109 is to be calculated, the received integrity value is substituted into the hash function because the storage area 3171 is the starting storage area. Alternatively, a result value of concatenating a predetermined initial value with the integrity value of the CRTM 3163 may be substituted into the hash function to obtain a hash value.

In the TCG standard, a process of obtaining a PCR value by performing a calculation onto a measured integrity value is called the extend process.

The following is a description using an example.

The BIOS, boot loader, and OS respectively correspond to PCR0, PCR1, and PCR2. The programs are loaded into the memory 3108 and executed in the order of BIOS, boot loader, OS, device driver, . . . . When the OS is loaded into the memory 3108, the PCR value calculating unit 3113 receives, from the RTM 3107, an identifier of the OS and an integrity value measured from the OS. Upon receiving these, the PCR value calculating unit 3113 reads out PCR1 based on the received identifier, concatenates the read-out PCR1 with the received integrity value, and substitutes the result into a hash function (extend process).

Next, the PCR value calculating unit 3113 writes a hash value (PCR2) calculated out from this into a predetermined storage area 3173.

Note that there may be a case where the terminal device 3001 includes a plurality of applications, and the order of loading the applications has not been determined, but is to be determined by the operation of the user. In such a case, for example, PCR3 corresponding to the OS is used to expand the integrity value measured from the application to be loaded, and the PCR values corresponding to the application are calculated.

Note that the function of the PCR value calculating unit 3113 is specifically achieved as the execution engine 3148 operates in accordance with the program stored in the program code storage unit 3156 and controls each calculator to operate.

(2-14) Log Obtaining Unit 3112

The log obtaining unit 3112 monitors the PCR values stored in the PCR value storage unit 3111. When any PCR value changes, the log obtaining unit 3112 reads out the PCR values from the PCR value storage unit 3111, and writes the read-out PCR values into the log storage unit 3116. The log obtaining unit 3112 also monitors the contents of the memory 3108, generates information indicating the operation state of the programs, and writes the generated information into the log storage unit 3116.

The function of the log obtaining unit 3112 is achieved as the execution engine 3148 operates in accordance with the program stored in the program code storage unit 3156 and controls each calculator to operate.

(2-15) Measured Value Notifying Unit 3104

The measured value notifying unit 3104 receives a random number (nonce) from the CA server device 3002 via the Internet 3005 and the transmission/reception unit 3103.

Upon receiving the random number, the measured value notifying unit 3104 reads out the AIK private key from the key storage unit 3120, and reads out the PCR values from the PCR value storage unit 3111. Next, the measured value notifying unit 3104 generates signature data by applying a signature generation algorithm to the received random number and the PCR values using the read-out AIK private key. In the present example, the RSA encryption is used as the signature generation algorithm. However, not limited to this, other algorithms may be used.

Next, under the control of the TPM control unit 3118, the measured value notifying unit 3104 transmits the generated signature data to the CA server device 3002 via the transmission/reception unit 3103.

The function of the measured value notifying unit 3104 is achieved as the execution engine 3148 operates in accordance with the program stored in the program code storage unit 3156 and controls each calculator to operate.

(2-16) Verifying Unit 3119

The verifying unit 3119 is a functional unit that, when the terminal device 3001, as the verifying device, performs the attestation process with another machine, verifies the authenticity of said another machine. The specific structure thereof is the same as the verifying unit 3013 (which will be described later) of the CA server device 3002, and thus detailed description thereof is omitted. Note that, although the verifying unit 3013 includes therein a random number generating unit 3012, the verifying unit 3119 may include therein a random number generating unit, or the TPM chip may generate a random number upon receiving a request therefor. Also, since the verifying unit 3013 performs the verification using various types of information stored in the verification data storage unit 3018, the verifying unit 3119 requires similar information (verification data). It is presumed here that this information is not shown in the functional block diagram of FIG. 32, but that verification data similar to this is stored in the hard disk unit 3142.

1.3 Structure of CA Server Device 3002

The CA server device 3002, as shown in FIG. 28, is a device that is held by a privacy CA that is a fair third party organization.

The CA server device 3002, as shown in FIG. 32, is composed of a transmission/reception unit 3015, a control unit 3011, a verifying unit 3013, and a verification data storage unit 3018. Further, the verifying unit 3013 includes a random number generating unit 3012, a certificate verifying unit 3014, a signature verifying unit 3016, and a log verifying unit 3017. Also, although not illustrated, it includes an input unit for receiving data or instruction input by the operator, and a display unit for displaying various types of information.

The CA server device 3002 is specifically a computer system that includes a microprocessor, RAM, and ROM. A computer program is stored in the RAM or the ROM. The microprocessor operates in accordance with the computer program and causes the CA server device 3002 to achieve a part of the functions.

(1) Transmission/Reception Unit 3015

The transmission/reception unit 3015 has an interface that is connectable with the Internet 3005. The transmission/reception unit 3015, under the control of the control unit 3011, performs transmission/reception of data with various functional units and external machines that are connected therewith via the Internet 3005.

(2) Verification Data Storage Unit 3018

The verification data storage unit 3018 stores verification data that is used in the attestation process performed by the verifying unit 3013. FIG. 32 shows one example where it stores a server public key 3021, a random number 3022, authentic PCR values 3023, and authentic log information 3024.

The server public key 3021 is a key corresponding to the server private key. Both keys correspond to the RSA encryption.

The random number 3022 is a pseudo-random number generated by the random number generating unit 3012 during the attestation process.

The authentic PCR values 3023 include PCR values that are calculated when the terminal device 3001 operates normally.

The authentic log information 3024 is log information that should be generated when the terminal device 3001 (requesting device) operates normally. The authentic log information 3024 includes at least a history of the PCR values in the case where the requesting device operates normally.

(3) Control Unit 3011

The control unit 3011 controls the operation of each constitutional element of the CA server device 3002.

The control unit 3011 receives a boot notification from the terminal device 3001 via the Internet 3005 and the transmission/reception unit 3015.

The control unit 3011 also receives an ID of an AIK key pair, an AIK public key, an EK credential, a PF credential, and an AIK credential issuance request, from the terminal device 3001 via the Internet 3005 and the transmission/reception unit 3015.

(3-1) Attestation Control

Upon receiving the boot notification, the control unit 3011 instructs the verifying unit 3013 to start an attestation with the terminal device 3001.

The control unit 3011 then receives a notification of the result of the attestation from the verifying unit 3013. When the control unit 3011 receives an attestation result notification that the terminal device 3001 is authentic, the control unit 3011 transmits an operation permission notification to the terminal device 3001 via the transmission/reception unit 3015.

When the control unit 3011 receives an attestation result notification that the terminal device 3001 is not authentic, the control unit 3011 transmits an operation prohibition notification to the terminal device 3001 via the transmission/reception unit 3015.

(3-2) Issuance of AIK Credential

Upon receiving the AIK credential issuance request, the control unit 3011 transmits received EK credential and PF credential respectively to the issuers thereof, and inquires the issuers whether the credentials are valid. In this example, the control unit 3011 transmits an EK credential to the TPM server device 3003 shown in FIG. 28, and transmits a PF credential to the terminal server device 3004.

When it is confirmed as a result of the inquiry that both the EK credential and PF credential are valid, the control unit 3011 generates an AIK credential. The AIK credential generated here includes signature data that is generated by using a private key of the AC server device (herein after referred to as server private key) and applying a signature generation algorithm at least to an AIK public key.

Next, the control unit 3011 generates an encrypted AIK credential by encrypting the generated AIK credential using the EK public key included in the EK credential. The control unit 3011 then transmits the generated encrypted AIK credential to the terminal device 3001.

When it is confirmed as a result of the inquiry that at least one of the credentials received from the terminal device 3001 is invalid, the control unit 3011 transmits an issuance-unavailable notification indicating that an AIK credential cannot be issued.

(4) Verifying Unit 3013

The verifying unit 3013 is, as shown in FIG. 32, composed of a random number generating unit 3012, a certificate verifying unit 3014, a signature verifying unit 3016, and a log verifying unit 3017.

(4-1) Random Number Generating Unit 3012

The random number generating unit 3012 is equipped with a pseudo-random number generation engine and, upon receiving an attestation start instruction from the control unit 3011, generates a random number.

Next, the random number generating unit 3012 writes the generated random number into the verification data storage unit 3018, and transmits the generated random number and an attestation request via the transmission/reception unit 3015.

(4-2) Certificate Verifying Unit 3014

The certificate verifying unit 3014 receives an AIK certificate, signature data and log information from the terminal device 3001 within a predetermined time period after the random number generating unit 3012 transmits the attestation request.

The CA server device 3002 is connected with an external storage 3026 that stores an AIK credential CRL indicating an invalid AIK credential.

The certificate verifying unit 3014 verifies whether the received AIK certificate is registered in the AIK credential CRL.

When it is found that the received AIK certificate is not registered in the AIK credential CRL, the certificate verifying unit 3014 reads out a server public key from the verification data storage unit 3018, and verifies signature data included in the received AIK credential, using the read-out server public key. When the authenticity of the AIK credential is certified as a result of the verification, the certificate verifying unit 3014 outputs the received signature data and log information and the AIK public key included in the AIK credential, to the signature verifying unit 3016.

When it is found that the received AIK credential is registered in the AIK credential CRL, or when the authenticity of the AIK credential is not certified as a result of the verification of the signature data included in the AIK credential, the certificate verifying unit 3014 outputs a verification result indicating that the terminal device 3001 is not authentic, to the control unit 3011.

(4-3) Signature Verifying Unit 3016

The signature verifying unit 3016 receives signature data, log information and AIK public key from the certificate verifying unit 3014. Upon receiving these, the signature verifying unit 3016 generates a random number and PCR values by using the received AIK public key and applying the signature verification algorithm to the signature data. The random number and PCR values generated here are respectively called a certification-purpose random number and certification-purpose PCR values. Note that the signature verification algorithm is based on the RSA encryption.

The signature verifying unit 3016 reads out the random number 3022 and the authentic PCR values 3023 from the verification data storage unit 3018. The signature verifying unit 3016 then compares the certification-purpose random number with the read-out random number 3022. When they match each other, the signature verifying unit 3016 then compares the generated certification-purpose PCR values with the authentic PCR values 3023. When all the certification-purpose PCR values match the authentic PCR values, the signature verifying unit 3016 outputs the received log information to the log verifying unit 3017.

When the generated certification-purpose random number do not match the read-out random number 3022, or when there is at least one pair of a certification-purpose PCR value and an authentic PCR value that do not match, the signature verifying unit 3016 outputs a verification result indicating that the terminal device 3001 is not authentic, to the control unit 3011.

(4-4) Log Verifying Unit 3017

The log verifying unit 3017 receives the received log information from the signature verifying unit 3016. Upon receiving the log information, the log verifying unit 3017 reads out the authentic log information 3024 from the verification data storage unit 3018, and compares the received log information with the read-out authentic log information 3024.

When the comparison result shows that the two pieces of log information match each other, the log verifying unit 3017 outputs a verification result indicating that the terminal device 3001 is authentic, to the control unit 3011.

When the comparison result shows that the two pieces of log information do not match each other, the log verifying unit 3017 outputs a verification result indicating that the terminal device 3001 is not authentic, to the control unit 3011.

1.4 TPM Server Device 3003

The TPM server device 3003 is a device held by the TPM vendor, and manages EK key pairs unique to the TPM chips, and EK credentials certifying the EK public keys.

The TPM server device 3003 is connected with an external storage that stores an EK credential CRL indicating an invalid EK credential, and receives an inquiry on whether an EK credential is valid, from the CA server device 3002.

1.5 Terminal Server Device 3004

The terminal server device 3004 is a device held by the terminal server vendor, and manages a PF credential unique to the terminal device (or to the platform in the device).

The terminal server device 3004 is connected with an external storage that stores a PF credential CRL indicating an invalid PF credential, and receives an inquiry on whether a PF credential is valid, from the CA server device 3002.

1.6 Operation

The following will describe the operation of each device with reference to the flowcharts.

(1) Operation in the Attestation Process

Figure 35:
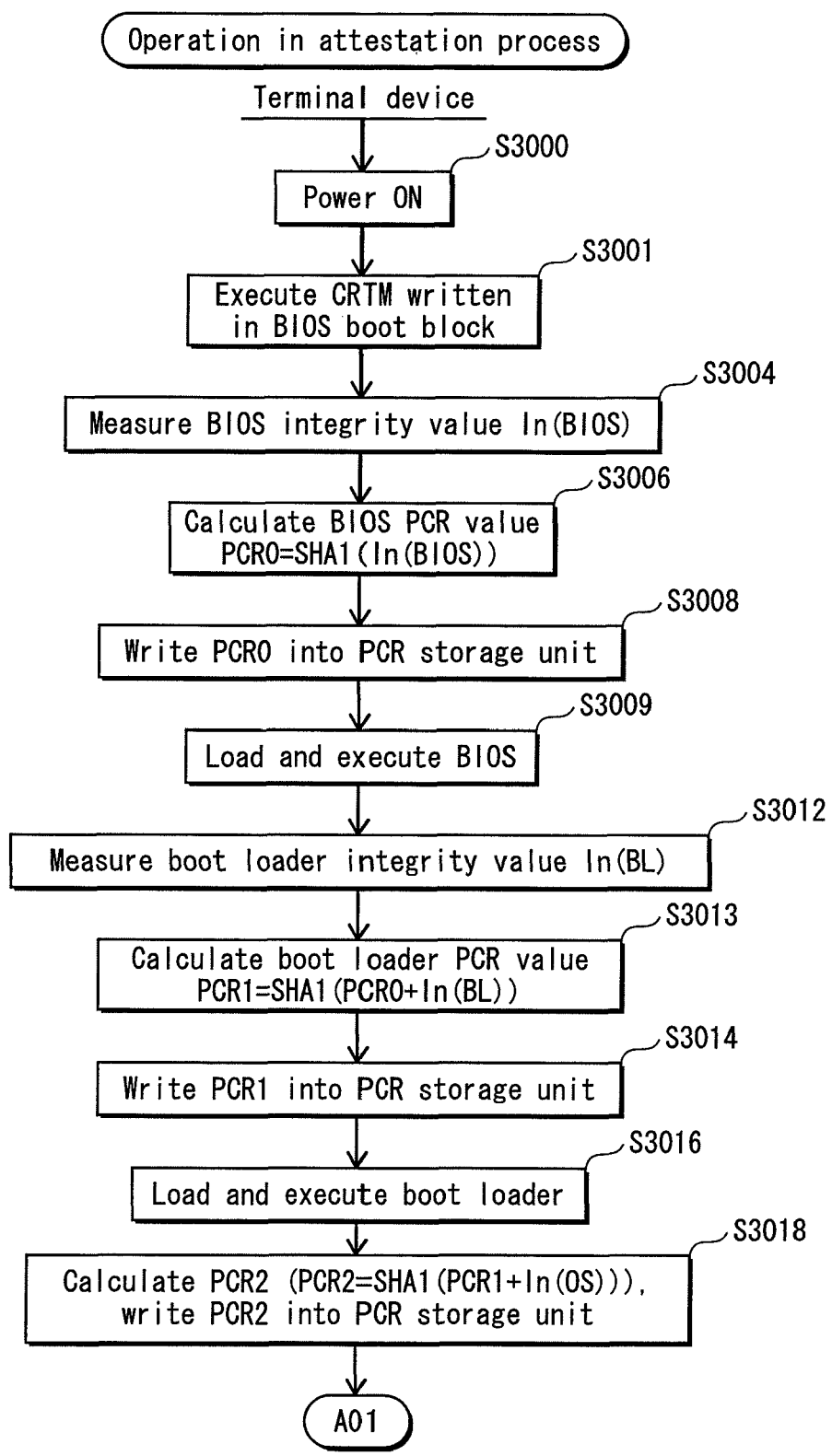
FIG. 35 is a flowchart showing the operation of the terminal device 3001 (requesting device) and the CA server device 3002 (verifying device) in the attestation process.
Figure 36:
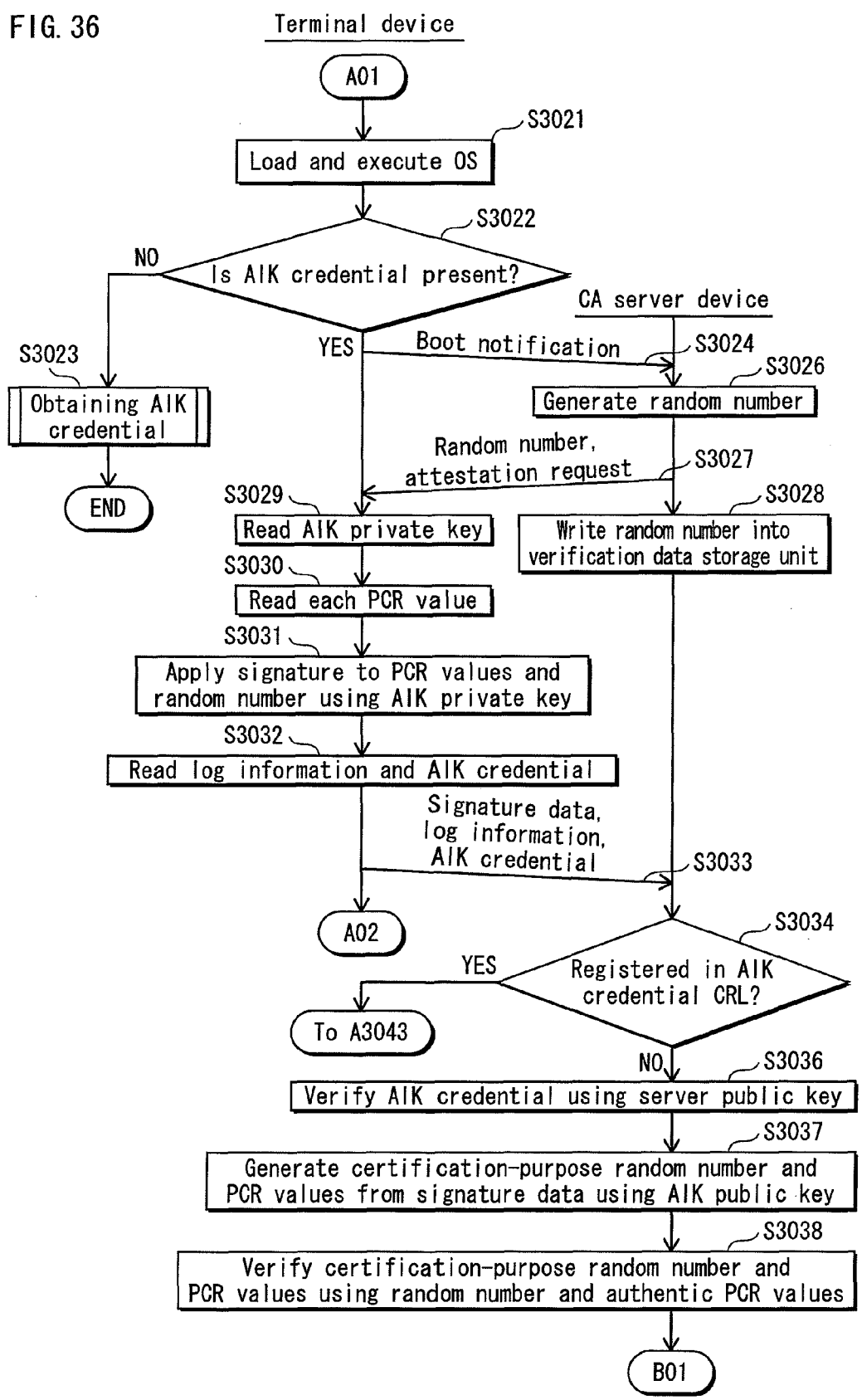
FIG. 36 is a flowchart showing the operation of the terminal device 3001 (requesting device) and the CA server device 3002 (verifying device) in the attestation process.
Figure 37:
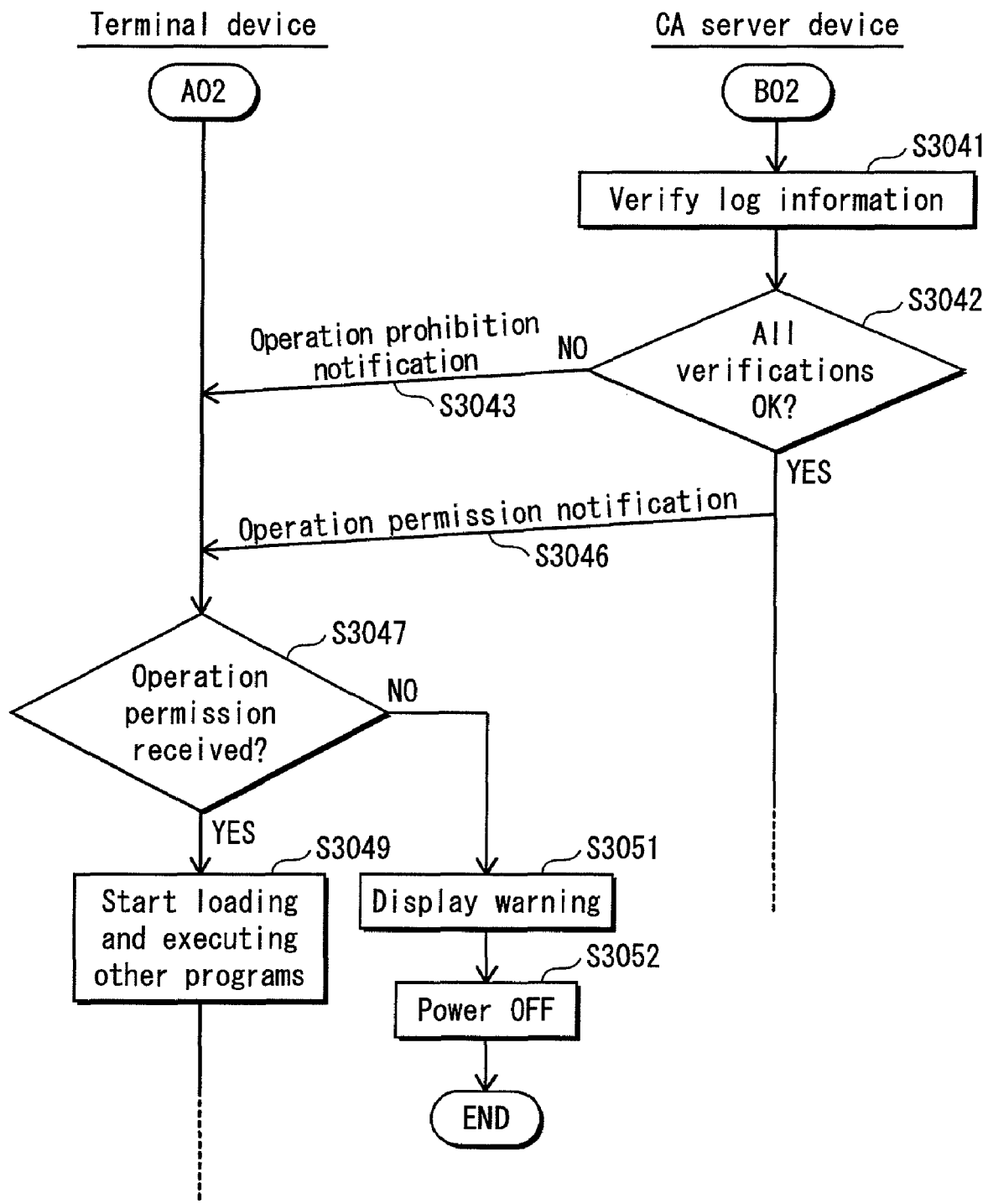
FIG. 37 is a flowchart showing the operation of the terminal device 3001 (requesting device) and the CA server device 3002 (verifying device) in the attestation process.

FIGS. 35 through 37 are flowcharts showing the operation of each machine in the attestation process. In the following, the operation of each machine in the attestation process will be described with reference to FIGS. 35 through 37. Hereinafter, an integrity value of program A is represented as "In(A)", for the sake of convenience. The steps that are commonly included in the data flow of FIG. 32 and the flowcharts shown in FIG. 35 through 37 are assigned with the same step numbers.

When the terminal device 3001 is powered on (step S3000) the CRTM 3163 written in the boot block 3165 of the BIOS 3109 is executed (step S3001), and as a result of this, integrity value In(BIOS) of the BIOS is measured (step S3004). The RTM 3107 achieved by the CRTM and the RTM code outputs the measured integrity value In(BIOS) and an identifier of the BIOS to the PCR value calculating unit 3113.

The PCR value calculating unit 3113 receives the integrity value In(BIOS), and calculates PCR0 corresponding to the BIOS using the following expression (step S3006):

$$PCR0 = SHA1(In(BIOS))$$

The PCR value calculating unit 3113 then writes the calculated PCR0 into the PCR storage unit 3111 (step S3008).

After the PCR value of the BIOS is stored, the BIOS is loaded into the memory 3108 and executed (step S3009).

When it becomes necessary to read the boot loader into the memory 3108 during the execution of the BIOS, the RTM3107 measures the integrity value In(BL) of the boot loader, and outputs the measured integrity value to the PCR value calculating unit 3113 (step S3012).

The PCR value calculating unit 3113 receives the integrity value In(BL), and calculates the PCR value of the boot loader using the following expression (step S3013):

$$PCR1 = SHA1(PCR0 + In(BL))$$

Note that the sign "+" in the above expression means a concatenation.

The PCR value calculating unit 3113 writes the calculated PCR1 into the PCR value storage unit 3111 (step S3014).

After the PCR1 is written into the PCR value storage unit 3111, the boot loader is loaded into the memory 3108 and executed (step S3016).

Similarly, the RTM 3107 and the PCR value calculating unit 3113 calculate a PCR value corresponding to the OS (PCR2=SHA1(PCR1+In(OS))), and write the calculated PCR2 into the PCR value storage unit 3111 (step S3018).

Note that the sign "+" in the above expression means a concatenation.

After the PCR2 is written into the PCR value storage unit 3111, the OS is loaded into the memory 3108 and executed (step S3021).

Here, when the terminal device 3001 has already obtained the AIK credential (YES in step S3022), the control unit 3102 transmits the boot notification indicating that the terminal device 3001 has booted, to the CA server device 3002 (step S3024).

When the AIK credential has not been obtained (NO in step S3022), the control unit 3102 moves to step S3023.

The control unit 3011 of the CA server device 3002 receives the boot notification from the terminal device 3001 (step S3024). Upon receiving the boot notification, the control unit 3011 instructs the verifying unit 3013 to start the attestation.

Upon being instructed to start the attestation, the random number generating unit 3012 provided in the verifying unit 3013 generates a random number (step S3026). The random number generating unit 3012 then transmits the generated random number and the attestation request to the terminal device 3001 (step S3027), and writes the generated random number into the verification data storage unit 3018 (step S3028).

The TPM control unit 3118 of the terminal device 3001 receives the random number and the attestation request (step S3027), and outputs the received random number to the measured value notifying unit 3104.

Upon receiving the random number, the measured value notifying unit 3104 reads out the AIK private key 3127 from the key storage unit 3120 (step S3029). The measured value notifying unit 3104 then reads out each PCR value from the PCR value storage unit 3111 (step S3030). The measured value notifying unit 3104 then generates signature data by using the read-out private key and applying a signature generation algorithm to the received random number and to the read-out PCR values (step S3031).

The TPM control unit 3118 reads out the AIK credential 3123 from the certificate storage unit 3114, and reads out the log information from the log storage unit 3116 (step S3032).

The TPM control unit 3118 then transmits the signature data generated by the measured value notifying unit 3104, and the read-out AIK credential and log information to the CA server device 3002 (step S3033).

The certificate verifying unit 3014 provided in the CA server device 3002 receives the signature data, AIK credential and log information from the terminal device 3001 (step S3033), and then confirms whether the received AIK credential is registered in the AIK credential CRL, and when it confirms that the received AIK certificate is registered in the AIK credential CRL (YES in step S3034), the control moves to step S3041.

When it finds that the received AIK certificate is not registered in the AIK credential CRL (NO in step S3034), the certificate verifying unit 3014 verifies the AIK credential using the server public key 3021 stored in the verification data storage unit 3018 (step S3036).

The signature verifying unit 3016 generates a certification-purpose random number and certification-purpose PCR values by using the AIK public key included in the received AIK credential and applying a signature verification algorithm to the received signature data (step S3037). The signature verifying unit 3016 then verifies the certification-purpose random number and certification-purpose PCR values based on the random number 3022 and the authentic PCR values 3023 stored in the verification data storage unit 3018 (step S3038).

The log verifying unit 3017 verifies the received log information based on the random number 3022 stored in the verification data storage unit 3018 (step S3041). When any of the verifications performed in steps S3036 through S3041 results in a failure (NO in step S3042), the control unit 3011 transmits an operation prohibition notification to the terminal device 3001 (step S3043). When all the verifications result in successes (YES in step S3042), the control unit 3011 transmits an operation permission notification to the terminal device 3001 (step S3046).

The terminal device 3001 receives the operation prohibition notification or the operation permission notification from the CA server device 3002.

When it has received the operation permission notification (YES in step S3047), the control unit 3102 executes the program having been loaded in the memory, and loads other programs into the memory as necessary and executes them (step S3049).

When it has received the operation prohibition notification (NO in step S3047), the control unit 3102 displays a warning screen indicating that the structure of the terminal device 3001 is not authentic, stops the operation of the terminal device 3001, and powers it off (step S3052).

(2) Operation of Obtaining AIK Credential

Figure 38:
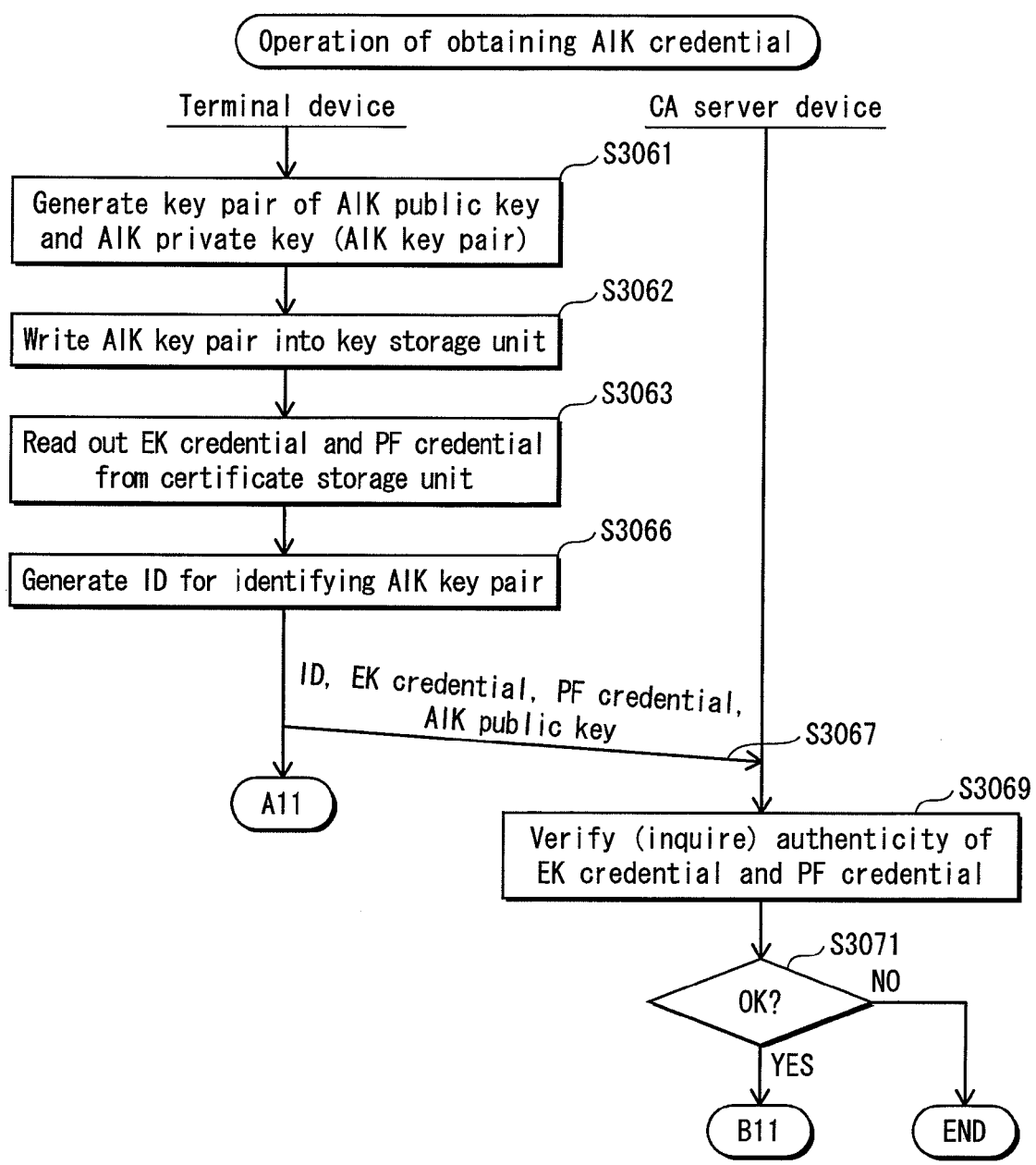
FIG. 38 is a flowchart showing the operation of the terminal device 3001 and the CA server device 3002 in the AIK credential obtaining process.
Figure 39:
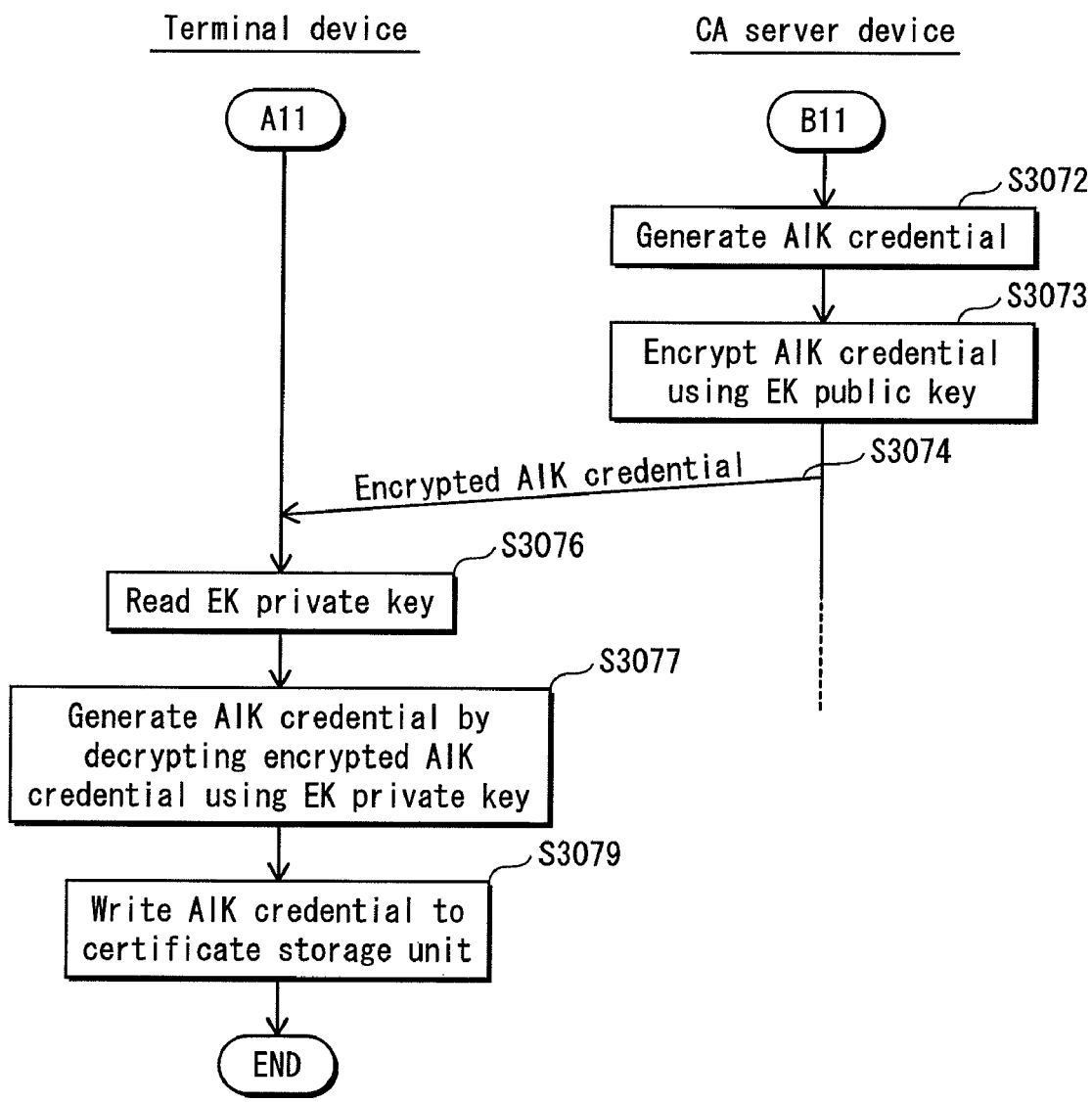
FIG. 39 is a flowchart showing the operation of the terminal device 3001 and the CA server device 3002 in the AIK credential obtaining process.

The terminal device 3001 before it is booted does not hold the AIK credential, and obtains the AIK credential from the CA server device 3002 when it is booted for the first time. FIGS. 38 and 39 are flowcharts showing the operation of each machine in obtaining the AIK credential. These flowcharts show details of step S3023 shown in FIG. 36.

The following shows the operation of obtaining the AIK credential with reference to FIGS. 38 and 39.

First, the TPM control unit 3118 generates a new AIK key pair based on the RSA encryption (step S3061), writes the generated AIK key pair into the key storage unit 3120 (step S3062), and then outputs the generated AIK public key to the control unit 3102.

The control unit 3102 reads out the EK credential 3121 and the PF credential 3122 from the certificate storage unit 3114 (step S3063), and then generates an ID of the newly generated AIK key pair (step S3066).

Next, the control unit 3102 transmits the ID, EK credential, PF credential, and AIK public key to the CA server device 3002, and requests issuance of an AIK credential (step S3067).

The control unit 3011 provided in the CA server device 3002 receives the ID, EK credential, PF credential, AIK public key, and AIK credential issuance request from the terminal device 3001 (step S3067).

Upon receiving these, the control unit 3011 respectively inquires the TPM server device 3003 and the terminal server device 3004 whether the EK credential and the PF credential are authentic (step S3069).

When it is confirmed as a result of the inquiry that at least one of the EK credential and the PF credential is not authentic (NO in step S3071), the control unit 3011 ends the process concerning the issuance of the AIK credential.

When it is confirmed as a result of the inquiry that both the EK credential and PF credential are authentic (YES in step S3071), the control unit 3011 generates an AIK credential that includes the received ID and AIK public key (step S3072), and encrypts the generated AIK credential using the EK public key included in the generated AIK credential (step S3073).

Next, the control unit 3011 transmits the generated encrypted AIK credential to the terminal device 3001 (step S3074)

The control unit 3102 provided in the terminal device 3001, upon receiving the encrypted AIK credential from the CA server device 3002 (step S3074), reads out the EK private key 3126 from the key storage unit 3120 (step S3076), and generates an AIK credential by decrypting the encrypted AIK credential using the read-out EK private key (step S3077).

Next, the control unit 3102 writes the generated AIK credential to the certificate storage unit 3114 (step S3079).

1.7 Modifications of Embodiment 1

(1) Obtaining Update Program

In the above-described Embodiment 1, when the attestation results in a failure, the CA server device 3002 transmits an operation prohibition notification, and upon receiving this notification, the terminal device 3001 stops the operation and is powered off. However, not limited to this, the terminal device 3001 may be booted, with part of its functions being restricted.

Alternatively, as is the case with the above-described embodiment and modifications, the CA server device 3002 may transmit an update program for updating each program to a newest version, and the terminal device 3001 may update each program to a newest version by using the received update program.

After the update, the terminal device 3001 is rebooted and performs the attestation again.

(2) Timing of Attestation

In the above-described Embodiment 1, when the OS has been loaded into a memory and can be executed, a boot notification is transmitted and the attestation is started. However, this is merely an example, but other timings may be applied.

For example, it may immediately after the device driver and applications are loaded in succession to the OS, or it may be immediately after the boot loader is loaded.

(3) Specifying Specific PCR Value

In the above-described Embodiment 1, the measured value notifying unit 3104 reads out all PCR values, applies a signature to the read-out PCR values, and transmits the PCR values. However, the present invention is not limited to this structure.

More specifically, the CA server device 3002 may transmit identification information indicating any one PCR value (or a plurality of PCR values), together with the random number.

The measured value notifying unit 3104 reads out only the PCR value indicated by the identification information, applies a signature to the read-out PCR value and the received random number, and transmits them.

In this connection, the TPM control unit 3118 extracts only a piece of log information that corresponds to the PCR value of the received identification information, and transmits the extracted piece of log information.

With this structure, it is possible to reduce the amount of data that is transmitted/received between machines.

(4) Structure for Achieving RTM Function

In the above-described Embodiment 1, the BIOS includes the CRTM in the boot block, each program includes the RTM code, and the function of the RTM is realized as the CPU executes the CRTM and the RTM code of each program. However, the present invention is not limited to this structure.

One example of modification is presented in the following.

The terminal device stores the BIOS that includes the CRTM in the boot block. In addition to this, the terminal device stores RTM (this is software. Hereinafter, this RTM will be referred to as RTM program so as to be distinguished from the RTM being a functional unit) and a measurement agent.

The CRTM includes a procedure of measuring the integrity value of the RTM.

The RTM program includes a procedure of measuring the integrity value of the specified program.

The measurement agent is called by various programs, and is a program that includes a procedure of requesting the RTM program to measure the integrity value.

The BIOS, loader, OS, and other programs include a code for calling the measurement agent, and notifying the measurement agent of a program that is to be called next thereby.

With the above-described structure, before calling another program, each program calls the measurement agent and notifies the measurement agent of said another program that is to be called next. The measurement agent then calls the RTM program and requests it to measure the integrity value of the notified program. Upon receiving this request, the RTM program calculates the integrity value of the notified program.

The function of the RTM may be realized by the above-described mechanism.

2. Embodiment 2

2.1 Outline

Figure 40:
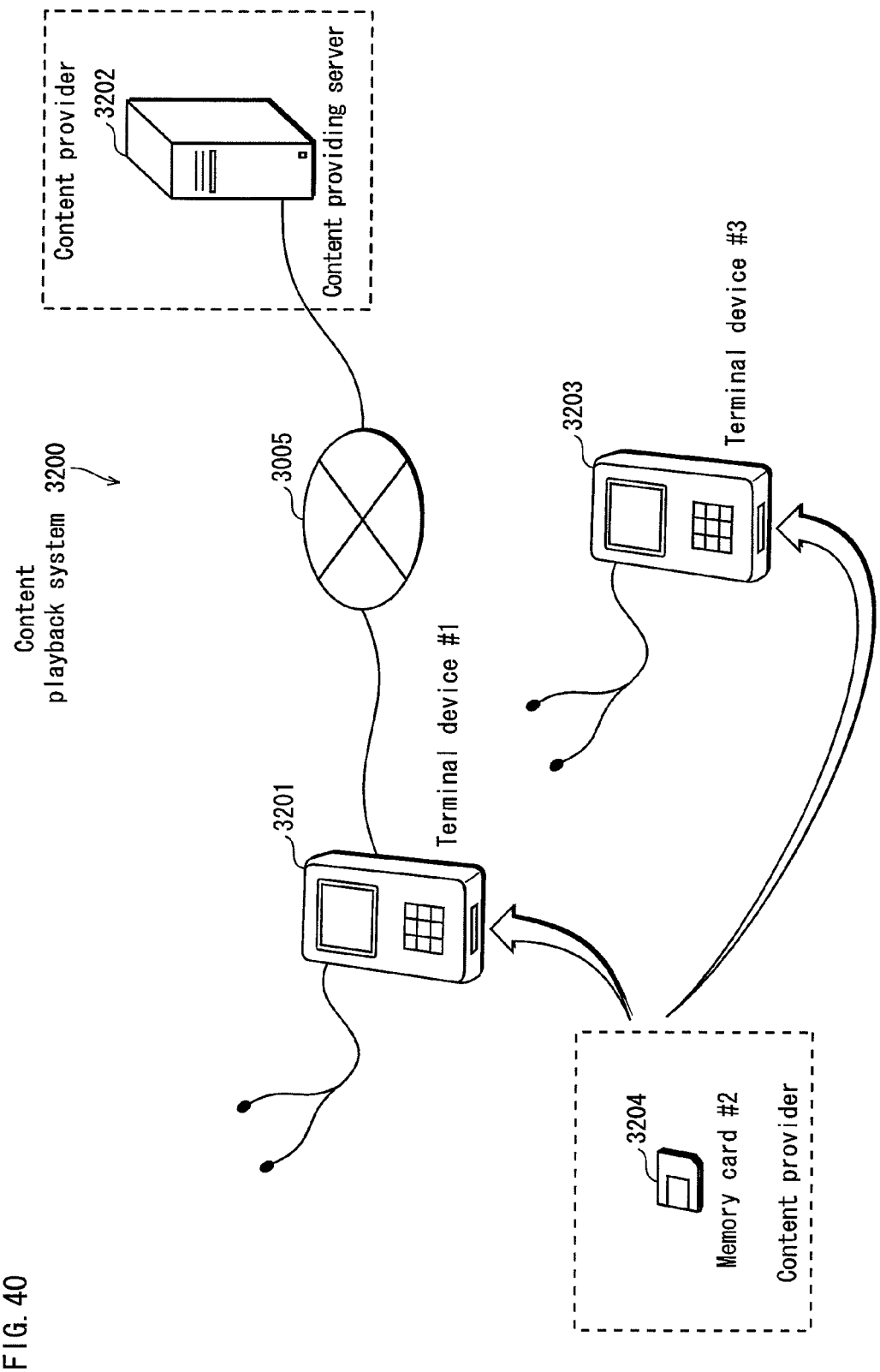
FIG. 40 shows the structure of Embodiment 2 in the other embodiments.

A content playback system in Embodiment 2 is, as shown in FIG. 40, composed of a content providing server 3202, a terminal device #1 (3201), and a terminal device #3 (3203). The content providing server 3202 and the terminal device #1 (3201) are connectable with the Internet 3005. The terminal device #3 (3203) does not have the Internet communication function.

A memory card #2 (3204) is attachable to the terminal device #1 (3201) and the terminal device #3 (3203), and has a content and a right to use the content (a key, an expiration time and the like).

The terminal device #1 (3201) and the terminal device #3 (3203) have a function to decrypt, decompress, and play back the content stored in the memory card #2 (3204). Prior to this, the terminal device and the memory card alternately function as the verifying device and the requesting device, and mutually perform the attestation process. After they mutually recognize the partners as authentic, the terminal device can obtain the content and the right information from the memory card #2 and can play back the content.

Also, the memory card #2 (3204), while it is attached to the terminal device #1 (3201), performs the process of purchasing a new content and right information from the content providing server 3202, using the communication function of the terminal device #1 (3201).

Meanwhile, the programs provided in the machines may be upgraded via the Internet, recording medium, or other machines.

In that case, the verification data to be used in the aforesaid attestation needs to be updated. The content providing server 3202 holds therein newest verification data to be used in the aforesaid attestation, as well as in the process concerning the selling of the content and right information.

The memory card #2 (3204), while it is attached to the terminal device #1 (3201), performs a communication with the content providing server 3202 using the communication function of the terminal device #1 (3201), and obtains a new content and a content use right (that includes a decryption key, an expiration time and the like). Prior to this, the memory card #2 (3204) obtains newest verification data to be used in the aforesaid attestation process, from the content providing server 3202. During this process, the memory card #2 (3204) obtains verification data to be used by the terminal devices #1 and #3, as well as the verification data to be used by the memory card #2 (3204) itself, and distributes the obtained verification data to the terminal devices when the memory card #2 (3204) is attached thereto.

2.1 Structure of Terminal Devices #1 and #3

The physical and functional structures of the terminal device #1 are substantially the same as those of the terminal device 3001 explained in Embodiment 1. Accordingly, only differences there between will be described here, with the details omitted.

The terminal device #1 differs from the terminal device 3001 in that it is provided with an input/output unit with which the memory card #2 can be attached, and that it stores a playback control program that includes a procedure for playing back the music data, as an application higher than the OS. Further, the terminal device #1 has a verification data storage unit that is achieved by the hard disk unit. The verification data storage unit stores information for verifying the authenticity of the memory card #2.

The terminal device 3001, after the OS is booted, performs the attestation process with the external CA server device 3002, and obtains the AIK certificate from the CA server device 3002. However, in the present embodiment, these are not indispensable, but, instead, an AIK key pair and an AIK certificate may be recorded when the terminal device #1 (3201) is manufactured.

The terminal device #1 loads the BIOS through the playback control program into the memory in order, after it is powered ON. After the playback control program is loaded, first, the terminal device #1 and the memory card #2 being attached to the device each transmit the own machine ID to the other machine. The terminal device #1 then becomes the verifying device and performs the first attestation process with the memory card #2.

When the first attestation results in a success, the terminal device #1 becomes the requesting device and performs the second attestation process. When the two attestation processes prove that both machines are authentic, the terminal device #1 executes the playback control program. This enables the music to be played back in accordance with the operation of the user.

Upon receiving a user operation requesting to purchase a new content, the terminal device #1 outputs the purchase request to the memory card #2, and provides the communication function in, for example, the content purchase process executed by the DRM (Digital Rights Management) application (which will be described later).

Also, the terminal device #1, upon receiving the newest verification data from the memory card #2, rewrites the verification data stored in the verification data storage unit, with the received newest verification data.

The terminal device #3 has almost the same structure as the terminal device #1 except that it does not have a transmission/reception unit connectable with the Internet 3005.

Also, after the memory card #2 is attached to the terminal device #3, they each transmit the own machine ID to the other machine. The terminal device #3 then receives the newest verification data, and rewrites the verification data stored in itself with the received newest verification data.

After this, as is the case with the terminal device #1, the terminal device #3 and the memory card #2 mutually perform the attestation.

2.3 Content Providing Server

The content providing server 3202 is a device held by the content provider, and mainly performs a process concerning the selling of the content and use right (that includes a key, an expiration time and the like), with an external machine via the Internet 3005.

Figure 41:
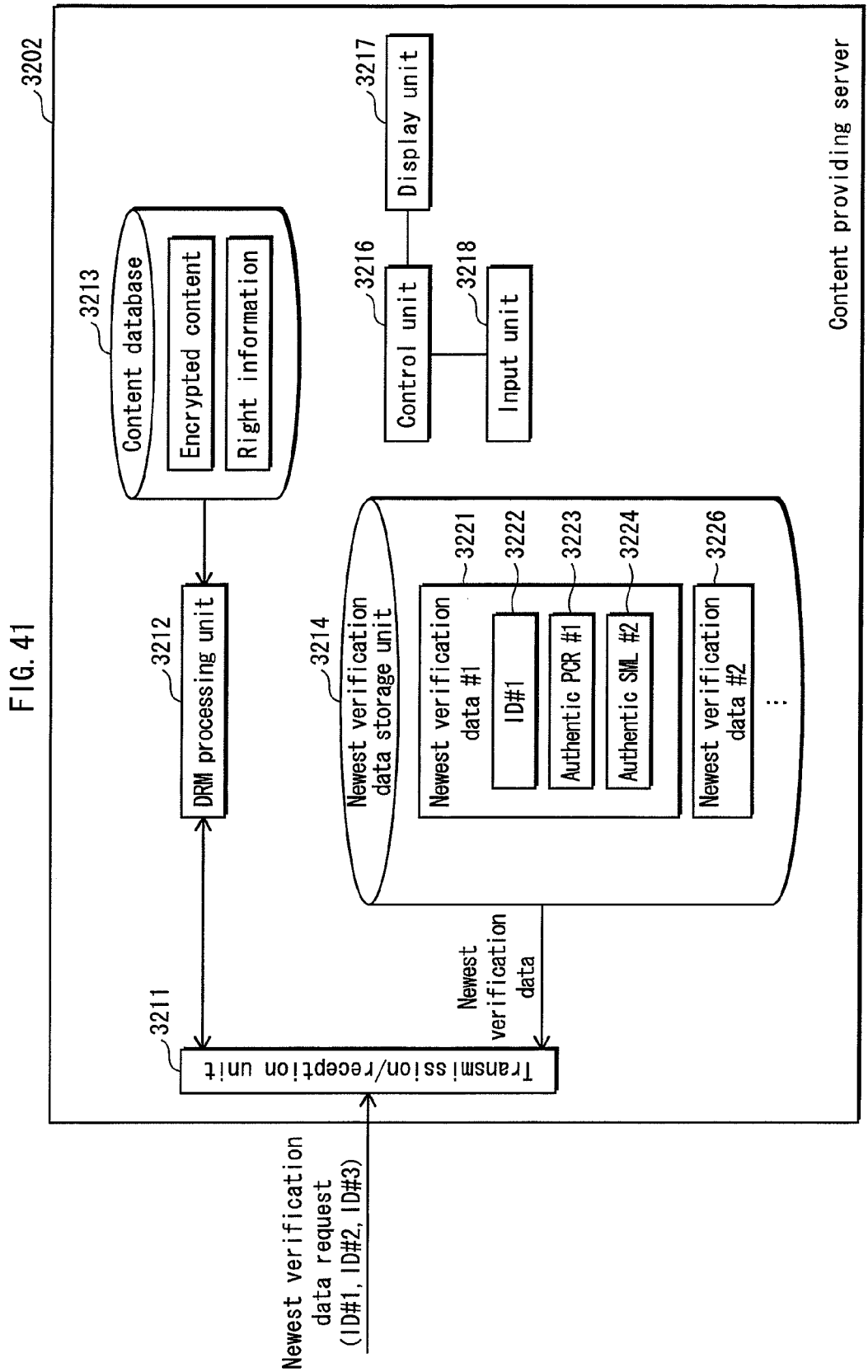
FIG. 41 is a block diagram showing the functional structure of the content providing server 3202.

FIG. 41 is a functional block diagram showing the structure of the content providing server 3202. As shown in FIG. 41, the content providing server 3202 includes a transmission/reception unit 3211, a DRM processing unit 3212, a content database 3213, a newest verification data storage unit 3214, a control unit 3216, a display unit 3217, and an input unit 3218.

The content providing server 3202 is specifically a computer system that includes a microprocessor, RAM, and ROM. A computer program is stored in the RAM or ROM. The microprocessor operates in accordance with the computer program and causes the content providing server 3202 to achieve part of the functions thereof.

(1) Content Database 3213

The content database 3213 is composed of a large-capacity hard disk unit, and stores a plurality of encrypted contents and a plurality of pieces of right information in association with each other.

The encrypted contents are generated by encrypting and compressing the music data. The right information includes a decryption key used for decrypting an encrypted content, an expiration time of the decryption key, price information and the like.

(2) Newest Verification Data Storage Unit 3214

The newest verification data storage unit 3214 stores a plurality of pieces of newest verification data 3221, 3226, . . . . Each piece of newest verification data is composed of a machine ID, authentic PCR values, and authentic SML (log information). The newest verification data is information for verifying the authenticity of a machine indicated by a machine ID. Hereinafter, the machine ID is represented as ID; data for verifying the authenticity of a machine indicated by ID #n (n=1, 2, 3, . . . ) is represented as verification data #n; the authentic PCR values contained in the verification data #n are represented as authentic PCR #n; and the authentic SML is represented as authentic SML #n, for the sake of convenience.

As one example, newest verification data #1 (3221) includes ID #1 (3222), authentic PCR #1 (3221), and authentic SML #1, and is used for verifying the authenticity of terminal device #1 indicated by ID #1.

(3) DRM Processing Unit 3212

The DRM processing unit 3212 is a functional unit for performing a process concerning the selling of contents, with an external machine connected via the Internet 3005, under the control of the control unit 3216.

More specifically, the DRM processing unit 3212, upon receiving a content purchase request from the external machine, performs a series of processes such as the user authentication, transmission of a content list, reception of selection of a content, billing process, and transmission of an encrypted content and right information.

(4) Transmission/Reception Unit 3211

The transmission/reception unit 3211 is structured to include an interface connectable with the Internet 3005, and performs transmission/reception of various types of information with external machines connected with the Internet 3005 and with each functional unit.

(5) Control Unit 3216

The control unit 3216 controls the operation of each functional unit constituting the content providing server 3202 by outputting control signals (not illustrated) to each functional unit.

The control unit 3216 also receives a newest verification data request from the memory card #2 via the Internet 3005 and the terminal device #1. The newest verification data request includes one or more machine IDs, and requests newest verification data to be used for verifying the authenticity of the one or more machine IDs.

Upon receiving the newest verification data request, the control unit 3216 detects, in the newest verification data storage unit 3214, a piece of newest verification data that includes the same machine ID as the received machine ID, and reads out the detected piece of newest verification data. The control unit 3216 then transmits the read-out piece of newest verification data to the memory card #2 via the transmission/reception unit 3211.

2.4 Structure of Memory Card #2 (3204)

Figure 42:
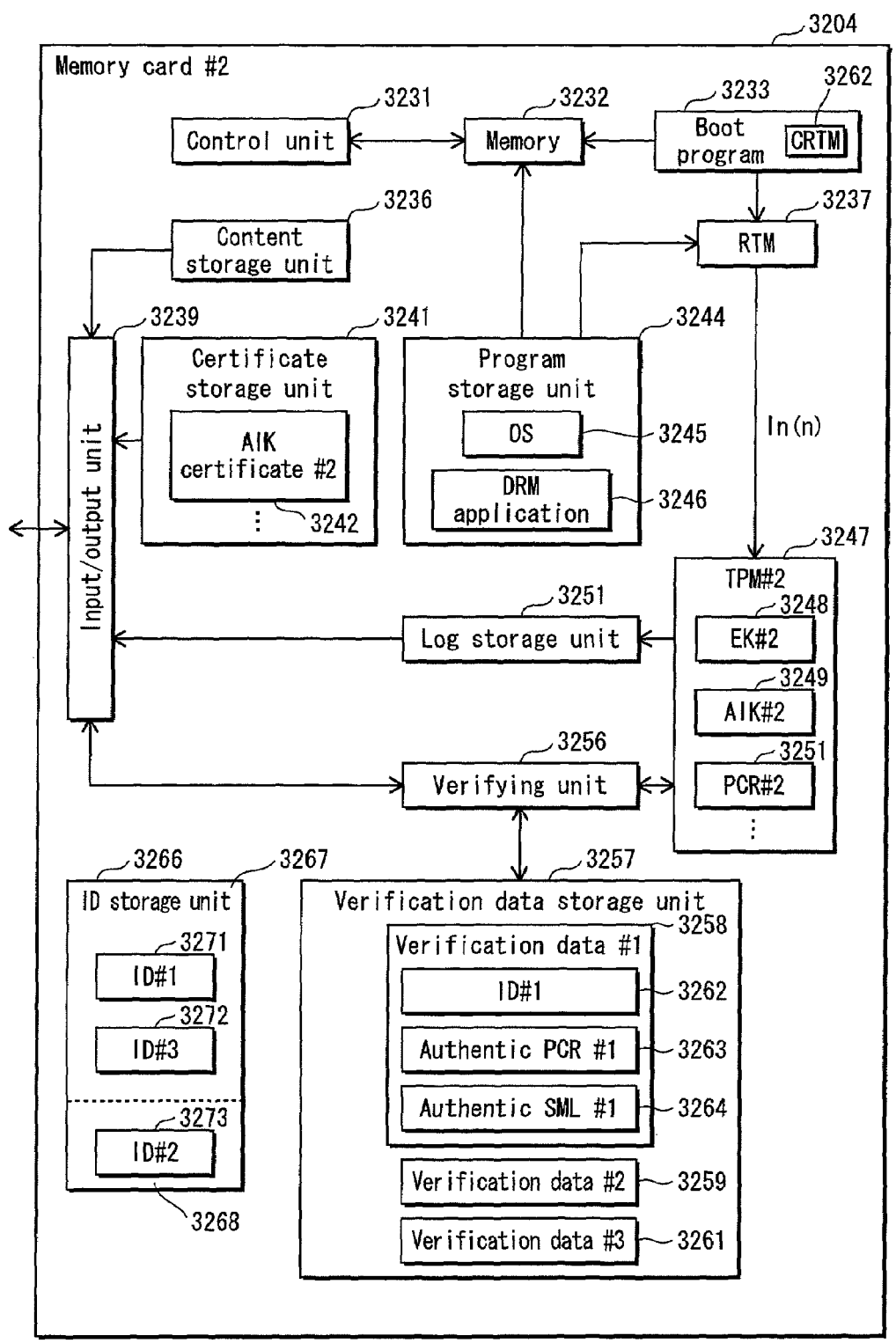
FIG. 42 is a block diagram showing the functional structure of the memory card 3204.

FIG. 42 is a functional block diagram showing the structure of the memory card #2 (3204). As shown in FIG. 42, the memory card #2 (3204) includes a control unit 3231, a memory 3232, a boot program 3233, a content storage unit 3236, an RTM 3237, an input/output unit 3239, a certificate storage unit 3241, a program storage unit 3244, a log storage unit 3251, a TPM chip 3247, a verifying unit 3256, an ID storage unit 3266, and a verification data storage unit 3257.

The memory card #2 (3204) is specifically a computer system that includes a microprocessor, RAM, and ROM. A computer program is stored in the RAM or ROM. The microprocessor operates in accordance with the computer program and causes the memory card #2 (3204) to achieve part of the functions thereof.

The following will describe the constitutional elements.

Note that description of the certificate storage unit 3241, the memory 3232, the log storage unit 3251, and the RTM 3237 is omitted here since they have the same functions as the certificate storage unit, memory, log storage unit, and RTM described in Embodiment 1.

(1) Input/Output Unit 3239

The input/output unit 3239 includes an interface connectable with external machines. In the present example, the external machines are the terminal devices #1 and #3. The input/output unit 3239 performs transmission/reception of information with the external machines and with each functional unit in the memory card #2.

The input/output unit 3239 is equipped with a power terminal, receives supply of power from the external machines via the power terminal, and distributes the received power to each constitutional element.

(2) Content Storage Unit 3236

The content storage unit 3236 is a functional unit for storing encrypted contents and the right information. The encrypted contents and the right information stored in the content storage unit 3236 are the same as the encrypted contents and the right information held by the aforesaid content providing server.

(3) Program Storage Unit 3244

The program storage unit 3244 is achieved by a nonvolatile storage medium such as a flash memory, and stores an OS 3245 and a DRM application 3246. As is the case with the terminal device side, the OS 3245 includes the RTM code.

The DRM application 3246 is a program including procedures for performing, with the content providing server, a process concerning the selling of contents, and confirming the right information and outputting an encrypted content and a decryption key in response to a content playback request from a terminal device.

(4) Boot Program 3233

The boot program 3233, as is the case with the BIOS in the terminal device, is stored in a secure area in the memory card, and is a program that is loaded and executed first after the power supply is started. The boot program 3233, as is the case with the BIOS, includes a CRTM 3262.

After the power is supplied to the memory card #2, the boot program, OS, and DRM application are loaded into the memory and executed, in the stated order. Especially, the CRTM 3262 in the boot program 3233 is executed first by the processor in the memory card #2 (3204).

(5) ID Storage Unit 3266

The ID storage unit 3266 is achieved by a nonvolatile storage medium, and is composed of a general area 3267 and a secure area 3268.

The secure area 3268 stores a machine ID "ID #2" 3273 that is written when the memory card #2 (3204) is manufactured, and uniquely indicates the memory card #2.

The general area 3267 stores machine IDs 3271 and 3272 indicating machines to which the memory card #2 was attached at least once. More specifically, the general area 3267 stores a machine ID "ID #1" 3271 indicating terminal device #1 and a machine ID "ID #3" 3272 indicating terminal device #3. Hereinafter, these machine IDs are represented as ID #1, ID #2, and ID #3, for the sake of convenience.

(6) Verification Data Storage Unit 3257

The verification data storage unit 3257 stores a plurality of pieces of verification data 3258, 3259, 3261, . . . .

Each piece of verification data is composed of a machine ID, authentic PCR values, and authentic SML, and is used for verifying the authenticity of a machine indicated by a machine ID.

The verification data 3259 is used for verifying the authenticity of the memory card #2. The verification data 3258, 3261, . . . are respectively used for verifying the authenticity of the terminal devices #1, #3, . . . . Hereinafter, these verification data are represented as verification data #n (n=1, 2, 3, . . . ), and the machine ID, authentic PCR values, and authentic SML constituting verification data #n are represented as ID #n, authentic PCR #n, and authentic SML #n, respectively.

As one example, verification data #1 includes ID #1 (3262) indicating terminal device #1, authentic PCR #1 (3259) that is to be calculated when terminal device #1 has an authentic structure, and authentic SML #1 (3264) including a history of PCR values when terminal device #1 has an authentic structure.

(7) TPM #2 (3247)

The TPM chip 3247 (herein after referred to as TPM #2) loaded in the memory card #2 (3204) has been provided from the network provider and implemented in the memory card #2.

The TPM #2, as is the case with the TPM 3117 in Embodiment 1, calculates and accumulates PCR values that are information indicating the authenticity of the memory card #2, using the functional units of the TPM #2. Description of detailed structure of the TPM #2 is omitted in FIG. 42 since it is the same as that of the TPM 3117 in Embodiment 1.

In the present embodiment, the EK private key, AIK private key, and PCR values held by the TPM chip in each machine are represented respectively as EK #n, AIK #n, and PCR #n (n=1, 2, 3, . . . ). Also, the certificate of the public key corresponding to each private key is represented as certificate #n, and SML stored in the log storage unit is represented as SML #n.

(8) Verifying Unit 3256

The verifying unit 3256 is instructed by the control unit 3231 to perform the attestation with the terminal device (requesting device) to which the memory card #2 itself is attached. When receiving the instruction, the verifying unit 3256 also receives the machine ID of the terminal device from the control unit 3231.

Upon being instructed to perform the attestation, the verifying unit 3256 reads out a piece of verification data that includes the received machine ID. The verifying unit 3256 then performs the authenticity verification of the terminal device. Description of details of the verification is omitted here since it is the same as the verification performed by the verifying unit 3013 in Embodiment 1.

Next, the verifying unit 3256 notifies the result of the attestation to the control unit 3231.

(9) Control Unit 3231

The control unit 3231 is a functional unit for controlling each constitutional element.

The control unit 3231, after it is attached to any terminal device, reads out ID #2 from the ID storage unit 3266, and outputs the read-out ID #2 to the terminal device. The control unit 3231 also receives the machine ID from the terminal device, and stores the machine ID into the memory 3232.

Note that the machine ID includes information indicating whether or not it is a playback device having a communication function, or information indicating whether or not it is a recording medium. For example, when it is a playback device having a communication function, the machine ID starts with bits "11"; when it does not have a communication function, the machine ID starts with bits "10"; and when it is a recording medium, the machine ID starts with bits "00".

After this, the control unit 3231 receives an attestation request and a random number (nonce) from the terminal device. Upon receiving these, the control unit 3231 outputs the received nonce to the TPM #2 (3247), and instructs it to perform the attestation.

After the authenticity of the memory card #2 is certified and the operation permission notification is received from the terminal device, the control unit 3231 outputs the instruction for authenticity attestation of the terminal device, to the verifying unit 3256. When doing this, the control unit 3231 reads out the terminal ID having been written in the memory 3232, and outputs the read-out terminal ID to the verifying unit 3256, together with the attestation instruction.

Next, the control unit 3231 is notified the result of attestation from the verifying unit 3256. When it is judged from the notified result that the terminal device is not authentic, the control unit 3231 stops communicating with the terminal device thereafter.

When it is judged from the notified result that the terminal device is authentic, the control unit 3231 performs the process such as outputting an encrypted content, in accordance with the operation of the user on the terminal device.

(9-1) Process when Attached to Terminal Device #1

The following describes the process that is performed when memory card #2 is attached to terminal device #1.

The control unit 3231 receives a content purchase request from terminal device #1 while the memory card #2 is attached to terminal device #1. Upon receiving this request, the control unit 3231 reads out all the machine IDs stored in the ID storage unit 3266. Following this, the control unit 3231 generates a newest verification data request that is a request for transmission of newest verification data, and transmits the generated newest verification data request to the content providing server 3202 using the communication function of terminal device #1. The newest verification data request includes all theread-out machine IDs.

The control unit 3231 then receives a plurality of pieces of newest verification data from the content providing server 3202 via terminal device #1. The control unit 3231 then rewrites the verification data stored in the verification data storage unit 3257, with the received newest verification data based on the machine IDs included in the received newest verification data.

Next, the control unit 3231 reads out verification data #2 including ID #2 indicating the memory card #2 itself, and outputs the read-out verification data #2 to terminal device #1 as newest verification data #2.

After the output, the control unit 3231 performs the content purchase process according to the procedure indicated by the DRM program having been loaded in the memory 3232.

(9-2) Process when Attached to Terminal Device #2

The following describes the process that is performed when memory card #2 is attached to terminal device #2.

When the first two bits of the received machine ID is "10", the control unit 3231 reads out verification data 3259 including ID #2 indicating the memory card #2 itself, and outputs the read-out verification data 3259 as newest verification data.

2.5 Operation

The following describes the operation of each machine related to the attestation.

Note that description of mutual attestation performed between terminal device #1 and memory card #2 is omitted here since the mutual attestation performed between memory card #2 and a terminal device is the same regardless of the terminal device.

(1) Mutual Attestation

After the terminal device #1 is powered ON while the memory card #2 is attached thereto and the boot processes of both machines are completed, the terminal device #1 becomes the verifying device and performs the first attestation process for verifying the authenticity of the memory card #2 (steps S3101 through S3103).

First, a verifying unit 3281 of the terminal device #1 generates nonce #2 and outputs the generated nonce #2 to the memory card #2 (step S3101).

Upon receiving the nonce #2, the TPM #2 of the memory card #2 generates signature data by applying a signature to the received nonce #2 and to the PCR #2 that is held by itself. The TPM #2 then outputs the generated signature data "AIK #1 (nonce #2, PCR #2)" and AIK certificate #2 and SML #2 to the terminal device #1 (step S3102). Hereinafter, signature data generated by applying a signature to data B, C, . . . using key A in other embodiments is represented as "A(B, C . . . )". As one example, the aforesaid "AIK #1 (nonce #2, PCR #2)" represents signature data that was generated by applying a signature to "nonce #2, PCR #2" using key "AIK #1".

The verifying unit 3281 of the terminal device #1 receives the signature data, AIK certificate #2 and SML #2 from the memory card #2. Upon receiving these, the verifying unit 3281 performs, in sequence, verification of the AIK certificate #2, verification of the signature data (more specifically, verification of the nonce #2 and verification of the PCR #2), and verification of the SML #2 (step S3103). A server public key (not illustrated), AIK public key #2 included in the AIK certificate #2, and authentic PCR #2 and authentic SML #2 stored in a verification data storage unit 3282 are used in these verifications.

When the first attestation results in a success, it is followed by a second attestation in which the memory card #2 becomes the verifying device and verifies the authenticity of the terminal device #1 (steps S3106 through S3108).

First, the verifying unit 3256 of the memory cardf #2 generates nonce #1, and outputs the generated nonce #1 to the terminal device #1 (step S3106).

The TPM #1 of the terminal device #1, upon receiving the nonce #1, generates signature data by applying a signature to the received nonce #1 and the PCR #1 held by itself, using the AIK #1, and outputs the AIK certificate #1, the generated signature data, and the SML #1 to the memory card #2 (step S3107).

The verifying unit 3256 of the memory card #2 receives the AIK certificate #1, signature data, and SML #1. Upon receiving these, the verifying unit 3256 performs, in sequence, verification of the AIK certificate #1, verification of the signature data (more specifically, verification of the nonce #1 and verification of the PCR #1), and verification of the SML #1 (step S3108). A server public key (not illustrated), AIK public key #1 included in the AIK certificate #1, and authentic PCR #1 and authentic SML #1 stored in the verification data storage unit 3257 are used in these verifications.

When the second attestation results in a success, the terminal device #1 executes the playback control program and starts playing back a content in accordance with the operation of the user.

(2) Obtaining Newest Verification Data

Figure 43:
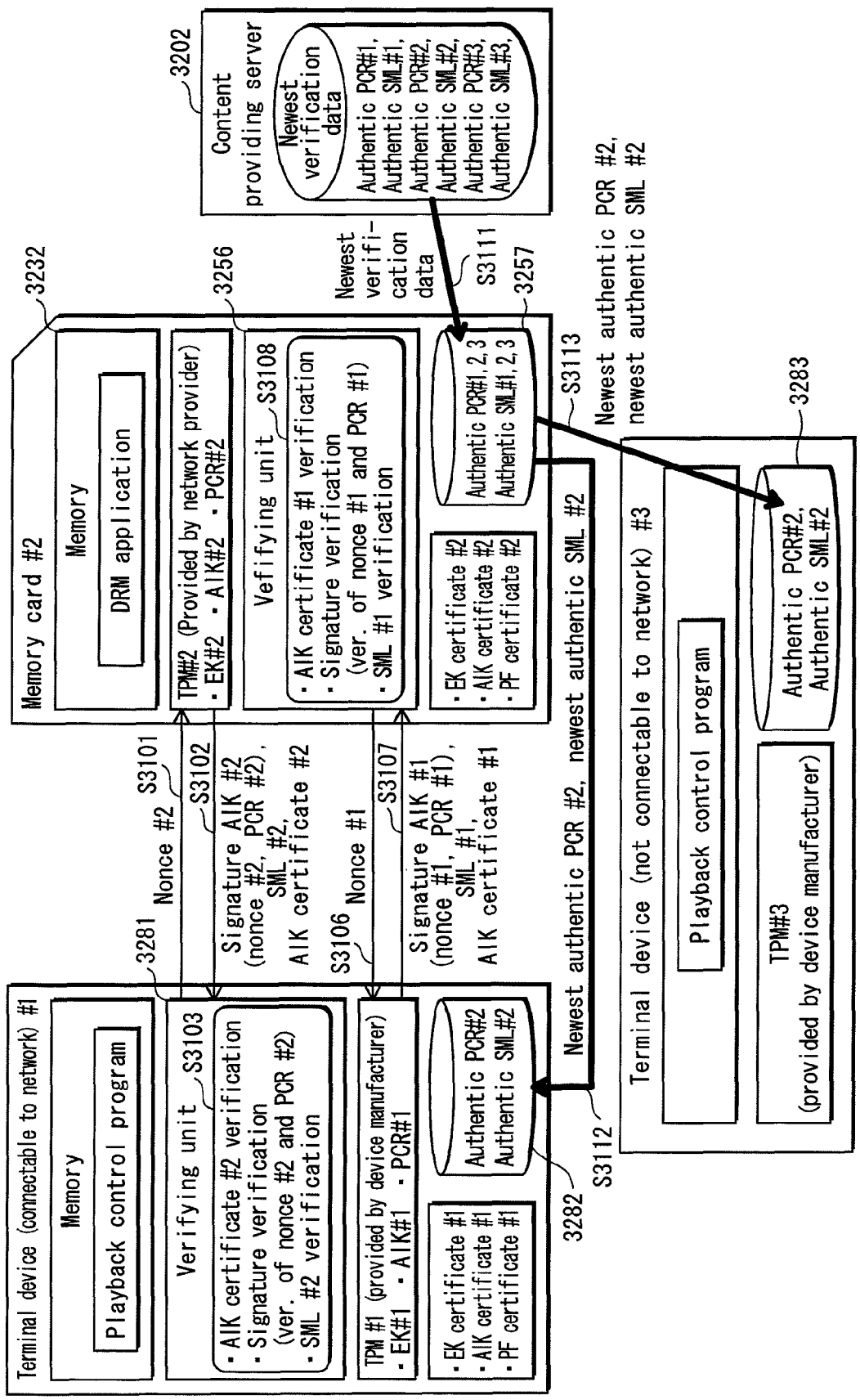
FIG. 43 shows the operation and data flow in the mutual authentication between the terminal device #1 (3201) and the memory card #2 (3204), and shows the data flow in the update process of the verification data.

In FIG. 43, the thick arrows indicate operations regarding the obtainment of newest verification data. The following will describe the operation of each machine in the process of obtaining newest verification data.

When the user performs an operation for requesting a purchase of a new content, it becomes a trigger for the control unit 3231 of the memory card #2 to transmit a newest verification data request to the content providing server 3202. Upon receiving the request, the content providing server transmit newest verification data to the memory card #2 (step S3111).

The control unit 3231 of the memory card #2, using the communication function of the terminal device #1, receives the newest verification data (step S3111), and rewrites the verification data stored in itself with the received newest verification data.

Following this, the control unit 3231 outputs the newest verification data (newest authentic PCR #2 and newest authentic SML), which corresponds to the machine ID the memory card #2 itself, to the terminal device #1 (step S3112).

The control unit of the terminal device #1 receives the newest verification data (newest authentic PCR #2 and newest authentic SML) from the memory card #2 (step S3112), and rewrites the verification data stored in the verification data storage unit 3282 with the received newest verification data.

After the verification data is rewritten in both machines, the memory card #2 executes the DRM application stored in the memory 3232 and performs the process of purchasing a new content in accordance with the operation of the user.

Also, after this, when the memory card #2 is attached to the terminal device #3, the memory card #2 outputs the newest authentic PCR #2 and newest authentic SML #2 corresponding to the machine ID of itself to the terminal device #3 (step S3113). The terminal device #3 rewrites the verification data stored in a verification data storage unit 3283 of itself with the received newest authentic PCR #2 and newest authentic SML #2.

2.6 Modifications of Embodiment 2

(1) Specifying Predetermined PCR Value

As is the case with Modification (3) of Embodiment 1, in the attestation process of the present embodiment, the machine on the verification side may transmit, together with the nonce, identification information indicating one or more PCR values. The machine on the requesting side may read out only the PCR values indicated by the identification information, generate signature data, and transmit the generated signature data. In line with this, the machine on the certification side may extract only log information that corresponds to the PCR values indicated by the received identification information, and transmit the extracted log information.

(2) Plurality of Memory Cards

The present embodiment has been described using an example where one piece of memory card #2 can be attached to a plurality of terminal devices. However, there may be a converse case where a plurality of memory cards can be attached to one terminal device In this case, the terminal device #1 stores machine IDs of memory cards that were attached thereto in past. The terminal device #1 also stores verification data (authentic PCR values, authentic SML) that corresponds to each machine ID. The verifying unit 3281 selects verification data corresponding to the machine ID of the memory card currently attached to the terminal device #1, and uses the selected verification data in the attestation in which the terminal device #1 becomes the verifying device.

3. Embodiment 3

3.1 Outline

Embodiment 3, as is the case with Embodiment 2, is composed of a terminal device 3301 (requesting device) and a memory card 3302 (verifying device), where the terminal device 3301 includes a playback control program as an application, and the memory card 3302 holds en encrypted content.

The terminal device 3301 is loaded with two TPMs that are provided from different providers. It is presumed as one example that the TPMs are provided from a device manufacturer and a network provider, respectively. The former is represented as TPM #1 and the latter is represented as TPM #2, for the sake of convenience.

Such a model where one terminal is loaded with TPMs provided from a plurality of providers is called a multi-stakeholder model in the TCG standard.

Each of these TPMs manages PCR values and SML of a different program.

The memory card 3302 first performs the attestation with TPM #1 managing programs in a lower layer, and when the attestation result proves that the programs in the lower layer are authentic, the memory card 3302 then performs the attestation with TPM #2 managing programs (applications) in an upper layer to confirm whether or not the programs in the upper layer are authentic.

Also, in the terminal device 3301, TPM #1 managing programs in a lower layer verifies the authenticity of TPM #2 managing programs in an upper layer to confirm whether or not TPM #2 is authentic, and when the attestation result proves that TPM #2 is authentic, TPM #1 outputs, to TPM #2, a PCR value corresponding to the highest program in the programs managed by TPM #1. TPM #2 calculates a PCR value for a program managed by TPM #2, using the received PCR value.

When the attestation result proves that TPM #2 is not authentic, the power supply to TMP #2 is stopped.

Figure 44:
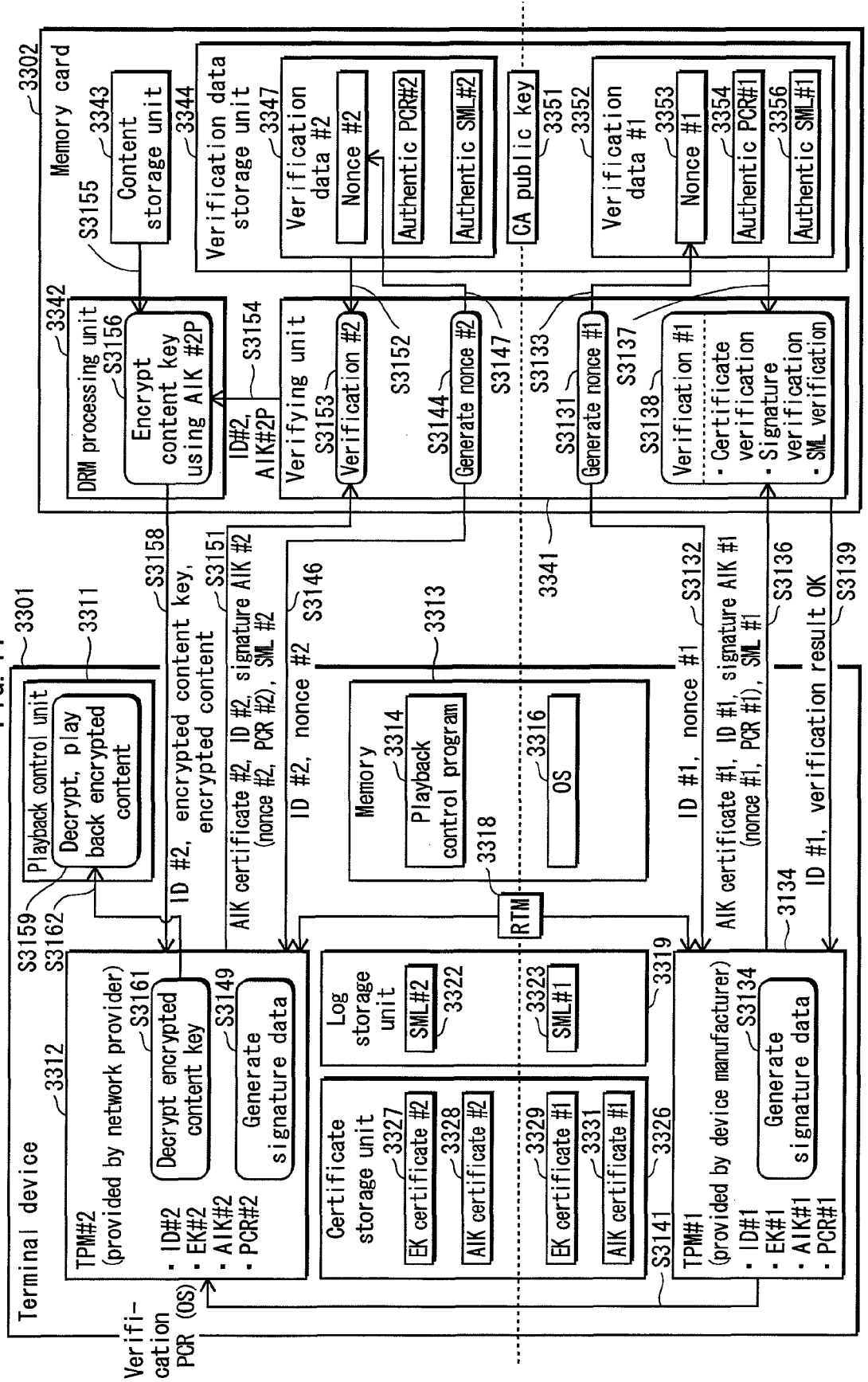
FIG. 44 shows the functional structure of the terminal device 3301 and the memory card 3302 in Embodiment 3 in the other embodiments, and shows the operation of the memory card 3302 in verifying the terminal device 3301.

FIG. 44 shows the structure and operation of the machines. The arrows in the drawing indicate data flows among or inside the machines. Also, in the drawing, the structural elements and data held thereby are represented by only numerals, and the operations thereof are assigned with step numbers starting with "S". The following will describe the structure and operation of the machines with reference to FIG. 44.

3.2 Structure of Terminal Device 3301

The terminal device 3301 includes a playback control unit 3311, TPM #2 (3312), a memory 3313, an RTM 3318, a log storage unit 3319, a certificate storage unit 3326, and TPM #1 (3134). The terminal device 3301 also includes a nonvolatile storage unit storing various types of data and programs, an input unit for receiving operations of the user, a display unit, an input/output unit that is connected with the memory card, inputs and outputs various types of information, and supplies the power, and the like, which are omitted in FIG. 44 and only parts related to the attestation are shown in FIG. 44.

(1) Playback Control Unit 3311

The playback control unit 3311 is a functional unit that is achieved as the CPU executes a playback control program 3314 loaded in the memory 3313. The playback control unit 3311 reads out an encrypted content from the memory card 3302, obtains a content by decrypting and decompressing the read-out encrypted content, and plays back the content.

(2) TPM #2 (3312)

The TPM #2 (3312) stores a TPM identifier "ID #2" that indicates TPM #2 itself.

The TPM #2 (3312) also stores one or more pieces of identification information indicating programs in the upper layer.

The TPM #2 (3312) manages information (PCR values and SML) that indicate authenticity of the programs indicated by the identification information stored therein. More specifically, it is presumed here that the TPM #2 (3312) stores identification information indicating the playback control program 3314 and generates and manages information indicating integrity of the program.

The sign "EK #2" in the drawing indicates an EK private key unique to TPM #2. Also, "AIK #2" indicates an AIK private key, and PCR #2 indicates PCR values stored in the TPM #2.

The TPM #2 receives, from the RTM 3318, identification information and integrity values of the respective programs. When the received identification information matches identification information of the programs managed by itself, the TPM #2 calculates PCR values using the received integrity values, and stores the calculated PCR values. The TPM #2 also writes a history of the PCR #2 stored in itself, into the log storage unit 3319. When the received identification information does not match identification information of the programs managed by itself, the TPM #2 discards the received data.

Further, the TPM #2 (requesting side) is subjected into verification on authenticity of the TPM #2 performed by the TPM #1 (verifying side). The verification may be performed by any verification method. For example, it may be a method such as the challenge and response which includes a predetermined calculation, or a simple verification such as an ID check and a certificate check.

When the TPM #2 is recognized to be authentic as a result of the verification, the TPM #2 receives a PCR value that corresponds to the OS 3316 being the highest program among the programs managed by the TPM #1. Upon receiving the PCR value, the TPM #2 stores the received PCR value as PCR0.

After the playback control program 3314 is loaded into the memory, the TPM #2 calculates a PCR value (PCR1) of the playback control program based on the PCR0 having been stored therein and the integrity value of the playback control program 3314 received from the RTM 3318, and stores the calculated PCR value (PCR1).

Further, the TPM #2 receives, from the memory card 3302, TPM identifier "ID #2", nonce #2, and an attestation request. Upon receiving these, the TPM #2, as in the above-described embodiment, performs the attestation process for certifying authenticity of the programs managed by itself (details will be described in the description of the operation).

When the attestation proves the authenticity of the programs managed by the TPM #2, the TPM #2 receives an encrypted content and an encrypted content key from the memory card 3302. The encrypted content key has been generated by encrypting a content key using a public key that makes a pair with the AIK #2 (herein after, the public key is represented as AIK#2P). The encrypted content has been generated by encrypting compressed music data, which was generated by compressing music data, using a content key.

Upon receiving these, the TPM #2 generates a content key by decrypting the encrypted content key using the AIK #2, and outputs the generated content key and the received encrypted content to the playback control unit 3311.

Note that the encryption key used for generating the encrypted content key is not limited to AIK#2P, but another different key such as a disposable session key may be used.

(3) Memory 3313

The memory 3313 is mainly composed of a RAM, and stores various types of programs to be executed by the CPU.

FIG. 44 shows that, as one example, the memory 3313 stores the playback control program 3314 and the OS 3316.

The playback control program 3314 includes a procedure for decrypting, decompressing, and playing back the encrypted content stored in the memory card 3302.

The OS 3316 includes a procedure for calling an application (in this example, a music playback program). The OS 3316 also includes a procedure for controlling the basic operation of the terminal device 3301 such as receiving an operation of the user and detecting a memory card. When the authenticity of the TPM #2 is confirmed by the TPM #1, the OS 3316 loads the playback control program 3314 into the memory 3313.

(4) RTM 3318

The RTM 3318 is, as is the case with the RTM 3107 explained in Embodiment 1, a functional unit that is achieved as the CPU executes the CRTM included in the BIOS and the RTM code included in each program. Note that each program may not include the RTM code, as explained in Modification (4) of Embodiment 1.

The RTM 3318 then measures the integrity value of the program to be loaded into the memory 3313, and outputs the measured integrity value and identification information of the measurement target program to both the TPM #1 and the TPM #2.

(5) Log Storage Unit 3319

The log storage unit 3319 is composed of a volatile memory such as RAM, and stores the SML #2 (3322) and the SML #1 (3323).

The SML #2 (3322) includes history information of PCR #2 corresponding to the programs managed by the TPM #2.

The SML #1 (3323) includes history information of PCR values (herein after referred to as PCR #1) corresponding to the programs managed by the TPM #1.

(6) Certificate Storage Unit 3326

The certificate storage unit 3326 is composed of a nonvolatile memory such as a flash memory, and stores, as one example, EK certificate #2 (3327), AIK certificate #2 (3328), EK certificate #1 (3329), and AIK certificate #1 (3331).

The EK certificate #2 (3327) is a certificate for certifying authenticity of an EK public key corresponding to the EK #2 held by the TPM #2.

The AIK certificate #2 (3328) is a certificate for certifying authenticity of a public key (AIK#2P) corresponding to the AIK #2 held by the TPM #2.

The EK certificate #1 (3329) is a certificate for certifying authenticity of an EK public key corresponding to the EK #1 held by the TPM #1.

The AIK certificate #1 (3331) is a certificate for certifying authenticity of a public key corresponding to the AIK #1 held by the TPM #1.

Description of the structure of these certificate is omitted here, since it has already been explained in Embodiment 1.

Note that, in addition to these, PF certificates (more specifically, certificates of the network provider and the terminal device manufacturer) corresponding to the TPMs may be stored.

(7) TPM #1 (3334)

The TPM #1 (3334) is provided by the device manufacturer, and stores a TPM identifier "ID #1" for identifying the TPM #1 itself, and identification information of programs in the lower layer from the BIOS to the OS. The TPM #1 manages information (PCR values and SML) that indicate authenticity of the programs indicated by the identification information stored therein.

The sign "EK #1" in the drawing indicates an EK private key unique to TPM #1. Also, "AIK #1" indicates an AIK private key, and PCR #1 indicates PCR values stored in the TPM #1.

The TPM #1 receives, from the RTM 3318, integrity values and identification information of the programs for which the integrity values were measured. When the received identification information matches identification information stored in itself, the TPM #1 calculates PCR values using the received integrity values, and stores the calculated PCR values. When the received identification information does not match the stored identification information, the TPM #1 discards the received integrity values.

After the OS 3316 is loaded into the memory 3313 and the process of booting the memory card 3302 is completed, the TPM #1 receives, from the memory card 3302, TPM identifier "ID #1", nonce #1, and an attestation request. Upon receiving these, the TPM #1 performs the attestation process with the memory card 3302 (verifying device).

When the attestation proves the authenticity of the programs managed by the TPM #1, the TPM #1 verifies the TPM #2. When the TPM #2 is judged to be authentic as a result of the verification, the TPM #1 outputs, to TPM #2, a PCR value (PCR(OS)) that corresponds to the OS 3316 being a highest-layer program among the programs managed by the TPM #1.

3.3 Structure of Memory Card 3302

FIG. 44 shows the functional structure of the memory card 3302. As shown in FIG. 44, the memory card 3302 includes a verifying unit 3341, a DRM processing unit 3342, a content storage unit 3343, and a verification data storage unit 3344. The memory card 3302 also includes an input/output unit that inputs and outputs data from and to the terminal device 3301, and receives the power supply from the terminal device 3301, a nonvolatile memory storing various types of programs such as a boot program, and the like, which are omitted in FIG. 44 and only parts related to the attestation are shown in FIG. 44.

The following describes each functional unit.

(1) Verifying Unit 3341

The verifying unit 3341 is loaded in the terminal device 3301 to which the memory card 3302 is to be attached. The verifying unit 3341 stores a TPM identifier "ID #1" that indicates a TPM managing the programs in the lower layer, and a TPM identifier "ID #2" that indicates a TPM managing the programs in the upper layer.

After the process of booting the memory card 3302, the verifying unit 3341 generates nonce #1, and outputs ID #1 stored in itself, the generated nonce #1, and the attestation request to the terminal device 3301, which becomes a trigger for the attestation process to be performed with the TPM#1 in the terminal device 3301.

When it is judged, from the attestation, that the programs managed by the TPM #1 are inauthentic, the verifying unit 3341 prohibits communications therein after between the memory card 3302 and the terminal device 3301.

When it is judged, from the attestation, that the programs managed by the TPM #1 are authentic, the verifying unit 3341 notifies to the TPM #1 of the terminal device 3301 that the verification resulted in a success.

After sending this notification, the verifying unit 3341 generates nonce #2 and outputs the stored ID #2, the generated nonce #2, and the attestation request to the terminal device 3301, which becomes a trigger for the attestation process to be performed with the TPM #2 in the terminal device 3301.

When it is judged, from the attestation, that the programs managed by the TPM #2 are inauthentic, the verifying unit 3341 prohibits communications therein after between the memory card 3302 and the terminal device 3301.

When it is judged, from the attestation, that the programs managed by the TPM #2 are authentic, the verifying unit 3341 extracts AIK#2P from the AIK certificate #2 having been received in the attestation with the TPM #2", and outputs the extracted AIK#2P and ID #2 indicating the TPM #2 to the DRM processing unit 3342.

(2) Content Storage Unit 3343

The content storage unit 3343 is composed of a nonvolatile storage medium such as a flash memory, and stores an encrypted content and right information corresponding to the encrypted content. The right information includes a content key for decrypting the encrypted content, and an expiration time of the period during which the content can be viewed.

(3) DRM Processing Unit 3342

The DRM processing unit 3342 performs a process for purchasing a content, with the server device of the content provider, by using the communication function of the terminal device 3301. The DRM processing unit 3342 also manages the expiration time of each encrypted content stored in the content storage unit 3343.

Further, the DRM processing unit 3342 receives ID #2 which indicates the TPM #2 managing a program for playing back the content, receives public key API#2P, and stores the received ID #2 and API#2P.

The DRM processing unit 3342 receives a content viewing request from a user operating the terminal device 3301. Upon receiving the content viewing request, the DRM processing unit 3342 generates an encrypted content key by encrypting a content key using API#2 P received from the verifying unit 3341, and outputs the generatee encrypted content key, ID #2, and the encrypted content to the terminal device 3301.

(4) Verification Data Storage Unit 3344

The verification data storage unit 3344 is composed of a nonvolatile storage medium, and stores, as one example, verification data 3347, a CA public key 3351, and verification data 3352.

The CA public key is a public key of a third party organization that is the issuing source of the AIK certificate #1 and the AIK certificate #2, and makes a pair with a CA private key that was used when signature data included in these certificate was generated.

The verification data 3347 is verification data used in the attestation performed between the verifying unit 3341 and the TPM #2 in the terminal device 3301. Hereinafter, the verification data 3347 is also referred to as verification data #2.

The verification data 3352 is verification data used in the attestation performed between the verifying unit 3341 and the TPM #1 in the terminal device 3301. Hereinafter, the verification data 3352 is also referred to as verification data #1.

More specifically, the verification data #1 is composed of nonce #1 (3353), authentic PCR #1 (3354), and authentic SML #1 (3356). Description of these data is omitted since they have already been explained in Embodiments 1 and 2.

3.4 Operation

The following will describe the operation of the terminal device 3301 from the booting to playback of a content, with reference to FIG. 44. It is presumed here that the memory card 3302 is attached to the terminal device 3301, that the power is supplied from the terminal device 3301, and that a series of booting processes have been completed.

After the boot process of the memory card 3302 is completed, the verifying unit 3341 generates nonce #1 (step S3131), and requests the attestation by transmitting, to the terminal device 3301, the generated nonce #1 and ID #1 indicating the TPM that manages the programs in the lower layer (step S3132). Together with this transmission, the verifying unit 3341 writes the generated nonce #1 into the verifying unit 3341 (step S3133).

The TPM #1 of the terminal device 3301 receives ID #1, nonce #1 and the attestation request from the memory card 3302 (step S3132). Upon receiving these, the TPM #1 generates signature data "AIK #1 (nonce #1, PCR #1)" by applying a signature generation algorithm to the received nonce #1 and to the stored PCR #1, using AIK #1 that is held by itself (step S3134).

The TPM #1 then outputs ID #1 indicating itself, the generated signature data, AIK certificate #1 and SML #1 to the memory card 3302 (step S3136).

The verifying unit 3341 of the memory card 3302 receives the signature data "AIK #1 (nonce #1, PCR #1)", AIK certificate #1 and SML #1 (step S3136). Upon receiving these, the verifying unit 3341 reads out the CA public key 3351 and the verification data #1 from the verification data storage unit 3344 (step S3137), and verifies the received data using the read-out CA public key 3351 and verification data #1 (step S3138). More specifically, the verifying unit 3341 performs, in sequence, the verification of AIK certificate #1, verification of the signature data (verification of nonce #1 and PCR #1), and verification of SML #1.

When it is judged that the programs managed by the TPM #1 are authentic as a result of the verification, the verifying unit 3341 outputs the ID #1 and the verification result (OK) to the terminal device 3301 (step S3139).

The TPM #1 of the terminal device 3301 receives the ID #1 and the verification result (OK) from the memory card 3302 (step S3139). Upon receiving these, the TPM #1 verifies whether or not the TPM #2 is authentic. When it verifies that the TPM #2 is authentic, the TPM #1 outputs, to the TPM #2, the PCR value (herein after referred to as PCR(OS)) that corresponds to the OS 3316 (step S3141).

The TPM #2 stores the received PCR(OS) as PCR0, and then calculate PCR1 using the PCR0 and the integrity value of the playback control program 3314.

When the attestation performed by the TPM #1 results in a success, the verifying unit 3341 generates nonce #2 (step S3144), and sends a request for an attestation, together with the generated nonce #2 and the stored ID #2, to the terminal device 3301 (step S3146)

The TPM #2 of the terminal device 3301 receives the ID #2, nonce #2 and request for an attestation from the memory card 3302 (step S3146). Upon receiving these, the TPM #2 generates signature data "AIK #2 (nonce #2, PCR #2)" by applying a signature generation algorithm to the received nonce #2 and to the stored PCR #2, using AIK #2 (step S3149).

The TPM #2 then outputs ID #2, the generated signature data, AIK certificate #2 and SML #2 to the memory card 3302 (step S3151).

The verifying unit 3341 of the memory card 3302 receives ID #2, signature data, AIK certificate #2 and SML #2 from the terminal device 3301 (step S3151). Upon receiving these, the verifying unit 3341 reads out the CA public key 3351 and the verification data #2 from the verification data storage unit 3344 (step S3152), and verifies the received data using the read-out CA public key 3351 and verification data #2 (step S3153). More specifically, the verifying unit 3341 performs, in sequence, the verification of AIK certificate #2, verification of the signature data, and verification of SML #2.

When it is judged that the programs managed by the TPM #2 are authentic as a result of the verification, the verifying unit 3341 outputs the received ID #2 and AIK#2P included in the AIK certificate #2 to the DRM processing unit 3342 (step S3154).

The DRM processing unit 3342 stores the received ID #2 and AIK#2P. When the user performs an operation to input a request for a playback of a content, the DRM processing unit 3342 reads out an encrypted content and an content key from the content storage unit 3343 (step S3155). The DRM processing unit 3342 then generates an encrypted content key by encrypting the content key using the stored AIK#2P (step S3156). The DRM processing unit 3342 then outputs the stored ID #2, the read-out encrypted content, and the generated encrypted content key to the terminal device 3301 (step S3158).

The TPM #2 of the terminal device 3301 receives the ID #2, encrypted content, and encrypted content key from the memory card 3302 (step S3158). Upon receiving these, the TPM #2 outputs the received encrypted content to the playback control unit 3311 as it is, then generates a content key by decrypting the encrypted content key using the stored AIK #2 (step S3161). The TPM #2 then outputs the generated content key to the playback control unit 3311 (step S3162).

The playback control unit 3311 receives the encrypted content and encrypted content key from the TPM #2 (step S3162). Upon receiving these, the playback control unit 3311 generates a content by decrypting the encrypted content using the received content key, and plays back the generated content (step S3163). When a compressed content is generated as a result of the decryption, the playback control unit 3311 generates a content by decompressing the compressed content, and plays back the generated content.

3.5 Modifications of Embodiment 3

(1) Verification between TPMs

In the embodiment described above, the TPM #1 verifies the authenticity of the TPM #1 after the authenticity of the programs managed by the TPM #1 is proved. However, this is not an indispensable structure.

After the authenticity of the programs managed by the TPM #1 is proved, the TPM #1 merely activate the TPM #2 and output the PCR value of the OS.

Conversely, a mutual authentication may be performed between TPMs before the attestation between the memory card 3302 and the TPM #1 is performed.

In Embodiment 3 above, the method for verifying whether or not the TPM #2 is authentic is not explained in detail. However, an arbitrary method can be employed for this. For example, it may be a method such as the challenge and response which includes a predetermined calculation, or a simple method of checking the TPM identifier.

In Embodiment 3 above, when the TPM #1 fails to verify the authenticity of the TPM #2, the TPM #1 stops supplying power to the TPM #2. However, not limited to this, booting the TPM #2 may be stopped, or the function of the TPM #2 may be restricted, for example.

(2) Independent Operation of TPM #2

In Embodiment 3 above, the TPM #2 receives the PCR (OS) corresponding to the OS 3316 from the TPM #1, stores the received PCR(OS) as PCR0, and calculates the PCR value (PCR1) of the playback control program 3314, using the PCR0 and the integrity value of the playback control program 3314. However, the present invention is not limited to this structure.

As one example, a predetermined initial value PCR0 may be stored in a nonvolatile memory in the TPM #2, and PCR1 may be calculated using the stored PCR0. As understood from this, the TPM #2 may operate independently from the TPM #1.

When the TPM #2 calculates a PCR value independently as described above, in the attestation performed between TPMs, the TPM #1 may be a verifying device and the TPM #2 may be a requesting device.

(3) Software Implementation of TPM #2

In Embodiment 3 above, the terminal device 3301 is loaded with TPM #2 that is hardware. However, part or all of the functions of the TPM #2 may be achieved as software.

In this case, the TPM #1, after the attestation with the memory card 3302 results in a success, verifies the hardware part and software part which provide the functions of the TPM #2, respectively. An arbitrary verification method may be employed for this. As one example, the TPM #1 may preliminarily store verification data (a hash value or the like) for the software part, calculate certification data (a hash value or the like) for the software part before it is loaded into the memory, and verify whether or not the software part is authentic by comparing both data.

As for the verification of the hardware part of the TPM #2, the authenticity may be verified by the confirmation of the ID or by the challenge and response, as in the verification of the TPM #2 described above.

(4) Operation after Verification Failure

In Embodiment 3 above, when it is judged as a result of the attestation that the terminal device 3301 is not authentic, the verifying unit 3341 of the memory card 3302 prohibits the communication with the terminal device 3301. However, the present invention is not limited to this structure.

For example, the memory card may restrict the function and data to be provided to the terminal device.

Alternatively, the terminal device 3301 may be provided with an update control unit that updates the program that is held by itself.

In this case, when it is judged as a result of the attestation that the terminal device 3301 is not authentic, the update control unit downloads an update program from an external server (a server of the terminal manufacturer, a server of the network provider, or a server of the content provider), rewrites each program to a newest version by using the downloaded update program, and reboots the terminal device 3301.

(5) Notifying Structure of Terminal Device

In the embodiment described above, the memory card 3302 preliminarily recognizes that the terminal device 3301 has been loaded with two TPMs, and holds verification data that respectively correspond to the two TPMs. However, not limited to this structure, the memory card may obtain the structure information that indicates the internal structure of the terminal device when the memory card is attached to the terminal device. The structure information includes the number of TPMs loaded in the terminal device, a TPM identifier, and, when a plurality of TPMs are loaded further, hierarchy information that indicates the hierarchy among the programs managed by each TPM (in the embodiment described above, the TPM #1 corresponds to programs in the lower layer, and the TPM #2 corresponds to programs in the upper layer).

In this case, the memory card 3302 further stores verification data #3. The verification data #3 includes authentic PCR #3 and authentic SML #3 that are to be used in the attestation performed with a terminal device that is loaded with only one TPM.

The verifying unit 3341 of the memory card 3302 selects a verification procedure by referring to the obtained structure information. When the terminal device is loaded with two TPMs, the attestation is performed with a TPM managing the programs in the lower layer, and then the attestation is performed with a TPM managing the programs in the upper layer, as is the case with Embodiment 3 described above.

When the terminal device is loaded with one TPM, the verifying unit 3341 verifies whether or not the terminal device is authentic, using the verification data #3.

4. Embodiment 4

4.1 Outline

When a need arises to update a program stored in a terminal device, an update program may be distributed thereto via a memory card.

In the present example, an update program for updating a program provided by a carrier 3373 (telecommunications carrier), among the programs stored in the terminal device, is distributed to the terminal device via a memory card. The terminal device mentioned here is a machine whose operations are, in part or entirely, controlled by a computer, and specific examples thereof include a mobile telephone, a content playback device, and a game machine.

A terminal device 3371, as in Embodiment 1 described above, is loaded with a TPM, and generates SML (including a history of PCR values) and PCR values indicating integrity and authenticity of the programs that are loaded into the memory after it is booted, and stores therein the generated SML and PCR values. Also, the terminal device 3371 stores a program provided by the carrier (carrier-provided program).

In the following description, it is presumed that a carrier 3373 distributes a memory card 3372 in which an update program and a carrier certificate are recorded, where the carrier certificate certifies that the memory card is distributed from an authentic carrier.

The memory card 3372 (verifying device), after it is attached to the terminal device 3371 (requesting device), performs an attestation with the terminal device 3371 to confirm the authenticity of the terminal device 3371. After the authenticity of the terminal device 3371 is confirmed, the memory card 3372 outputs the data stored therein to the terminal device 3371.

The terminal device 3371, before performing an update using the update program output from the memory card 3372, verifies the carrier certificate to confirm whether or not the memory card 3372 attached thereto is a memory card having been distributed by an authentic carrier 3373.

4.2 Structure of Memory Card 3372

The memory card 3372, as in the embodiment described above, operates including functional units such as an input/output, a control unit, a memory, a verifying unit, a verification data storage unit. However, description thereof is omitted here since they are the same as those explained the embodiment above, and the following will describe the data held by the memory card 3372.

(1) Update Program 3376

An update program 3376 includes a procedure for rewriting a part or all of a carrier-provided program 3384 held by the terminal device 3371, and a program content that is to replace the program content of the carrier-provided program 3384. The update program 3376 is decoded and executed by an update control unit 3382 provided in the terminal device 3371.

(2) Carrier Certificate 3377

A carrier certificate 3377 is a certificate that indicates that the memory card 3372 was distributed by the authentic carrier 3373. The carrier certificate 3377 includes an update program hash value 3378 and a signature data 3379, where the update program hash value 3378 is generated by substituting the update program 3376 into a hash function, and the signature data 3379 is generated by applying a signature generation algorithm to at least the update program hash value 3378, using a private key (herein after referred to as a carrier private key) of the carrier 3373. The carrier certificate 3377 also includes identification information indication the carrier 3373 as the issuer of the certificate, format information indicating a format of the certificate, and information indicating the signature generation algorithm.

4.3 Terminal Device 3371

The terminal device 3371 achieves its functions as its functional units operate, as is the case with the memory card. Here, only structures and data that are especially related to the present embodiment will be described, and description of the other structures and data will be omitted.

The terminal device 3371 is loaded with a carrier-provided TPM 3381 provided by the carrier 3373. Also, the terminal device 3371 stores the carrier-provided program 3384 provided by the carrier 3373, and a carrier public key 3386 that makes a pair with the carrier private key. The terminal device 3371 is further provided with an update control unit 3328 for executing the update of the program.

The following will describe the structure and data of the terminal device 3371.

(1) Carrier Public Key 3386

The carrier public key 3386 is a public key that makes a pair with the carrier private key, and is written to the terminal device 3371 when the terminal device 3371 is manufactured. Alternatively, the carrier public key 3386 may be obtained safely via a network, a memory card or the like after the shipment.

The key pair composed the carrier private key and the carrier public key 3386 corresponds to the RSA encryption.

(2) Carrier-Provided Program 3384

The carrier-provided program 3384 is a program provided by the carrier 3373. By executing this program, the terminal device 3371 can use a predetermined service provided by the carrier 3373.

(3) Carrier-Provided TPM 3381

The carrier-provided TPM 3381 is a TPM provided by the carrier 3373, and at least has a function to generate SML and PCR values that correspond to the carrier-provided program 3384, and record the generated SML and PCR values.

The carrier-provided TPM 3381 also receives a carrier certificate from the update control unit 3382, together with a request for verifying the carrier certificate. Upon receiving this request, the carrier-provided TPM 3381 reads out the carrier public key 3386, verifies the signatured at a included in the carrier certificate, using the read-out carrier public key 3386, and notifies the update control unit 3382 of the verification result.

(4) Update Control Unit 3382

The update control unit 3382, when the attestation between the carrier-provided TPM 3381 and the memory card 3372 results in a success, reads out the update program 3376 and the carrier certificate 3377 from the memory card 3372.

After this, the update control unit 3382 outputs the read-out carrier certificate to the carrier-provided TPM 3381, together with a request for verifying the carrier certificate.

The update control unit 3382 then receives the carrier certificate verification result from the carrier-provided TPM 3381. When it receives a verification result that indicates a verification failure, the update control unit 3382 deletes the read-out update program and carrier certificate, and stops the update of the program.

When it receives a verification result that indicates a verification success, the update control unit 3382 calculates hash value of the read-out update program, and compares the calculated hash value with the update program hash value 3378 included in the carrier certificate.

When the hash values match, the update control unit 3382 rewrites a part or all of the carrier-provided program 3384, in accordance with the read-out update program.

When the hash values do not match, there is a possibility that the read-out update program has been tampered with, and thus the update control unit 3382 stops the update, and deletes the read-out update program 3376 and carrier certificate.

4.4 Operation

Figure 45:
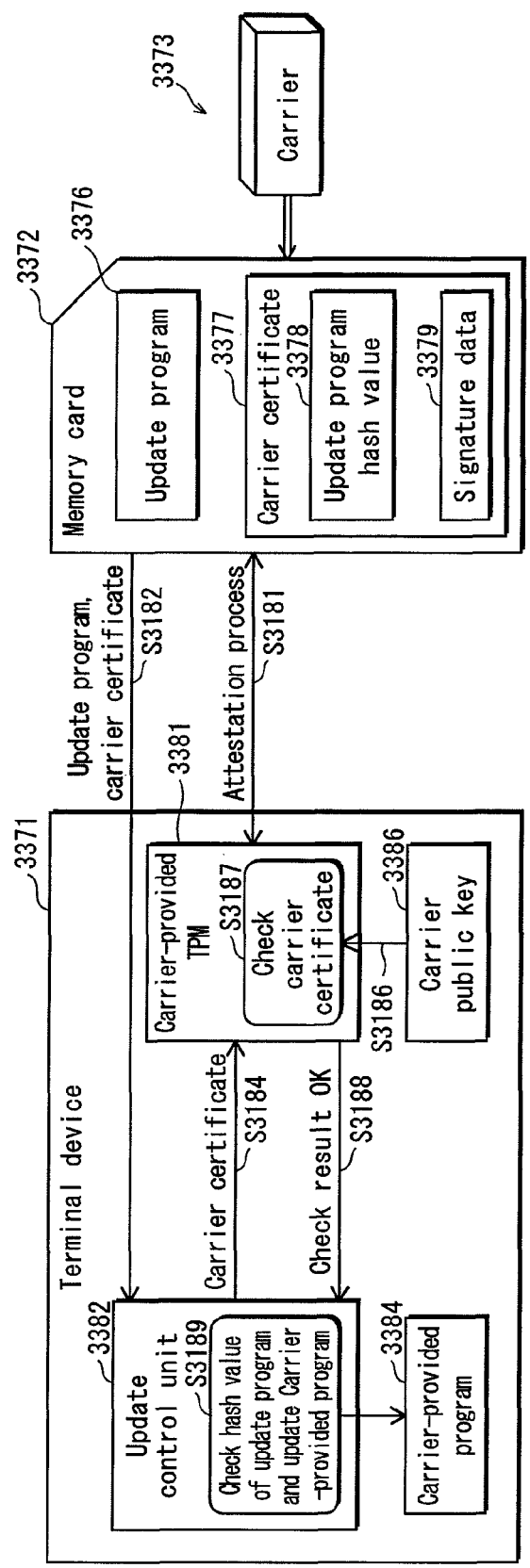
FIG. 45 shows the structure and operation of the terminal device 3371 and the memory card 3372 in Embodiment 4 in the other embodiments.

The following describes the program update operation performed by the terminal device 3371, in a sequential order with reference to FIG. 45. It is presumed here that the memory card 3372 has been issued from an inauthentic carrier, and the data recorded therein has not been tampered with when it is attached to the terminal device 3371.

After the memory card 3372 is attached to the terminal device 3371, an attestation is performed between the carrier-provided TPM 3381 of the terminal device 3371 and the memory card 3372 (verifying device) (step S3181).

When the attestation results in a success, the update control unit 3382 reads out the update program 3376 and the carrier certificate 3377 from the memory card 3372 (step S3182).

Next, the update control unit 3382 outputs the read-out carrier certificate to the carrier-provided TPM 3381, together with a request for verifying the carrier certificate (step S3184).

Upon receiving the request from the update control unit 3382 (step S3184), the carrier-provided TPM 3381 reads out the carrier public key 3386 (step S3186), verifies the signature data included in the carrier certificate, using the read-out carrier public key 3386 (step S3187).

The carrier-provided TPM 3381 then notifies the update control unit 3382 that the verification has resulted in a success (step S3188).

The update control unit 3382 receives the notification that the verification has resulted in a success (step S3188), and then calculates a hash value of the read-out update program. When it confirms that the calculated hash value matches the hash value included in the carrier certificate, the update control unit 3382 updates the carrier-provided program 3384 in accordance with the update program (step S3182).

4.5 Modifications of Embodiment 4

(1) TPM regarding playback of content

In the present modification, a terminal device 3391, as is the case with the terminal device 3371 described in Embodiment 4, is loaded with a TPM that manages at least the carrier-provided program. The terminal device 3391 updates the carrier-provided program 3384 via the memory card 3372 issued by the carrier 3373.

Figure 46:
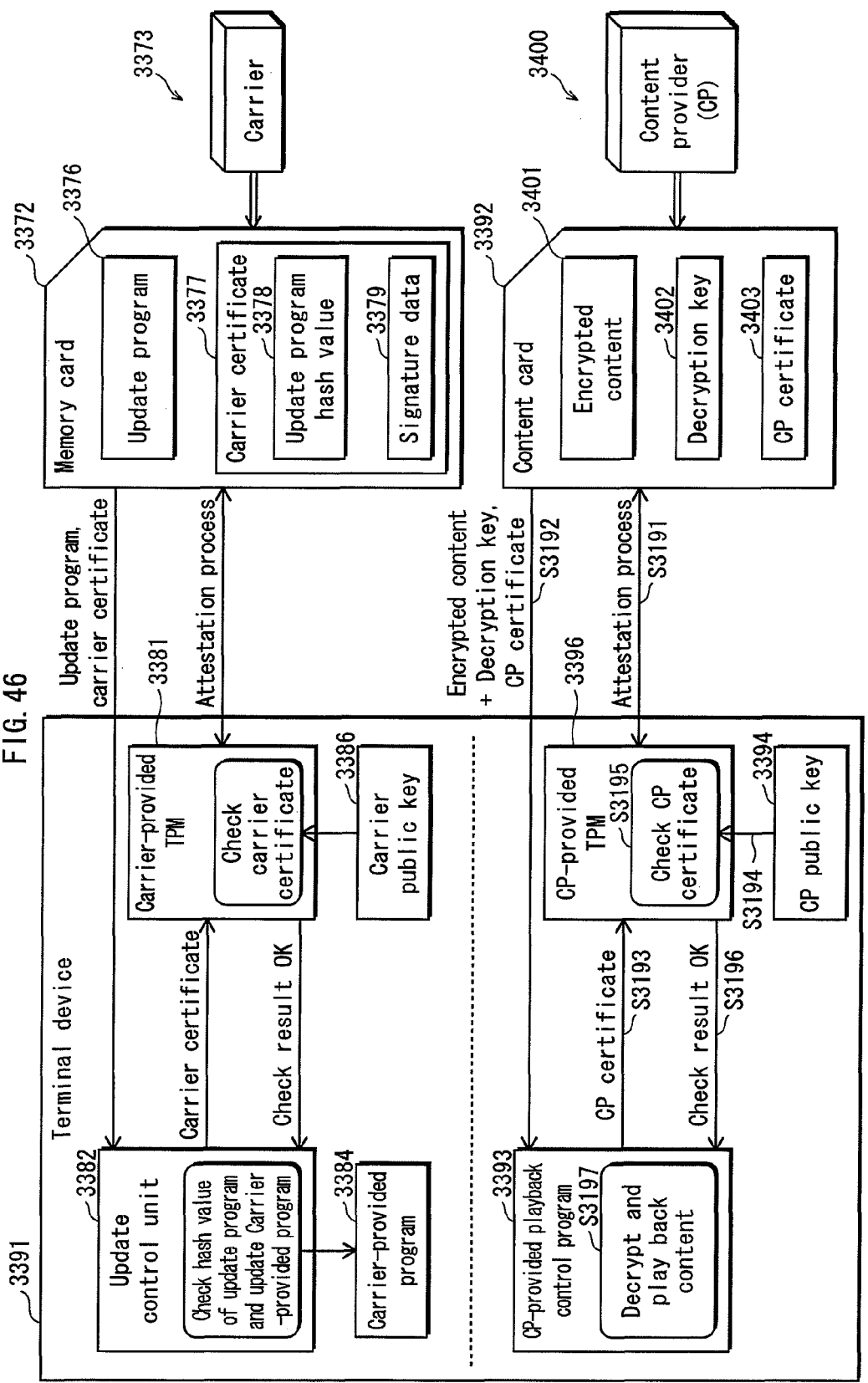
FIG. 46 shows the structure and operation of the terminal device 3392, the memory card 3372, and the content card 3392 in a modification of Embodiment 4 in the other embodiments.

Further, the terminal device 3391, as shown in FIG. 46, stores a CP-provided playback control program 3393 that is provided by a content provider 3400, where a "CP" represents a content provider. The terminal device 3391 is loaded with a CP-provided TPM 3396 for generating and recording PCR values and SML that at least certify the authenticity of the CP-provided playback control program 3393. After the content card 3392 is loaded into the terminal device 3391, a predetermined verification is performed, and then the content is played back by the terminal device 3391.

The operation after the content card 3392 is loaded into the terminal device 3391 is the same as the operation described in Embodiment 4, and thus description thereof is omitted here.

In the content card 3392 that was issued by the authentic content provider 3400, an encrypted content 3401, a decryption key 3402 to be used for decrypting the encrypted content 3401, and a CP certificate 3403 have been recorded. The CP certificate 3403 at least includes predetermined information and signature data that was generated by applying a signature to the predetermined information using the CP private key. The predetermined information is, for example, identification information indicating the content provider 3400, or a hash value of the content provider 3400.

The terminal device 3391 stores; the CP-provided playback control program 3393 that is provided by a CP and includes a procedure for decrypting and playing back a content, and stores a CP public key 3394. A CP public key makes a pair with a CP private key.

The following describes the operation after the content card 3392 is attached to the terminal device.

After the content card 3392 is attached, an attestation is performed between the CP-provided TPM 3396 of the terminal device 3391 and the content card 3392 (verifying device) (step S3191). When the attestation certifies that the programs managed by the CP-provided TPM 3396 are authentic; the CP-provided playback control program 3393 (more specifically, a playback control unit that is achieved as the CPU executes; the CP-provided playback control program 3393) reads out the encrypted content 3401, the decryption key 3402, and the CP certificate 3403 from the content card 3392 (step S3192). After reading these out; the CP-provided playback control program 3393 outputs the read-out CP certificate to the CP-provided TPM 3396, together with a request for verifying the CP certificate (step S3195).

Upon receiving this request, the CP-provided TPM 3396 reads out the CP public key (step S3194), and verifies the signature data included in the CP certificate, using the read-out CP public key (step S3195). The CP-provided TPM 3396 then notifies the CP-provided playback control program 3393 of the verification result (step S3196).

Upon receiving a notification that the CP certificate is authentic; the CP-provided playback control program 3393 generates content by decrypting the encrypted content using the read-out decryption key, and plays back the content (step S3197)

(2) Verifying TPM Provided from Others

In the above-described modification (1), the memory card and the content card perform attestations with the carrier-provided TPM and the CP-provided TPM, respectively. However, not limited to this, for example, the content card 3392 (verifying device) issued by a CP may further perform an attestation with the carrier-provided TPM 3381, and the memory card 3372 (verifying device) may further perform an attestation with the CP-provided TPM 3396.

As another option, as described in Embodiment 3, after a card is attached, first an attestation with a TPM managing programs in a lower layer may be performed, then when the attestation results in a success, the TPM managing programs in the lower layer may activate another TPM, and then an attestation with the activated TPM (managing programs in an upper layer) may be performed.

(3) SIM Card

Figure 47:
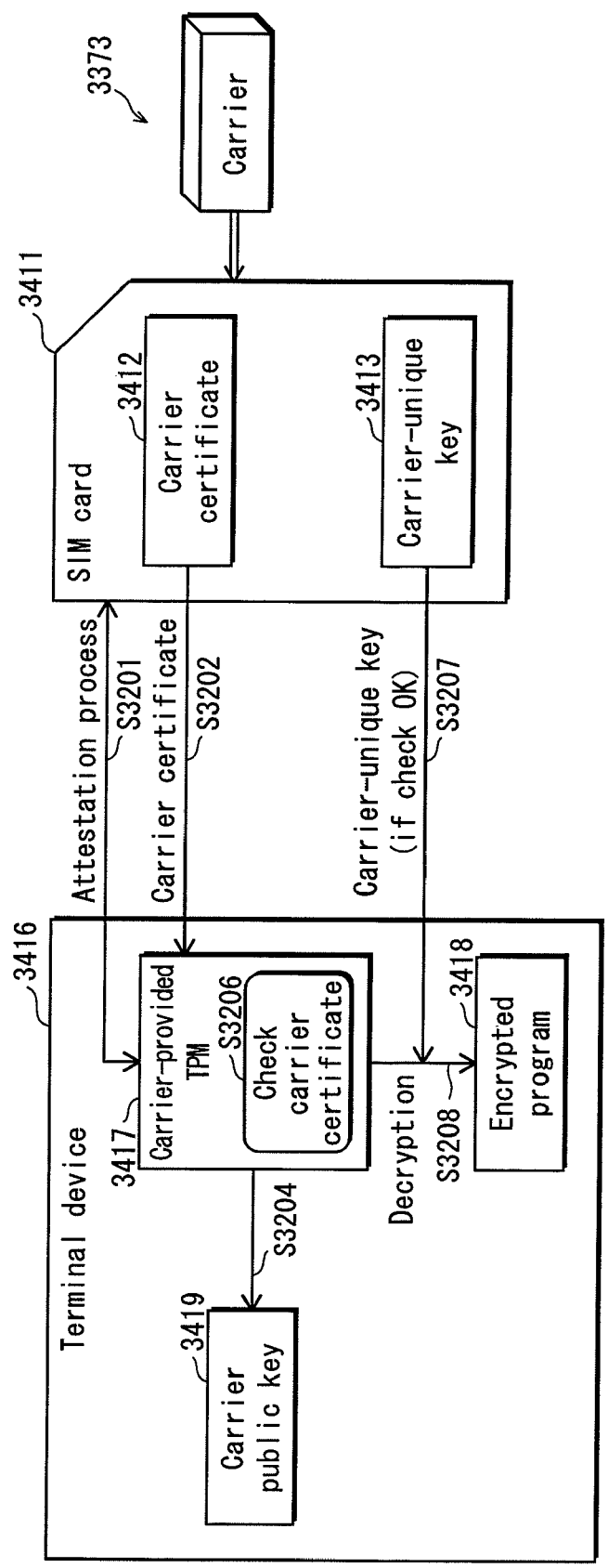
FIG. 47 shows the structure and operation of the terminal device 3416 and the SIM card 3411 in a modification of Embodiment 4 in the other embodiments.

In the above-described structure of Embodiment 4, the terminal device may perform an attestation with a SIM (Subscriber Identity Module Card), instead of the memory card, as the verifying device, and when the authenticity is confirmed, the terminal device may be able to obtain information from the SIM card. FIG. 47 shows the information held by a memory card 3411, and the structure and operation of a terminal device 3416 (in this example, a mobile telephone). In this example, the terminal device 3416 is a mobile telephone.

The memory card 3411 stores a carrier certificate 3412 and a carrier unique key 3413. In the memory card 3411, subscriber information and other information are recorded as well.

The carrier certificate 3412 at least includes: carrier identification information identifying a carrier; and signature data that was generated by applying a signature generation algorithm at least to the carrier identification information, using the carrier private key.

The terminal device 3416 is loaded with a carrier-provided TPM 3417, and stores an encrypted program 3418 and a carrier public key 3419.

The carrier-provided TPM 3417 is loaded with a public key encryption (for example, AES (Advanced Encryption Standard)) engine.

The encrypted program 3418 is generated by encrypting a program for providing a predetermined service, using the carrier unique key.

The carrier public key 3419 is a public key that makes a pair with a carrier private key. The key pair corresponds to the RSA encryption.

The following describes the operation of the terminal device 3416.

First, an attestation between the carrier-provided TPM 3417 (requesting device) and the memory card 3411 (verifying device) is performed, and it is verified whether or not the programs loaded in the memory in the terminal device 3416 are authentic (step S3201). When the attestation ends normally, the carrier-provided TPM 3417 reads out the carrier certificate 3412 from the memory card 3411 (step S3202). Next, the carrier-provided TPM 3417 reads out the carrier public key 3419 (step S3204), and verifies the signature data included in the carrier certificate, using the read-out carrier public key (step S3206). When the verification results in a success, the carrier-provided TPM 3417 reads out the carrier unique key 3413 from the memory card 3411 (step S3207). Next, the carrier-provided TPM 3417 causes a common key encryption engine provided therein to decrypt the encrypted program 3418 using the read-out carrier unique key (step S3208).

(4) Terminal Unique Key

In the above-described modification (3), the SIM card stores a carrier unique key. However, not limited to this, the SIM card may store a terminal unique key instead of the carrier unique key.

In this case, the encrypted program stored in the terminal device has been generated by encrypting a program using the terminal unique key, and only the terminal device can generate the program by decrypting the encrypted program, and use the program.

5. Embodiment 5

In the present embodiment, a terminal device 3431 has a function of a verification device that performs an attestation. The verification data is structured so that even if a signature is applied thereto and the verification data is tampered with, the tampering can be detected easily.

A verifying unit 3438 in the terminal device 3431 first confirms that the verification data has not been tampered with, and then performs an attestation with an internal TPM (requesting side), and verifies whether or not the structure inside the terminal is authentic.

5.2 Structure

Figure 48:
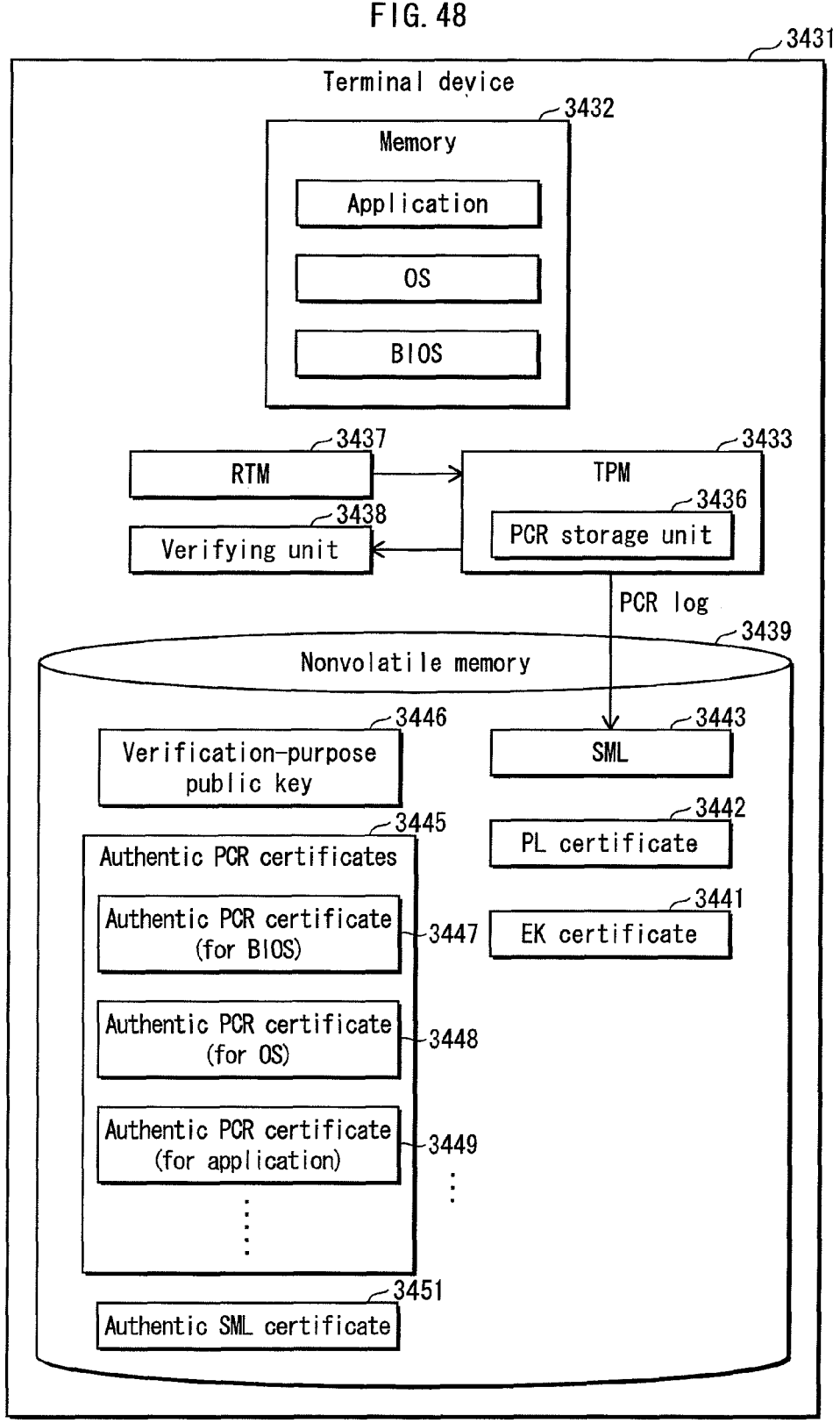
FIG. 48 is a block diagram showing the functional structure of the terminal device 3431 in Embodiment 5 in the other embodiments.

FIG. 48 is a block diagram showing the functional structure of the terminal device 3431. Among various functional units included in the terminal device 3431, only the functional units relating to the attestation are shown in FIG. 48.

The following describes the structure of each functional unit.

(1) Memory 3432

A memory 3432 is composed of RAM and ROM. As one example, the memory 3432 stores the BIOS, OS, and application, as shown in FIG. 48. Each of these programs may include a CRTM code or a RTM code, as is the case with Embodiment 1. Alternatively, as is the case with Modification (4) of Embodiment 1, an RTM program may exist separately from these programs.

The BIOS includes a procedure for loading the OS, and the OS includes a procedure for loading the application.

(2) TPM 3433

A TPM 3433, as is the case with Embodiment 1, receives an integrity value from an RTM 3437, calculates PCR values in correspondence with each program, and stores the calculated PCR values. Also, when any PCR value changes, the TPM 3433 writes a history of PCR values into a nonvolatile memory 3439, and generates an SML 3443. Note that in the present embodiment, generating the AIK key pair and obtaining the AIK certificate are not indispensably necessary, and that, although the verification performed by the verifying unit 3438 outputs the PCR values as they are, the verification may obtain the AIK certificate and output PCR values to which signatures have been applied using the AIK private key, as is the case with Embodiment 1.

(3) Nonvolatile Memory 3439

The nonvolatile memory 3439 is specifically achieved by a hard disk unit, a flash memory, ROM or the like, and stores, as shown in FIG. 48, an EK certificate 3441, a PF certificate 3442, an SML 3443, a verification-purpose public key 3446, an authentic PCR certificates 3445, and an authentic SML certificate 3451.

Of these, the EK certificate 3441, the PF certificate 3442, and the SML 3443 are the same as the corresponding ones in the embodiment described above, and description thereof is omitted here.

The verification-purpose public key 3446, the authentic PCR certificates 3445, and the authentic SML certificate 3451 are written to a non-rewritable area in the nonvolatile memory 3439 during the manufacturing process of the terminal device 3431.

The verification-purpose public key 3446 is a public key corresponding to the RSA encryption, and makes a pair with a verification-purpose private key (which will be described later). The key pairs of a verification-purpose private key and a verification-purpose public key, as one example, correspond to the RSA encryption.

The authentic PCR certificates 3445 is composed of a plurality of authentic PCR certificates 3447, 3448, 3449, . . . . Each authentic PCR certificate at least includes identification information of each program stored in the terminal device 3431, PCR values that were calculated when the program is authentic, and signature data that was generated by applying a signature generation algorithm to the PCR values using the verification-purpose private key.

For example, the authentic PCR certificate 3447 corresponds to the BIOS, and includes identification information of the BIOS, an authentic PCR value (authentic PCR1) that was calculated based on an authentic BIOS code, and signature data that was generated by applying a signature generation algorithm to the authentic PCR1 using the verification-purpose private key.

The authentic SML certificate 3451 includes the authentic SML which has been explained in the embodiment described above, and signature data that was generated by applying a signature generation algorithm to the authentic SML using the verification-purpose private key.

(4) Verifying Unit 3438

The verifying unit 3438, after the terminal device 3431 is booted, reads the verification-purpose public key 3446, the authentic PCR certificates 3445, and the authentic SML certificate 3451 from the nonvolatile memory 3439, and verifies the signature data included in each certificate, using the read-out verification-purpose public key 3446. When any of the verifications results in a failure, the operation of the terminal device 3431 is stopped.

When the verifications of each certificate end normally, the verifying unit 3438 reads out PCR values from a PCR storage unit 3436 in the TPM 3433, and confirms whether or not the read-out PCR values match the authentic PCR values included in each authentic PCR certificate. When there is a mismatch in any pair of a PCR value and a corresponding authentic PCR value, the operation of the terminal device 3431 is stopped.

After it is confirmed that all the read-out PCR values match the authentic PCR values, the verifying unit 3438 reads out the SML 3443 from the nonvolatile memory 3439, and compares the read-out SML with the authentic SML included in the authentic SML certificate 3451. When they do not match, the verifying unit 3438 stops the operation of the terminal device 3431.

When the SML and the authentic SML match, the verifying unit 3438 ends the verification process.

Note that, to conduct more reliable verifications, it is preferable that the verifying unit 3438 is independent from the CPU and the programs loaded in the memory 3432. Accordingly, the verifying unit 3438 is implemented as hardware, or is achieved by a program stored in a non-rewritable secure area. Alternatively, the verifying unit 3438 is achieved by tamper-resistant implementation.

Further, according to the above-provided description, the operation of the terminal device 3431 is stopped when a verification results in a failure. However, not limited to this structure, for example, a predetermined operation may be restricted, and the operation may be continued. Alternatively, an update program, newest authentic PCR certificates, and an authentic SML certificate may be obtained from an external device or a memory card.

5.3 Modification of Embodiment 5

(1) TPM for Each Layer

In Embodiment 5 described above, the terminal device 3431 is loaded with one TPM, and the verifying unit 3438 verifies PCR values corresponding to each program, that are calculated by the TPM. However, not limited to this, the present invention may have a structure where the TPM and the verifying unit are included in each layer of the program.

Figure 49:
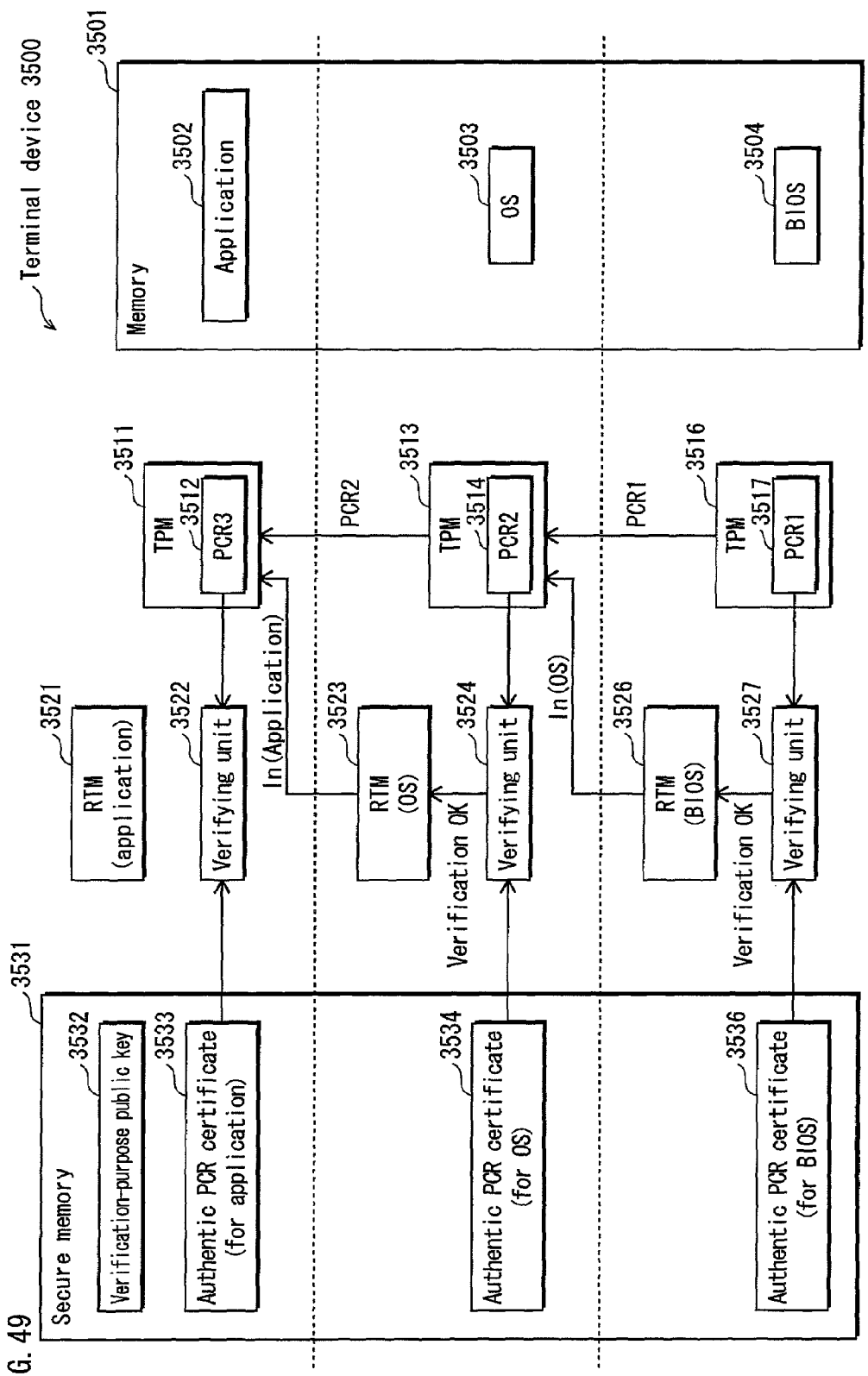
FIG. 49 is a block diagram showing the functional structure of the terminal device 3500 in a modification of Embodiment 5 in the other embodiments.

FIG. 49 shows the structure of a terminal device 3500 in this modification. The terminal device 3500 includes a hard disk unit, a communication unit, an input/output unit, a CPU and the like other than the above-mentioned constitutional elements, but FIG. 49 shows only parts of the terminal device 3500 that relate to the verification. The arrows in FIG. 49 indicate data flows among the constitutional elements.

As shown in FIG. 49, the terminal device 3500 includes a memory 3501, TPMs 3511, 3513 and 3516, RTMs 3521, 3523 and 3526, verifying units 3522, 3524 and 3527, and a secure memory 3531.

The TPM 3511, the RTM 3521 and the verifying unit 3522 correspond to an application 3502; the TPM 3513, the RTM 3523 and the verifying unit 3524 correspond to an OS 3503; and the TPM 3516, the RTM 3526 and the verifying unit 3527 correspond to a BIOS 3504.

(1-1) Memory 3501

The memory 3501 is composed of RAM and ROM, and stores programs that are to be executed by the CPU. The programs are loaded into the memory 3501 in the order of the BIOS 3504, the OS 3503, and the application 3502. Each of the programs includes a procedure of loading higher-order programs into the memory 3501.

(1-2) Secure Memory 3531

The secure memory 3531 is a not-rewritable and not-erasable memory, and stores a verification-purpose public key 3532, authentic PCR certificates 3533, 3534 and 3536. These structures are the same as those of Embodiment described above, and thus description thereof is omitted here.

The authentic PCR certificates 3536, 3534 and 3533 respectively correspond to the BIOS 3504, the OS 3503, and the application 3502 that are in different hierarchical layers.

(1-3) RTMs 3526, 3523 and 3521

The RTM 3526 is a functional unit that is achieved as the CPU execute a CRTM code included in the BIOS 3504. The RTM 3526 calculates an integrity value of the BIOS itself and an integrity value of the program (OS) called by the BIOS.

The RTMs 3523 and 3521 are respectively functional units that are achieved as the CPU execute RTM codes respectively included in the OS 3503 and the application 3502. The RTMs 3523 and 3521 respectively have functions to measure integrity values of programs that are called by the corresponding programs.

(1-4) Verifying Units 3527, 3524 and 3522

The three verifying units respectively verify authenticity of PCR values calculated by corresponding TPMs. The procedure of the verification is similar to that described in Embodiment 5. That is to say, each verifying unit reads out the verification-purpose public key 3532 and an authentic PCR certificate (in this example, only an authentic PCR certificate that corresponds to said each verifying unit) from the secure memory 3531, verifies the read-out authentic PCR certificate, and compares a PCR value held by the corresponding TPM with an authentic PCR value included in the read-out authentic PCR certificate. When the comparison shows that they do not match, the operation of the terminal device 3500 is stopped. Alternatively, loading of the next program by the corresponding program may be stopped.

When the PCR value held by the corresponding TPM matches the authentic PCR value included in the read-out authentic PCR certificate, the verifying unit instructs the corresponding RTM to measure an integrity value of the program that the corresponding program is attempting to load. At the same time, the verifying unit instructs the corresponding TPM to output a stored PCR value to a higher-order TPM.

(1-5) TPMs 3516, 3513 and 3511

Each of the TPMs calculates a PCR value of a corresponding program, and stores the calculated PCR value. Also, each TPM outputs a stored PCR value to a higher-order TPM, in accordance with an instruction by the corresponding verifying unit.

(1-6) Operation

The following will describe the processes performed by the units within the terminal device 3500, where the programs are loaded into the memory 3501 in order from the BIOS 3504 to the application 3502.

When the terminal device is powered on, first the RTM 3526, which is a functional unit that is achieved as the CRTM code included in the BIOS is executed, calculates an integrity value of the CRTM code included in the BIOS 3504. The TPM then calculates PCR0 based on the calculated integrity value. The RTM 3526 then measures an integrity value of the BIOS 3504. The TPM 3516 calculates a PCR value 3517 (PCR1) corresponding to the BIOS, based on the measured integrity value and PCR0, and stores the calculated PCR value 3517 (PCR1). After the PCR1 is calculated, the BIOS 3504 is loaded into the memory 3501 and is executed.

The verifying unit 3527 also reads out the verification-purpose public key 3532 and an authentic PCR certificate (for BIOS) 3536 from the secure memory 3531, verifies the read-out authentic PCR certificate (for BIOS) 3536, and compares PCR1 with an authentic PCR value included in the authentic PCR certificate 3536. When PCR1 and the authentic PCR value match, the verifying unit 3527 instructs the RTM 3526 to measure an integrity value of the program (OS 3503) to be loaded next, and instructs the TPM 3516 to output PCR1.

The RTM 3526 measures integrity value In(OS) of the OS 3503, and outputs the measured integrity value to a higher-order TPM 3513. Also, the TPM 3516 outputs the stored PCR1 to the higher-order TPM 3513.

The TPM 3513 receives the integrity value In(OS) of the OS 3503 from the RTM 3526, and the PCR1 from the TPM 3516. Upon receiving these, the TPM 3513 calculates PCR2 from the received integrity value In(OS) and PCR1, and stores the calculated PCR2.

After the PCR2 is calculated, the BIOS 3504 loads the OS 3503 into the memory 3501. Also, the verifying unit 3524 reads out the verification-purpose public key 3532 and an authentic PCR certificate (for OS) 3534 from the secure memory 3531, verifies the read-out authentic PCR certificate (for OS) 3534 and PCR2, in sequence.

When it is judged that PCR2 matches the authentic PCR value included in the authentic PCR certificate (for OS) 3534, the verifying unit 3524 instructs the RTM 3523 to calculate an integrity value In (Application) of the program (application 3502) that the OS 3503 is attempting to load, and instructs the TPM 3513 to output PCR2 to the higher-order TPM 3511.

In accordance with the instruction by the verifying unit 3524, the RTM 3523 calculates the integrity value In (Application) of the application, and outputs the calculated integrity value to the TPM 3511. Similarly, the TPM 3513 outputs the stored PCR2 to the TPM 3511.

The TPM 3511 receives the integrity value In (Application) from the RTM 3523, and PCR2 from the TPM 3513. Upon receiving these, the TPM 3511 calculates a PCR value 3512 (PCR3) corresponding to the application 3502.

After the PCR3 is calculated, the OS 3503 loads the application 3502 into the memory 3501.

(2) Verification of Higher-Order Layer

In the modification (1) described above, each verifying unit verifies whether or not a program corresponding to itself is authentic, and when the verification results in a success, outputs parameters (more specifically, a PCR value of a lower-order layer and a hash value of a program in a higher-order layer) necessary for the calculations to a TPM in a higher-order layer. However, this structure may be replaced with a structure where the verifying unit verifies the authenticity of the RTM and the verifying unit in the higher-order layer. In the following description, the layers to which the BIOS 3504, the OS 3503 and the application 3502 respectively belong are called the BIOS layer, the OS layer and the application layer, respectively.

Figure 50:
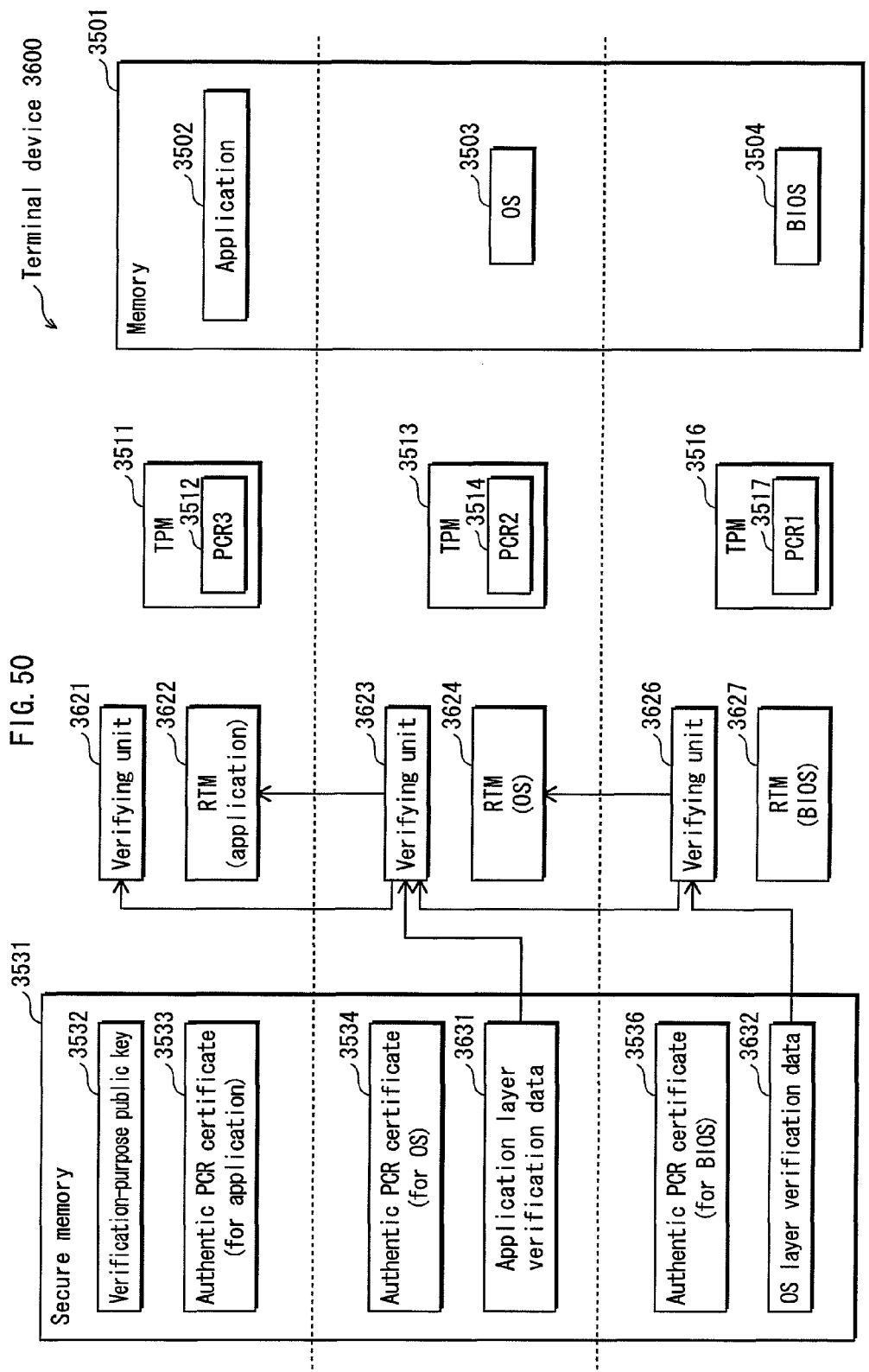
FIG. 50 is a block diagram showing the functional structure of the terminal device 3600 in a modification of Embodiment 5 in the other embodiments.

FIG. 50 shows, among the constitutional elements of a terminal device 3600 in this modification, only the constitutional elements that relate to the verification. The arrows in FIG. 50 indicate verifications of the authenticity of the RTM and the verifying unit in the higher-order layer, performed by the verifying unit in the lower-order layer. The constitutional elements common with those of the modification (1) are attached with the same reference numbers.

The following will describe the structure and operation that are different from those of the modification (1).

(2-1) RTMs 3622, 3624 and 3627

RTMs 3627, 3624 and 3622 respectively belong to the BIOS layer, the OS layer and the application layer, and measure the integrity values of the programs of the layers to which they belong. The RTMs 3622, 3623 and 3627 then output the measured integrity values to TPMs 3516, 3513 and 3511 of the layers to which they belong, respectively.

For example, the RTM 3527 measures the integrity value of the BIOS 3504, and outputs the measured integrity value to the TPM 3516.

Also, when the RTMs 3623 and 3627 are hardware, they receive random numbers from the verifying units of the lower-order layers. Upon receiving the random numbers, the RTMs 3623 and 3627 perform predetermined calculations onto the received random numbers, and output the calculation results to the verifying units of the lower-order layers.

(2-2) TPMs 3516, 3513 and 3511

TPMs 3511, 3513 and 3516 respectively receive integrity values of the programs of the layers to which they belong, from the RTMs 3627, 3624 and 3622. The TPMs 3511, 3513 and 3516 then calculate the PCR values by expanding the received integrity values, and store the calculated PCR values.

The TPMs 3511, 3513 and 3516 also output the stored PCR values to the verifying units that belong to the same layers, in accordance with the requests sent from the verifying units.

For example, the TPM 3516 receives an integrity value from the RTM 3627, calculates PCR1 by expanding the received integrity value, and store the calculated PCR1. Also, upon receiving a PVR value output request from a verifying unit 3626, the TPM 3516 outputs the stored PCR1 to the verifying unit 3626.

(2-3) Secure Memory 3531

The secure memory 3531 stores, in addition to the information explained in the modification (1) described above, an OS layer verification data 3632 and an application layer verification data 3631.

The OS layer verification data 3632 and the application layer verification data 3631 are data used by the verifying units 3626 and 3623 when they verify the authenticity of the verifying units and RTMs of the higher-order layers, respectively.

More specifically, when the verifying units and RTMs are software, the RTM 3622 is a value that is obtained by performing a predetermined calculation onto a normal program code that achieves the functions of the verifying unit 3623 and the RTM 3624. The predetermined calculation can be optionally determined. For example, the predetermined calculation may be a one-way function such as SHA-1, an AES encryption calculation, or a signature calculation. This also applies to the application layer verification data 3631.

Further, when RTMs and verifying units of the higher-order layers are hardware, the OS layer verification data 3632 is data that is calculated by a circuit having the functions of the verifying unit 3623 and the RTM 3624. In this case, the OS layer verification data is written by the verifying unit 3626.

Similarly, the application layer verification data 3631 is written by the verifying unit 3626.

(2-4) Verifying Units 3626, 3623 and 3621

The verifying units 3626, 3623 and 3621, as is the case with the three verifying units in the modification (1) described above, verify the authenticity of the programs corresponding thereto, respectively. The procedure of the verification is the same as that of the modification (1) described above, and description thereof is omitted here.

After the authenticity of the corresponding program is certified, the verifying units 3626 and 3623 verify the authenticity of the RTMs and verifying units of the higher-order layers.

More specifically, when the verifying units and RTMs are software, the verifying unit 3626 generates a concatenated code by concatenating the program code achieving the verifying unit 3623 with the program code achieving the RTM 3624, and performs a predetermined calculation onto the generated concatenated code. Next, the verifying unit 3626 reads out the OS layer verification data 3632 from the secure memory 3531, and compares the read-out OS layer verification data 3632 with the calculation result. When they match, the verifying unit 3626 judges that the RTM 3624 and the verifying unit 3623 of the higher-order layer are authentic, and activates the verifying unit 3623 and the RTM 3624.

Here, the predetermined calculation can be optionally determined. For example, the predetermined calculation may be a one-way function or an encryption calculation, or another different calculation.

The procedure of verifying the verifying unit 3621 and the RTM 3622 performed by the verifying unit 3623 is similar to that described above.

Note that, although in the present modification, the verifying unit 3623 performs a predetermined calculation, the predetermined calculation may be a calculation using a function held by the RTM 3627. Also, in the present modification, a predetermined calculation is performed onto a concatenated code generated by concatenating the program code achieving the verifying unit 3623 with the program code achieving the RTM 3624. However, not limited to this, a predetermined calculation may be performed onto each of the program codes separately, not onto the concatenated code.

When the read-out OS layer verification data 3632 does not match the calculation result, the verifying unit 3626 judges that the RTM 3624 and the verifying unit 3623 of the higher-order layer are not authentic, and stops the operation of the terminal device 3600, or restricts the predetermined functions thereof.

Also, when the verifying units and RTMs are hardware, the verifying unit 3626 generates random numbers, and outputs the generated random numbers to the verifying unit 3623 and the RTM 3624. Following this, the verifying unit 3626 generates OS layer verification data by performing a calculation that is to be performed when the verifying unit 3623 and the RTM 3624 are authentic, and writes the generated OS layer verification data into the secure memory 3531. The verifying unit 3626 then receives a result of a predetermined calculation from the verifying unit 3623 and the RTM 3624.

Upon receiving the calculation result, the verifying unit 3626 reads out the OS layer verification data 3632 from the secure memory 3531, and compares the read-out OS layer verification data with the calculation result. When they match, the verifying unit 3626 judges that the RTM 3624 and the verifying unit 3623 of the higher-order layer are authentic, and activates the verifying unit 3623 and the RTM 3624.

When the read-out OS layer verification data 3632 does not match the calculation result, the verifying unit 3626 judges that the RTM 3624 and the verifying unit 3623 of the higher-order layer are not authentic, and stops the operation of the terminal device 3600, or restricts the predetermined functions thereof.

The procedure of verifying the verifying unit 3621 and the RTM 3622 performed by the verifying unit 3623 is similar to that described above, and description thereof is omitted.

Also, when the verifying unit 3621 and the verifying unit 3623 are hardware, they receive random numbers from the lower-order layers, and then perform a predetermined calculation onto the received random numbers, and output the calculation results to the verifying units of the lower-order layers.

(2-5) Summary

With the above-described structure, after the terminal device is powered on, the verification of authenticity of the BIOS, the verification of authenticity of the verifying units and RTMs of the OS layer, the verification of authenticity of the OS, the verification of authenticity of the verifying units and RTMs of the application layer, and the verification of authenticity of the application layer are performed in sequence.

When all the verifications are successful, the terminal device 3600 can operate normally.

FIG. 50 shows that each TPM receives an integrity value of a program of a layer to which the TPM itself belongs, calculates a PCR value by expanding the received integrity value, and stores the calculated PCR value. However, this is not an indispensable structure, but the integrity value may be stored as it is.

6. Other Modifications

Up to now, the present invention has been described through the embodiments. However, the present invention is not limited to embodiments described above, but includes, for example, the following modifications.

(1) In the above-described embodiments and modifications, the terminals devices and the memory cards are loaded with TPM chips conforming to the TGC standard. However, not limited to this, the integrated circuits to be loaded therein may not conform to a standard, but may be any secure integrated circuits having a function to generate and store information that certifies the authenticity of each machine, in a similar manner to the TPM chips conforming to the standard.

(2) In the above-described embodiments, the terminal device is a personal computer, a music player, a mobile terminal or the like. However, not limited to these, the present invention may be applied to various machines that are loaded with a computer system that operates in accordance with a computer program loaded in a memory or the like.

Some examples of the machines include a network machine such as a server device, a computer-controlled electric product (such as an audio/visual machine or a cooking machine), an automobile, and a robot.

The memory cards have been explained as being attached to the terminal devices, but the memory cards may be contactless IC cards, for example.

(3) Each of the above-described devices is specifically a computer system that includes a microprocessor, ROM, RAM, a hard disk unit, a display unit, a keyboard, a mouse and the like. A computer program is stored in the RAM, the ROM or the hard disk unit. The microprocessor operates in accordance with the computer program and causes each device to achieve the functions. The computer program is composed of a plurality of instruction codes that instruct the computer to achieve predetermined functions.

(4) Part or all of the structural elements constituting the devices described above may be achieved in one system LSI (Large Scale Integration). The system LSI is an ultra multi-functional LSI that is manufactured by integrating a plurality of components on one chip. More specifically, the system LSI is a computer system that includes a microprocessor, ROM, RAM and the like. A computer program is stored in the RAM. The microprocessor operates in accordance with the computer program, thereby enabling the system LSI to achieve its functions.

(5) Part or all of the structural elements constituting each of the above-described devices may be achieved as an IC card or a single module that is attachable/detachable to or from each device. The IC card or module is a computer system that includes a microprocessor, ROM, RAM, and the like. The IC card or module may include the aforesaid ultra multi-functional LSI. The microprocessor operates in accordance with the computer program and causes the IC card or module to achieve the functions. The IC card or module may be tamper resistant.

(6) The present invention may be methods shown by the above. The present invention may be a computer program that allows a computer to realize the methods, or may be a digital signal representing the computer program.

Furthermore, the present invention may be a computer-readable recording medium such as a flexible disk, a hard disk, CD-ROM, MO, DVD, DVD-ROM, DVD RAM, BD (Blu-ray Disc), or a semiconductor memory, that stores the computer program or the digital signal. Furthermore, the present invention may be the digital signal recorded on any of the aforementioned recording mediums.

Furthermore, the present invention may be the computer program or the digital signal transmitted via an electric communication line, a wireless or wired communication line, a network of which the Internet is representative, or a data broadcast.

Furthermore, the present invention may be a computer system that includes a microprocessor and a memory, the memory storing the computer program, and the microprocessor operating according to the computer program.

Furthermore, by transferring the program or the digital signal via the recording medium, or by transferring the program or the digital signal via the network or the like, the program or the digital signal may be executed by another independent computer system.

Furthermore, the present invention includes the case where all functional blocks of the memory card and the SIM card in the embodiment described above are achieved in an LSI being an integrated circuit. Also, the present invention includes the case where not all of but part of the functional blocks is achieved in an LSI. Each of them may be achieved on one chip, or part or all thereof may be achieved on one chip. Although the term LSI is used here, it may be called IC, system LSI, super LSI, ultra LSI or the like, depending on the level of integration.

Also, the method of achieving the integrated circuits is not limited to the LSI, but they may be achieved by dedicated circuits or general-purpose processors. It is also possible to use the FPGA (Field Programmable Gate Array), with which a programming is available after the LSI is manufactured, or the reconfigurable processor that can re-configure the connection or setting of the circuit cells within the LSI.

Furthermore, a technology for an integrated circuit that replaces the LSI may appear in the near future as the semiconductor technology improves or branches into other technologies. In that case, the new technology may be incorporated into the integration of the functional blocks constituting the present invention as described above. Such possible technologies include biotechnology.

(8) The present invention may be any combination of the above-described embodiments and modifications.

The present invention can be used managerially, repetitively and continuously in the industry for manufacturing and selling the devices and cards which constitute the present invention.

The invention claimed is:

1. A requesting device for requesting verification of authenticity of the requesting device itself from a verifying device, comprising:
   a storage unit storing a plurality of computer programs that are to run on the requesting device, the computer programs being hierarchically related to each other;
   a measuring unit, each time one of the plurality of computer programs is loaded, measuring an amount of characteristics of the one of the plurality of computer programs;
   a generation unit which is tamper-resistant and, while a computer program that is one of the plurality of computer programs is loaded, generating certification information reflecting amounts of characteristics of the computer program and other computer programs that have already been loaded and are required to run the computer program;
   an output unit outputting the generated certification information;
   a requesting unit sending a request for secret information to the verifying device;
   a receiving unit receiving either the secret information or an update program, depending on a result of a judgment which is made by the verifying device to confirm whether or not the requesting device is authentic; and
   an update unit, when the receiving unit has received the update program, updating the computer program stored in the storage unit in accordance with the received update program,
   wherein the generation unit includes a plurality of platform configuration registers for storing amounts of characteristics, and
   the generation unit receives a specification of one of the platform configuration registers from the verifying device, and generates the certification information in accordance with an amount of characteristics stored in the register indicated by the specification received, and
   wherein the secret information is an encrypted device key that was generated by encrypting a device key,
   the requesting device further comprises an encrypting unit,
   the receiving unit receives the encrypted device key when the verifying device has confirmed authenticity of the encrypting unit,
   the encrypting unit generates a double-encrypted device key by encrypting the received encrypted device key, based on the device identifier for identifying the requesting device, and
   the requesting device further comprises a device key holding unit holding the generated double-encrypted device key.

2. The requesting device of claim 1, wherein
   the encrypting unit includes:
   a storage subunit storing an encryption program including a plurality of computer instructions constituting an encryption algorithm; and
   a microprocessor that operates in accordance with the encryption program,
   the receiving unit, when the verifying device has failed to confirm authenticity of the encrypting unit, receives, as the update program, an authentic encryption program including a plurality of computer instructions constituting an encryption algorithm, and overwrites the encryption program stored in the storage subunit with the received authentic encryption program, and
   the encrypting unit achieves a function of the encryption algorithm as the microprocessor operates in accordance with the authentic encryption program.

3. The requesting device of claim 2, wherein
   when it has been confirmed that the encryption program for performing an individual encryption was deleted, the receiving unit further receives, from the verifying device, a key that is indispensably required for decrypting the received encrypted device key.

4. A verifying device for verifying authenticity of a requesting device in which a plurality of computer programs hierarchically related to each other, the verifying device comprising:
   an obtaining unit obtaining, from the requesting device, certification information while one computer program among the plurality of computer programs is loaded, the certification information reflecting (a) an amount of characteristics of the one computer program and (b) amounts of characteristics of other computer programs that have already been loaded and are required to run the one computer program;
   a storing unit preliminarily storing verification information reflecting amounts of characteristics which are to be obtained from the one computer program and the other computer programs when the one computer program and the other computer programs are not tampered with;
   a judging unit judging, using the verification information and the obtained certification information, whether or not the requesting device is authentic;
   an information holding unit holding secret information safely;
   a program storage unit storing an update program for updating a computer program including a plurality of computer instructions for operating the requesting device; and
   an output unit outputting the secret information held by the information holding unit to the requesting device when authenticity of the requesting device has been confirmed, and outputting the update program stored in the program storage unit to the requesting device when unauthenticity of the requesting device has been confirmed,
   wherein the obtaining unit obtains certification information that was generated in accordance with an amount of characteristics stored in a platform configuration register specified by the verifying device, and
   the judging unit judges the authenticity of the requesting device, using the obtained certification information and an amount of characteristics to be stored in the platform configuration register, and
   wherein the requesting device includes an encrypting unit encrypting an encrypted device key,
   the information holding unit holds the encrypted device key as the secret information,
   the judging unit judges the authenticity of the requesting device, by judging whether or not the encrypting unit of the requesting device is authentic, and
   the output unit outputs the encrypted device key to the requesting device when authenticity of the encrypting unit has been confirmed.

5. The verifying device of claim 4, wherein
the encrypting unit of the requesting device includes (i) a storage subunit storing an encryption program including a plurality of computer instructions constituting an encryption algorithm, and (ii) a microprocessor that operates in accordance with the encryption program,
the program storage unit stores, as the update program, an authentic encryption program including a plurality of computer instructions constituting the encryption algorithm, and
the output unit outputs the authentic encryption program to the requesting device when unauthenticity of the encrypting unit has been confirmed.

6. The verifying device of claim 5, wherein
the output unit outputs a key required for decrypting the encrypted device key when the judging unit has confirmed that the encryption program for performing an individual encryption was deleted.

* * * * *